(12) United States Patent
Nagata

(10) Patent No.: US 8,732,038 B2
(45) Date of Patent: May 20, 2014

(54) SERVICE MANAGEMENT METHOD, PRODUCT-IN-CIRCULATION TO WHICH THE SAME IS APPLIED, SERVICE MANAGEMENT DEVICE, SERVICE MANAGEMENT NETWORK SYSTEM, SERVICE MANAGEMENT PROGRAM, AND COMPUTER READABLE PROGRAM PRODUCT WITH THE PROGRAM STORED THEREON

(75) Inventor: Masaya Nagata, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1015 days.

(21) Appl. No.: 12/075,622

(22) Filed: Oct. 31, 2007

(65) Prior Publication Data

US 2009/0112738 A1 Apr. 30, 2009

Related U.S. Application Data

(63) Continuation of application No. 09/907,667, filed on Jul. 18, 2001, now abandoned.

(30) Foreign Application Priority Data

| Jul. 19, 2000 | (JP) | 2000-219597 |
| Sep. 25, 2000 | (JP) | 2000-291264 |
| Dec. 27, 2000 | (JP) | 2000-399565 |
| Dec. 27, 2000 | (JP) | 2000-399568 |
| Jan. 15, 2001 | (JP) | 2001-7025 |
| Jan. 16, 2001 | (JP) | 2001-8318 |

(51) Int. Cl.
*G06Q 10/00* (2012.01)

(52) U.S. Cl.
USPC .................................................. 705/28

(58) Field of Classification Search
USPC .......................................................... 705/1, 28
See application file for complete search history.

(56) References Cited

U.S. PATENT DOCUMENTS

| 5,132,729 A | 7/1992 | Matsushita et al. |
| 5,335,048 A | 8/1994 | Takano et al. |

(Continued)

FOREIGN PATENT DOCUMENTS

| JP | 59145179 | 8/1984 |
| JP | 02073264 | 3/1990 |

(Continued)

OTHER PUBLICATIONS

Office Action of Japanese Patent Office dated Nov. 9, 2004, issued in Japanese Patent Application No. 2000-399565.

(Continued)

*Primary Examiner* — Shay S Glass
(74) *Attorney, Agent, or Firm* — Edwards Wildman Palmer LLP; David G. Conlin; Stephen D. LeBarron

(57) ABSTRACT

According to a service management method to supply products-in-circulation to service receivers, a service management system is built that enables the service provider to manage whether the service receivers are using those products-in-circulation delivered from the service provider in an authorized manner. This provides a reasonable service whereby the service receiver is charged only for those products-in-circulation the service receiver has actually used. To this end, the service management device in accordance with the present invention includes: a memory section for registering data of products-in-circulation to be delivered to the service receivers; an input section for entering current status of the products-in-circulation; and an arithmetic processing section for calculating charges on the basis of the number of products-in-circulation that are regarded as having been actually used, not the total number of the delivered product-in-circulations.

11 Claims, 99 Drawing Sheets

(56) References Cited

U.S. PATENT DOCUMENTS

| | | | |
|---|---|---|---|
| 5,594,529 | A | 1/1997 | Yamashita et al. |
| 5,662,055 | A | 9/1997 | Hartwig et al. |
| 5,930,553 | A | 7/1999 | Hirst et al. |
| 6,019,461 | A | 2/2000 | Yoshimura et al. |
| 6,332,062 | B1 | 12/2001 | Phillips et al. |
| 6,430,711 | B1 | 8/2002 | Sekizawa |
| 6,816,968 | B1 | 11/2004 | Walmsley |
| 6,886,748 | B1 | 5/2005 | Moore |
| 6,963,851 | B1 | 11/2005 | Szabo et al. |
| 6,965,411 | B1 | 11/2005 | Jones |
| 7,065,497 | B1 * | 6/2006 | Brewster et al. ........... 705/14.61 |
| 2003/0137685 | A1 | 7/2003 | Meade, II et al. |
| 2006/0095280 | A1 * | 5/2006 | Gooding .......................... 705/1 |

FOREIGN PATENT DOCUMENTS

| | | |
|---|---|---|
| JP | 03-220572 | 9/1991 |
| JP | 3-226767 | 10/1991 |
| JP | 04-151765 | 5/1992 |
| JP | 05-224479 | 9/1993 |
| JP | 06-111039 | 4/1994 |
| JP | 06-250802 | 9/1994 |
| JP | 07-239825 | 9/1995 |
| JP | 07-325514 | 12/1995 |
| JP | 08-152814 | 6/1996 |
| JP | 08-152825 | 6/1996 |
| JP | 08-167960 | 6/1996 |
| JP | 08-211792 | 8/1996 |
| JP | 08-315052 | 11/1996 |
| JP | 09-120238 | 5/1997 |
| JP | 09-156123 | 6/1997 |
| JP | 09-185311 | 7/1997 |
| JP | 09-185474 | 7/1997 |
| JP | 09-259355 | 10/1997 |
| JP | 10-052964 | 2/1998 |
| JP | 10-069139 | 3/1998 |
| JP | 10-105011 | 4/1998 |
| JP | 10-234825 | 9/1998 |
| JP | 10-264968 | 10/1998 |
| JP | 11-085657 | 3/1999 |
| JP | 11-126008 | 5/1999 |
| JP | 11-237816 | 8/1999 |
| JP | 11-239926 | 9/1999 |
| JP | 11-272350 | 10/1999 |
| JP | 11-327367 | 11/1999 |
| JP | 11-352846 | 12/1999 |
| JP | 2000-019803 | 1/2000 |
| JP | 2000-035994 | 2/2000 |
| JP | 2000-069216 | 3/2000 |
| JP | 2000-071581 | 3/2000 |
| JP | 2000-194767 | 7/2000 |
| JP | 2000-206752 | 7/2000 |
| JP | 2000-246921 | 9/2000 |
| JP | 2000-296904 | 10/2000 |
| JP | 2000-347503 | 12/2000 |
| JP | 2001-228761 | 8/2001 |
| JP | 2001-228762 | 8/2001 |
| JP | 2001-246822 | 9/2001 |
| JP | 2001-251464 | 9/2001 |
| JP | 2000-325554 | 11/2001 |
| JP | 2002-031988 | 1/2002 |

OTHER PUBLICATIONS

"Development of Remote Facsimile Maintenance System," NTT Technique Journal, Japan, telecommunications Association, Nov. 1, 1995, vol. 7, Issue 11, pp. 68-69.

Office Action issued in co-pending U.S. Appl. No. 13/867,610, dated Oct. 7, 2013.

Office action issued in co-pending U.S. Appl. No. 11/982,335, dated Aug. 1, 2012.

\* cited by examiner

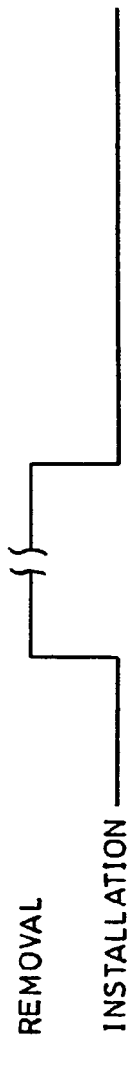
FIG. 7 (a)
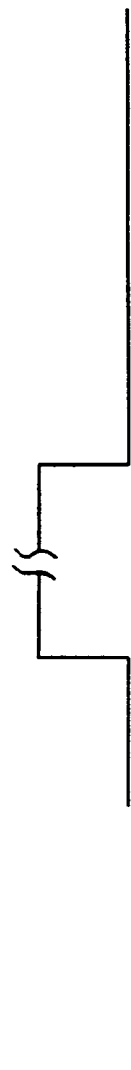
FIG. 7 (b)
FIG. 7 (c)
FIG. 7 (d)
FIG. 7 (e)
FIG. 7 (f)
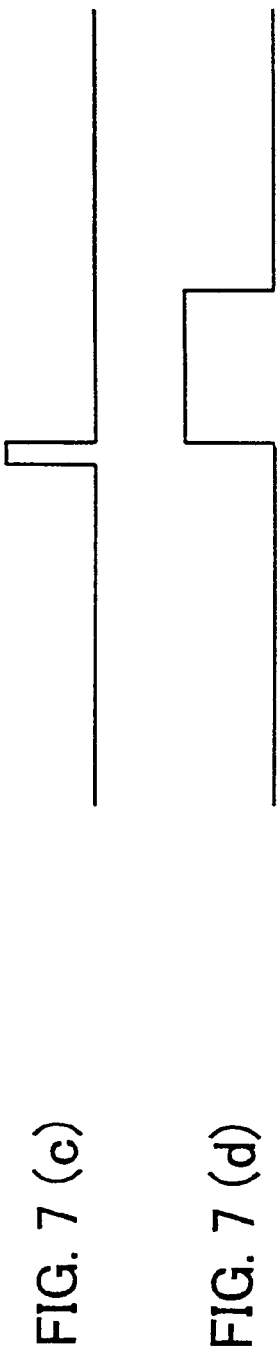
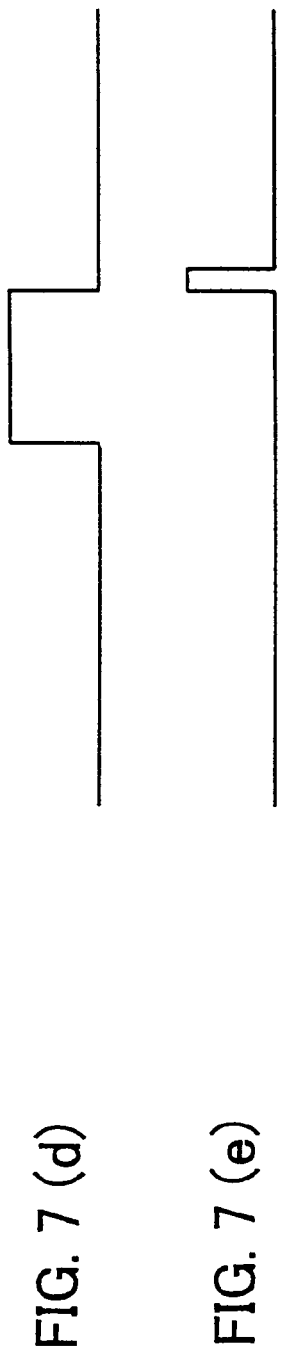
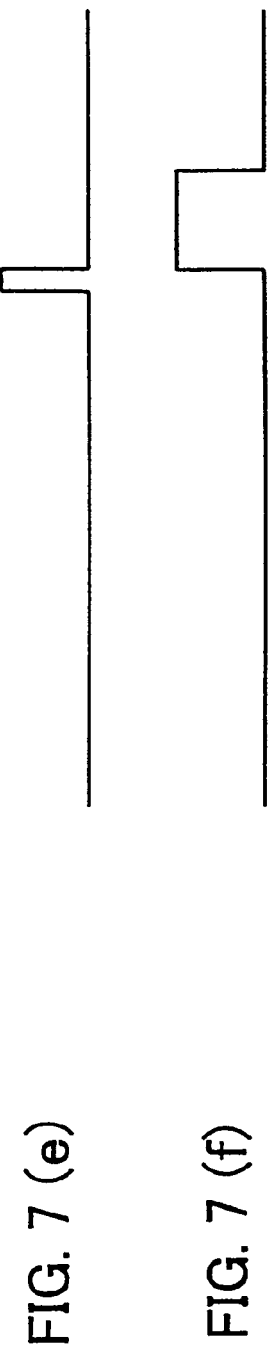
REMOVAL
INSTALLATION

FIG. 8 (a)

CONTRACT SIGNER TABLE[1]

| ID NUMBER | NAME OF CONTRACT SIGNER | STREET ADDRESS | EMAIL ADDRESS | TELEPHONE NO. | DATE OF CONTRACT SIGNED | METHOD OF PAYMENT | ... |
|---|---|---|---|---|---|---|---|
| 000001 | A CO., LTD. | | | | | | |
| 000002 | B INC. | GENERAL AFFAIRS DEPARTMENT | | | | | |
| 000003 | C CO., LTD. | ABC DIVISION | | | | | |
| 000004 | C CO., LTD. | XYZ DIVISION | | | | | |
| 000005 | | | | | | | |
| ... | | | | | | | |

FIG. 8 (b)

CONTRACT SIGNER TABLE[2]

| ID NUMBER | CONTRACT MODEL1 | CONTRACT MODEL2 | CONTRACT MODEL3 | ... |
|---|---|---|---|---|
| 000001 | AR-2000 | NO CONTRACT | NO CONTRACT | |
| 000002 | AR-2000 | NO CONTRACT | NO CONTRACT | |
| 000003 | AR-2000 | AR-2001 | NO CONTRACT | |
| 000004 | AR-2000 | NO CONTRACT | NO CONTRACT | |
| 000005 | | | | |
| ... | | | | |

FIG. 9 (a) INSTALLED CARTRIDGE DATA

MACHINE MODEL: AR-2000 LIBRE

| CARTRIDGE TYPE | DATE OF REPLACEMENT | INSTALLED CARTRIDGE DATA ||||  CORRESPONDING SPARE CARTRIDGE No. |
| --- | --- | --- | --- | --- | --- | --- |
| | | FULL DATA (FULL DIGITS) | COLOR DATA (FIRST TWO DIGITS) | MODEL DATA | UNIQUE DATA | DATE OF EXPIRY | |
| BLACK | N/A | N/A | N/A | N/A | N/A | N/A | N/A |
| YELLOW | N/A | N/A | N/A | N/A | N/A | N/A | N/A |
| MAGENTA | N/A | N/A | N/A | N/A | N/A | N/A | N/A |
| CYAN | N/A | N/A | N/A | N/A | N/A | N/A | N/A |

| PHOTOSENSITIVE BODY | N/A | N/A | N/A | N/A | N/A | N/A |
| --- | --- | --- | --- | --- | --- | --- |

FIG. 9 (b) SPARE CARTRIDGE DATA

MACHINE MODEL: AR-2000 LIBRE          DATE: 03/21/2000/15:58

| No. | DATE OF DELIVERY | DATE OF INSTALLATION | SPARE CARTRIDGE DATA |||| DATE OF EXPIRY |
| --- | --- | --- | --- | --- | --- | --- | --- |
| | | | FULL DATA (FULL DIGITS) | COLOR DATA (FIRST TWO DIGITS) | MODEL DATA | UNIQUE DATA | CURRENT STATUS | |
| 1 | N/A | N/A | N/A | N/A | N/A | N/A | N/A | N/A |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |

FIG. 10 (a) INSTALLED CARTRIDGE DATA

MACHINE MODEL  AR-2000 LIBRE

| CARTRIDGE TYPE | DATE OF REPLACEMENT | INSTALLED CARTRIDGE DATA ||||| CORRESPONDING SPARE CARTRIDGE No. |
|---|---|---|---|---|---|---|
| | | FULL DATA (FULL DIGITS) | COLOR DATA (FIRST TWO DIGITS) | MODEL DATA | UNIQUE DATA | DATE OF EXPIRY | |
| BLACK | N/A | N/A | N/A | N/A | N/A | N/A | N/A |
| YELLOW | N/A | N/A | N/A | N/A | N/A | N/A | N/A |
| MAGENTA | N/A | N/A | N/A | N/A | N/A | N/A | N/A |
| CYAN | N/A | N/A | N/A | N/A | N/A | N/A | N/A |
| PHOTOSENSITIVE BODY | N/A | N/A | | | | N/A | |

FIG. 10 (b) SPARE CARTRIDGE DATA

MACHINE MODEL  AR-2000 LIBRE     DATE  03/21/2000/15:58

| No. | DATE OF DELIVERY | DATE OF INSTALLATION | SPARE CARTRIDGE DATA ||||| CURRENT STATUS | DATE OF EXPIRY |
|---|---|---|---|---|---|---|---|---|---|
| | | | FULL DATA (FULL DIGITS) | COLOR DATA (FIRST TWO DIGITS) | MODEL DATA | UNIQUE DATA | | |
| 1 | 3/22/2000 | | 0000 0000 0000 0101 0000 | BLACK TONER(00) | AR-2000 | 0000 0000 0000 0101 0000 | NEW (SPARE) | N/A |
| 2 | 3/22/2000 | | 0100 0000 0000 0000 0100 | YELLOW TONER(01) | AR-2000 | 0000 0000 0000 0000 0100 | NEW (SPARE) | N/A |
| 3 | 3/22/2000 | | 1000 0000 0000 0000 1100 | MAGENTA TONER(10) | AR-2000 | 0000 0000 0000 0000 1100 | NEW (SPARE) | N/A |
| 4 | 3/22/2000 | | 1100 0000 0000 0000 0111 | CYAN TONER(11) | AR-2000 | 0000 0000 0000 0000 0111 | NEW (SPARE) | N/A |
| 5 | 3/22/2000 | | 0000 0000 0000 0101 0001 | BLACK TONER(00) | AR-2000 | 0000 0000 0000 0101 0001 | NEW (SPARE) | N/A |
| 6 | 3/22/2000 | | 0100 0000 0000 0000 0101 | YELLOW TONER(01) | AR-2000 | 0000 0000 0000 0000 0101 | NEW (SPARE) | N/A |
| 7 | 3/22/2000 | | 1000 0000 0000 0000 1101 | MAGENTA TONER(10) | AR-2000 | 0000 0000 0000 0000 1101 | NEW (SPARE) | N/A |
| 8 | 3/22/2000 | | 1100 0000 0000 0000 1000 | CYAN TONER(11) | AR-2000 | 0000 0000 0000 0000 1000 | NEW (SPARE) | N/A |
| 9 | . . . | | | | | | | |
| 10 | . . . | | | | | | | |
| 11 | | | | | | | | |

FIG. 11 (a) INSTALLED CARTRIDGE DATA

MACHINE MODEL: AR-2000 LIBRE

| CARTRIDGE TYPE | DATE OF REPLACEMENT | INSTALLED CARTRIDGE DATA ||||| CORRESPONDING SPARE CARTRIDGE |
|---|---|---|---|---|---|---|
| | | FULL DATA (FULL DIGITS) | COLOR DATA (FIRST TWO DIGITS) | MODEL DATA | UNIQUE DATA | DATE OF EXPIRY | No. |
| BLACK | 3/22/2000 | 0000 0000 0000 0101 0000 | BLACK TONER (00) | AR-2000 | 0000 0000 0101 0000 | N/A | 1 |
| YELLOW | 3/22/2000 | 0100 0000 0000 0000 0100 | YELLOW TONER (01) | AR-2000 | 0000 0000 0000 0100 | N/A | 2 |
| MAGENTA | 3/22/2000 | 1000 0000 0000 0000 1100 | MAGENTA TONER (10) | AR-2000 | 0000 0000 0000 1100 | N/A | 3 |
| CYAN | 3/22/2000 | 1100 0000 0000 0000 0111 | CYAN TONER (11) | AR-2000 | 0000 0000 0000 0111 | N/A | 4 |
| PHOTOSENSITIVE BODY | N/A | N/A | N/A | N/A | N/A | N/A | N/A |

FIG. 11 (b) SPARE CARTRIDGE DATA

MACHINE MODEL: AR-2000 LIBRE       DATE: 03/22/2000/16:45

| No. | DATE OF DELIVERY | DATE OF INSTALLATION | SPARE CARTRIDGE DATA |||||  |
|---|---|---|---|---|---|---|---|---|
| | | | FULL DATA (FULL DIGITS) | COLOR DATA (FIRST TWO DIGITS) | MODEL DATA | UNIQUE DATA | CURRENT STATUS | DATE OF EXPIRY |
| 1 | 3/22/2000 | 3/22/2000 | 0000 0000 0000 0101 0000 | BLACK TONER (00) | AR-2000 | 0000 0000 0101 0000 | IN USE | N/A |
| 2 | 3/22/2000 | 3/22/2000 | 0100 0000 0000 0000 0100 | YELLOW TONER (01) | AR-2000 | 0000 0000 0000 0100 | IN USE | N/A |
| 3 | 3/22/2000 | 3/22/2000 | 1000 0000 0000 0000 1100 | MAGENTA TONER (10) | AR-2000 | 0000 0000 0000 1100 | IN USE | N/A |
| 4 | 3/22/2000 | 3/22/2000 | 1100 0000 0000 0000 0111 | CYAN TONER (11) | AR-2000 | 0000 0000 0000 0111 | IN USE | N/A |
| 5 | 3/22/2000 | | 0000 0000 0000 0101 0001 | BLACK TONER (00) | AR-2000 | 0000 0000 0101 0001 | NEW (SPARE) | |
| 6 | 3/22/2000 | | 0100 0000 0000 0000 0101 | YELLOW TONER (01) | AR-2000 | 0000 0000 0000 0101 | NEW (SPARE) | |
| 7 | 3/22/2000 | | 1000 0000 0000 0000 1101 | MAGENTA TONER (10) | AR-2000 | 0000 0000 0000 1101 | NEW (SPARE) | |
| 8 | 3/22/2000 | | 1100 0000 0000 0000 1000 | CYAN TONER (11) | AR-2000 | 0000 0000 0000 1000 | NEW (SPARE) | |
| 9 | . | | | | | | | |
| 10 | . | | | | | | | |
| 11 | . | | | | | | | |

FIG. 12 (a) INSTALLED CARTRIDGE DATA

MACHINE MODEL: AR-2000 LIBRE

INSTALLED CARTRIDGE DATA

| CARTRIDGE TYPE | DATE OF REPLACEMENT | FULL DATA (FULL DIGITS) | COLOR DATA (FIRST TWO DIGITS) | MODEL DATA | UNIQUE DATA | DATE OF EXPIRY | CORRESPONDING SPARE CARTRIDGE No. |
|---|---|---|---|---|---|---|---|
| BLACK | 6/12/2000 | 0000 0000 0000 0101 0001 | BLACK TONER (00) | AR-2000 | 0000 0000 0101 0001 | N/A | 5 |
| YELLOW | 3/22/2000 | 0100 0000 0000 0000 0100 | YELLOW TONER (01) | AR-2000 | 0000 0000 0000 0100 | N/A | 2 |
| MAGENTA | 3/22/2000 | 1000 0000 0000 0000 1100 | MAGENTA TONER (10) | AR-2000 | 0000 0000 0000 1100 | N/A | 3 |
| CYAN | 3/22/2000 | 1100 0000 0000 0000 0111 | CYAN TONER (11) | AR-2000 | 0000 0000 0000 0111 | N/A | 4 |
| PHOTOSENSITIVE BODY | N/A | N/A | N/A | N/A | N/A | N/A | N/A |

FIG. 12 (b) SPARE CARTRIDGE DATA

MACHINE MODEL: AR-2000 LIBRE     DATE: 06/12/2000/10:56

SPARE CARTRIDGE DATA

| No. | DATE OF DELIVERY | DATE OF INSTALLATION | FULL DATA (FULL DIGITS) | COLOR DATA (FIRST TWO DIGITS) | MODEL DATA | UNIQUE DATA | CURRENT STATUS | DATE OF EXPIRY |
|---|---|---|---|---|---|---|---|---|
| 1 | 3/22/2000 | 3/22/2000 | 0000 0000 0000 0101 0000 | BLACK TONER (00) | AR-2000 | 0000 0000 0101 0000 | USED | N/A |
| 2 | 3/22/2000 | 3/22/2000 | 0100 0000 0000 0000 0100 | YELLOW TONER (01) | AR-2000 | 0000 0000 0000 0100 | IN USE | N/A |
| 3 | 3/22/2000 | 3/22/2000 | 1000 0000 0000 0000 1100 | MAGENTA TONER (10) | AR-2000 | 0000 0000 0000 1100 | IN USE | N/A |
| 4 | 3/22/2000 | 3/22/2000 | 1100 0000 0000 0000 0111 | CYAN TONER (11) | AR-2000 | 0000 0000 0000 0111 | IN USE | N/A |
| 5 | 3/22/2000 | 6/12/2000 | 0000 0000 0000 0101 0001 | BLACK TONER (00) | AR-2000 | 0000 0000 0101 0001 | IN USE | N/A |
| 6 | 3/22/2000 | | 0100 0000 0000 0000 0101 | YELLOW TONER (01) | AR-2000 | 0000 0000 0000 0101 | NEW (SPARE) | N/A |
| 7 | 3/22/2000 | | 1000 0000 0000 0000 1101 | MAGENTA TONER (10) | AR-2000 | 0000 0000 0000 1101 | NEW (SPARE) | N/A |
| 8 | 3/22/2000 | | 1100 0000 0000 0000 1000 | CYAN TONER (11) | AR-2000 | 0000 0000 0000 1000 | NEW (SPARE) | N/A |
| 9 | 6/20/2000 | | 0000 0000 0000 0101 0010 | BLACK TONER (00) | AR-2000 | 0000 0000 0101 0010 | NEW (SPARE) | N/A |
| 10 | . | | | | | | | |
| 11 | . | | | | | | | |

FIG.13

ACCOUNTING LIST[1] (PERIOD: MARCH 16, 2000 - APRIL 15, 2000)

CONTRACT NUMBER: 000125
CONTRACT MODEL: AR-2000 LIBRE

| No. | PRODUCT | DATE OF INSTALLATION | QUANTITY | UNIT PRICE | SUBTOTAL |
|---|---|---|---|---|---|
| 1 | BLACK TONER CARTRIDGE | 3/22/2000 | 1 | △△△△.△ | △△△△.△ |
| 2 | YELLOW TONER CARTRIDGE | 3/22/2000 | 1 | △△△△.△ | △△△△.△ |
| 3 | MAGENTA TONER CARTRIDGE | 3/22/2000 | 1 | △△△△.△ | △△△△.△ |
| 4 | CYAN TONER CARTRIDGE | 3/22/2000 | 1 | △△△△.△ | △△△△.△ |
| 5 | | | | | |
| TOTAL | | | | | △△△△.△ |

ACCOUNTING LIST[2] (PERIOD: APRIL 16, 2000 - MAY 15, 2000)

CONTRACT NUMBER: 000125
CONTRACT MODEL: AR-2000 LIBRE

| No. | PRODUCT | DATE OF INSTALLATION | QUANTITY | UNIT PRICE | SUBTOTAL |
|---|---|---|---|---|---|
| 1 | NO DATA | | | | 0 |
| 2 | | | | | |
| 3 | | | | | |
| 4 | | | | | |
| 5 | | | | | |
| TOTAL | | | | | 0 |

ACCOUNTING LIST[3] (PERIOD: MAY 16, 2000 - JUNE 15, 2000)

CONTRACT NUMBER: 000125
CONTRACT MODEL: AR-2000 LIBRE

| No. | PRODUCT | DATE OF INSTALLATION | QUANTITY | UNIT PRICE | SUBTOTAL |
|---|---|---|---|---|---|
| 1 | BLACK TONER CARTRIDGE | 6/12/2000 | 1 | △△△△.△ | △△△△.△ |
| 2 | | | | | |
| 3 | | | | | |
| 4 | | | | | |
| 5 | | | | | |
| TOTAL | | | | | △△△△.△ |

FIG. 16 (a)
FIG. 16 (b)
FIG. 16 (c)
```
    . . . .
<FORM ACTION="...">
  <INPUT TYPE="checkbox" NAME="0210">·SOFTWARE FOR PC<BR>
  <INPUT TYPE="checkbox" NAME="0220">·WESTERN MOVIES (ON DVD)<BR>
  <INPUT TYPE="checkbox" NAME="0230">·JAPANESE MOVIES (ON DVD)<BR>
       ...
</FORM>
    . . . .
```
FIG. 16 (d)
| DATA | NUMBER OF REPLIES |
|---|---|
| 0210 | 84 |
| 0220 | 173 |
| 0230 | 50 |
| ... | |
FIG. 16 (e)
| DATA | NUMBER OF REPLIES |
|---|---|
| 0210 | SOFTWARE FOR PC |
| 0220 | WESTERN MOVIES (ON DVD) |
| 0230 | JAPANESE MOVIES (ON DVD) |
| ... | |

FIG. 26

CONTRACT SIGNER ID : 000125

| No. | DATE OF DELIVERY | DATE OF PURCHACE | DATE OF COLLECTION | ADVANCE PRODUCT DATA ||||||| REMARKS 1 | REMARKS 2 | UNIQUE DATA | PURCHASED? |
| --- | --- | --- | --- | --- | --- | --- | --- | --- | --- | --- | --- | --- | --- |
| | | | | FULL DATA (FULL DIGITS) | TOP LEVEL GROUP CODE | TOP LEVEL GROUP | SECOND LEVEL GROUP CODE | SECOND LEVEL GROUP | TITLE | | | | |
| 1 | N/A | | | N/A | N/A | N/A | N/A | N/A | N/A | N/A | N/A | N/A | N/A |
| 2 | | | | | | | | | | | | | |
| 3 | | | | | | | | | | | | | |
| 4 | | | | | | | | | | | | | |
| 5 | | | | | | | | | | | | | |
| 6 | | | | | | | | | | | | | |
| 7 | | | | | | | | | | | | | |
| 8 | | | | | | | | | | | | | |
| 9 | . | | | | | | | | | | | | |
| 10 | . | | | | | | | | | | | | |
| 11 | | | | | | | | | | | | | |

FIG. 27

CONTRACT SIGNER ID : 000125

| No. | DATE OF DELIVERY | DATE OF PURCHACE | DATE OF COLLECTION | ADVANCE PRODUCT DATA ||||||||| PURCHASED? |
|---|---|---|---|---|---|---|---|---|---|---|---|---|
| | | | | FULL DATA (FULL DIGITS) | TOP LEVEL GROUP CODE | TOP LEVEL GROUP | SECOND LEVEL GROUP CODE | SECOND LEVEL GROUP | TITLE | REMARKS 1 | REMARKS 2 | UNIQUE DATA | |
| 1 | 3/1/2000 | — | — | 0010 0000 0000 0101 0000 | 00 | CD-ROM | 10 | APPLICATION, SOFTWARE | △△△ | DATA SEARCH AND PROCESSING APPLICATION | FOR PC | 0000 0000 0101 0000 | NEW (SPARE) |
| 2 | 3/1/2000 | — | — | 0010 0000 0000 0000 0100 | 00 | CD-ROM | 10 | APPLICATION, SOFTWARE | □□□ | TRANSLATION SOFTWARE | " | 0000 0000 0000 0100 | NEW (SPARE) |
| 3 | 3/1/2000 | — | — | 0010 0000 0000 0000 1100 | 00 | CD-ROM | 10 | APPLICATION, SOFTWARE | ○○○ | INTERNET ASSISTANT SOFTWARE | " | 0000 0000 0000 1100 | NEW (SPARE) |
| 4 | 3/1/2000 | — | — | 1100 0000 0000 0000 0111 | 11 | UNRECORDED MEDIUM | 00 | VHS | — | FOR GENERAL USE (FIVE TAPES PER PACK) | | 0000 0000 0000 0111 | NEW (SPARE) |
| 5 | 3/1/2000 | — | — | 1101 0000 0000 0101 0001 | 11 | UNRECORDED MEDIUM | 01 | DV | — | FOR GENERAL USE | FOR DIGITAL VIDEO | 0000 0000 0101 0001 | NEW (SPARE) |
| 6 | | | | | | | | | | | | | |
| 7 | | | | | | | | | | | | | |
| 8 | | | | | | | | | | | | | |
| 9 | . | | | | | | | | | | | | |
| 10 | . | | | | | | | | | | | | |
| 11 | | | | | | | | | | | | | |

FIG. 28

CONTRACT SIGNER ID : 000125

| No. | DATE OF DELIVERY | DATE OF PURCHASE | DATE OF COLLECTION | ADVANCE PRODUCT DATA ||||||||| PURCHASED? |
|---|---|---|---|---|---|---|---|---|---|---|---|---|
| | | | | FULL DATA (FULL DIGITS) | TOP LEVEL GROUP CODE | TOP LEVEL GROUP | SECOND LEVEL GROUP CODE | SECOND LEVEL GROUP | TITLE | REMARKS 1 | REMARKS 2 | UNIQUE DATA | |
| 1 | 3/1/2000 | ###### | — | 0010 0000 0000 0101 0000 | 00 | CD-ROM | 10 | APPLICATION, SOFTWARE | △△△ | DATA SEARCH AND PROCESSING APPLICATION | FOR PC | 0000 0000 0101 0000 | BOUGHT |
| 2 | 3/1/2000 | — | — | 0010 0000 0000 0000 0100 | 00 | CD-ROM | 10 | APPLICATION, SOFTWARE | □□□ | TRANSLATION SOFTWARE | " | 0000 0000 0000 0100 | NEW (SPARE) |
| 3 | 3/1/2000 | — | — | 0010 0000 0000 0000 1100 | 00 | CD-ROM | 10 | APPLICATION, SOFTWARE | ○○○ | INTERNET ASSISTANT SOFTWARE | " | 0000 0000 0000 1100 | NEW (SPARE) |
| 4 | 3/1/2000 | — | — | 1100 0000 0000 0000 0111 | 11 | UNRECORDED MEDIUM | 00 | VHS | — | FOR GENERAL USE (FIVE TAPES PER PACK) | | 0000 0000 0000 0111 | NEW (SPARE) |
| 5 | 3/1/2000 | 3/8/2000 | — | 1101 0000 0000 0101 0001 | 11 | UNRECORDED MEDIUM | 01 | DV | — | FOR GENERAL USE (FIVE TAPES PER PACK) | FOR DIGITAL VIDEO | 0000 0000 0101 0001 | NEW (SPARE) |
| 6 | | | | | | | | | | | | | |
| 7 | | | | | | | | | | | | | |
| 8 | | | | | | | | | | | | | |
| 9 | · | | | | | | | | | | | | |
| 10 | · | | | | | | | | | | | | |
| 11 | | | | | | | | | | | | | |

FIG. 29

CONTRACT SIGNER ID : 000125

| No. | DATE OF DELIVERY | DATE OF PURCHACE | DATE OF COLLECTION | ADVANCE PRODUCT DATA ||||| TITLE | REMARKS 1 | REMARKS 2 | UNIQUE DATA | PURCHASED? |
|---|---|---|---|---|---|---|---|---|---|---|---|---|
| | | | | FULL DATA (FULL DIGITS) | TOP LEVEL GROUP CODE | TOP LEVEL GROUP | SECOND LEVEL GROUP CODE | SECOND LEVEL GROUP | | | | | ADVANCE PURCHASED? |
| 1 | 3/1/2000 | ####### | — | 0010 0000 0000 0101 0000 | 00 | CD-ROM | 10 | APPLICATION, SOFTWARE | △△△ | DATA SEARCH AND PROCESSING APPLICATION | FOR PC | 0000 0000 0101 0000 | BOUGHT |
| 2 | 3/1/2000 | — | ####### | 0010 0000 0000 0000 0100 | 00 | CD-ROM | 10 | APPLICATION, SOFTWARE | □□□ | TRANSLATION SOFTWARE | " | 0000 0000 0000 0100 | NEW (SPARE) |
| 3 | 3/1/2000 | — | ####### | 0010 0000 0000 0000 1100 | 00 | CD-ROM | 10 | APPLICATION, SOFTWARE | ○○○ | INTERNET ASSISTANT SOFTWARE | " | 0000 0000 0000 1100 | NEW (SPARE) |
| 4 | 3/1/2000 | — | ####### | 1100 0000 0000 0000 0111 | 11 | UNRECORDED MEDIUM | 00 | VHS | — | FOR GENERAL USE (FIVE TAPES PER PACK) | | 0000 0000 0000 0111 | NEW (SPARE) |
| 5 | 3/1/2000 | 3/8/2000 | — | 1101 0000 0000 0101 0001 | 11 | UNRECORDED MEDIUM | 01 | DV | — | FOR GENERAL USE (FIVE TAPES PER PACK) | FOR DIGITAL VIDEO | 0000 0000 0101 0001 | BOUGHT |
| 6 | 4/1/2000 | — | — | 1110 0000 0000 0000 0101 | 11 | UNRECORDED MEDIUM | 10 | MD | — | FOR GENERAL USE (FIVE TAPES PER PACK) | | 0000 0000 0000 0101 | NEW (SPARE) |
| 7 | 4/1/2000 | — | — | 0010 0000 0000 0000 1101 | 00 | CD-ROM | 10 | APPLICATION, SOFTWARE | ◎◎◎ | MAIL APPLICATION | FOR PC | 0000 0000 0000 1101 | NEW (SPARE) |
| 8 | 4/1/2000 | — | — | 0100 0000 0000 0000 1000 | 01 | DVD | 00 | MOVIE | ▽▽▽ | WITH SUBTITLE | | 0000 0000 0000 1000 | NEW (SPARE) |
| 9 | . | | | | | | | | | | | | |
| 10 | . | | | | | | | | | | | | |
| 11 | | | | | | | | | | | | | |

FIG.30

TERMINAL STATION TABLE

| TERMINAL STATION ID | CONTRACT SIGNER ID |
|---|---|
| 000001 | 000001 |
| 000002 | 216320 |
| 000003 | 002560 |
| 000004 | 380905 |
| 000005 | 102611 |
| . | . |
| . | . |
| . | . |

CUSTOMER TABLE

| TERMINAL STATION ID | NAME | REMARKS |
|---|---|---|
| 000001 | MR. S. SMITH | PRIVATE |
| 000002 | MS. J. FOX | PRIVATE |
| 000003 | ABC | CORPORATE |
| 000004 | MR. M. HENRY | PRIVATE |
| 000005 | | |
| . | | |
| . | | |
| . | | |

FIG.31

ACCOUNTING LIST[1] (PERIOD: MARCH 16, 2000 – APRIL 15, 2000)

CONTRACT NUMBER: 000125
CONTRACT MODEL: AR-2000 LIBRE

| No. | PRODUCT | DATE OF INSTALLATION | QUANTITY | UNIT PRICE | SUBTOTAL |
|---|---|---|---|---|---|
| 1 | APPLICATION | 4/8/2000 | 1 | △△△△. △ | △△△△. △ |
| 2 | DV CASSETTE | 4/10/2000 | 1 | △△△△. △ | △△△△. △ |
| 3 | | | | | |
| 4 | | | | | |
| 5 | | | | | |
| TOTAL | GENERAL | | | | △△△△. △ |

ACCOUNTING LIST[2] (PERIOD: APRIL 16, 2000 – MAY 15, 2000)

CONTRACT NUMBER: 000125
CONTRACT MODEL: AR-2000 LIBRE

| No. | PRODUCT | DATE OF INSTALLATION | QUANTITY | UNIT PRICE | SUBTOTAL |
|---|---|---|---|---|---|
| 1 | NOT SPECIFIED | | | | 0 |
| 2 | | | | | |
| 3 | | | | | |
| 4 | | | | | |
| 5 | | | | | |
| TOTAL | | | | | 0 |

ACCOUNTING LIST[3] (PERIOD: MAY 16, 2000 – JUNE 15, 2000)

CONTRACT NUMBER: 000125
CONTRACT MODEL: AR-2000 LIBRE

| No. | PRODUCT | DATE OF INSTALLATION | QUANTITY | UNIT PRICE | SUBTOTAL |
|---|---|---|---|---|---|
| 1 | MOVIES | 6/12/2000 | 1 | △△△△. △ | △△△△. △ |
| 2 | | | | | |
| 3 | | | | | |
| 4 | | | | | |
| 5 | | | | | |
| TOTAL | | | | | △△△△. △ |

FIG. 32

UNIQUE DATA—CONTRACT SIGNER ID TABLE

CURRENT DATE AND TIME: 3/22/2000

| UNIQUE DATA | REMARKS | CONTRACT SIGNER ID |
|---|---|---|
| 0000 0000 0000 0000 0000 | BLACK TONER CARTRIDGE FOR AR-2000 | 001604 |
| 0000 0000 0000 0000 0001 | | 001604 |
| ... | | ... |
| 0000 0000 0000 0101 0000 | | 000125 |
| 0000 0000 0000 0101 0001 | | 000125 |
| 0000 0000 0000 0101 0010 | | 000209 |
| ... | | ... |
| 0100 0000 0000 0000 0000 | YELLOW TONER CARTRIDGE FOR AR-2000 | 003161 |
| ... | | ... |
| 0100 0000 0000 0000 0100 | | 000125 |
| 0100 0000 0000 0000 0101 | | 000125 |
| ... | | ... |
| 1000 0000 0000 0000 0000 | MAGENTA TONER CARTRIDGE FOR AR-2000 | 003161 |
| ... | | ... |
| 1000 0000 0000 0000 1100 | | 000125 |
| 1000 0000 0000 0000 1101 | | 000125 |
| ... | | ... |
| 1100 0000 0000 0000 0000 | CYAN TONER CARTRIDGE FOR AR-2000 | 003161 |
| ... | | ... |
| 1100 0000 0000 0000 0111 | | 000125 |
| 1100 0000 0000 0000 1000 | | 000125 |
| ... | ... | ... |

FIG. 37 (a) INSTALLED CARTRIDGE DATA

MACHINE MODEL: AR-2000 LIBRE

| CARTRIDGE TYPE | DATE OF REPLACEMENT | INSTALLED CARTRIDGE DATA ||||| CORRESPONDING SPARE CARTRIDGE No. |
|---|---|---|---|---|---|---|
| | | FULL DATA (FULL DIGITS) | COLOR DATA (FIRST TWO DIGITS) | MODEL DATA | UNIQUE DATA | REMAINING AMOUNT | |
| BLACK | N/A | N/A | N/A | N/A | N/A | N/A | N/A |
| YELLOW | N/A | N/A | N/A | N/A | N/A | N/A | N/A |
| MAGENTA | N/A | N/A | N/A | N/A | N/A | N/A | N/A |
| CYAN | N/A | N/A | N/A | N/A | N/A | N/A | N/A |

| PHOTOSENSITIVE BODY | N/A | N/A | N/A | N/A | N/A | N/A |
|---|---|---|---|---|---|---|

FIG. 37 (b) SPARE CARTRIDGE DATA

MACHINE MODEL: AR-2000 LIBRE          DATE: 03/21/2000/15:58

| No. | DATE OF DELIVERY | DATE OF INSTALLATION | SPARE CARTRIDGE DATA ||||| REMAINING AMOUNT |
|---|---|---|---|---|---|---|---|
| | | | FULL DATA (FULL DIGITS) | COLOR DATA (FIRST TWO DIGITS) | MODEL DATA | UNIQUE DATA | CURRENT STATUS | |
| 1 | N/A | N/A | N/A | N/A | N/A | N/A | N/A | N/A |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |

FIG. 38 (a) INSTALLED CARTRIDGE DATA

MACHINE MODEL: AR-2000 LIBRE

| CARTRIDGE TYPE | DATE OF REPLACEMENT | INSTALLED CARTRIDGE DATA | | | | CORRESPONDING SPARE CARTRIDGE No. |
|---|---|---|---|---|---|---|
| | | FULL DATA (FULL DIGITS) | COLOR DATA (FIRST TWO DIGITS) | MODEL DATA | UNIQUE DATA | REMAINING AMOUNT | |
| BLACK | N/A | N/A | N/A | N/A | N/A | N/A | N/A |
| YELLOW | N/A | N/A | N/A | N/A | N/A | N/A | N/A |
| MAGENTA | N/A | N/A | N/A | N/A | N/A | N/A | N/A |
| CYAN | N/A | N/A | N/A | N/A | N/A | N/A | N/A |
| PHOTOSENSITIVE BODY | N/A | N/A | | | | N/A | N/A |

FIG. 38 (b) SPARE CARTRIDGE DATA

MACHINE MODEL: AR-2000 LIBRE     DATE: 03/22/2000/15:58

| No. | DATE OF DELIVERY | DATE OF INSTALLATION | SPARE CARTRIDGE DATA | | | | | |
|---|---|---|---|---|---|---|---|---|
| | | | FULL DATA (FULL DIGITS) | COLOR DATA (FIRST TWO DIGITS) | MODEL DATA | UNIQUE DATA | CURRENT STATUS | REMAINING AMOUNT |
| 1 | 3/22/2000 | | 0000 0000 0000 0101 0000 | BLACK TONER (00) | AR-2000 | 0000 0000 0101 0000 | NEW (SPARE) | N/A |
| 2 | 3/22/2000 | | 0100 0000 0000 0000 0100 | YELLOW TONER (01) | AR-2000 | 0000 0000 0000 0100 | NEW (SPARE) | N/A |
| 3 | 3/22/2000 | | 1000 0000 0000 0000 1100 | MAGENTA TONER (10) | AR-2000 | 0000 0000 0000 1100 | NEW (SPARE) | N/A |
| 4 | 3/22/2000 | | 1100 0000 0000 0000 0111 | CYAN TONER (11) | AR-2000 | 0000 0000 0000 0111 | NEW (SPARE) | N/A |
| 5 | 3/22/2000 | | 0000 0000 0000 0101 0001 | BLACK TONER (00) | AR-2000 | 0000 0000 0101 0001 | NEW (SPARE) | N/A |
| 6 | 3/22/2000 | | 0100 0000 0000 0000 0101 | YELLOW TONER (01) | AR-2000 | 0000 0000 0000 0101 | NEW (SPARE) | N/A |
| 7 | 3/22/2000 | | 1000 0000 0000 0000 1101 | MAGENTA TONER (10) | AR-2000 | 0000 0000 0000 1101 | NEW (SPARE) | N/A |
| 8 | 3/22/2000 | | 1100 0000 0000 0000 1000 | CYAN TONER (11) | AR-2000 | 0000 0000 0000 1000 | NEW (SPARE) | N/A |
| 9 | · | | | | | | | |
| 10 | · | | | | | | | |
| 11 | · | | | | | | | |

FIG. 39 (a) INSTALLED CARTRIDGE DATA

MACHINE MODEL: AR-2000 LIBRE

| CARTRIDGE TYPE | DATE OF REPLACEMENT | INSTALLED CARTRIDGE DATA ||||| CORRESPONDING SPARE CARTRIDGE No. |
|---|---|---|---|---|---|---|
| | | FULL DATA (FULL DIGITS) | COLOR DATA (FIRST TWO DIGITS) | MODEL DATA | UNIQUE DATA | REMAINING AMOUNT | |
| BLACK | 3/22/2000 | 0000 0000 0000 0101 0000 | BLACK TONER (00) | AR-2000 | 0000 0000 0101 0000 | L1 | 1 |
| YELLOW | 3/22/2000 | 0100 0000 0000 0000 0100 | YELLOW TONER (01) | AR-2000 | 0000 0000 0000 0100 | L1 | 2 |
| MAGENTA | 3/22/2000 | 1000 0000 0000 0000 1100 | MAGENTA TONER (10) | AR-2000 | 0000 0000 0000 1100 | L1 | 3 |
| CYAN | 3/22/2000 | 1100 0000 0000 0000 0111 | CYAN TONER (11) | AR-2000 | 0000 0000 0000 0111 | L1 | 4 |
| PHOTOSENSITIVE BODY | N/A | N/A | N/A | N/A | N/A | N/A | N/A |

FIG. 39 (b) SPARE CARTRIDGE DATA

MACHINE MODEL: AR-2000 LIBRE     DATE: 03/22/2000/16:45

| No. | DATE OF DELIVERY | DATE OF INSTALLATION | SPARE CARTRIDGE DATA ||||| CURRENT STATUS | REMAINING AMOUNT |
|---|---|---|---|---|---|---|---|---|---|
| | | | FULL DATA (FULL DIGITS) | COLOR DATA (FIRST TWO DIGITS) | MODEL DATA | UNIQUE DATA | | |
| 1 | 3/22/2000 | 3/22/2000 | 0000 0000 0000 0101 0000 | BLACK TONER (00) | AR-2000 | 0000 0000 0101 0000 | IN USE | L1 |
| 2 | 3/22/2000 | 3/22/2000 | 0100 0000 0000 0000 0100 | YELLOW TONER (01) | AR-2000 | 0000 0000 0000 0100 | IN USE | L1 |
| 3 | 3/22/2000 | 3/22/2000 | 1000 0000 0000 0000 1100 | MAGENTA TONER (10) | AR-2000 | 0000 0000 0000 1100 | IN USE | L1 |
| 4 | 3/22/2000 | 3/22/2000 | 1100 0000 0000 0000 0111 | CYAN TONER (11) | AR-2000 | 0000 0000 0000 0111 | IN USE | L1 |
| 5 | 3/22/2000 | | 0000 0000 0000 0101 0001 | BLACK TONER (00) | AR-2000 | 0000 0000 0101 0001 | NEW (SPARE) | |
| 6 | 3/22/2000 | | 0100 0000 0000 0000 0101 | YELLOW TONER (01) | AR-2000 | 0000 0000 0000 0101 | NEW (SPARE) | |
| 7 | 3/22/2000 | | 1000 0000 0000 0000 1101 | MAGENTA TONER (10) | AR-2000 | 0000 0000 0000 1101 | NEW (SPARE) | |
| 8 | 3/22/2000 | | 1100 0000 0000 0000 1000 | CYAN TONER (11) | AR-2000 | 0000 0000 0000 1000 | NEW (SPARE) | |
| 9 | . | | | | | | | |
| 10 | . | | | | | | | |
| 11 | . | | | | | | | |

FIG. 40 (a) INSTALLED CARTRIDGE DATA

MACHINE MODEL: AR-2000 LIBRE

| CARTRIDGE TYPE | DATE OF REPLACEMENT | INSTALLED CARTRIDGE DATA ||||| CORRESPONDING SPARE CARTRIDGE No. |
|---|---|---|---|---|---|---|
| | | FULL DATA (FULL DIGITS) | COLOR DATA (FIRST TWO DIGITS) | MODEL DATA | UNIQUE DATA | REMAINING AMOUNT | |
| BLACK | 3/22/2000 | 0000 0000 0000 0101 0000 | BLACK TONER (00) | AR-2000 | 0000 0000 0101 0000 | L3 | 1 |
| YELLOW | 3/22/2000 | 0100 0000 0000 0000 0100 | YELLOW TONER (01) | AR-2000 | 0000 0000 0000 0100 | L2 | 2 |
| MAGENTA | 3/22/2000 | 1000 0000 0000 0000 1100 | MAGENTA TONER (10) | AR-2000 | 0000 0000 0000 1100 | L2 | 3 |
| CYAN | 3/22/2000 | 1100 0000 0000 0000 0111 | CYAN TONER (11) | AR-2000 | 0000 0000 0000 0111 | L2 | 4 |
| PHOTOSENSITIVE BODY | N/A | N/A | N/A | N/A | N/A | N/A | N/A |

FIG. 40 (b) SPARE CARTRIDGE DATA

MACHINE MODEL: AR-2000 LIBRE          DATE: 03/22/2000/16:45

| No. | DATE OF DELIVERY | DATE OF INSTALLATION | SPARE CARTRIDGE DATA ||||| REMAINING AMOUNT |
|---|---|---|---|---|---|---|---|---|
| | | | FULL DATA (FULL DIGITS) | COLOR DATA (FIRST TWO DIGITS) | MODEL DATA | UNIQUE DATA | CURRENT STATUS | |
| 1 | 3/22/2000 | 3/22/2000 | 0000 0000 0000 0101 0000 | BLACK TONER (00) | AR-2000 | 0000 0000 0101 0000 | IN USE | L3 |
| 2 | 3/22/2000 | 3/22/2000 | 0100 0000 0000 0000 0100 | YELLOW TONER (01) | AR-2000 | 0000 0000 0000 0100 | IN USE | L2 |
| 3 | 3/22/2000 | 3/22/2000 | 1000 0000 0000 0000 1100 | MAGENTA TONER (10) | AR-2000 | 0000 0000 0000 1100 | IN USE | L2 |
| 4 | 3/22/2000 | 3/22/2000 | 1100 0000 0000 0000 0111 | CYAN TONER (11) | AR-2000 | 0000 0000 0000 0111 | IN USE | L2 |
| 5 | 3/22/2000 | | 0000 0000 0000 0101 0001 | BLACK TONER (00) | AR-2000 | 0000 0000 0101 0001 | NEW (SPARE) | |
| 6 | 3/22/2000 | | 0100 0000 0000 0101 0101 | YELLOW TONER (01) | AR-2000 | 0000 0000 0101 0101 | NEW (SPARE) | |
| 7 | 3/22/2000 | | 1000 0000 0000 1101 1101 | MAGENTA TONER (10) | AR-2000 | 0000 0000 1101 1101 | NEW (SPARE) | |
| 8 | 3/22/2000 | | 1100 0000 0000 0000 1000 | CYAN TONER (11) | AR-2000 | 0000 0000 0000 1000 | NEW (SPARE) | |
| 9 | . | | | | | | | |
| 10 | . | | | | | | | |
| 11 | . | | | | | | | |

FIG. 41 (a) INSTALLED CARTRIDGE DATA

MACHINE MODEL: AR-2000 LIBRE

| CARTRIDGE TYPE | DATE OF REPLACEMENT | INSTALLED CARTRIDGE DATA ||||| CORRESPONDING SPARE CARTRIDGE |
| | | FULL DATA (FULL DIGITS) | COLOR DATA (FIRST TWO DIGITS) | MODEL DATA | UNIQUE DATA | REMAINING AMOUNT | No. |
|---|---|---|---|---|---|---|---|
| BLACK | 3/22/2000 | 0000 0000 0000 0101 0000 | BLACK TONER (00) | AR-2000 | 0000 0000 0101 0000 | L4 | 1 |
| YELLOW | 3/22/2000 | 0100 0000 0000 0000 0100 | YELLOW TONER (01) | AR-2000 | 0000 0000 0000 0100 | L2 | 2 |
| MAGENTA | 3/22/2000 | 1000 0000 0000 0000 1100 | MAGENTA TONER (10) | AR-2000 | 0000 0000 0000 1100 | L3 | 3 |
| CYAN | 3/22/2000 | 1100 0000 0000 0000 0111 | CYAN TONER (11) | AR-2000 | 0000 0000 0000 0111 | L2 | 4 |
| PHOTOSENSITIVE BODY | N/A | N/A | N/A | N/A | N/A | N/A | N/A |

FIG. 41 (b) SPARE CARTRIDGE DATA

MACHINE MODEL: AR-2000 LIBRE    DATE: 06/12/2000/10:56

| No. | DATE OF DELIVERY | DATE OF INSTALLATION | SPARE CARTRIDGE DATA |||||  REMAINING AMOUNT |
| | | | FULL DATA (FULL DIGITS) | COLOR DATA (FIRST TWO DIGITS) | MODEL DATA | UNIQUE DATA | CURRENT STATUS | |
|---|---|---|---|---|---|---|---|---|
| 1 | 3/22/2000 | 3/22/2000 | 0000 0000 0000 0101 0000 | BLACK TONER (00) | AR-2000 | 0000 0000 0101 0000 | IN USE | L4 |
| 2 | 3/22/2000 | 3/22/2000 | 0100 0000 0000 0000 0100 | YELLOW TONER (01) | AR-2000 | 0000 0000 0000 0100 | IN USE | L2 |
| 3 | 3/22/2000 | 3/22/2000 | 1000 0000 0000 0000 1100 | MAGENTA TONER (10) | AR-2000 | 0000 0000 0000 1100 | IN USE | L3 |
| 4 | 3/22/2000 | 3/22/2000 | 1100 0000 0000 0000 0111 | CYAN TONER (11) | AR-2000 | 0000 0000 0000 0111 | IN USE | L2 |
| 5 | 3/22/2000 | 6/12/2000 | 0000 0000 0000 0101 0001 | BLACK TONER (00) | AR-2000 | 0000 0000 0101 0001 | NEW (SPARE) | N/A |
| 6 | 3/22/2000 | | 0100 0000 0000 0000 0101 | YELLOW TONER (01) | AR-2000 | 0000 0000 0000 0101 | NEW (SPARE) | N/A |
| 7 | 3/22/2000 | | 1000 0000 0000 0000 1101 | MAGENTA TONER (10) | AR-2000 | 0000 0000 0000 1101 | NEW (SPARE) | N/A |
| 8 | 3/22/2000 | | 1100 0000 0000 0000 1000 | CYAN TONER (11) | AR-2000 | 0000 0000 0000 1000 | NEW (SPARE) | N/A |
| 9 | | | | | | | | |
| 10 | | | | | | | | |
| 11 | | | | | | | | |

FIG. 42 (a) INSTALLED CARTRIDGE DATA

MACHINE MODEL: AR-2000 LIBRE

| CARTRIDGE TYPE | DATE OF REPLACEMENT | INSTALLED CARTRIDGE DATA ||||| CORRESPONDING SPARE CARTRIDGE No. |
|---|---|---|---|---|---|---|
| | | FULL DATA (FULL DIGITS) | COLOR DATA (FIRST TWO DIGITS) | MODEL DATA | UNIQUE DATA | REMAINING AMOUNT | |
| BLACK | 6/12/2000 | 0000 0000 0000 0101 0001 | BLACK TONER (00) | AR-2000 | 0000 0000 0101 0001 | L1 | 5 |
| YELLOW | 3/22/2000 | 0100 0000 0000 0000 0100 | YELLOW TONER (01) | AR-2000 | 0000 0000 0000 0100 | L2 | 2 |
| MAGENTA | 3/22/2000 | 1000 0000 0000 0000 1100 | MAGENTA TONER (10) | AR-2000 | 0000 0000 0000 1100 | L3 | 3 |
| CYAN | 3/22/2000 | 1100 0000 0000 0000 0111 | CYAN TONER (11) | AR-2000 | 0000 0000 0000 0111 | L2 | 4 |
| PHOTOSENSITIVE BODY | N/A | N/A | N/A | N/A | N/A | N/A | N/A |

FIG. 42 (b) SPARE CARTRIDGE DATA

MACHINE MODEL: AR-2000 LIBRE        DATE: 06/12/2000/10:56

| No. | DATE OF DELIVERY | DATE OF INSTALLATION | SPARE CARTRIDGE DATA ||||| CURRENT STATUS | REMAINING AMOUNT |
|---|---|---|---|---|---|---|---|---|
| | | | FULL DATA (FULL DIGITS) | COLOR DATA (FIRST TWO DIGITS) | MODEL DATA | UNIQUE DATA | | |
| 1 | 3/22/2000 | 3/22/2000 | 0000 0000 0000 0101 0000 | BLACK TONER (00) | AR-2000 | 0000 0000 0101 0000 | USED | L4 |
| 2 | 3/22/2000 | 3/22/2000 | 0100 0000 0000 0000 0100 | YELLOW TONER (01) | AR-2000 | 0000 0000 0000 0100 | IN USE | L2 |
| 3 | 3/22/2000 | 3/22/2000 | 1000 0000 0000 0000 1100 | MAGENTA TONER (10) | AR-2000 | 0000 0000 0000 1100 | IN USE | L3 |
| 4 | 3/22/2000 | 3/22/2000 | 1100 0000 0000 0000 0111 | CYAN TONER (11) | AR-2000 | 0000 0000 0000 0111 | IN USE | L2 |
| 5 | 3/22/2000 | 6/12/2000 | 0000 0000 0000 0101 0001 | BLACK TONER (00) | AR-2000 | 0000 0000 0101 0001 | IN USE | L1 |
| 6 | 3/22/2000 | | 0100 0000 0000 0000 0101 | YELLOW TONER (01) | AR-2000 | 0000 0000 0000 0101 | NEW (SPARE) | N/A |
| 7 | 3/22/2000 | | 1000 0000 0000 0000 1101 | MAGENTA TONER (10) | AR-2000 | 0000 0000 0000 1101 | NEW (SPARE) | N/A |
| 8 | 3/22/2000 | | 1100 0000 0000 0000 1000 | CYAN TONER (11) | AR-2000 | 0000 0000 0000 1000 | NEW (SPARE) | N/A |
| 9 | . . | | | | | | | |
| 10 | . . | | | | | | | |
| 11 | | | | | | | | |

FIG. 43 (a) INSTALLED CARTRIDGE DATA

MACHINE MODEL: AR-2000 LIBRE

| CARTRIDGE TYPE | DATE OF REPLACEMENT | INSTALLED CARTRIDGE DATA ||||| CORRESPONDING SPARE CARTRIDGE |
|---|---|---|---|---|---|---|
| | | FULL DATA (FULL DIGITS) | COLOR DATA (FIRST TWO DIGITS) | MODEL DATA | UNIQUE DATA | REMAINING AMOUNT | No. |
| BLACK | 6/12/2000 | 0000 0000 0000 0101 0001 | BLACK TONER (00) | AR-2000 | 0000 0000 0101 0001 | L1 | 5 |
| YELLOW | 3/22/2000 | 0100 0000 0000 0000 0100 | YELLOW TONER (01) | AR-2000 | 0000 0000 0000 0100 | L2 | 2 |
| MAGENTA | 3/22/2000 | 1000 0000 0000 0000 1100 | MAGENTA TONER (10) | AR-2000 | 0000 0000 0000 1100 | L3 | 3 |
| CYAN | 3/22/2000 | 1100 0000 0000 0000 0111 | CYAN TONER (11) | AR-2000 | 0000 0000 0000 0111 | L2 | 4 |
| PHOTOSENSITIVE BODY | N/A | N/A | N/A | N/A | N/A | N/A | N/A |

FIG. 43 (b) SPARE CARTRIDGE DATA

MACHINE MODEL: AR-2000 LIBRE    DATE: 06/12/2000/14:35

| No. | DATE OF DELIVERY | DATE OF INSTALLATION | SPARE CARTRIDGE DATA |||||| REMAINING AMOUNT |
|---|---|---|---|---|---|---|---|---|
| | | | FULL DATA (FULL DIGITS) | COLOR DATA (FIRST TWO DIGITS) | MODEL DATA | UNIQUE DATA | CURRENT STATUS | |
| 1 | 3/22/2000 | 3/22/2000 | 0000 0000 0000 0101 0000 | BLACK TONER (00) | AR-2000 | 0000 0000 0101 0000 | USED | L4 |
| 2 | 3/22/2000 | 3/22/2000 | 0100 0000 0000 0000 0100 | YELLOW TONER (01) | AR-2000 | 0000 0000 0000 0100 | IN USE | L2 |
| 3 | 3/22/2000 | 3/22/2000 | 1000 0000 0000 0000 1100 | MAGENTA TONER (10) | AR-2000 | 0000 0000 0000 1100 | IN USE | L3 |
| 4 | 3/22/2000 | 3/22/2000 | 1100 0000 0000 0000 0111 | CYAN TONER (11) | AR-2000 | 0000 0000 0000 0111 | IN USE | L2 |
| 5 | 3/22/2000 | 6/12/2000 | 0000 0000 0000 0101 0001 | BLACK TONER (00) | AR-2000 | 0000 0000 0101 0001 | IN USE | L1 |
| 6 | 3/22/2000 | | 0100 0000 0000 0000 0101 | YELLOW TONER (01) | AR-2000 | 0000 0000 0000 0101 | NEW (SPARE) | N/A |
| 7 | 3/22/2000 | | 1000 0000 0000 0000 1101 | MAGENTA TONER (10) | AR-2000 | 0000 0000 0000 1101 | NEW (SPARE) | N/A |
| 8 | 3/22/2000 | | 1100 0000 0000 0000 1000 | CYAN TONER (11) | AR-2000 | 0000 0000 0000 1000 | NEW (SPARE) | N/A |
| 9 | 6/20/2000 | | 0000 0000 0000 0101 0010 | BLACK TONER (00) | AR-2000 | 0000 0000 0101 0010 | NEW (SPARE) | N/A |
| 10 | | | | | | | | |
| 11 | | | | | | | | |

FIG.44

ACCOUNTING LIST[1] (PERIOD: MARCH 16, 2000 – APRIL 15, 2000)

CONTRACT NUMBER: 000125
CONTRACT MODEL: AR-2000 LIBRE

| No. | PRODUCT | DATE OF INSTALLATION | QUANTITY | BASE FEE p | COEFFICIENT mi | SUBTOTAL |
|---|---|---|---|---|---|---|
| 1 | BLACK TONER CARTRIDGE | 3/22/2000 | 1 | pb | m4 | △△△△.△ |
| 2 | YELLOW TONER CARTRIDGE | 3/22/2000 | 1 | py | m3 | △△△△.△ |
| 3 | MAGENTA TONER CARTRIDGE | 3/22/2000 | 1 | pm | m4 | △△△△.△ |
| 4 | CYAN TONER CARTRIDGE | 3/22/2000 | 1 | pc | m3 | △△△△.△ |
| TOTAL | | | | | | △△△△.△ |

ACCOUNTING LIST[2] (PERIOD: APRIL 16, 2000 – MAY 15, 2000)

CONTRACT NUMBER: 000125
CONTRACT MODEL: AR-2000 LIBRE

| No. | PRODUCT | DATE OF INSTALLATION | QUANTITY | BASE FEE p | COEFFICIENT mi | SUBTOTAL |
|---|---|---|---|---|---|---|
| 1 | NO DATA | | | | | 0 |
| 2 | | | | | | |
| 3 | | | | | | |
| 4 | | | | | | |
| 5 | | | | | | |
| TOTAL | | | | | | 0 |

ACCOUNTING LIST[3] (PERIOD: MAY 16, 2000 – JUNE 15, 2000)

CONTRACT NUMBER: 000125
CONTRACT MODEL: AR-2000 LIBRE

| No. | PRODUCT | DATE OF INSTALLATION | QUANTITY | BASE FEE p | COEFFICIENT mi | SUBTOTAL |
|---|---|---|---|---|---|---|
| 1 | BLACK TONER CARTRIDGE | 6/12/2000 | 1 | pb | m4 | △△△△.△ |
| TOTAL | | | | | | △△△△.△ |

FIG. 45 (a) INSTALLED CARTRIDGE DATA

MACHINE MODEL: AR-2000 LIBRE

| CARTRIDGE TYPE | DATE OF REPLACEMENT | INSTALLED CARTRIDGE DATA ||||| CORRESPONDING SPARE CARTRIDGE |
| --- | --- | --- | --- | --- | --- | --- |
| | | FULL DATA (FULL DIGITS) | COLOR DATA (FIRST TWO DIGITS) | MODEL DATA | UNIQUE DATA | DATE OF EXPIRY | No. |
| BLACK | N/A | N/A | N/A | N/A | N/A | N/A | N/A |
| YELLOW | N/A | N/A | N/A | N/A | N/A | N/A | N/A |
| MAGENTA | N/A | N/A | N/A | N/A | N/A | N/A | N/A |
| CYAN | N/A | N/A | N/A | N/A | N/A | N/A | N/A |

| PHOTOSENSITIVE BODY | N/A | N/A | N/A | N/A | N/A | N/A | N/A |
| --- | --- | --- | --- | --- | --- | --- | --- |

FIG. 45 (b) SPARE CARTRIDGE DATA

MACHINE MODEL: AR-2000 LIBRE    DATE: 03/21/2000/15:58

| No. | DATE OF DELIVERY | DATE OF INSTALLATION | SPARE CARTRIDGE DATA ||||| DATE OF EXPIRY |
| --- | --- | --- | --- | --- | --- | --- | --- |
| | | | FULL DATA (FULL DIGITS) | COLOR DATA (FIRST TWO DIGITS) | MODEL DATA | UNIQUE DATA | CURRENT STATUS | |
| 1 | N/A | N/A | N/A | N/A | N/A | N/A | N/A | N/A |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |

FIG. 46 (a) INSTALLED CARTRIDGE DATA

MACHINE MODEL: AR-2000 LIBRE

| CARTRIDGE TYPE | DATE OF REPLACEMENT | INSTALLED CARTRIDGE DATA ||||| CORRESPONDING SPARE CARTRIDGE No. |
|---|---|---|---|---|---|---|
| | | FULL DATA (FULL DIGITS) | COLOR DATA (FIRST TWO DIGITS) | MODEL DATA | UNIQUE DATA | DATE OF EXPIRY | |
| BLACK | N/A | N/A | N/A | N/A | N/A | N/A | N/A |
| YELLOW | N/A | N/A | N/A | N/A | N/A | N/A | N/A |
| MAGENTA | N/A | N/A | N/A | N/A | N/A | N/A | N/A |
| CYAN | N/A | N/A | N/A | N/A | N/A | N/A | N/A |
| PHOTOSENSITIVE BODY | N/A | N/A | | | | | N/A |

FIG. 46 (b) SPARE CARTRIDGE DATA

MACHINE MODEL: AR-2000 LIBRE          DATE: 03/22/2000/15:58

| No. | DATE OF DELIVERY | DATE OF INSTALLATION | SPARE CARTRIDGE DATA ||||| CURRENT STATUS | DATE OF EXPIRY |
|---|---|---|---|---|---|---|---|---|---|
| | | | FULL DATA (FULL DIGITS) | COLOR DATA (FIRST TWO DIGITS) | MODEL DATA | UNIQUE DATA | | | |
| 1 | 3/22/2000 | | 0000 0000 0000 0101 0000 | BLACK TONER (00) | AR-2000 | 0000 0000 0101 0000 | NEW (SPARE) | N/A |
| 2 | 3/22/2000 | | 0100 0000 0000 0000 0100 | YELLOW TONER (01) | AR-2000 | 0000 0000 0000 0100 | NEW (SPARE) | N/A |
| 3 | 3/22/2000 | | 1000 0000 0000 0000 1100 | MAGENTA TONER (10) | AR-2000 | 0000 0000 0000 1100 | NEW (SPARE) | N/A |
| 4 | 3/22/2000 | | 1100 0000 0000 0000 0111 | CYAN TONER (11) | AR-2000 | 0000 0000 0000 0111 | NEW (SPARE) | N/A |
| 5 | 3/22/2000 | | 0000 0000 0000 0101 0001 | BLACK TONER (00) | AR-2000 | 0000 0000 0101 0001 | NEW (SPARE) | N/A |
| 6 | 3/22/2000 | | 0100 0000 0000 0000 0101 | YELLOW TONER (01) | AR-2000 | 0000 0000 0000 0101 | NEW (SPARE) | N/A |
| 7 | 3/22/2000 | | 1000 0000 0000 0000 1101 | MAGENTA TONER (10) | AR-2000 | 0000 0000 0000 1101 | NEW (SPARE) | N/A |
| 8 | 3/22/2000 | | 1100 0000 0000 0000 1000 | CYAN TONER (11) | AR-2000 | 0000 0000 0000 1000 | NEW (SPARE) | N/A |
| 9 | . | | | | | | | |
| 10 | . | | | | | | | |
| 11 | . | | | | | | | |

FIG. 47 (a) INSTALLED CARTRIDGE DATA

MACHINE MODEL: AR-2000 LIBRE

| CARTRIDGE TYPE | DATE OF REPLACEMENT | INSTALLED CARTRIDGE DATA |||| CORRESPONDING SPARE CARTRIDGE No. |
|---|---|---|---|---|---|---|
| | | FULL DATA (FULL DIGITS) | COLOR DATA (FIRST TWO DIGITS) | MODEL DATA | UNIQUE DATA | DATE OF EXPIRY | |
| BLACK | 3/22/2000 | 0000 0000 0000 0101 0000 | BLACK TONER (00) | AR-2000 | 0000 0000 0101 0000 | N/A | 1 |
| YELLOW | 3/22/2000 | 0100 0000 0000 0000 0100 | YELLOW TONER (01) | AR-2000 | 0000 0000 0000 0100 | N/A | 2 |
| MAGENTA | 3/22/2000 | 1000 0000 0000 0000 1100 | MAGENTA TONER (10) | AR-2000 | 0000 0000 0000 1100 | N/A | 3 |
| CYAN | 3/22/2000 | 1100 0000 0000 0000 0111 | CYAN TONER (11) | AR-2000 | 0000 0000 0000 0111 | N/A | 4 |
| PHOTOSENSITIVE BODY | N/A | N/A | N/A | N/A | N/A | N/A | N/A |

FIG. 47 (b) SPARE CARTRIDGE DATA

MACHINE MODEL: AR-2000 LIBRE      DATE: 03/22/2000/16:45

| No. | DATE OF DELIVERY | DATE OF INSTALLATION | SPARE CARTRIDGE DATA ||||| DATE OF EXPIRY |
|---|---|---|---|---|---|---|---|---|
| | | | FULL DATA (FULL DIGITS) | COLOR DATA (FIRST TWO DIGITS) | MODEL DATA | UNIQUE DATA | CURRENT STATUS | |
| 1 | 3/22/2000 | 3/22/2000 | 0000 0000 0000 0101 0000 | BLACK TONER (00) | AR-2000 | 0000 0000 0101 0000 | IN USE | N/A |
| 2 | 3/22/2000 | 3/22/2000 | 0100 0000 0000 0000 0100 | YELLOW TONER (01) | AR-2000 | 0000 0000 0000 0100 | IN USE | N/A |
| 3 | 3/22/2000 | 3/22/2000 | 1000 0000 0000 0000 1100 | MAGENTA TONER (10) | AR-2000 | 0000 0000 0000 1100 | IN USE | N/A |
| 4 | 3/22/2000 | 3/22/2000 | 1100 0000 0000 0000 0111 | CYAN TONER (11) | AR-2000 | 0000 0000 0000 0111 | IN USE | N/A |
| 5 | 3/22/2000 | | 0000 0000 0000 0101 0001 | BLACK TONER (00) | AR-2000 | 0000 0000 0101 0001 | NEW (SPARE) | |
| 6 | 3/22/2000 | | 0100 0000 0000 0000 0101 | YELLOW TONER (01) | AR-2000 | 0000 0000 0000 0101 | NEW (SPARE) | |
| 7 | 3/22/2000 | | 1000 0000 0000 0000 1101 | MAGENTA TONER (10) | AR-2000 | 0000 0000 0000 1101 | NEW (SPARE) | |
| 8 | 3/22/2000 | | 1100 0000 0000 0000 1000 | CYAN TONER (11) | AR-2000 | 0000 0000 0000 1000 | NEW (SPARE) | |
| 9 | · | | | | | | | |
| 10 | · | | | | | | | |
| 11 | · | | | | | | | |

FIG. 48 (a) INSTALLED CARTRIDGE DATA

MACHINE MODEL: AR-2000 LIBRE

| CARTRIDGE TYPE | DATE OF REPLACEMENT | INSTALLED CARTRIDGE DATA ||||| CORRESPONDING SPARE CARTRIDGE |
|---|---|---|---|---|---|---|
| | | FULL DATA (FULL DIGITS) | COLOR DATA (FIRST TWO DIGITS) | MODEL DATA | UNIQUE DATA | DATE OF EXPIRY | No. |
| BLACK | 6/12/2000 | 0000 0000 0000 0101 0001 | BLACK TONER (00) | AR-2000 | 0000 0000 0101 0001 | N/A | 5 |
| YELLOW | 3/22/2000 | 0100 0000 0000 0000 0100 | YELLOW TONER (01) | AR-2000 | 0000 0000 0000 0100 | N/A | 2 |
| MAGENTA | 3/22/2000 | 1000 0000 0000 0000 1100 | MAGENTA TONER (10) | AR-2000 | 0000 0000 0000 1100 | N/A | 3 |
| CYAN | 3/22/2000 | 1100 0000 0000 0000 0111 | CYAN TONER (11) | AR-2000 | 0000 0000 0000 0111 | N/A | 4 |
| PHOTOSENSITIVE BODY | N/A | N/A | N/A | N/A | N/A | N/A | N/A |

FIG. 48 (b) SPARE CARTRIDGE DATA

MACHINE MODEL: AR-2000 LIBRE          DATE: 06/12/2000/10:56

| No. | DATE OF DELIVERY | DATE OF INSTALLATION | SPARE CARTRIDGE DATA ||||| CURRENT STATUS | DATE OF EXPIRY |
|---|---|---|---|---|---|---|---|---|
| | | | FULL DATA (FULL DIGITS) | COLOR DATA (FIRST TWO DIGITS) | MODEL DATA | UNIQUE DATA | | |
| 1 | 3/22/2000 | 3/22/2000 | 0000 0000 0000 0101 0000 | BLACK TONER (00) | AR-2000 | 0000 0000 0101 0000 | USED | N/A |
| 2 | 3/22/2000 | 3/22/2000 | 0100 0000 0000 0000 0100 | YELLOW TONER (01) | AR-2000 | 0000 0000 0000 0100 | IN USE | N/A |
| 3 | 3/22/2000 | 3/22/2000 | 1000 0000 0000 0000 1100 | MAGENTA TONER (10) | AR-2000 | 0000 0000 0000 1100 | IN USE | N/A |
| 4 | 3/22/2000 | 3/22/2000 | 1100 0000 0000 0000 0111 | CYAN TONER (11) | AR-2000 | 0000 0000 0000 0111 | IN USE | N/A |
| 5 | 3/22/2000 | 6/12/2000 | 0000 0000 0000 0101 0001 | BLACK TONER (00) | AR-2000 | 0000 0000 0101 0001 | IN USE | N/A |
| 6 | 3/22/2000 | | 0100 0000 0000 0000 0101 | YELLOW TONER (01) | AR-2000 | 0000 0000 0000 0101 | NEW (SPARE) | N/A |
| 7 | 3/22/2000 | | 1000 0000 0000 0000 1101 | MAGENTA TONER (10) | AR-2000 | 0000 0000 0000 1101 | NEW (SPARE) | N/A |
| 8 | 3/22/2000 | | 1100 0000 0000 0000 1000 | CYAN TONER (11) | AR-2000 | 0000 0000 0000 1000 | NEW (SPARE) | N/A |
| 9 | | | | | | | | |
| 10 | | | | | | | | |
| 11 | | | | | | | | |

FIG. 49 (a) INSTALLED CARTRIDGE DATA

MACHINE MODEL  AR-2000 LIBRE

| CARTRIDGE TYPE | DATE OF REPLACEMENT | INSTALLED CARTRIDGE DATA ||||| CORRESPONDING SPARE CARTRIDGE No. |
|---|---|---|---|---|---|---|
| | | FULL DATA (FULL DIGITS) | COLOR DATA (FIRST TWO DIGITS) | MODEL DATA | UNIQUE DATA | DATE OF EXPIRY | |
| BLACK | 6/12/2000 | 0000 0000 0000 0101 0001 | BLACK TONER (00) | AR-2000 | 0000 0000 0101 0001 | N/A | 5 |
| YELLOW | 3/22/2000 | 0100 0000 0000 0000 0100 | YELLOW TONER (01) | AR-2000 | 0000 0000 0000 0100 | N/A | 2 |
| MAGENTA | 3/22/2000 | 1000 0000 0000 0000 1100 | MAGENTA TONER (10) | AR-2000 | 0000 0000 0000 1100 | N/A | 3 |
| CYAN | 3/22/2000 | 1100 0000 0000 0000 0111 | CYAN TONER (11) | AR-2000 | 0000 0000 0000 0111 | N/A | 4 |
| PHOTOSENSITIVE BODY | N/A | N/A | N/A | N/A | N/A | N/A | N/A |

FIG. 49 (b) SPARE CARTRIDGE DATA

MACHINE MODEL  AR-2000 LIBRE        DATE  06/20/2000/14:35

| No. | DATE OF DELIVERY | DATE OF INSTALLATION | SPARE CARTRIDGE DATA ||||| CURRENT STATUS | DATE OF EXPIRY |
|---|---|---|---|---|---|---|---|---|---|
| | | | FULL DATA (FULL DIGITS) | COLOR DATA (FIRST TWO DIGITS) | MODEL DATA | UNIQUE DATA | | | |
| 1 | 3/22/2000 | 3/22/2000 | 0000 0000 0101 0101 0000 | BLACK TONER (00) | AR-2000 | 0000 0000 0101 0000 | USED | N/A |
| 2 | 3/22/2000 | 3/22/2000 | 0100 0000 0000 0000 1100 | YELLOW TONER (01) | AR-2000 | 0000 0000 0000 1100 | IN USE | N/A |
| 3 | 3/22/2000 | 3/22/2000 | 1000 0000 0000 0000 0111 | MAGENTA TONER (10) | AR-2000 | 0000 0000 0000 0111 | IN USE | N/A |
| 4 | 3/22/2000 | 3/22/2000 | 1100 0000 0000 0101 0001 | CYAN TONER (11) | AR-2000 | 0000 0000 0101 0001 | IN USE | N/A |
| 5 | 3/22/2000 | 6/12/2000 | 0000 0000 0000 0101 0001 | BLACK TONER (00) | AR-2000 | 0000 0000 0101 0001 | IN USE | N/A |
| 6 | 3/22/2000 | | 0100 0000 0000 0000 0101 | YELLOW TONER (01) | AR-2000 | 0000 0000 0000 0101 | NEW (SPARE) | N/A |
| 7 | 3/22/2000 | | 1000 0000 0000 0000 1101 | MAGENTA TONER (10) | AR-2000 | 0000 0000 0000 1101 | NEW (SPARE) | N/A |
| 8 | 3/22/2000 | | 1100 0000 0000 0000 1000 | CYAN TONER (11) | AR-2000 | 0000 0000 0000 1000 | NEW (SPARE) | N/A |
| 9 | 6/20/2000 | | 0000 0000 0101 0010 | BLACK TONER (00) | AR-2000 | 0000 0000 0101 0010 | NEW (SPARE) | N/A |
| 10 | . . | | | | | | | |
| 11 | | | | | | | | |

FIG.50

ACCOUNTING LIST[4] (PERIOD: MARCH 16, 2000 - APRIL 15, 2000)

CONTRACT NUMBER: 000125
CONTRACT MODEL: AR-2000 LIBRE

| No. | PRODUCT | DATE OF INSTALLATION | QUANTITY | BASE FEE p | CONSUMED AMOUNT mi | SUBTOTAL |
|---|---|---|---|---|---|---|
| 1 | BLACK TONER CARTRIDGE | 3/22/2000 | 1 | pb' | ◇◇ | △△△△. △ |
| 2 | YELLOW TONER CARTRIDGE | 3/22/2000 | 1 | py' | ◇◇ | △△△△. △ |
| 3 | MAGENTA TONER CARTRIDGE | 3/22/2000 | 1 | pm' | ◇◇ | △△△△. △ |
| 4 | CYAN TONER CARTRIDGE | 3/22/2000 | 1 | pc' | ◇◇ | △△△△. △ |
| TOTAL | | | | | | △△△△. △ |

ACCOUNTING LIST[5] (PERIOD: APRIL 16, 2000 - MAY 15, 2000)

CONTRACT NUMBER: 000125
CONTRACT MODEL: AR-2000 LIBRE

| No. | PRODUCT | DATE OF INSTALLATION | QUANTITY | BASE FEE p | CONSUMED AMOUNT mi | SUBTOTAL |
|---|---|---|---|---|---|---|
| 1 | NO DATA | | | | | 0 |
| 2 | | | | | | |
| 3 | | | | | | |
| 4 | | | | | | |
| 5 | | | | | | |
| TOTAL | | | | | | 0 |

ACCOUNTING LIST[6] (PERIOD: MAY 16, 2000 - JUNE 15, 2000)

CONTRACT NUMBER: 000125
CONTRACT MODEL: AR-2000 LIBRE

| No. | PRODUCT | DATE OF INSTALLATION | QUANTITY | BASE FEE p | CONSUMED AMOUNT mi | SUBTOTAL |
|---|---|---|---|---|---|---|
| 1 | BLACK TONER CARTRIDGE | 6/12/2000 | 1 | pb' | ◇◇ | △△△△. △ |
| TOTAL | | | | | | △△△△. △ |

FIG. 58

MACHINE MODEL: AR-2000 LIBRE
CONTRACT SIGNER ID: 000125

DATE: 03/21/2000/15:58

BLACK TONER

| No. | CARTRIDGE UNIQUE DATA | DATE OF DELIVERY | DATE OF INSTALLATION | CURRENT STATUS | TONER REPLENISH DATA | | |
|---|---|---|---|---|---|---|---|
| | | | | | DATE OF TONER REPLENISHMENT | REPLENISHED AMOUNT | REMAINING AMOUNT |
| 1 | N/A | N/A | N/A | N/A | N/A | N/A | N/A |

YELLOW TONER

| No. | CARTRIDGE UNIQUE DATA | DATE OF DELIVERY | DATE OF INSTALLATION | CURRENT STATUS | TONER REPLENISH DATA | | |
|---|---|---|---|---|---|---|---|
| | | | | | DATE OF TONER REPLENISHMENT | REPLENISHED AMOUNT | REMAINING AMOUNT |
| 1 | N/A | N/A | N/A | N/A | N/A | N/A | N/A |

MAGENTA TONER

| No. | CARTRIDGE UNIQUE DATA | DATE OF DELIVERY | DATE OF INSTALLATION | CURRENT STATUS | TONER REPLENISH DATA | | |
|---|---|---|---|---|---|---|---|
| | | | | | DATE OF TONER REPLENISHMENT | REPLENISHED AMOUNT | REMAINING AMOUNT |
| 1 | N/A | N/A | N/A | N/A | N/A | N/A | N/A |

CYAN TONER

| No. | CARTRIDGE UNIQUE DATA | DATE OF DELIVERY | DATE OF INSTALLATION | CURRENT STATUS | TONER REPLENISH DATA | | |
|---|---|---|---|---|---|---|---|
| | | | | | DATE OF TONER REPLENISHMENT | REPLENISHED AMOUNT | REMAINING AMOUNT |
| 1 | N/A | N/A | N/A | N/A | N/A | N/A | N/A |

FIG. 59

MACHINE MODEL: AR-2000 LIBRE
CONTRACT SIGNER ID: 0000125
DATE: 03/22/2000/15:58

BLACK TONER

| No. | CARTRIDGE UNIQUE DATA | DATE OF DELIVERY | DATE OF INSTALLATION | CURRENT STATUS | TONER REPLENISH DATA ||| 
|---|---|---|---|---|---|---|---|
| | | | | | DATE OF TONER REPLENISHMENT | REPLENISHED AMOUNT | REMAINING AMOUNT |
| 1 | 0000 0000 0000 0101 0000 | 3/22/2000 | N/A | NEW (SPARE) | N/A | N/A | N/A |
| 2 | 0000 0000 0000 0101 0001 | 3/22/2000 | N/A | NEW (SPARE) | N/A | N/A | N/A |

YELLOW TONER

| No. | CARTRIDGE UNIQUE DATA | DATE OF DELIVERY | DATE OF INSTALLATION | CURRENT STATUS | TONER REPLENISH DATA ||| 
|---|---|---|---|---|---|---|---|
| | | | | | DATE OF TONER REPLENISHMENT | REPLENISHED AMOUNT | REMAINING AMOUNT |
| 1 | 0100 0000 0000 0000 0100 | 3/22/2000 | N/A | NEW (SPARE) | N/A | N/A | N/A |
| 2 | 0100 0000 0000 0000 0101 | 3/22/2000 | N/A | NEW (SPARE) | N/A | N/A | N/A |

MAGENTA TONER

| No. | CARTRIDGE UNIQUE DATA | DATE OF DELIVERY | DATE OF INSTALLATION | CURRENT STATUS | TONER REPLENISH DATA ||| 
|---|---|---|---|---|---|---|---|
| | | | | | DATE OF TONER REPLENISHMENT | REPLENISHED AMOUNT | REMAINING AMOUNT |
| 1 | 1000 0000 0000 0000 1100 | 3/22/2000 | N/A | NEW (SPARE) | N/A | N/A | N/A |
| 2 | 1000 0000 0000 0000 1101 | 3/22/2000 | N/A | NEW (SPARE) | N/A | N/A | N/A |

CYAN TONER

| No. | CARTRIDGE UNIQUE DATA | DATE OF DELIVERY | DATE OF INSTALLATION | CURRENT STATUS | TONER REPLENISH DATA ||| 
|---|---|---|---|---|---|---|---|
| | | | | | DATE OF TONER REPLENISHMENT | REPLENISHED AMOUNT | REMAINING AMOUNT |
| 1 | 1100 0000 0000 0000 0111 | 2000/3/22 | N/A | NEW (SPARE) | N/A | N/A | N/A |
| 2 | 1100 0000 0000 0000 1000 | 2000/3/22 | N/A | NEW (SPARE) | N/A | N/A | N/A |

FIG. 60

MACHINE MODEL: AR-2000 LIBRE
CONTRACT SIGNER ID: 000125
DATE: 03/22/2000/15:58

BLACK TONER

| No. | CARTRIDGE UNIQUE DATA | DATE OF DELIVERY | DATE OF INSTALLATION | CURRENT STATUS | TONER REPLENISH DATA | | |
|---|---|---|---|---|---|---|---|
| | | | | | DATE OF TONER REPLENISHMENT | REPLENISHED AMOUNT | REMAINING AMOUNT |
| 1 | 0000 0000 0000 0101 0000 | 3/22/2000 | 3/22/2000 | IN USE | N/A | N/A | FULL |
| 2 | 0000 0000 0000 0101 0001 | 3/22/2000 | N/A | NEW (SPARE) | N/A | N/A | N/A |

YELLOW TONER

| No. | CARTRIDGE UNIQUE DATA | DATE OF DELIVERY | DATE OF INSTALLATION | CURRENT STATUS | TONER REPLENISH DATA | | |
|---|---|---|---|---|---|---|---|
| | | | | | DATE OF TONER REPLENISHMENT | REPLENISHED AMOUNT | REMAINING AMOUNT |
| 1 | 0100 0000 0000 0000 0100 | 3/22/2000 | 3/22/2000 | IN USE | N/A | N/A | FULL |
| 2 | 0100 0000 0000 0000 0101 | 3/22/2000 | N/A | NEW (SPARE) | N/A | N/A | N/A |

MAGENTA TONER

| No. | CARTRIDGE UNIQUE DATA | DATE OF DELIVERY | DATE OF INSTALLATION | CURRENT STATUS | TONER REPLENISH DATA | | |
|---|---|---|---|---|---|---|---|
| | | | | | DATE OF TONER REPLENISHMENT | REPLENISHED AMOUNT | REMAINING AMOUNT |
| 1 | 1000 0000 0000 0000 1100 | 3/22/2000 | 3/22/2000 | IN USE | N/A | N/A | FULL |
| 2 | 1000 0000 0000 0000 1101 | 3/22/2000 | N/A | NEW (SPARE) | N/A | N/A | N/A |

CYAN TONER

| No. | CARTRIDGE UNIQUE DATA | DATE OF DELIVERY | DATE OF INSTALLATION | CURRENT STATUS | TONER REPLENISH DATA | | |
|---|---|---|---|---|---|---|---|
| | | | | | DATE OF TONER REPLENISHMENT | REPLENISHED AMOUNT | REMAINING AMOUNT |
| 1 | 1100 0000 0000 0000 0111 | 3/22/2000 | 3/22/2000 | IN USE | N/A | N/A | FULL |
| 2 | 1100 0000 0000 0000 1000 | 3/22/2000 | N/A | NEW (SPARE) | N/A | N/A | N/A |

FIG. 61

MACHINE MODEL: AR-2000 LIBRE
CONTRACT SIGNER ID: 000125
DATE: 06/12/2000/10:56

BLACK TONER

| No. | CARTRIDGE UNIQUE DATA | DATE OF DELIVERY | DATE OF INSTALLATION | CURRENT STATUS | TONER REPLENISH DATA | | |
|---|---|---|---|---|---|---|---|
| | | | | | DATE OF TONER REPLENISHMENT | REPLENISHED AMOUNT | REMAINING AMOUNT |
| 1 | 0000 0000 0000 0101 0000 | 3/22/2000 | 3/22/2000 | IN USE | N/A | N/A | L4 |
| 2 | 0000 0000 0000 0101 0001 | 3/22/2000 | N/A | NEW (SPARE) | N/A | N/A | N/A |

YELLOW TONER

| No. | CARTRIDGE UNIQUE DATA | DATE OF DELIVERY | DATE OF INSTALLATION | CURRENT STATUS | TONER REPLENISH DATA | | |
|---|---|---|---|---|---|---|---|
| | | | | | DATE OF TONER REPLENISHMENT | REPLENISHED AMOUNT | REMAINING AMOUNT |
| 1 | 0100 0000 0000 0000 0100 | 3/22/2000 | 3/22/2000 | IN USE | N/A | N/A | L2 |
| 2 | 0100 0000 0000 0000 0101 | 3/22/2000 | N/A | NEW (SPARE) | N/A | N/A | N/A |

MAGENTA TONER

| No. | CARTRIDGE UNIQUE DATA | DATE OF DELIVERY | DATE OF INSTALLATION | CURRENT STATUS | TONER REPLENISH DATA | | |
|---|---|---|---|---|---|---|---|
| | | | | | DATE OF TONER REPLENISHMENT | REPLENISHED AMOUNT | REMAINING AMOUNT |
| 1 | 1000 0000 0000 0000 1100 | 3/22/2000 | 3/22/2000 | IN USE | N/A | N/A | L3 |
| 2 | 1000 0000 0000 0000 1101 | 3/22/2000 | N/A | NEW (SPARE) | N/A | N/A | N/A |

CYAN TONER

| No. | CARTRIDGE UNIQUE DATA | DATE OF DELIVERY | DATE OF INSTALLATION | CURRENT STATUS | TONER REPLENISH DATA | | |
|---|---|---|---|---|---|---|---|
| | | | | | DATE OF TONER REPLENISHMENT | REPLENISHED AMOUNT | REMAINING AMOUNT |
| 1 | 1100 0000 0000 0000 0111 | 3/22/2000 | 3/22/2000 | IN USE | N/A | N/A | L2 |
| 2 | 1100 0000 0000 0000 1000 | 3/22/2000 | N/A | NEW (SPARE) | N/A | N/A | N/A |

FIG. 62

| MACHINE MODEL | AR-2000 LIBRE |
| --- | --- |
| CONTRACT SIGNER ID | 000125 |

DATE  06/12/2000/11:41

BLACK TONER

| No. | CARTRIDGE UNIQUE DATA | DATE OF DELIVERY | DATE OF INSTALLATION | CURRENT STATUS | TONER REPLENISH DATA ||| 
| --- | --- | --- | --- | --- | --- | --- | --- |
| | | | | | DATE OF TONER REPLENISHMENT | REPLENISHED AMOUNT | REMAINING AMOUNT |
| 1 | 0000 0000 0000 0000 0101 0000 | 3/22/2000 | 3/22/2000 | IN USE | 6/20/2000 | Sb | FULL |
| 2 | 0000 0000 0000 0000 0101 0001 | 3/22/2000 | N/A | NEW (SPARE) | N/A | N/A | N/A |

YELLOW TONER

| No. | CARTRIDGE UNIQUE DATA | DATE OF DELIVERY | DATE OF INSTALLATION | CURRENT STATUS | TONER REPLENISH DATA ||| 
| --- | --- | --- | --- | --- | --- | --- | --- |
| | | | | | DATE OF TONER REPLENISHMENT | REPLENISHED AMOUNT | REMAINING AMOUNT |
| 1 | 0100 0000 0000 0000 0000 0100 | 3/22/2000 | 3/22/2000 | IN USE | 6/20/2000 | Sy | FULL |
| 2 | 0100 0000 0000 0000 0000 0101 | 3/22/2000 | N/A | NEW (SPARE) | N/A | N/A | N/A |

MAGENTA TONER

| No. | CARTRIDGE UNIQUE DATA | DATE OF DELIVERY | DATE OF INSTALLATION | CURRENT STATUS | TONER REPLENISH DATA ||| 
| --- | --- | --- | --- | --- | --- | --- | --- |
| | | | | | DATE OF TONER REPLENISHMENT | REPLENISHED AMOUNT | REMAINING AMOUNT |
| 1 | 1000 0000 0000 0000 0000 1100 | 3/22/2000 | 3/22/2000 | IN USE | 6/20/2000 | Sm | FULL |
| 2 | 1000 0000 0000 0000 0000 1101 | 3/22/2000 | N/A | NEW (SPARE) | N/A | N/A | N/A |

CYAN TONER

| No. | CARTRIDGE UNIQUE DATA | DATE OF DELIVERY | DATE OF INSTALLATION | CURRENT STATUS | TONER REPLENISH DATA ||| 
| --- | --- | --- | --- | --- | --- | --- | --- |
| | | | | | DATE OF TONER REPLENISHMENT | REPLENISHED AMOUNT | REMAINING AMOUNT |
| 1 | 1100 0000 0000 0000 0000 0111 | 3/22/2000 | 3/22/2000 | IN USE | 6/20/2000 | Sc | FULL |
| 2 | 1100 0000 0000 0000 0000 1000 | 3/22/2000 | N/A | NEW (SPARE) | N/A | N/A | N/A |

FIG.63

ACCOUNTING LIST [7] (PERIOD: MARCH 16, 2000 – APRIL 15, 2000)

CONTRACT NUMBER: 000125
CONTRACT MODEL: AR-2000 LIBRE

| No. | PRODUCT | DATE OF INSTALLATION | QUANTITY | TONER FEE | | | CONTAINER FEE P2 | SUBTOTAL (P1+P2) |
| --- | --- | --- | --- | --- | --- | --- | --- | --- |
| | | | | BASE FEE p | REPLENISHED AMOUNT S | SUBTOTAL (p*S) | | |
| 1 | BLACK TONER CARTRIDGE | ######## | 1 | pb | 0 | 0 | P2b | P2b |
| 2 | YELLOW TONER CARTRIDGE | ######## | 1 | py | 0 | 0 | P2y | P2y |
| 3 | MAGENTA TONER CARTRIDGE | ######## | 1 | pm | 0 | 0 | P2m | P2m |
| 4 | CYAN TONER CARTRIDGE | ######## | 1 | pc | 0 | 0 | P2c | P2c |
| TOTAL | | | | | | | | △△△△.△ |

ACCOUNTING LIST [8] (PERIOD: APRIL 16, 2000 – MAY 15, 2000)

CONTRACT NUMBER: 000125
CONTRACT MODEL: AR-2000 LIBRE

| No. | PRODUCT | DATE OF INSTALLATION | QUANTITY | TONER FEE | | | CONTAINER FEE P2 | SUBTOTAL (P1+P2) |
| --- | --- | --- | --- | --- | --- | --- | --- | --- |
| | | | | BASE FEE p | REPLENISHED AMOUNT S | SUBTOTAL (p*S) | | |
| 1 | NO DATA | | | | | | | 0 |
| TOTAL | | | | | | | | 0 |

ACCOUNTING LIST [9] (PERIOD: MAY 16, 2000 – JUNE 15, 2000)

CONTRACT NUMBER: 000125
CONTRACT MODEL: AR-2000 LIBRE

| No. | PRODUCT | DATE OF INSTALLATION | QUANTITY | TONER FEE | | | CONTAINER FEE P2 | SUBTOTAL (P1+P2) |
| --- | --- | --- | --- | --- | --- | --- | --- | --- |
| | | | | BASE FEE p | REPLENISHED AMOUNT S | SUBTOTAL (p*S) | | |
| 1 | BLACK TONER CARTRIDGE | ######## | | pb | Sb | pb*Sb | 0 | pb*Sb |
| 2 | YELLOW TONER CARTRIDGE | ######## | | py | Sy | py*Sy | 0 | py*Sy |
| 3 | MAGENTA TONER CARTRIDGE | ######## | | pm | Sm | pm*Sm | 0 | pm*Sm |
| 4 | CYAN TONER CARTRIDGE | ######## | | pc | Sc | pc*Sc | 0 | pc*Sc |
| TOTAL | | | | | | | | △△△△.△ |

FIG. 64 (a) INSTALLED CARTRIDGE DATA

MACHINE MODEL AR-2000 LIBRE

| CARTRIDGE TYPE | DATE OF REPLACEMENT | INSTALLED CARTRIDGE DATA | | | | | CORRESPONDING SPARE CARTRIDGE |
|---|---|---|---|---|---|---|---|
| | | FULL DATA (FULL DIGITS) | COLOR DATA (FIRST TWO DIGITS) | MODEL DATA | UNIQUE DATA | RECYCLE ROUNDS | No. |
| BLACK | N/A | N/A | N/A | N/A | N/A | N/A | N/A |
| YELLOW | N/A | N/A | N/A | N/A | N/A | N/A | N/A |
| MAGENTA | N/A | N/A | N/A | N/A | N/A | N/A | N/A |
| CYAN | N/A | N/A | N/A | N/A | N/A | N/A | N/A |

| PHOTOSENSITIVE BODY | N/A | N/A | N/A | N/A | N/A | N/A | N/A |
|---|---|---|---|---|---|---|---|

FIG. 64 (b) SPARE CARTRIDGE DATA

MACHINE MODEL AR-2000 LIBRE        DATE 03/21/2000/15:58

| No. | DATE OF DELIVERY | DATE OF INSTALLATION | SPARE CARTRIDGE DATA | | | | | |
|---|---|---|---|---|---|---|---|---|
| | | | FULL DATA (FULL DIGITS) | COLOR DATA (FIRST TWO DIGITS) | MODEL DATA | UNIQUE DATA | CURRENT STATUS | RECYCLE ROUNDS |
| 1 | N/A | N/A | N/A | N/A | N/A | N/A | N/A | N/A |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |

FIG. 65 (a) INSTALLED CARTRIDGE DATA

MACHINE MODEL AR-2000 LIBRE

| CARTRIDGE TYPE | DATE OF REPLACEMENT | INSTALLED CARTRIDGE DATA ||||| CORRESPONDING SPARE CARTRIDGE No. |
| --- | --- | --- | --- | --- | --- | --- |
| | | FULL DATA (FULL DIGITS) | COLOR DATA (FIRST TWO DIGITS) | MODEL DATA | UNIQUE DATA | RECYCLE ROUNDS | |
| BLACK | N/A | N/A | N/A | N/A | N/A | N/A | N/A |
| YELLOW | N/A | N/A | N/A | N/A | N/A | N/A | N/A |
| MAGENTA | N/A | N/A | N/A | N/A | N/A | N/A | N/A |
| CYAN | N/A | N/A | N/A | N/A | N/A | N/A | N/A |

| PHOTOSENSITIVE BODY | N/A | N/A | N/A | N/A | N/A | N/A | N/A |
| --- | --- | --- | --- | --- | --- | --- | --- |

FIG. 65 (b) SPARE CARTRIDGE DATA

MACHINE MODEL AR-2000 LIBRE          DATE 03/22/2000/15:58

| No. | DATE OF DELIVERY | DATE OF INSTALLATION | SPARE CARTRIDGE DATA ||||| RECYCLE ROUNDS |
| --- | --- | --- | --- | --- | --- | --- | --- | --- |
| | | | FULL DATA (FULL DIGITS) | COLOR DATA (FIRST TWO DIGITS) | MODEL DATA | UNIQUE DATA | CURRENT STATUS | |
| 1 | 3/22/2000 | | 0000 0000 0000 0101 0000 | BLACK TONER (00) | AR-2000 | 0000 0000 0000 0101 0000 | NEW (SPARE) | N/A |
| 2 | 3/22/2000 | | 0100 0000 0000 0000 0100 | YELLOW TONER (01) | AR-2000 | 0000 0000 0000 0000 0100 | NEW (SPARE) | N/A |
| 3 | 3/22/2000 | | 1000 0000 0000 0000 1100 | MAGENTA TONER (10) | AR-2000 | 0000 0000 0000 0000 1100 | NEW (SPARE) | N/A |
| 4 | 3/22/2000 | | 1100 0000 0000 0000 0111 | CYAN TONER (11) | AR-2000 | 0000 0000 0000 0000 0111 | NEW (SPARE) | N/A |
| 5 | 3/22/2000 | | 0000 0000 0000 0101 0001 | BLACK TONER (00) | AR-2000 | 0000 0000 0000 0101 0001 | NEW (SPARE) | N/A |
| 6 | 3/22/2000 | | 0100 0000 0000 0000 0101 | YELLOW TONER (01) | AR-2000 | 0000 0000 0000 0000 0101 | NEW (SPARE) | N/A |
| 7 | 3/22/2000 | | 1000 0000 0000 0000 1101 | MAGENTA TONER (10) | AR-2000 | 0000 0000 0000 0000 1101 | NEW (SPARE) | N/A |
| 8 | 3/22/2000 | | 1100 0000 0000 0000 1000 | CYAN TONER (11) | AR-2000 | 0000 0000 0000 0000 1000 | NEW (SPARE) | N/A |
| 9 | . | | | | | | | |
| 10 | . | | | | | | | |
| 11 | . | | | | | | | |

FIG. 66 (a) INSTALLED CARTRIDGE DATA

MACHINE MODEL  AR-2000  LIBRE

| CARTRIDGE TYPE | DATE OF REPLACEMENT | INSTALLED CARTRIDGE DATA ||||| CORRESPONDING SPARE CARTRIDGE No. |
|---|---|---|---|---|---|---|
| | | FULL DATA (FULL DIGITS) | COLOR DATA (FIRST TWO DIGITS) | MODEL DATA | UNIQUE DATA | RECYCLE ROUNDS | |
| BLACK | 3/22/2000 | 0000 0000 0000 0101 0000 | BLACK TONER(00) | AR-2000 | 0000 0000 0000 0101 0000 | 0 | 1 |
| YELLOW | 3/22/2000 | 0100 0000 0000 0000 0100 | YELLOW TONER(01) | AR-2000 | 0000 0000 0000 0000 0100 | 0 | 2 |
| MAGENTA | 3/22/2000 | 1000 0000 0000 0000 1100 | MAGENTA TONER(10) | AR-2000 | 0000 0000 0000 0000 1100 | 0 | 3 |
| CYAN | 3/22/2000 | 1100 0000 0000 0000 0111 | CYAN TONER(11) | AR-2000 | 0000 0000 0000 0000 0111 | 0 | 4 |
| PHOTOSENSITIVE BODY | N/A | N/A | N/A | N/A | N/A | N/A | N/A |

FIG. 66 (b) SPARE CARTRIDGE DATA

MACHINE MODEL  AR-2000  LIBRE         DATE  03/22/2000/16:45

| No. | DATE OF DELIVERY | DATE OF INSTALLATION | SPARE CARTRIDGE DATA ||||| CURRENT STATUS | RECYCLE ROUNDS |
|---|---|---|---|---|---|---|---|---|---|
| | | | FULL DATA (FULL DIGITS) | COLOR DATA (FIRST TWO DIGITS) | MODEL DATA | UNIQUE DATA | | | |
| 1 | 3/22/2000 | 3/22/2000 | 0000 0000 0000 0101 0000 | BLACK TONER(00) | AR-2000 | 0000 0000 0000 0101 0000 | IN USE | 0 |
| 2 | 3/22/2000 | 3/22/2000 | 0100 0000 0000 0000 0100 | YELLOW TONER(01) | AR-2000 | 0000 0000 0000 0000 0100 | IN USE | 0 |
| 3 | 3/22/2000 | 3/22/2000 | 1000 0000 0000 0000 1100 | MAGENTA TONER(10) | AR-2000 | 0000 0000 0000 0000 1100 | IN USE | 0 |
| 4 | 3/22/2000 | 3/22/2000 | 1100 0000 0000 0000 0111 | CYAN TONER(11) | AR-2000 | 0000 0000 0000 0000 0111 | IN USE | 0 |
| 5 | 3/22/2000 | | 0000 0000 0000 0101 0001 | BLACK TONER(00) | AR-2000 | 0000 0000 0000 0101 0001 | NEW (SPARE) | |
| 6 | 3/22/2000 | | 0100 0000 0000 0000 0101 | YELLOW TONER(01) | AR-2000 | 0000 0000 0000 0000 0101 | NEW (SPARE) | |
| 7 | 3/22/2000 | | 1000 0000 0000 0000 1101 | MAGENTA TONER(10) | AR-2000 | 0000 0000 0000 0000 1101 | NEW (SPARE) | |
| 8 | 3/22/2000 | | 1100 0000 0000 0000 1000 | CYAN TONER(11) | AR-2000 | 0000 0000 0000 0000 1000 | NEW (SPARE) | |
| 9 | . | | | | | | | |
| 10 | . | | | | | | | |
| 11 | . | | | | | | | |

FIG. 67 (a) INSTALLED CARTRIDGE DATA

MACHINE MODEL: AR-2000 LIBRE

| CARTRIDGE TYPE | DATE OF REPLACEMENT | INSTALLED CARTRIDGE DATA ||||| CORRESPONDING SPARE CARTRIDGE |
| --- | --- | --- | --- | --- | --- | --- |
| | | FULL DATA (FULL DIGITS) | COLOR DATA (FIRST TWO DIGITS) | MODEL DATA | UNIQUE DATA | RECYCLE ROUNDS | No. |
| BLACK | 6/12/2000 | 0000 0000 0000 0101 0001 | BLACK TONER (00) | AR-2000 | 0000 0000 0101 0001 | 1 | 5 |
| YELLOW | 3/22/2000 | 0100 0000 0000 0000 0100 | YELLOW TONER (01) | AR-2000 | 0000 0000 0000 0100 | 0 | 2 |
| MAGENTA | 3/22/2000 | 1000 0000 0000 0000 1100 | MAGENTA TONER (10) | AR-2000 | 0000 0000 0000 1100 | 0 | 3 |
| CYAN | 3/22/2000 | 1100 0000 0000 0000 0111 | CYAN TONER (11) | AR-2000 | 0000 0000 0000 0111 | 0 | 4 |
| PHOTOSENSITIVE BODY | N/A | N/A | N/A | N/A | N/A | N/A | N/A |

FIG. 67 (b) SPARE CARTRIDGE DATA

MACHINE MODEL: AR-2000 LIBRE   DATE: 06/12/2000/10:56

| No. | DATE OF DELIVERY | DATE OF INSTALLATION | SPARE CARTRIDGE DATA ||||| CURRENT STATUS | RECYCLE ROUNDS |
| --- | --- | --- | --- | --- | --- | --- | --- | --- | --- |
| | | | FULL DATA (FULL DIGITS) | COLOR DATA (FIRST TWO DIGITS) | MODEL DATA | UNIQUE DATA | | |
| 1 | 3/22/2000 | 3/22/2000 | 0000 0000 0000 0101 0000 | BLACK TONER (00) | AR-2000 | 0000 0000 0101 0000 | USED | 0 |
| 2 | 3/22/2000 | 3/22/2000 | 0100 0000 0000 0000 0100 | YELLOW TONER (01) | AR-2000 | 0000 0000 0000 0100 | IN USE | 0 |
| 3 | 3/22/2000 | 3/22/2000 | 1000 0000 0000 0000 1100 | MAGENTA TONER (10) | AR-2000 | 0000 0000 0000 1100 | IN USE | 0 |
| 4 | 3/22/2000 | 3/22/2000 | 1100 0000 0000 0000 0111 | CYAN TONER (11) | AR-2000 | 0000 0000 0000 0111 | IN USE | 0 |
| 5 | 3/22/2000 | 6/12/2000 | 0000 0000 0000 0101 0001 | BLACK TONER (00) | AR-2000 | 0000 0000 0101 0001 | IN USE | 1 |
| 6 | 3/22/2000 | | 0100 0000 0000 0000 0101 | YELLOW TONER (01) | AR-2000 | 0000 0000 0000 0101 | NEW (SPARE) | N/A |
| 7 | 3/22/2000 | | 1000 0000 0000 0000 1101 | MAGENTA TONER (10) | AR-2000 | 0000 0000 0000 1101 | NEW (SPARE) | N/A |
| 8 | 3/22/2000 | | 1100 0000 0000 0000 1000 | CYAN TONER (11) | AR-2000 | 0000 0000 0000 1000 | NEW (SPARE) | N/A |
| 9 | · · · | | | | | | | |
| 10 | · · · | | | | | | | |
| 11 | | | | | | | | |

FIG. 68 (a) INSTALLED CARTRIDGE DATA

MACHINE MODEL: AR-2000 LIBRE

| CARTRIDGE TYPE | DATE OF REPLACEMENT | INSTALLED CARTRIDGE DATA | | | | | CORRESPONDING SPARE CARTRIDGE |
|---|---|---|---|---|---|---|---|
| | | FULL DATA (FULL DIGITS) | COLOR DATA (FIRST TWO DIGITS) | MODEL DATA | UNIQUE DATA | RECYCLE ROUNDS | No. |
| BLACK | 6/12/2000 | 0000 0000 0000 0101 0001 | BLACK TONER (00) | AR-2000 | 0000 0000 0101 0001 | 1 | 5 |
| YELLOW | 3/22/2000 | 0100 0000 0000 0000 0100 | YELLOW TONER (01) | AR-2000 | 0000 0000 0000 0100 | 0 | 2 |
| MAGENTA | 3/22/2000 | 1000 0000 0000 0000 1100 | MAGENTA TONER (10) | AR-2000 | 0000 0000 0000 1100 | 0 | 3 |
| CYAN | 3/22/2000 | 1100 0000 0000 0000 0111 | CYAN TONER (11) | AR-2000 | 0000 0000 0000 0111 | 0 | 4 |

| PHOTOSENSITIVE BODY | N/A | N/A | N/A | N/A | N/A | N/A | N/A |
|---|---|---|---|---|---|---|---|

FIG. 68 (b) SPARE CARTRIDGE DATA

MACHINE MODEL: AR-2000 LIBRE     DATE: 06/20/2000/14:35

| No. | DATE OF DELIVERY | DATE OF INSTALLATION | SPARE CARTRIDGE DATA | | | | CURRENT STATUS | RECYCLE ROUNDS |
|---|---|---|---|---|---|---|---|---|
| | | | FULL DATA (FULL DIGITS) | COLOR DATA (FIRST TWO DIGITS) | MODEL DATA | UNIQUE DATA | | |
| 1 | 3/22/2000 | 3/22/2000 | 0000 0000 0000 0101 0000 | BLACK TONER (00) | AR-2000 | 0000 0000 0101 0000 | USED | 0 |
| 2 | 3/22/2000 | 3/22/2000 | 0100 0000 0000 0000 0100 | YELLOW TONER (01) | AR-2000 | 0000 0000 0000 0100 | IN USE | 0 |
| 3 | 3/22/2000 | 3/22/2000 | 1000 0000 0000 0000 1100 | MAGENTA TONER (10) | AR-2000 | 0000 0000 0000 1100 | IN USE | 0 |
| 4 | 3/22/2000 | 3/22/2000 | 1100 0000 0000 0000 0111 | CYAN TONER (11) | AR-2000 | 0000 0000 0000 0111 | IN USE | 0 |
| 5 | 3/22/2000 | 6/12/2000 | 0000 0000 0000 0101 0001 | BLACK TONER (00) | AR-2000 | 0000 0000 0101 0001 | IN USE | 1 |
| 6 | 3/22/2000 | | 0100 0000 0000 0000 0101 | YELLOW TONER (01) | AR-2000 | 0000 0000 0000 0101 | NEW (SPARE) | N/A |
| 7 | 3/22/2000 | | 1000 0000 0000 0000 1101 | MAGENTA TONER (10) | AR-2000 | 0000 0000 0000 1101 | NEW (SPARE) | N/A |
| 8 | 3/22/2000 | | 1100 0000 0000 0000 1000 | CYAN TONER (11) | AR-2000 | 0000 0000 0000 1000 | NEW (SPARE) | N/A |
| 9 | 6/20/2000 | | 0000 0000 0000 0101 0010 | BLACK TONER (00) | AR-2000 | 0000 0000 0101 0010 | NEW (SPARE) | N/A |
| 10 | . | | | | | | | |
| 11 | . | | | | | | | |

FIG.69

| ACCOUNTING LIST[7] | (PERIOD: MARCH 16, 2000 – APRIL 15, 2000) | | | | | | |
|---|---|---|---|---|---|---|---|

CONTRACT NUMBER: 000125
CONTRACT MODEL: AR-2000 LIBRE

| No. | PRODUCT | DATE OF INSTALLATION | QUANTITY | BASE FEE P ① | RECYCLE ROUNDS | ADJUSTMENT ② | SUBTOTAL ((①-②)) |
|---|---|---|---|---|---|---|---|
| 1 | BLACK TONER CARTRIDGE | 3/22/2000 | 1 | pb | 0 | 0 | Pb |
| 2 | YELLOW TONER CARTRIDGE | 3/22/2000 | 1 | py | 0 | 0 | Py |
| 3 | MAGENTA TONER CARTRIDGE | 3/22/2000 | 1 | pm | 0 | 0 | Pm |
| 4 | CYAN TONER CARTRIDGE | 3/22/2000 | 1 | pc | 0 | 0 | Pc |
| TOTAL | | | | | | | △△△△. △ |

| ACCOUNTING LIST[8] | (PERIOD: APRIL 16, 2000 – MAY 15, 2000) | | | | | | |
|---|---|---|---|---|---|---|---|

CONTRACT NUMBER: 000125
CONTRACT MODEL: AR-2000 LIBRE

| No. | PRODUCT | DATE OF INSTALLATION | QUANTITY | BASE FEE P ① | RECYCLE ROUNDS | ADJUSTMENT ② | SUBTOTAL ((①-②)) |
|---|---|---|---|---|---|---|---|
| 1 | NO DATA | | | | | | 0 |
| TOTAL | | | | | | | 0 |

| ACCOUNTING LIST[9] | (PERIOD: MAY 16, 2000 – JUNE 15, 2000) | | | | | | |
|---|---|---|---|---|---|---|---|

CONTRACT NUMBER: 000125
CONTRACT MODEL: AR-2000 LIBRE

| No. | PRODUCT | DATE OF INSTALLATION | QUANTITY | BASE FEE P ① | RECYCLE ROUNDS | ADJUSTMENT ② | SUBTOTAL ((①-②)) |
|---|---|---|---|---|---|---|---|
| 1 | BLACK TONER CARTRIDGE | 6/12/2000 | 1 | Pb | 1 | p1 | Pb-p1 |
| TOTAL | | | | | | | △△△△. △ |

FIG. 70 (a) INSTALLED CARTRIDGE DATA

MACHINE MODEL  AR-2000 LIBRE

INSTALLED CARTRIDGE DATA

| CARTRIDGE TYPE | DATE OF REPLACEMENT | FULL DATA (FULL DIGITS) | COLOR DATA (FIRST TWO DIGITS) | UNIQUE DATA | REMAINING AMOUNT | RECYCLE ROUNDS | CORRESPONDING SPARE CARTRIDGE No. |
|---|---|---|---|---|---|---|---|
| BLACK | N/A | N/A | N/A | N/A | N/A | N/A | N/A |
| YELLOW | N/A | N/A | N/A | N/A | N/A | N/A | N/A |
| MAGENTA | N/A | N/A | N/A | N/A | N/A | N/A | N/A |
| CYAN | N/A | N/A | N/A | N/A | N/A | N/A | N/A |

| PHOTOSENSITIVE BODY | N/A | N/A | N/A | N/A | N/A | N/A | N/A |
|---|---|---|---|---|---|---|---|

FIG. 70 (b) SPARE CARTRIDGE DATA

MACHINE MODEL  AR-2000 LIBRE       DATE  03/21/2000/15:58

SPARE CARTRIDGE DATA

| No. | DATE OF DELIVERY | DATE OF INSTALLATION | FULL DATA (FULL DIGITS) | COLOR DATA (FIRST TWO DIGITS) | UNIQUE DATA | CURRENT STATUS | REMAINING AMOUNT | RECYCLE ROUNDS |
|---|---|---|---|---|---|---|---|---|
| 1 | N/A | N/A | N/A | N/A | N/A | N/A | N/A | N/A |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |

FIG. 71 (a) INSTALLED CARTRIDGE DATA

MACHINE MODEL: AR-2000 LIBRE

| CARTRIDGE TYPE | DATE OF REPLACEMENT | INSTALLED CARTRIDGE DATA ||||| CORRESPONDING SPARE CARTRIDGE No. |
|---|---|---|---|---|---|---|
| | | FULL DATA (FULL DIGITS) | COLOR DATA (FIRST TWO DIGITS) | UNIQUE DATA | REMAINING AMOUNT | RECYCLE ROUNDS | |
| BLACK | N/A | N/A | N/A | N/A | N/A | N/A | N/A |
| YELLOW | N/A | N/A | N/A | N/A | N/A | N/A | N/A |
| MAGENTA | N/A | N/A | N/A | N/A | N/A | N/A | N/A |
| CYAN | N/A | N/A | N/A | N/A | N/A | N/A | N/A |

| PHOTOSENSITIVE BODY | N/A | N/A | N/A | N/A | N/A | N/A |
|---|---|---|---|---|---|---|

FIG. 71 (b) SPARE CARTRIDGE DATA

MACHINE MODEL: AR-2000 LIBRE            DATE: 03/22/2000/15:58

| No. | DATE OF DELIVERY | DATE OF INSTALLATION | SPARE CARTRIDGE DATA |||| CURRENT STATUS | REMAINING AMOUNT | RECYCLE ROUNDS |
|---|---|---|---|---|---|---|---|---|---|
| | | | FULL DATA (FULL DIGITS) | COLOR DATA (FIRST TWO DIGITS) | UNIQUE DATA | | | | |
| 1 | 3/22/2000 | | 0000 0000 0000 0101 0000 | BLACK TONER (00) | 0000 0000 0000 0101 0000 | | NEW (SPARE) | N/A | N/A |
| 2 | 3/22/2000 | | 0100 0000 0000 0000 0100 | YELLOW TONER (01) | 0000 0000 0000 0000 0100 | | NEW (SPARE) | N/A | N/A |
| 3 | 3/22/2000 | | 1000 0000 0000 0000 1100 | MAGENTA TONER (10) | 0000 0000 0000 0000 1100 | | NEW (SPARE) | N/A | N/A |
| 4 | 3/22/2000 | | 1100 0000 0000 0000 0111 | CYAN TONER (11) | 0000 0000 0000 0000 0111 | | NEW (SPARE) | N/A | N/A |
| 5 | 3/22/2000 | | 0000 0000 0000 0101 0001 | BLACK TONER (00) | 0000 0000 0000 0101 0001 | | NEW (SPARE) | N/A | N/A |
| 6 | 3/22/2000 | | 0100 0000 0000 0000 0101 | YELLOW TONER (01) | 0000 0000 0000 0000 0101 | | NEW (SPARE) | N/A | N/A |
| 7 | 3/22/2000 | | 1000 0000 0000 0000 1101 | MAGENTA TONER (10) | 0000 0000 0000 0000 1101 | | NEW (SPARE) | N/A | N/A |
| 8 | 3/22/2000 | | 1100 0000 0000 0000 1000 | CYAN TONER (11) | 0000 0000 0000 0000 1000 | | NEW (SPARE) | N/A | N/A |
| 9 | · | | | | | | | | |
| 10 | · | | | | | | | | |
| 11 | · | | | | | | | | |

FIG. 72 (a) INSTALLED CARTRIDGE DATA

MACHINE MODEL: AR-2000 LIBRE

| CARTRIDGE TYPE | DATE OF REPLACEMENT | INSTALLED CARTRIDGE DATA ||| REMAINING AMOUNT | RECYCLE ROUNDS | CORRESPONDING SPARE CARTRIDGE No. |
| | | FULL DATA (FULL DIGITS) | COLOR DATA (FIRST TWO DIGITS) | UNIQUE DATA | | | |
|---|---|---|---|---|---|---|---|
| BLACK | 3/22/2000 | 0000 0000 0000 0101 0000 | BLACK TONER (00) | 0000 0000 0101 0000 | L1 | 0 | 1 |
| YELLOW | 3/22/2000 | 0100 0000 0000 0000 0100 | YELLOW TONER (01) | 0000 0000 0000 0100 | L1 | 0 | 2 |
| MAGENTA | 3/22/2000 | 1000 0000 0000 0000 1100 | MAGENTA TONER (10) | 0000 0000 0000 1100 | L1 | 0 | 3 |
| CYAN | 3/22/2000 | 1100 0000 0000 0000 0111 | CYAN TONER (11) | 0000 0000 0000 0111 | L1 | 0 | 4 |
| PHOTOSENSITIVE BODY | N/A | N/A | N/A | N/A | N/A | N/A | N/A |

FIG. 72 (b) SPARE CARTRIDGE DATA

MACHINE MODEL: AR-2000 LIBRE    DATE: 03/22/2000/16:45

| No. | DATE OF DELIVERY | DATE OF INSTALLATION | SPARE CARTRIDGE DATA ||| CURRENT STATUS | REMAINING AMOUNT | RECYCLE ROUNDS |
| | | | FULL DATA (FULL DIGITS) | COLOR DATA (FIRST TWO DIGITS) | UNIQUE DATA | | | |
|---|---|---|---|---|---|---|---|---|
| 1 | 3/22/2000 | 3/22/2000 | 0000 0000 0000 0101 0000 | BLACK TONER (00) | 0000 0000 0101 0000 | IN USE | L1 | 0 |
| 2 | 3/22/2000 | 3/22/2000 | 0100 0000 0000 0000 0100 | YELLOW TONER (01) | 0000 0000 0000 0100 | IN USE | L1 | 0 |
| 3 | 3/22/2000 | 3/22/2000 | 1000 0000 0000 0000 1100 | MAGENTA TONER (10) | 0000 0000 0000 1100 | IN USE | L1 | 0 |
| 4 | 3/22/2000 | 3/22/2000 | 1100 0000 0000 0000 0111 | CYAN TONER (11) | 0000 0000 0000 0111 | IN USE | L1 | 0 |
| 5 | 3/22/2000 | | 0000 0000 0000 0101 0001 | BLACK TONER (00) | 0000 0000 0101 0001 | NEW (SPARE) | N/A | |
| 6 | 3/22/2000 | | 0100 0000 0000 0000 0101 | YELLOW TONER (01) | 0000 0000 0000 0101 | NEW (SPARE) | N/A | |
| 7 | 3/22/2000 | | 1000 0000 0000 0000 1101 | MAGENTA TONER (10) | 0000 0000 0000 1101 | NEW (SPARE) | N/A | |
| 8 | 3/22/2000 | | 1100 0000 0000 0000 1000 | CYAN TONER (11) | 0000 0000 0000 1000 | NEW (SPARE) | N/A | |
| 9 | . . . | | | | | | | |
| 10 | . . . | | | | | | | |
| 11 | | | | | | | | |

FIG. 73 (a) INSTALLED CARTRIDGE DATA

MACHINE MODEL: AR-2000 LIBRE

| CARTRIDGE TYPE | DATE OF REPLACEMENT | INSTALLED CARTRIDGE DATA ||||| CORRESPONDING SPARE CARTRIDGE No. |
|---|---|---|---|---|---|---|
| | | FULL DATA (FULL DIGITS) | COLOR DATA (FIRST TWO DIGITS) | UNIQUE DATA | REMAINING AMOUNT | RECYCLE ROUNDS | |
| BLACK | 3/22/2000 | 0000 0000 0000 0101 0000 | BLACK TONER (00) | 0000 0000 0101 0000 | L3 | 0 | 1 |
| YELLOW | 3/22/2000 | 0100 0000 0000 0000 0100 | YELLOW TONER (01) | 0000 0000 0000 0100 | L2 | 0 | 2 |
| MAGENTA | 3/22/2000 | 1000 0000 0000 0000 1100 | MAGENTA TONER (10) | 0000 0000 0000 1100 | L2 | 0 | 3 |
| CYAN | 3/22/2000 | 1100 0000 0000 0000 0111 | CYAN TONER (11) | 0000 0000 0000 0111 | L2 | 0 | 4 |
| PHOTOSENSITIVE BODY | N/A | N/A | N/A | N/A | N/A | N/A | N/A |

FIG. 73 (b) SPARE CARTRIDGE DATA

MACHINE MODEL: AR-2000 LIBRE   DATE: 03/22/2000/16:45

| No. | DATE OF DELIVERY | DATE OF INSTALLATION | SPARE CARTRIDGE DATA |||| CURRENT STATUS | REMAINING AMOUNT | RECYCLE ROUNDS |
|---|---|---|---|---|---|---|---|---|---|
| | | | FULL DATA (FULL DIGITS) | COLOR DATA (FIRST TWO DIGITS) | UNIQUE DATA | | | | |
| 1 | 3/22/2000 | 3/22/2000 | 0000 0000 0000 0101 0000 | BLACK TONER (00) | 0000 0000 0101 0000 | | IN USE | L3 | 0 |
| 2 | 3/22/2000 | 3/22/2000 | 0100 0000 0000 0000 0100 | YELLOW TONER (01) | 0000 0000 0000 0100 | | IN USE | L2 | 0 |
| 3 | 3/22/2000 | 3/22/2000 | 1000 0000 0000 0000 1100 | MAGENTA TONER (10) | 0000 0000 0000 1100 | | IN USE | L2 | 0 |
| 4 | 3/22/2000 | 3/22/2000 | 1100 0000 0000 0000 0111 | CYAN TONER (11) | 0000 0000 0000 0111 | | IN USE | L2 | 0 |
| 5 | 3/22/2000 | | 0000 0000 0000 0101 0001 | BLACK TONER (00) | 0000 0000 0101 0001 | | NEW (SPARE) | N/A | N/A |
| 6 | 3/22/2000 | | 0100 0000 0000 0000 0101 | YELLOW TONER (01) | 0000 0000 0000 0101 | | NEW (SPARE) | N/A | N/A |
| 7 | 3/22/2000 | | 1000 0000 0000 0000 1101 | MAGENTA TONER (10) | 0000 0000 0000 1101 | | NEW (SPARE) | N/A | N/A |
| 8 | 3/22/2000 | | 1100 0000 0000 0000 1000 | CYAN TONER (11) | 0000 0000 0000 1000 | | NEW (SPARE) | N/A | N/A |
| 9 | . | | | | | | | | |
| 10 | . | | | | | | | | |
| 11 | . | | | | | | | | |

FIG. 74 (a) INSTALLED CARTRIDGE DATA

MACHINE MODEL: AR-2000 LIBRE

| CARTRIDGE TYPE | DATE OF REPLACEMENT | INSTALLED CARTRIDGE DATA ||| REMAINING AMOUNT | RECYCLE ROUNDS | CORRESPONDING SPARE CARTRIDGE No. |
| --- | --- | --- | --- | --- | --- | --- | --- |
| | | FULL DATA (FULL DIGITS) | COLOR DATA (FIRST TWO DIGITS) | UNIQUE DATA | | | |
| BLACK | 3/22/2000 | 0000 0000 0000 0101 0000 | BLACK TONER (00) | 0000 0000 0101 0000 | L4 | 0 | 1 |
| YELLOW | 3/22/2000 | 0100 0000 0000 0000 0100 | YELLOW TONER (01) | 0000 0000 0000 0100 | L2 | 0 | 2 |
| MAGENTA | 3/22/2000 | 1000 0000 0000 0000 1100 | MAGENTA TONER (10) | 0000 0000 0000 1100 | L3 | 0 | 3 |
| CYAN | 3/22/2000 | 1100 0000 0000 0000 0111 | CYAN TONER (11) | 0000 0000 0000 0111 | L2 | 0 | 4 |
| PHOTOSENSITIVE BODY | N/A | N/A | N/A | N/A | N/A | | N/A |

FIG. 74 (b) SPARE CARTRIDGE DATA

MACHINE MODEL: AR-2000 LIBRE      DATE: 06/12/2000/10:56

| No. | DATE OF DELIVERY | DATE OF INSTALLATION | SPARE CARTRIDGE DATA ||| CURRENT STATUS | REMAINING AMOUNT | RECYCLE ROUNDS |
| --- | --- | --- | --- | --- | --- | --- | --- | --- |
| | | | FULL DATA (FULL DIGITS) | COLOR DATA (FIRST TWO DIGITS) | UNIQUE DATA | | | |
| 1 | 3/22/2000 | 3/22/2000 | 0000 0000 0000 0101 0000 | BLACK TONER (00) | 0000 0000 0101 0000 | IN USE | L4 | 0 |
| 2 | 3/22/2000 | 3/22/2000 | 0100 0000 0000 0000 0100 | YELLOW TONER (01) | 0000 0000 0000 0100 | IN USE | L2 | 0 |
| 3 | 3/22/2000 | 3/22/2000 | 1000 0000 0000 0000 1100 | MAGENTA TONER (10) | 0000 0000 0000 1100 | IN USE | L3 | 0 |
| 4 | 3/22/2000 | 3/22/2000 | 1100 0000 0000 0000 0111 | CYAN TONER (11) | 0000 0000 0000 0111 | IN USE | L2 | 0 |
| 5 | 3/22/2000 | 6/12/2000 | 0000 0000 0000 0101 0001 | BLACK TONER (00) | 0000 0000 0101 0001 | NEW (SPARE) | N/A | N/A |
| 6 | 3/22/2000 | | 0100 0000 0000 0000 0101 | YELLOW TONER (01) | 0000 0000 0000 0101 | NEW (SPARE) | N/A | N/A |
| 7 | 3/22/2000 | | 1000 0000 0000 0000 1101 | MAGENTA TONER (10) | 0000 0000 0000 1101 | NEW (SPARE) | N/A | N/A |
| 8 | 3/22/2000 | | 1100 0000 0000 0000 1000 | CYAN TONER (11) | 0000 0000 0000 1000 | NEW (SPARE) | N/A | N/A |
| 9 | . | | | | | | | |
| 10 | . | | | | | | | |
| 11 | . | | | | | | | |

FIG. 75 (a) INSTALLED CARTRIDGE DATA

MACHINE MODEL: AR-2000 LIBRE

| CARTRIDGE TYPE | DATE OF REPLACEMENT | INSTALLED CARTRIDGE DATA ||| REMAINING AMOUNT | RECYCLE ROUNDS | CORRESPONDING SPARE CARTRIDGE No. |
| --- | --- | --- | --- | --- | --- | --- | --- |
| | | FULL DATA (FULL DIGITS) | COLOR DATA (FIRST TWO DIGITS) | UNIQUE DATA | | | |
| BLACK | 6/12/2000 | 0000 0000 0000 0101 0001 | BLACK TONER (00) | 0000 0000 0101 0001 | L1 | 1 | 5 |
| YELLOW | 3/22/2000 | 0100 0000 0000 0000 0100 | YELLOW TONER (01) | 0000 0000 0000 0100 | L2 | 0 | 2 |
| MAGENTA | 3/22/2000 | 1000 0000 0000 0000 1100 | MAGENTA TONER (10) | 0000 0000 0000 1100 | L3 | 0 | 3 |
| CYAN | 3/22/2000 | 1100 0000 0000 0000 0111 | CYAN TONER (11) | 0000 0000 0000 0111 | L2 | 0 | 4 |
| PHOTOSENSITIVE BODY | N/A | N/A | N/A | N/A | N/A | | N/A |

FIG. 75 (b) SPARE CARTRIDGE DATA

MACHINE MODEL: AR-2000 LIBRE    DATE: 06/12/2000/10:56

| No. | DATE OF DELIVERY | DATE OF INSTALLATION | SPARE CARTRIDGE DATA ||| CURRENT STATUS | REMAINING AMOUNT | RECYCLE ROUNDS |
| --- | --- | --- | --- | --- | --- | --- | --- | --- |
| | | | FULL DATA (FULL DIGITS) | COLOR DATA (FIRST TWO DIGITS) | UNIQUE DATA | | | |
| 1 | 3/22/2000 | 3/22/2000 | 0000 0000 0000 0101 0000 | BLACK TONER (00) | 0000 0000 0101 0000 | USED | L4 | 0 |
| 2 | 3/22/2000 | 3/22/2000 | 0100 0000 0000 0000 0100 | YELLOW TONER (01) | 0000 0000 0000 0100 | IN USE | L2 | 0 |
| 3 | 3/22/2000 | 3/22/2000 | 1000 0000 0000 0000 1100 | MAGENTA TONER (10) | 0000 0000 0000 1100 | IN USE | L3 | 0 |
| 4 | 3/22/2000 | 3/22/2000 | 1100 0000 0000 0000 0111 | CYAN TONER (11) | 0000 0000 0000 0111 | IN USE | L2 | 0 |
| 5 | 3/22/2000 | 6/12/2000 | 0000 0000 0000 0101 0001 | BLACK TONER (00) | 0000 0000 0101 0001 | IN USE | L1 | 1 |
| 6 | 3/22/2000 | | 0100 0000 0000 0000 0101 | YELLOW TONER (01) | 0000 0000 0000 0101 | NEW (SPARE) | N/A | N/A |
| 7 | 3/22/2000 | | 1000 0000 0000 0000 1101 | MAGENTA TONER (10) | 0000 0000 0000 1101 | NEW (SPARE) | N/A | N/A |
| 8 | 3/22/2000 | | 1100 0000 0000 0000 1000 | CYAN TONER (11) | 0000 0000 0000 1000 | NEW (SPARE) | N/A | N/A |
| 9 | ⋅ | | | | | | | |
| 10 | ⋅ | | | | | | | |
| 11 | ⋅ | | | | | | | |

FIG. 76 (a) INSTALLED CARTRIDGE DATA

MACHINE MODEL  AR-2000  LIBRE

| CARTRIDGE TYPE | DATE OF REPLACEMENT | INSTALLED CARTRIDGE DATA ||||| CORRESPONDING SPARE CARTRIDGE No. |
| --- | --- | --- | --- | --- | --- | --- |
| | | FULL DATA (FULL DIGITS) | COLOR DATA (FIRST TWO DIGITS) | UNIQUE DATA | REMAINING AMOUNT | RECYCLE ROUNDS | |
| BLACK | 6/12/2000 | 0000 0000 0000 0101 0001 | BLACK TONER (00) | 0000 0000 0101 0001 | L1 | 1 | 5 |
| YELLOW | 3/22/2000 | 0100 0000 0000 0000 0100 | YELLOW TONER (01) | 0000 0000 0000 0100 | L2 | 0 | 2 |
| MAGENTA | 3/22/2000 | 1000 0000 0000 0000 1100 | MAGENTA TONER (10) | 0000 0000 0000 1100 | L3 | 0 | 3 |
| CYAN | 3/22/2000 | 1100 0000 0000 0000 0111 | CYAN TONER (11) | 0000 0000 0000 0111 | L2 | 0 | 4 |
| PHOTOSENSITIVE BODY | N/A | N/A | N/A | N/A | N/A | | N/A |

FIG. 76 (b) SPARE CARTRIDGE DATA

MACHINE MODEL  AR-2000  LIBRE     DATE  06/20/2000/14:35

| No. | DATE OF DELIVERY | DATE OF INSTALLATION | SPARE CARTRIDGE DATA |||| CURRENT STATUS | REMAINING AMOUNT | RECYCLE ROUNDS |
| --- | --- | --- | --- | --- | --- | --- | --- | --- | --- |
| | | | FULL DATA (FULL DIGITS) | COLOR DATA (FIRST TWO DIGITS) | UNIQUE DATA | | | | |
| 1 | 3/22/2000 | 3/22/2000 | 0000 0000 0000 0101 0000 | BLACK TONER (00) | 0000 0000 0101 0000 | | USED | L4 | 0 |
| 2 | 3/22/2000 | 3/22/2000 | 0100 0000 0000 0000 0100 | YELLOW TONER (01) | 0000 0000 0000 0100 | | IN USE | L2 | 0 |
| 3 | 3/22/2000 | 3/22/2000 | 1000 0000 0000 0000 1100 | MAGENTA TONER (10) | 0000 0000 0000 1100 | | IN USE | L3 | 0 |
| 4 | 3/22/2000 | 3/22/2000 | 1100 0000 0000 0000 0111 | CYAN TONER (11) | 0000 0000 0000 0111 | | IN USE | L2 | 0 |
| 5 | 3/22/2000 | 6/12/2000 | 0000 0000 0000 0101 0001 | BLACK TONER (00) | 0000 0000 0101 0001 | | IN USE | L1 | 1 |
| 6 | 3/22/2000 | | 0100 0000 0000 0000 0101 | YELLOW TONER (01) | 0000 0000 0000 0101 | | NEW (SPARE) | N/A | N/A |
| 7 | 3/22/2000 | | 1000 0000 0000 0000 1101 | MAGENTA TONER (10) | 0000 0000 0000 1101 | | NEW (SPARE) | N/A | N/A |
| 8 | 3/22/2000 | | 1100 0000 0000 0000 1000 | CYAN TONER (11) | 0000 0000 0000 1000 | | NEW (SPARE) | N/A | N/A |
| 9 | 3/22/2000 | | 0000 0000 0000 0101 0010 | BLACK TONER (00) | 0000 0000 0101 0010 | | NEW (SPARE) | N/A | N/A |
| 10 | · | | | | | | | | |
| 11 | · | | | | | | | | |

FIG.77

ACCOUNTING LIST [4] (PERIOD: MARCH 16, 2000 – APRIL 15, 2000)
CONTRACT NUMBER: 000125
CONTRACT MODEL: AR-2000  LIBRE

| No. | PRODUCT | DATE OF INSTALLATION | QUANTITY | FIXED PART ||||| PROGRESSIVE PART |||
|---|---|---|---|---|---|---|---|---|---|---|
| | | | | BASE FEE P2 ① | RECYCLE ROUNDS | ADJUSTMENT ② | SUBTOTAL P2③(①−②) | BASE FEE p ④ | CHARGE COEFFICIENT mi ⑤ | SUBTOTAL P1⑥(③∗⑤) | SUBTOTAL P1+P2 ⑦(③+⑥) |
| 1 | BLACK TONER CARTRIDGE | 3/22/2000 | 1 | Pb | 0 | 0 | Pb | pb | m1 | pb∗m1 | Pb+pb∗m1 |
| 2 | YELLOW TONER CARTRIDGE | 3/22/2000 | 1 | Py | 0 | 0 | Py | py | m2 | py∗m2 | Py+py∗m2 |
| 3 | MAGENTA TONER CARTRIDGE | 3/22/2000 | 1 | Pm | 0 | 0 | Pm | pm | m3 | pm∗m3 | Pm+pm∗m3 |
| 4 | CYAN TONER CARTRIDGE | 3/22/2000 | 1 | Pc | 0 | 0 | Pc | pc | m2 | pc∗m2 | Pc+pc∗m2 |
| TOTAL ⑧ | | | 4 | | | | | | | | △△△△.△ |

ACCOUNTING LIST [5] (PERIOD: APRIL 16, 2000 – MAY 15, 2000)
CONTRACT NUMBER: 000125
CONTRACT MODEL: AR-2000  LIBRE

| No. | PRODUCT | DATE OF INSTALLATION | QUANTITY | FIXED PART ||||| PROGRESSIVE PART |||
|---|---|---|---|---|---|---|---|---|---|---|
| | | | | BASE FEE P2 ① | RECYCLE ROUNDS | ADJUSTMENT ② | SUBTOTAL P2③(①−②) | BASE FEE p ④ | CHARGE COEFFICIENT mi ⑤ | SUBTOTAL P1⑥(③∗⑤) | SUBTOTAL P1+P2 ⑦(③+⑥) |
| | NO DATA | | | | | | | | | | |
| TOTAL ⑧ | | | | | | | 0 | | | | 0 |

ACCOUNTING LIST [6] (PERIOD: MAY 16, 2000 – JUNE 15, 2000)
CONTRACT NUMBER: 000125
CONTRACT MODEL: AR-2000  LIBRE

| No. | PRODUCT | DATE OF INSTALLATION | QUANTITY | FIXED PART ||||| PROGRESSIVE PART |||
|---|---|---|---|---|---|---|---|---|---|---|
| | | | | BASE FEE P2 ① | RECYCLE ROUNDS | ADJUSTMENT ② | SUBTOTAL P2③(①−②) | BASE FEE p ④ | CHARGE COEFFICIENT mi ⑤ | SUBTOTAL P1⑥(③∗⑤) | SUBTOTAL P1+P2 ⑦(③+⑥) |
| 1 | BLACK TONER CARTRIDGE | 6/12/2000 | 1 | Pb | 1 | p1 | Pb−p1 | pb | m1 | pb∗m1 | Pb−p1+Pb+pb∗m1 |
| TOTAL ⑧ | | | 1 | | | | | | | | |

FIG.79

ACCOUNTING LIST [7] (PERIOD: MARCH 16, 2000 – APRIL 15, 2000)
CONTRACT NUMBER: 000125
CONTRACT MODEL: AR-2000 LIBRE

| No. | PRODUCT | DATE OF INSTALLATION | QUANTITY | FIXED PART ||||| PROGRESSIVE PART ||||
|---|---|---|---|---|---|---|---|---|---|---|---|
| | | | | BASE FEE P2 ① | RECYCLE ROUNDS | BASE FEE P2 ① | ADJUSTMENT ② | SUBTOTAL P2③①−② | BASE FEE p ④ | CHARGE COEFFICIENT m ⑤ | SUBTOTAL P1⑥③*⑤ | SUBTOTAL P1+P2 ⑦③+⑥ |
| 1 | BLACK TONER CARTRIDGE | 3/22/2000 | 1 | Pb | 0 | 0 | Pb | pb | mb | pb*mb | Pb+pb*mb |
| 2 | YELLOW TONER CARTRIDGE | 3/22/2000 | 1 | Py | 0 | 0 | Py | py | my | py*my | Py+py*my |
| 3 | MAGENTA TONER CARTRIDGE | 3/22/2000 | 1 | Pm | 0 | 0 | Pm | pm | mm | pm*mm | Pm+pm*mm |
| 4 | CYAN TONER CARTRIDGE | 3/22/2000 | 1 | Pc | 0 | 0 | Pc | pc | mc | pc*mc | Pc+pc*mc |
| TOTAL ⑧ | | | 4 | | | | | | | | | ΔΔΔΔ.Δ |

ACCOUNTING LIST [8] (PERIOD: APRIL 16, 2000 – MAY 15, 2000)
CONTRACT NUMBER: 000125
CONTRACT MODEL: AR-2000 LIBRE

| No. | PRODUCT | DATE OF INSTALLATION | QUANTITY | FIXED PART ||||| PROGRESSIVE PART ||||
|---|---|---|---|---|---|---|---|---|---|---|---|
| | | | | BASE FEE P2 ① | RECYCLE ROUNDS | BASE FEE P2 ① | ADJUSTMENT ② | SUBTOTAL P2③①−② | BASE FEE p ④ | CHARGE COEFFICIENT m ⑤ | SUBTOTAL P1⑥③*⑤ | SUBTOTAL P1+P2 ⑦③+⑥ |
| | NO DATA | | | | | | | | | | | |
| TOTAL ⑧ | | | | | | | | 0 | | | | 0 |

ACCOUNTING LIST [9] (PERIOD: MAY 16, 2000 – JUNE 15, 2000)
CONTRACT NUMBER: 000125
CONTRACT MODEL: AR-2000 LIBRE

| No. | PRODUCT | DATE OF INSTALLATION | QUANTITY | FIXED PART ||||| PROGRESSIVE PART ||||
|---|---|---|---|---|---|---|---|---|---|---|---|
| | | | | BASE FEE P2 ① | RECYCLE ROUNDS | BASE FEE P2 ① | ADJUSTMENT ② | SUBTOTAL P2③①−② | BASE FEE p ④ | CHARGE COEFFICIENT m ⑤ | SUBTOTAL P1⑥③*⑤ | SUBTOTAL P1+P2 ⑦③+⑥ |
| 1 | BLACK TONER CARTRIDGE | 6/12/2000 | 1 | Pb | 1 | Pb | p1 | Pb−p1 | pb | mb | pb*mb | Pb−p1+pb*mb |
| TOTAL ⑧ | | | 1 | | | | | | | | | |

FIG.82(a)

REPLACEMENT PART ID NUMBER LIST

ORIGINAL MAGENTA TONER CARTRIDGE FOR DIGITAL COPYING MACHINE BL-2000

| ID NUMBER | DATE OF MANUFACTURE | PLACE OF DELIVERY | DATE OF DELIVERY |
|---|---|---|---|
| 001002 00000001 | 5/20/2000 15:15 | – | – |
| 001002 00000002 | 5/20/2000 15:16 | – | – |
| 001002 00000003 | 5/20/2000 15:17 | – | – |
| 001002 00000004 | 5/20/2000 15:19 | – | – |
| 001002 00000005 | 5/20/2000 15:20 | – | – |
| 001002 00000006 | 5/20/2000 15:21 | – | – |
| 001002 00000007 | 5/20/2000 15:23 | – | – |
| 001002 00000008 | 5/20/2000 15:24 | – | – |
| 001002 00000009 | 5/20/2000 15:25 | – | – |
| 001002 00000010 | 5/20/2000 15:27 | – | – |
| ... | | | |

FIG.82(b)

REPLACEMENT PART ID NUMBER LIST

ORIGINAL MAGENTA TONER CARTRIDGE FOR DIGITAL COPYING MACHINE BL-2000

| ID NUMBER | DATE OF MANUFACTURE | PLACE OF DELIVERY | DATE OF DELIVERY |
|---|---|---|---|
| 001002 00000001 | 5/20/2000 15:15 | 000125 | 6/28/2000 |
| 001002 00000002 | 5/20/2000 15:16 | 000125 | 6/28/2000 |
| 001002 00000003 | 5/20/2000 15:17 | 000125 | 6/28/2000 |
| 001002 00000004 | 5/20/2000 15:19 | 000125 | 6/28/2000 |
| 001002 00000005 | 5/20/2000 15:20 | 000125 | 6/28/2000 |
| 001002 00000006 | 5/20/2000 15:21 | 093637 | 6/30/2000 |
| 001002 00000007 | 5/20/2000 15:23 | 093637 | 6/30/2000 |
| 001002 00000008 | 5/20/2000 15:24 | – | – |
| 001002 00000009 | 5/20/2000 15:25 | – | – |
| 001002 00000010 | 5/20/2000 15:27 | – | – |
| ... | | | |

FIG.86(a)

REPLACEMENT PART ID NUMBER LIST

ORIGINAL MAGENTA TONER CARTRIDGE FOR DIGITAL COPYING MACHINE BL-2000

| ID NUMBER | DATE OF MANUFACTURE | PLACE OF DELIVERY | DATE OF DELIVERY | COLLATION REQUESTER | DATE OF COLLATION |
|---|---|---|---|---|---|
| 001002 00000001 | 5/20/2000 15:15 | — | — | — | — |
| 001002 00000002 | 5/20/2000 15:16 | — | — | — | — |
| 001002 00000003 | 5/20/2000 15:17 | — | — | — | — |
| 001002 00000004 | 5/20/2000 15:19 | — | — | — | — |
| 001002 00000005 | 5/20/2000 15:20 | — | — | — | — |
| 001002 00000006 | 5/20/2000 15:21 | — | — | — | — |
| 001002 00000007 | 5/20/2000 15:23 | — | — | — | — |
| 001002 00000008 | 5/20/2000 15:24 | — | — | — | — |
| 001002 00000009 | 5/20/2000 15:25 | — | — | — | — |
| 001002 00000010 | 5/20/2000 15:27 | — | — | — | — |
| ... | | | | | |

FIG.86(b)

REPLACEMENT PART ID NUMBER LIST

ORIGINAL MAGENTA TONER CARTRIDGE FOR DIGITAL COPYING MACHINE BL-2000

| ID NUMBER | DATE OF MANUFACTURE | PLACE OF DELIVERY | DATE OF DELIVERY | COLLATION REQUESTER | DATE OF COLLATION |
|---|---|---|---|---|---|
| 001002 00000001 | 5/20/2000 15:15 | 000125 | 6/28/2000 | — | — |
| 001002 00000002 | 5/20/2000 15:16 | 000125 | 6/28/2000 | — | — |
| 001002 00000003 | 5/20/2000 15:17 | 000125 | 6/28/2000 | — | — |
| 001002 00000004 | 5/20/2000 15:19 | 000125 | 6/28/2000 | — | — |
| 001002 00000005 | 5/20/2000 15:20 | 000125 | 6/28/2000 | — | — |
| 001002 00000006 | 5/20/2000 15:21 | 093637 | 6/30/2000 | — | — |
| 001002 00000007 | 5/20/2000 15:23 | 093637 | 6/30/2000 | — | — |
| 001002 00000008 | 5/20/2000 15:24 | — | — | 011218 | 7/22/2000 |
| 001002 00000009 | 5/20/2000 15:25 | — | — | — | — |
| 001002 00000010 | 5/20/2000 15:27 | — | — | — | — |
| ... | | | | | |

FIG.87(a)

REPLACEMENT PART ID NUMBER LIST

ORIGINAL MAGENTA TONER CARTRIDGE FOR DIGITAL COPYING MACHINE BL-2000

| ID NUMBER | DATE OF MANUFACTURE | PLACE OF DELIVERY | DATE OF DELIVERY | COLLECTION REQUESTER | DATE OF COLLECTION |
|---|---|---|---|---|---|
| 001002 00000001 | 5/20/2000 15:15 | — | — | — | — |
| 001002 00000002 | 5/20/2000 15:16 | — | — | — | — |
| 001002 00000003 | 5/20/2000 15:17 | — | — | — | — |
| 001002 00000004 | 5/20/2000 15:19 | — | — | — | — |
| 001002 00000005 | 5/20/2000 15:20 | — | — | — | — |
| 001002 00000006 | 5/20/2000 15:21 | — | — | — | — |
| 001002 00000007 | 5/20/2000 15:23 | — | — | — | — |
| 001002 00000008 | 5/20/2000 15:24 | — | — | — | — |
| 001002 00000009 | 5/20/2000 15:25 | — | — | — | — |
| 001002 00000010 | 5/20/2000 15:27 | — | — | — | — |
| ... | | | | | |

FIG.87(b)

REPLACEMENT PART ID NUMBER LIST

ORIGINAL MAGENTA TONER CARTRIDGE FOR DIGITAL COPYING MACHINE BL-2000

| ID NUMBER | DATE OF MANUFACTURE | PLACE OF DELIVERY | DATE OF DELIVERY | COLLECTION REQUESTER | DATE OF COLLECTION |
|---|---|---|---|---|---|
| 001002 00000001 | 5/20/2000 15:15 | 000125 | 6/28/2000 | — | — |
| 001002 00000002 | 5/20/2000 15:16 | 000125 | 6/28/2000 | — | — |
| 001002 00000003 | 5/20/2000 15:17 | 000125 | 6/28/2000 | — | — |
| 001002 00000004 | 5/20/2000 15:19 | 000125 | 6/28/2000 | — | — |
| 001002 00000005 | 5/20/2000 15:20 | 093637 | 6/30/2000 | — | — |
| 001002 00000006 | 5/20/2000 15:21 | 093637 | 6/30/2000 | — | — |
| 001002 00000007 | 5/20/2000 15:23 | — | — | — | — |
| 001002 00000008 | 5/20/2000 15:24 | — | — | 011218 | 7/28/2000 |
| 001002 00000009 | 5/20/2000 15:25 | — | — | — | — |
| 001002 00000010 | 5/20/2000 15:27 | — | — | — | — |
| ... | | | | | |

FIG. 93 (a)

ID NUMBER ISSUE LIST

QUASI-ORIGINAL MAGENTA TONER CARTRIDGE FOR
DIGITAL COPYING MACHINE BL-2000

| MARK | ID NUMBER | | ID ISSUE DATE | ID ISSUE REQUESTER |
|---|---|---|---|---|
| O | 101002 | 00000001 | — | — |
| | 101002 | 00000002 | — | — |
| | 101002 | 00000003 | — | — |
| | 101002 | 00000004 | — | — |
| | 101002 | 00000005 | — | — |
| | ... | ... | ... | ... |
| | ... | ... | ... | ... |
| | ... | ... | ... | ... |

FIG. 93 (b)

ID NUMBER ISSUE LIST

QUASI-ORIGINAL MAGENTA TONER CARTRIDGE FOR
DIGITAL COPYING MACHINE BL-2000

| MARK | ID NUMBER | | ID NUMBER | ID ISSUE REQUESTER |
|---|---|---|---|---|
| | 101002 | 00000001 | 2000/6/28 | 000001 |
| | 101002 | 00000002 | 2000/6/28 | 000001 |
| | 101002 | 00000003 | 2000/6/28 | 000001 |
| | 101002 | 00000004 | 2000/6/28 | 000001 |
| | 101002 | 00000005 | 2000/6/28 | 000001 |
| | ... | ... | ... | ... |
| | 101002 | 00000075 | 2000/6/28 | 000001 |
| O | 101002 | 00000076 | — | — |
| | 101002 | 00000077 | — | — |
| | 101002 | 00000078 | — | — |
| | ... | ... | ... | ... |

FIG. 93 (c)

ID NUMBER ISSUE LIST

QUASI-ORIGINAL MAGENTA TONER CARTRIDGE FOR
DIGITAL COPYING MACHINE BL-2000

| マーク | ID NUMBER | | ID NUMBER | ID ISSUE REQUESTER |
|---|---|---|---|---|
| | 101002 | 00000001 | 2000/6/28 | 000001 |
| | 101002 | 00000002 | 2000/6/28 | 000001 |
| | 101002 | 00000003 | 2000/6/28 | 000001 |
| | 101002 | 00000004 | 2000/6/28 | 000001 |
| | 101002 | 00000005 | 2000/6/28 | 000001 |
| | ... | ... | ... | ... |
| | 101002 | 00000075 | 2000/6/28 | 000001 |
| | 101002 | 00000076 | 2000/6/30 | 000125 |
| | 101002 | 00000077 | 2000/6/30 | 000125 |
| | 101002 | 00000078 | 2000/6/30 | 000125 |
| | ... | ... | ... | ... |
| | 101002 | 00000095 | 2000/6/30 | 000125 |
| O | 101002 | 00000096 | — | — |
| | ... | ... | ... | ... |

FIG.94

ID NUMBER APPLICATION MANAGER LIST

ORIGINAL MAGENTA TONER CARTRIDGE FOR DIGITAL COPYING MACHINE BL-2000

| ID NUMBER | ID ISSUE DATE | DATE AND TIME ID APPLIED | CARTRIDGE FILLING | PACKING | DELIVERY |
|---|---|---|---|---|---|
| 001002\|00000001 | 6/28/2000 | 6/29/2000 9:00 | COMPLETED | COMPLETED | NOT COMPLETED |
| 001002\|00000002 | 6/28/2000 | 6/29/2000 9:02 | COMPLETED | COMPLETED | NOT COMPLETED |
| 001002\|00000003 | 6/28/2000 | 6/29/2000 9:04 | COMPLETED | COMPLETED | NOT COMPLETED |
| 001002\|00000004 | 6/28/2000 | 6/29/2000 9:07 | COMPLETED | COMPLETED | NOT COMPLETED |
| 001002\|00000005 | 6/28/2000 | 6/29/2000 9:09 | COMPLETED | COMPLETED | NOT COMPLETED |
| ... | ... | ... | ... | ... | ... |
| 001002\|00000049 | 6/28/2000 | 6/29/2000 10:45 | NOT COMPLETED | NOT COMPLETED | NOT COMPLETED |
| 001002\|00000050 | 6/28/2000 | 6/29/2000 10:47 | NOT COMPLETED | NOT COMPLETED | NOT COMPLETED |
| 001002\|00000051 | 6/28/2000 | — | NOT COMPLETED | NOT COMPLETED | NOT COMPLETED |
| ... | ... | ... | ... | ... | ... |
| 001002\|00000075 | 6/28/2000 | — | NOT COMPLETED | NOT COMPLETED | NOT COMPLETED |
| — | — | — | | | |

FIG. 95 (a)

CONTRACT SIGNER TABLE[1]

| ID NUMBER | NAME OF CONTRACT SIGNER | STREET ADDRESS | EMAIL ADDRESS | TELEPHONE NO. | DATE OF CONTRACT SIGNED | METHOD OF PAYMENT | ... |
|---|---|---|---|---|---|---|---|
| 000001 | A CO., LTD. | | | | | | |
| 000002 | B INC. | | | | | | |
| 000003 | C CO., LTD. SUPPLIES SALES DIVISION | | | | | | |
| 000004 | C CO., LTD. SALES DIVISION | | | | | | |
| 000005 | | | | | | | |
| ... | | | | | | | |

FIG. 95 (b)

CONTRACT SIGNER TABLE[2]

| ID NUMBER | CONTRACT CARTRIDGE DATA | | | | | |
|---|---|---|---|---|---|---|
| | FOR BL-2000 | FOR BL-2000 | ... | FOR S-2000 | FOR S-2000 | FOR S-2001 |
| 000001 | ○ | ○ | | - | - | - |
| 000002 | - | ○ | | - | - | ○ |
| 000003 | ○ | - | | - | - | - |
| 000004 | ○ | - | | ○ | ○ | - |
| 000005 | - | - | | - | - | - |
| ... | | | | | | |

FIG.96

CONTRACT SIGNER MANAGER TABLE

CONTRACT SIGNER ID : 000001

6.30.2000
PERIOD: JUNE 16, 2000 — JULY 15, 2000

| DATE OF DELIVERY | NAME OF MODEL DELIVERED | QUANTITY DELIVERED | QUANTITY USED | REMARKS |
|---|---|---|---|---|
| 5/20/2000 | FOR BL-2000 (Black) | 100 | 50 | — |
| 5/20/2000 | FOR BL-2000 (Yellow) | 75 | 50 | — |
| 5/20/2000 | FOR BL-2000 (Mazenta) | 75 | 50 | — |
| 5/20/2000 | FOR BL-2000 (Cyan) | 75 | 50 | — |
| 5/20/2000 | FOR BL-2001 (Black) | 70 | 21 | — |
| 5/20/2000 | FOR BL-2001 (Yellow) | 40 | 18 | — |
| 5/20/2000 | FOR BL-2001 (Mazenta) | 40 | 18 | — |
| 5/20/2000 | FOR BL-2001 (Cyan) | 40 | 18 | — |
| 5/20/2000 | ... | — | — | — |
| ... | ... | | | |

FIG. 97

ACCOUNTING LIST[1]

(PERIOD: JUNE 16, 2000 – JULY 15, 2000)

CONTRACT NUMBER: 000001
CONTRACT MODEL: BR-2000  LIBRE, BR-2001  TONER CARTRIDGE FOR LIBRE

| No. | NAME OF CONTAINER | DELIVERY DATA ||| ID ISSUE DATA || QUANTITY USED | UNIT PRICE | SUBTOTAL |
|---|---|---|---|---|---|---|---|---|---|
| | | DATE OF DELIVERY | QUANTITY DELIVERED | TOTAL QUANTITY DELIVERED | ID ISSUE DATE | NUMBER OF ID ISSUED | | | |
| 1 | BLACK FOR BL-2000 (CONTENT) | 5/20/2000 | 100 | 100 | 6/10/2000<br>6/28/2000<br>7/1/2000 | 20<br>30<br>11 | 61 | △△△△.△ | △△△△.△ |
| 2 | YELLOW FOR BL-2000 (CONTENT) | 5/20/2000 | 75 | 75 | 6/27/2000 | 50 | 50 | △△△△.△ | △△△△.△ |
| 3 | MAGENTA FOR BL-2000 (CONTENT) | 5/20/2000 | 75 | 75 | 6/28/2000 | 50 | 50 | △△△△.△ | △△△△.△ |
| TOTAL | | | | | | | | | △△△△.△ |

FIG. 98 (a)

CONTRACT SIGNER TABLE[1]

| ID NUMBER | NAME OF CONTRACT SIGNER | STREET ADDRESS | EMAIL ADDRESS | TELEPHONE NO. | DATE OF CONTRACT SIGNED | METHOD OF PAYMENT | ... |
|---|---|---|---|---|---|---|---|
| 000001 | A CO., LTD. | | | | | | |
| 000002 | B INC. GENERAL AFFAIRS DEPARTMENT | | | | | | |
| 000003 | C CO., LTD. ABC DIVISION | | | | | | |
| 000004 | C CO., LTD. XYZ DIVISION | | | | | | |
| 000005 | | | | | | | |
| ... | | | | | | | |

FIG. 98 (b)

CONTRACT SIGNER TABLE[2]

| ID NUMBER | CONTRACT MODEL1 | CONTRACT MODEL2 | CONTRACT MODEL3 | ... |
|---|---|---|---|---|
| 000001 | BL-2000 | NO CONTRACT | NO CONTRACT | |
| 000002 | BL-2000 | NO CONTRACT | NO CONTRACT | |
| 000003 | BL-2000 | BL-2000 | NO CONTRACT | |
| 000004 | BL-2000 | NO CONTRACT | NO CONTRACT | |
| 000005 | | | | |
| ... | | | | |

US 8,732,038 B2

SERVICE MANAGEMENT METHOD, PRODUCT-IN-CIRCULATION TO WHICH THE SAME IS APPLIED, SERVICE MANAGEMENT DEVICE, SERVICE MANAGEMENT NETWORK SYSTEM, SERVICE MANAGEMENT PROGRAM, AND COMPUTER READABLE PROGRAM PRODUCT WITH THE PROGRAM STORED THEREON

CROSS-REFERENCE TO RELATED APPLICATIONS

This application is a continuation application of U.S. patent application Ser. No. 09/907,667 filed Jul. 18, 2001, which in turn claims priority under 35 U.S.C. §119 to the following Japanese applications, all of which are incorporated herein by reference.

| Application No. | Filing Date | Country |
| --- | --- | --- |
| 2000-219597 | Jul. 19, 2000 | Japan |
| 2000-291264 | Sep. 25, 2000 | Japan |
| 2000-399568 | Dec. 27, 2000 | Japan |
| 2000-399565 | Dec. 27, 2000 | Japan |
| 2001-7025 | Jan. 15, 2001 | Japan |
| 2001-8318 | Jan. 16, 2001 | Japan |

FIELD OF THE INVENTION

The present invention is directed to service management methods for degradables and consumables and service management network systems related with the method and in particular directed to management, supply, billing, and other related methods for the degradable and consumables, including those used in copying machines, printers, and other image forming apparatuses, which the service receiver can keep a stock of and be charged on the quantities of the products used.

BACKGROUND OF THE INVENTION

Copying machines, printers, and other image forming apparatuses need a refill after continuous use over an extended period of time, and degradables and consumables, such as toner cartridges and photosensitive body cartridges, must be replaced.

Throughout this document, we use degradables in reference to those photosensitive body cartridges and other photosensitive parts that wear out by use and consumables in reference to toner and ink cartridges and other similar parts that hold toner, ink, etc. that are consumed by use. However, degradables are also consumable in the sense that they have to be replaced with new ones after an extended period of use, and some toner cartridges include a built-in photosensitive body cartridge. In light of these facts, when degradables and consumables are not necessarily differentiated from each other, consumables collectively refers to both kinds of products.

The user of a machine that requires replacement of consumables typically buys new ones before he/she uses up old ones. By so doing, he/she can keep a stock of them and avoid situations where the machine becomes inoperative because he/she has run out of the consumables.

In the current payment system, the user can legitimately own consumable products only after buying them. Put differently, without paying, he/she cannot own them, much less to keep a stock of them.

Meanwhile, when a generous budget is a thing that is hard to come, the user needs to curb expenses on consumable products. Maybe he/she could do this by keeping a smaller stock of spare consumable products, but the stock would have to be refilled more often. He/she would fairly frequently have to bother to check the stock to find out how many of them are left unused and also the consumable products currently in use to know how longer they could be used. The user or manager of the machine would be typically responsible for doing this job, but could not dedicate his/her whole time to it. Under these circumstances, he/she probably could not, or would not, manage the consumables.

A likely result is that more than a currently necessary number of consumable products are bought and stocked.

To put the problem in a different perspective, recycle and reuse of consumables are being encouraged to create better environment. Recycle refers to the process of used consumables being collected, sorted depending on the material, and destroyed for reuse as raw material. Reuse refers to the process of used consumables being washed, polished, or otherwise treated quickly for reuse.

In the latter case, some toner cartridges have memory means to record history of each component. The history is taken into consideration when deciding whether the individual components are to be reused or discarded.

For example, Japanese Laid-Open Patent Application No. 11-126008/1999 (Tokukaihei 11-126008; published on May 11, 1999) discloses a toner cartridge with an EEPROM or other freely attachable and detachable memory means to record use history, including the lot number, number of times recycled, and accumulated number of pages printed, of a develop cylinder, photosensitive drum, cleaning blade, and other individual components in the toner cartridge. The technique enables appropriate control of toner cartridges collected after use as to whether they can be recycled or not.

There are situations where the spare consumables kept by the user are totally wasted: for example, the user has been renting an image forming apparatus from a leasing company, but returns it as the contract expires; or the user simply discards an old image forming apparatus that has been used up to its expected life.

Even when the user renews the contract, unless he/she rents a compatible model with the consumable products he/she has kept a stock of for the old model, they are totally wasted.

This is especially true in offices where vast amounts of pages are printed. Many consumable products therefore must be bought and kept in stock to satisfy the needs in exchange for a large amount of advance payment. If the foregoing situations occur, loss is very large accordingly.

The problem is partly solved by predicting how longer the photosensitive body and toner (or cartridges holding them) are usable. The prediction can be made by an IC chip provided in the consumable product to record data on operation conditions, such as the date and time the consumable product was last replaced, the total time of use of the consumable product since its installation, and the number of pages printed.

Using an image forming apparatus with the function to predict the remaining product life by electronic means may be somewhat helpful to establish a fairly reliable, automatic day-to-day control system that even works with a stock of a least number of spare consumable products possible.

Nevertheless, however precisely the prediction is made, the user still needs to pay to keep some spare consumable products at hand. Anyway, the precision of the prediction varies greatly depending on the performance of the algorithm involved, and the prediction is in no case 100% reliable.

To sum up the description so far, the user needs to keep spare consumable products at hand to avoid situations where the machine becomes inoperative because he/she has run out of consumable products. To this end, the user has to buy the consumable products in the current accounting system. In addition, the user may not actually use those spare consumable products he/she has paid for and let them waste.

Japanese Laid-Open Patent Application No. 11-126008/1999 mentioned above is directed to the recording of use history of individual components of a toner cartridge and the determining as to whether the components are recyclable based on the history. The technique is aimed at reducing manufacturing cost of toner cartridges and making efficient use of energy and natural resources; however it does not give any solution at all to the undesirable expenses the user is forced to spend on spare consumable parts.

When the toner cartridge is assembled from more than one component, use history needs to be recorded individually for the components. To record this growing amount of data, the memory means needs to be expanded. Other problems include an extended period of time required to input the data, reduced manufacturing efficiencies, and growing costs. Besides, if the user desires to further record the number of pages the machine has been used for and/or the running hours the machine has accumulated so as to improve precision of recorded use history, the printer itself needs to have a function to write data in the memory means, which causes various problems including increasingly complex devices and processes.

Some image forming apparatuses developed so far have a toner-supplying toner cartridge installed in a developer.

The toner cartridge is designed to be freely attachable and detachable so that it can be replaced at a suitable time depending on the consumption of the toner. Under typical circumstances, the image forming apparatus is desirably used with an genuine, standards-complying toner cartridge made by the original manufacturer, because it is compatible with the structure of the device and its performance is guaranteed by the manufacturer.

Nevertheless, pirated toners, whose performance is not guaranteed by the manufacturer, are widely distributed because of their low prices and other reasons, despite the fact that various toners have been developed for use in electrophotographic image forming apparatuses and are available in the market.

Toner cartridges are a degradable product and are often counterfeited. Admittedly, a certain level of performance in photocopying may be expected with fake and non-guaranteed toner cartridges. It is therefore difficult to bring home to the user inconveniences incurred by the use, deliberate or by mistake, of counterfeit toners. The use of fake products not only fails to bring out the best performance of the image forming apparatus, but is also a cause for trouble.

Methods have been conventionally proposed to identify genuine replacement parts to determine if those installed in an image forming apparatus are original. Japanese Laid-Open Patent Application No. 59-145179/1984 (Tokukaisho 59-145179, published on Aug. 20, 1984) discloses such a method to identify an original replacement part whereby a photoelectric or magnetic sensor detects a specified mark borne by the original replacement part. Japanese Laid-Open Patent Application No. 2-73264/1990 (Tokukaihei 2-73264, published on Mar. 13, 1990) discloses another whereby original replacement parts are equipped with a pressure-sensitive conductor of a complex shape to be distinguished from non-original replacement parts. Japanese Laid-Open Patent Application No. 9-185311/1997 (Tokukaihei 9-185311, published on Jul. 15, 1997) discloses still another whereby original replacement parts are equipped with a pattern of small lumps and dents which is detected by a mechanical switch with a normally open contact to be distinguished from non-original replacement parts.

There are advanced methods whereby not only the replacement part is checked for its genuine origin, but the image forming apparatus is controlled to operate normally only when the replacement part is identified as original. Japanese Laid-Open Patent Application No. 5-224479/1993 (Tokukaihei 5-224479, published on Sep. 3, 1993) discloses such a method to recognize an original replacement part being installed in the image forming apparatus, whereby the replacement part has an attached code label carrying a specified set of data, and the image forming apparatus is permitted to operate normally only upon the reading of the set of data.

A disadvantage of these methods is that they can be circumvented easily by third parties producing counterfeit goods and fall far short of eradicating fake parts from the market. Disposable replacement parts are particularly difficult to eradicate from the market, because third parties have to only collect them and replace nothing but toner for example, before introducing them into the market as new products. Another problem is that conditions in using counterfeit parts are difficult to recognize, making it difficult to perform maintenance. Besides, recycled replacement parts may be introduced into the market repeatedly even after they have worn out, because keeping track of the number of times recycled is impossible.

These problems are addressed in Japanese Laid-Open Patent Application No. 10-69139/1998 (Tokukaihei 10-69139; published on. Mar. 10, 1998). The patent application discloses a method whereby the copying machine operates normally if an ink bottle (replacement part) is genuine and stops operating normally or records the use conditions of the counterfeit in the memory if not. This is achieved by the original ink bottles being equipped with a data carrier composed of a nonvolatile memory to record data specified depending on the model of the copying machine and the control section being provided in the copying machine to determine if the data recorded in the data carrier has normal values.

Accordingly to the method, however, any ink bottle compatible with copying machines of a particular model has the same data; third parties can analyze the data stored in nonvolatile memory and the structure of the data carrier with relative ease to make imitations, and once they get the know-how, it is practically impossible to stop them from distributing unauthorized imitations in large quantities.

The manufacturer and distribution manager of ink bottles cannot know that the users of the copying machines have bought imitations before a service person visits the users to pick up ink bottles or the manufacturer is notified so by the users. The manufacturer or distribution manager may notice the circulation of imitations only after a time lag.

Japanese Laid-Open Patent Application No. 10-69139/1998 above further discloses a method to prevent third parties from collecting used ink bottles and other replacement parts only for the data carriers and attaching those data carriers to non-genuine parts for new use. This is achieved by destructing the data carriers when the replacement parts are detached from the machines to replace them. However, something must be done to avoid destruction of the data carrier when the replacement part is detached only for maintenance. Someone must therefore select destruction or non-destruction of the data carrier, depending on whether the replacement part is detached for maintenance or replacement. This is both bothersome to that person and may cause the person to make an error that leads to unintended destruction of the data carrier.

The foregoing methods are aimed at achieving a common goal of eradicating non-original parts, by notifying the user that a non-original part is installed in the image forming apparatus, disabling non-original parts, etc. However, none of them is capable of producing a satisfiable result in the attempt to squeeze non-original parts out of the market.

The eradication is difficult to achieve, because tinkering with the mechanism so that it can identify non-original parts and reject to operate normally with non-original parts is hardly enough to stop third parties from making non-original parts based on originals. Another factor is the price gap between original and non-original parts. The user would find it hard to refuse cheap prices of non-original parts and buy originals instead, as long as the image forming machine works with non-originals without serious, immediate consequences.

Wide distribution of non-original parts does not only eat into profits of the manufacturer and dealers of original parts. As mentioned earlier, the user of the image forming apparatus is also a victim: non-originals do not offer the same level of guarantee to their performance as original parts and could be a cause of trouble if they do not operate properly.

Imitations come in some forms. Some are disposable replacement parts and collected by third parties after they are discarded. These are refilled with new toner or another kind of recording material and reintroduced into the market, disguising as new products. Some are recycled without controlling quality, such as the number of times recycled.

SUMMARY OF THE INVENTION

The present invention, in order to solve the foregoing problems, has an object to provide a management method, system, etc. that enable easy management of circulation of genuine products, whereby it is checked that the degradables and consumables that were actually used by a service receiver are original degradables and consumables (original products) out of those delivered to the service receiver by a service provider, to prevent situations or inconveniences where the machine becomes inoperative because the user has run out of consumable products, and also to provide a management method, system, etc. whereby the service receiver is charged only for the degradables and consumables he/she actually used and curb unnecessary expenses without resorting to forecast or other unreliable methods.

The present invention has another object to provide degradables and consumables that have a proper price-to-performance balance as a result of charges that are varied according to how many times the product has been recycled.

In order to achieve the above object, the service management method of the present invention, executing a computer program on a computer, is characterized by including the steps of:

i) making an access (by an arithmetic processing section of the computer) to a management table for storing therein data specifying a product-in-circulation delivered to a service receiver and a current state of use of the product-in-circulation by the service receiver as recorded (in a memory section of the computer) when occasion demands, and reading out from the management table an amount of the product-in-circulation consumed by the service receiver, which can be considered as a purchase; and ii) calculating an account chargeable to the service receiver based on the amount of the product-in-circulation consumed read out in the step i) (by said arithmetic processing section).

Examples of products-in-circulation covered by the service include not only products-in-circulation used in machines that require use of products-in-circulation, but also recording paper and other office supplies, soap and other everyday commodities used at home, parts used in manufacture of products at factories, etc. The present invention is applicable to any such product that the service receiver would find it more convenient and would not have to waste purchased goods if the service receiver has the product delivered in advance and is later charged only for the amount (quantity, weight, volume, etc.) actually used.

According to this, the service receiver is not charged for those products-in-circulation delivered to, but not used yet by, the service receiver and is charged only for those products-in-circulation regarded as being purchased by the service receiver. The service receiver can thereby enjoy a reasonable service whereby he/she does not have to pay undesirable expenses. Meanwhile, the service provider can use the service to build a solid customer base and achieve stable sales of products-in-circulation.

Data is stored of the products-in-circulation delivered to the service receiver in the management table on the computer of the service provider when necessary; pirated products-in-circulation can be eradicated that are not covered by the service. The products-in-circulation used by the service receiver are directly supplied from the service provider and recorded in the service provider's own computer that does not record pirated products. Therefore, the service in accordance with the present invention is not applied to pirated products.

The service provider can manage the products-in-circulation used by more than one service receiver in a centralized manner by means of a management table. If the use of identical products-in-circulation by different service receivers is detected, the service provider can tell which one is an original product and which ones are not and eradicate pirated products by, for example, issuing a warning to a service receiver who is using products-in-circulation that are regarded as being pirated versions.

In this manner, the service provider can easily discover the use of identical products-in-circulation and identify service receivers who delivered the products-in-circulation in reference to the data of products-in-circulation registered by none other than the service provider to pinpoint service receiver who are using pirated products.

The foregoing service management method of the present invention may be arranged such that the management table also stores therein data indicative of remaining amount of the product-in-circulation delivered to the service receiver as recorded when occasion demands, and the amount of the product-in-circulation consumed is determined, based on an amount of the product-in-circulation delivered to the service receiver and the data indicative of remaining amount.

According to this, the service provider identifies the service receiver as well as the product-in-circulation supplied to the service receiver upon obtaining data on the remaining quantity of a product-in-circulation, to determine an account on the basis of the consumed amount of the product-in-circulation. For example, when the product-in-circulation is toner or ink, the service provider does not charge for the remaining toner or ink. The service provider can therefore determine a detailed scale of charges and provide an economical service to the service receiver.

If no one but the service provider registers data of products-in-circulation delivered in advance in the management table, pirated and other products that are not up to standards have no chance of being registered. The service receiver uses only those products-in-circulation that are guaranteed and authorized as being original by the service provider and can practice strict quality control.

The foregoing service management method of the present invention may be arranged such that the management table also stores therein recycle data or reuse data of the product-in-circulation delivered to the service receiver as recorded when occasion demands, and the account is adjusted based on the recycle data or the reuse data.

According to this, the charges the service receiver is expected to pay is determined taking into account recycle or reuse data of the product-in-circulation. Different scales of charges can be applied to products-in-circulation that has been recycled or reused and to those that has never been. For the former case, the scale of charges includes discounts determined according to how many times the product has been so far recycled or reused, for example.

The service provider can thereby provide a more reasonable service whereby the service receiver does not have to pay undesirable expenses. The service provider can use the service to build a solid customer base and achieve stable sales of products-in-circulation.

Further, the service provider takes the recycle or reuse data of the product-in-circulation into account to calculate an account. In other words, the chargeable account reflects degradation of the product because of recycling. Therefore, the service provider can introduce recycled and non-recycled products in the same market, while separately managing the respective distributions of the products of these two kinds.

The original product discrimination method, executing a computer program on a computer, is characterized by including the steps of:

i) detecting unique data specifying a replacement part installed in an apparatus via a network; and ii) determining if the replacement part installed in the apparatus is an original product registered in memory means which stores therein unique data on a registered original product by collating the unique data detected in the step i) with unique data read out from the memory means by making an access to the memory means.

According to the arrangement, unique data can be used to identify replacement parts. Further, the unique data registered in the memory means can be compared with the unique data detected of the replacement parts installed in the apparatus, so as to quickly determine whether the replacement parts are original products whose unique data is registered or non-original products whose unique data is not registered.

Further, the unique data of the replacement part is both registered and detected over a network; the service provider for replacement parts can control distribution of replacement parts in a centralized manner and readily know how non-original products are distributed. Measures can be quickly taken to eradicate non-original products from the market. This quick response restrains occurrence of non-original products as much as possible and spread of occurrence in smallest possible confines.

In the arrangement, the apparatus is no limited in any particular manner, as long as it has replacement parts installed in it and connects to a network for data exchange. When the apparatus is an image forming apparatus having a communication facility, the present invention is especially suitable to accurately determine whether replacement parts, such as cartridges (degradables) containing toner, ink, tape, or another kind of recording medium, are original and to control distribution of such degradables.

In the arrangement, to detect unique data via a network, an apparatus that can connect to the network needs be provided at both the service receiver and the service provider. The apparatus itself is however not limited in any particular manner as long as it has a communications function to exchange data via a network. The network is not limited in any particular manner either as long as it allows exchange of data. Examples include radio communications, the Internet, telephone lines, and cable television and other dedicated lines.

In order to achieve the above object, the management method of a replacement part composed of an expendable and a container for the expendable, is characterized by executing on a computer the steps of:

i) making an access to a management file which stores therein unique data to be applied to each container for its identification; and ii) reading out from the management file, a required number of pieces of unique data to be recorded on a container which is to be used by the customer in a place of delivery of the container.

In the arrangement, replacement parts are installed in an apparatus that exploits their functions for use and then removed from the apparatus for replacement when the container or its content that is to be consumed in the operation of the apparatus has degraded or been consumed. The management method of replacement parts in accordance with the present invention is applicable to customers to whom the containers constituting the replacement parts are delivered and who are consumers of the containers.

Here, the container is regarded as being consumed by the customer when the container is in such a condition that it cannot be returned free of charge. No particular limitation is imposed on procurement, that is, how and from whom the customer obtains the consumables.

According to the method, the management table stores a set of unique data for each container, and when the customer to whom the containers have been delivered begins using them, is read for those sets of unique data that are associated with the containers.

Therefore, the customer, for example, has containers with unique data delivered from the manager who is exercising the foregoing management method on replacement parts or has only containers delivered in advance and informs the manager of the number of containers to be used when the number is definite, so that the manager can issue a set of unique data for each container the customer intends to use. According to this, the customer can supply the replacement parts to the market with the containers provided with unique data and the consumable products contained in the containers in the customer's own manner.

As a result, the manager can see an overall picture of the distribution of the replacement parts on the basis of the unique data provided to the containers and discriminate between those replacement parts with unique data and those without. This means that it is guaranteed that at least the containers are original, i.e., makes it clear that the manager guarantees performance and quality of the containers provided with unique data.

Therefore, both conventional original replacement parts and quasi-original replacement parts are distributed in the market and create free competition, causing the prices of replacement parts to drop. The conventional original replacement parts are manufactured either by the manager or by third parties who have a contract with the manager to manufacture and control replacement parts, and their performance and quality are guaranteed also by either the manager or third parties. The quasi-original replacement parts are consumable products customized for a specific customer and contained in a container whose performance and quality is guaranteed.

If the customer is a manufacturer or a maker of the consumables, prices will likely be lowered compared to original products, while retaining the same levels of the performance and quality as original products, by containing the consumables manufactured by none other than the customer in containers. This is because the customer will be able to put resources only to the development of consumable products and develop new products that place special emphasis on reduced prices or increased performance.

General consumers in the market for replacement parts do not have to risk buying those replacement parts whose performance or quality is not guaranteed. This reduces chances for replacement part imitations or unauthorized copies that are not up to standards to be widely distributed in the market and helps to achieve ultimate eradication of them from the market. Manufacturers of the containers also benefit from increased demands for the containers and hence from increased profits.

No particular limitations are imposed on where the management file is stored. The management file may be stored in built-in or external memory of a computer executing a service management method, an original product discrimination method, and a replacement parts management method in accordance with the present invention or in memory controlled by another computer, workstation, etc. connected via communications means.

In order to achieve the above object, the management method of a replacement part composed of an expendable and a container for the expendable, is characterized by including the steps of:

i) recording unique data for identifying each container on a container, the unique data being obtained from a container manager who manages a distribution of the container; and ii) packaging the expendable in the container having formed thereon unique data.

According to this, replacement parts such that consumable products are contained in containers whose unique data is formed and whose performance and quality is guaranteed by the manager of the container can be manufactured and supplied to the market; these replacement parts can be clearly discriminated from imitations without unique data and, as mentioned earlier, help increase circulation of original or quasi-original replacement parts whose performance and quality are guaranteed.

General consumers therefore find it less necessary to risk buying those replacement parts whose performance and quality are not guaranteed when buying replacement parts in the market. This reduces chances for replacement part imitations or unauthorized copies that are not up to standards to be widely distributed in the market and helps to achieve ultimate eradication of them from the market. Manufacturers of the containers also benefit from increased demands for the containers and hence from increased profits.

The manager of the containers may be a manufacturer of the container, a manufacturer who manufactures both consumable products and containers to assemble replacement parts, or a container or replacement part distribution manager assigned by the manufacturer.

Somebody but the manufacturer of the container would experience technical and financial difficulties in analyzing and guaranteeing the quality of the container and also have trouble in terms of time and cost in designing and manufacturing a container used in lieu of an original container. For these reasons, problems occurred where the container is used repeatedly by replacing the consumable product alone, without guaranteeing the quality of the container, and the assembled replacement parts are introduced and sold in the market, disguising as new products.

To address these problems, by, for example, outsourcing the guaranteeing of the quality of containers to a container manufacturer, the consumable product manufacturers can concentrate their resources only on the development of consumable products, develop new consumable products that place special emphasis on reduced prices or increased performance, and contribute to the eradication of imitations and development of industries.

In order to achieve the above object, the service management device of the present invention is characterized by including:

a first memory section for registering data on a product-in-circulation to be delivered to a service receiver;

an input section for inputting a current status of use of the product-in-circulation; and an arithmetic processing section for calculating an account based on an amount of the product-in-circulation consumed out of an amount of the product-in-circulation delivered.

According to this, the arithmetic processing section can calculate the amount (quantity, weight, volume, etc.) actually consumed by acquiring the amount delivered from the data of products-in-circulation registered in the first memory section and the amount used from the data of current status entered through the input section and subtracting the amount used from the amounts delivered. Therefore, a new service can be controlled in a centralized manner whereby the service receiver is not charged for those products-in-circulation that have been delivered in advance and are yet to be used, but only for those products-in-circulation the service receiver has actually used.

If the data of products-in-circulation is paired with the data of service receivers in registration, the service management device can identify the service receiver who is using the products-in-circulation even during the use of the products-in-circulation when the service receiver transmits only the data of the products-in-circulation to the service management device. Compared to the receiving of the data of service receivers and the unique data of products-in-circulation upon the user of products-in-circulation, the amount of data to be received is reduced, and the load of input and arithmetic processing can be relieved.

The foregoing service management device may be arranged such that the current status of use is determined based on data indicative of remaining amount of the product-in-circulation delivered to the service receiver; and the arithmetic processing section calculates the amount of the product-in-circulation consumed, based on the data indicative of remaining amount.

According to this, the arithmetic processing section can be arranged so as to acquire the amount delivered from the data of products-in-circulation registered in the first memory section and calculate an account for the initial amount less the remaining amount on the basis of the data of remaining amount of the product-in-circulation obtained from the data collection section. Therefore, when, for example, the cartridge still contains unused toner, the service receiver is not charged for the amount of the remaining toner and enjoys economical benefits from the service provided.

The data collection section may collect the data by which the service receiver can be identified, upon the authentication in establishing a connection with the service receiver to collect data on remaining amounts. Alternatively, the service provider manually specifies the service receiver upon the arithmetic processing section calculating charges, and the data collection section accesses the specified service receiver to collect the data on remaining amounts. This is applicable to other claims too.

The foregoing service management device may be arranged such that the first memory section also stores therein recycle data or reuse data of the product-in-circulation delivered to the service receiver; and the arithmetic processing section adjusts the account based on the recycle data or the reuse data.

According to this, the charges are calculated with adjustments based on the recycle or reuse data of the products-in-circulation. By taking into account the degradation in performance of parts caused by recycling, the service provider can charge the service receiver reasonably and introduce recycled products and non-recycled products into the same market.

In order to achieve the above object, the original product management device of the present invention is characterized by including:

a memory section for registering therein unique data specifying a replacement part in circulation;

a communications section for obtaining unique data on the replacement part; and an arithmetic processing section which compares unique data on the replacement part obtained via the communications section with unique data on the replacement part stored in the memory section, and determines the replacement part whose unique data is obtained via the communications section to be an original product registered in the memory section if the obtained unique data is identical with the unique data registered in the memory section.

According to this, the unique data of replacement parts is registered in the memory section; the arithmetic processing section can determine, by comparing the unique data obtained via the communications section with the unique data registered in the memory section, that the replacement parts without registered unique data are not original. Since the unique data is thus registered in the memory section and also obtained via the communications section, it becomes extremely easy to control the distribution of replacement parts in a centralized manner.

The arithmetic processing section can readily detect the distribution of non-original products; the service provider can quickly take measures to eradicate the non-original products. This quick response restrains occurrence of non-original products as much as possible and spread of occurrence in smallest possible confines.

As detailed so far, if the unique data of replacement parts is registered and attention is paid to data security, the service provider can discourage third parties from manufacturing or marketing unauthorized copies and determines products' originality by an easy method of comparing the unique data of replacement parts obtained from the user with the registered data after selling them.

In order to achieve the above object, an original product countermeasure device of the present invention is characterized by including:

a read-out section for reading out unique data specifying a replacement part in circulation recorded in the replacement part;

a transmitter/receiver section for transmitting and receiving data with an original product management device which determines if the replacement part is a registered original product; and a controller section which transmits via the transmitter/receiver section, the unique data read out by the read-out section to the original product management device and controls an operation using the replacement part in such a manner that upon receiving a result of determination from the original product management device that the replacement part is an original product, the operation using the replacement part is permitted, while upon receiving a result of determination from the original product management device that the replacement part is an imitative product, the operation using the replacement part is prohibited.

According to the arrangement, the unique data of a replacement part is read out by the read-out section and transmitted to the original product management device via the transmitter/receiver section. The original product management device determines whether the replacement part whose unique data was read out by the original product countermeasure device is original and transmits the result to the original product countermeasure device.

Subsequently, the controller section allows actions for using the replacement part when receiving a result that the original product management device has decided that the replacement part is original and disallows any actions for using the replacement part when receiving a result that the original product management device has decided that the replacement part is not original.

As a result, without conventional labor and cost to design such a data carrier that go out of order to disallow further use if it is detached from the replacement part, the original product countermeasure device in accordance with the present invention positively ensures that non-original products are eradicated.

In order to achieve the above object, the management device of the present invention, for a replacement part composed of an expendable and a container for the expendable, is characterized by including:

used number receiving means for receiving a number of used containers from a customer of a place of delivery of the container, and unique data issue means for issuing required number of pieces of unique data to be applied to each container for its identification according to the number of used containers received by the used number receiving means.

According to the arrangement, the unique data issue means issues the same number of sets of unique data as the number of containers used received from the customer by the used number receiving means.

Accordingly, each container is assigned its one and only unique data. No limitations are imposed on how the container may bear its unique data. The unique data may be borne in/on a recording medium that is secured, attached, or packed together with the container. No limitations are either imposed on who will physically provide the unique data to the container: for example, the container manufacturer, the distribution manager of containers, intermediate manufactures who are supplied with the containers and fill them with a consumable product to fabricate replacement parts, etc. may be responsible for securing, attaching, or otherwise physically providing the unique data to the containers.

As mentioned earlier, this increases the distribution of replacement parts whose performance and quality are guaranteed. General consumers in the market for replacement parts do not have to risk buying those replacement parts whose performance or quality is not guaranteed. This reduces chances for replacement part imitations or unauthorized copies that are not up to standards to be widely distributed in the market and helps to achieve ultimate eradication of them from the market. Manufacturers of the containers also benefit from increased demands for the containers and hence from increased profits.

The used number receiving means only needs to have a function to feed the number of used containers and associated data to the unique data issue means. Examples include a keyboard, a touch panel, and other input means that work in tandem with a computer; and communications means for receiving the number of used containers from the customer's computer through communication.

The foregoing management device for a replacement part may be arranged so as to further include:

management file access means for making an access to a management file for storing therein the unique data to read out, from the management file, the same number of sets of unique data that can be newly assigned to containers as the number of containers used; and notifying means for notifying of the read-out unique data the customer from which the number of containers used have been received.

According to this, the customer can provide unique data to the containers, saving a workload off the management device on the manager's side in providing and unique data to the containers and managing the unique data provision job.

In order to achieve the above object, the service management network system of the present invention is characterized by including:

(a) a first group composed of an apparatus detachably provided with a product-in-circulation having its unique data to be consumed or used up, the apparatus including:

a read-out section for detecting unique data from the product-in-circulation, a transmitter section for transmitting data read by the read-out section to an exterior via a network, and a controller section for controlling the read-out section and the transmitter section; and (b) a second group composed of a service management device which includes:

a communications section for communicating with the first group, a memory section for registering therein the data on the product-in-circulation delivered to the first group, and an arithmetic processing section for calculating an account based on an amount of the product-in-circulation consumed out of an amount of the product-in-circulation delivered by checking a current status of use of the product-in-circulation.

According to this, the foregoing service management method can be realized using IT technologies including network systems and IC chips.

The data including the unique data detected by the read-out section from the product-in-circulation installed in the apparatus is transmitted from the transmitter section to the communications section of service management device. According to this, the arithmetic processing section can check the current status of the product-in-circulation on the basis of the incoming unique data and calculate an account the first group is expected to pay on the basis of the amount (quantity, weight, volume, etc.) actually used. Therefore, the second group can translate the first group replacing an old product with a spare product-in-circulation as being indicative of purchase.

Supposing that a pirated product is being used, since the apparatus reads out the unique data of the product-in-circulation formed on/in the product-in-circulation to externally transmit the unique data via a network, the service management device can check to see whether the product-in-circulation in use is an authorized product-in-circulation or a pirated version by comparing the incoming unique data with the data of the product-in-circulation registered in the memory section. The check can eradicate products-in-circulation without unique data.

For example, if the same set of unique data is detected from different service receivers, the service management device can recognize that the products-in-circulation except one of them are pirated versions. Typically, the product-in-circulation detected later is likely to be a pirated version (i.e., a product bearing "copied" unique data of an original product) and is therefore removed.

The service management device may be provided separately with an input section through which the current status of the product-in-circulation can be entered to allow manual input of the current status of the product-in-circulation when necessary.

The foregoing service management network system of the present invention may be further arranged such that:

the apparatus further includes a remaining amount detecting section for measuring a remaining amount of the product-in-circulation, and the arithmetic processing section calculates an account based on a remaining amount of the product-in-circulation obtained via the communications section.

The foregoing service management network system of the present invention may be further arranged such that:

the memory section further stores therein recycle data or reuse data of the product-in-circulation delivered to the service receiver as recorded when occasion demands, and the arithmetic processing section adjusts the account based on the recycle data or the reuse data.

According to this, charges are adjusted on the basis of the recycle data and/or reuse data, which compensates for relatively poor performance and reputation of the recycled or reused product over the normal new product. Making the data accessible to service receivers ensures that the service receivers can enjoy highly transparent sales activities and services.

Since the data of products-in-circulation is monitored via a network, the service provider can predict possible problems that may occur with recycled products: for example, recycled products have a shorter lifetime than non-recycled products. Therefore, the service provider can take measures before those problems actually occur. Further, the use of a network enables real time operations.

In order to achieve the above object, the original product management network system of the present invention is characterized by including the above original product management device and the original product countermeasure device which are connected via a network.

According to this, an original product management system that positively ensures that the use of non-original products are eradicated can be built over a network.

In order to achieve the above object, the management network system for a replacement part of the present invention, is characterized by including (a) a management device of a replacement part which includes the used number receiving means and unique data issue means, and (b) a management device of an replacement part which includes issue request data preparation means, and unique data processing means.

According to this, data is exchanged via a network between the manager of the unique data and the person who forms the unique data on/in the container; A distribution system for replacement parts can be established which eradicates the aforementioned imitations and makes contributions to the development of industries.

In order to achieve the above object, the product-in-circulation of the present invention is characterized in that it is for use in one of the foregoing service management methods.

The products-in-circulation are managed by one of the service management methods in accordance with the present invention. This is beneficial to the service, provider in that the service provider can exactly know current status, and so is to the service receiver in that the service receiver is charged only for what he/she used and does not have to shoulder unnecessary expenses for spare products.

In order to achieve the above object, the replacement parts of the present invention is characterized in that it is for use in one of original product discrimination methods in accordance with the present invention.

By applying either one of the original product discrimination methods to the replacement parts, the service provider can supply such replacement parts that can be readily determined as being original or not, that are difficult for third parties to forge, and that readily enables imitations to be stopped from widely distributed.

In order to achieve the above object, the computer program product of the present invention characterized by storing a computer-readable program for executing the service management method, the original product discrimination method or the management method of the replacement part.

According to this, a general-purpose computer, when having loaded the program recorded in the program product, can function as a service management device, an original product management device, or a management device for replacement parts in accordance with the present invention and can provide the customer with a service management method, an original product discrimination method, or a management method for replacement parts in accordance with the present invention.

The present invention will become more fully understood from the detailed description given hereinbelow and the accompanying drawings which are given by way of illustration only, are not in any way intended to limit the scope of the claims of the present invention.

BRIEF DESCRIPTION OF THE DRAWINGS

FIGS. 7(a)-7(f) are drawings showing timing charts for machine operation.

FIGS. 8(a) and 8(b) are drawings showing, as an example, a contract signer table appearing in a data manager window.

FIGS. 9(a) and 9(b) are drawings showing, as an example, a management table (by default) appearing in a data manager window.

FIGS. 10(a) and 10(b) are drawings showing, as an example, a management table (upon advance registration) appearing in a data manager window.

FIGS. 11(a) and 11(b) are drawings showing, as an example, a management table (during use of a product-in-circulation) appearing in a data manager window.

FIGS. 12 (a) and 12(b) are drawings showing, as an example, a management table (upon delivery of a product-in-circulation) appearing in a data manager window.

FIG. 13 is a drawing showing a charging method.

FIGS. 16(a)-16(e) are drawings showing an advance request method for product-in-circulation.

FIG. 26 is a drawing showing, as an example, a management table (by default) appearing in a data manager window according to the service management network system of FIG. 15.

FIG. 27 is a drawing showing, as an example, a management table (upon advance registration) appearing in a data manager window according to the service management network system of FIG. 15.

FIG. 28 is a drawing showing, as an example, a management table (during use of a product-in-circulation) appearing in a data manager window according to the service management network system of FIG. 15.

FIG. 29 is a drawing showing, as an example, a management table (upon delivery of a product-in-circulation) appearing in a data manager window according to the service management network system of FIG. 15.

FIG. 30 is a drawing showing combining a terminal station management table with a customer table on the basis of contract signer's IDs according to the service management network system of FIG. 15.

FIG. 31 is a drawing illustrating a charging method according to the service management network system of FIG. 15.

FIG. 32 is an explanatory drawing showing, as an example, a data table for product-in-circulation, which relates unique data of product-in-circulation to contract signer's IDs.

FIGS. 37(a) and 37(b) are drawings showing, as an example, a management table (by default) appearing in a data manager window.

FIGS. 38(a) and 38(b) are drawings showing, as an example, a management table (upon advance registration) appearing in a data manager window.

FIGS. 39(a) and 38(b) are drawings showing, as an example, a management table (upon starting to use a product-in-circulation) appearing in a data manager window.

FIGS. 40(a) and 40(b) are drawings showing, as an example, a management table (during use of a product-in-circulation) appearing in a data manager window.

FIGS. 41(a) and 41(b) are drawings showing, as an example, a management table (immediately before replacement of a product-in-circulation) appearing in a data manager window.

FIGS. 42(a) and 42(b) are drawings showing, as an example, a management table (upon replacement of a product-in-circulation) appearing in a data manager window.

FIGS. 43(a) and 43(b) are drawings showing, as an example, a management table (upon delivery of a product-in-circulation) appearing in a data manager window.

FIG. 44 is a drawing illustrating a charging method.

FIGS. 45(a) and 45(b) are drawings showing, as another example, a management table (by default) appearing in a data manager window.

FIGS. 46(a) and 46(b) are drawings showing, as another example, a management table (upon advance registration) appearing in a data manager window.

FIGS. 47(a) and 47(b) are drawings showing, as another example, a management table (during use of a product-in-circulation) appearing in a data manager window.

FIGS. 48(a) and 48(b) are drawings showing, as another example, a management table (upon replacement of a product-in-circulation) appearing in a data manager window.

FIGS. 49(a) and 49(b) are drawings showing, as another example, a management table (upon delivery of a product-in-circulation) appearing in a data manager window.

FIG. 50 is a drawing illustrating another charging method.

FIG. 58 is a drawing showing, as a further example, a management table (by default) appearing in a data manager window.

FIG. 59 is a drawing showing, as a further example, a management table (upon advance registration) appearing in a data manager window.

FIG. 60 is a drawing showing, as a further example, a management table (during use of a product-in-circulation) appearing in a data manager window.

FIG. 61 is a drawing showing, as a further example, a management table (before delivery of toner) appearing in a data manager window.

FIG. 62 is a drawing showing, as a further example, a management table (after delivery of toner) appearing in a data manager window.

FIG. 63 is a drawing illustrating another charging method.

FIGS. 64(a) and 64(b) are drawings showing, as another example, a management table (by default) appearing in a data manager window.

FIGS. 65(a) and 65(b) are drawings showing, as another example, a management table (upon advance registration) appearing in a data manager window.

FIGS. 66(a) and 66(b) are drawings showing, as another example, a management table (during use of a product-in-circulation) appearing in a data manager window.

FIGS. 67(a) and 67(b) are drawings showing, as another example, a management table (upon replacement of a product-in-circulation) appearing in a data manager window.

FIGS. 68(a) and 68(b) are drawings showing, as another example, a management table (upon delivery of a product-in-circulation) appearing in a data manager window.

FIG. 69 is a drawing illustrating yet another charging method.

FIGS. 70(a) and 70(b) are drawings showing, as an example, a management table with remaining quantities data recording cells (by default) appearing in a data manager window.

FIGS. 71(a) and 71(b) are drawings showing, as an example, a management table with remaining quantities data recording cells (upon advance registration) appearing in a data manager window.

FIGS. 72(a) and 72(b) are drawings showing, as an example, a management table with remaining quantities data recording cells (upon starting to use a product-in-circulation) appearing in a data manager window.

FIGS. 73(a) and 73(b) are drawings showing, as an example, a management table with remaining quantities data recording cells (during use of a product-in-circulation) appearing in a data manager window.

FIGS. 74(a) and 74(b) are drawings showing, as an example, a management table with remaining quantities data recording cells (immediately before replacement of a product-in-circulation) appearing in a data manager window.

FIGS. 75(a) and 75(b) are drawings showing, as an example, a management table with remaining quantities data recording cells (upon replacement of a product-in-circulation) appearing in a data manager window.

FIGS. 76(a) and 76(b) are drawings showing, as an example, a management table with remaining quantities data recording cells (upon delivery of a product-in-circulation) appearing in a data manager window.

FIG. 77 is a drawing illustrating a further charging method.

FIG. 79 is a drawing illustrating still another charging method.

FIGS. 82(a) and 82(b) are drawings showing, as an example, a replacement part ID number list maintained by a terminal station.

FIGS. 86(a) and 86(b) are drawings showing, as another example, a replacement part ID number list maintained by the terminal station.

FIGS. 87(a) and 87(b) are drawings showing, as a further example, a replacement part ID number list maintained by the terminal station.

FIGS. 93(a)-93(c) are explanatory drawings showing, as an example, an ID number issue managing list maintained by a service provider.

FIG. 94 is an explanatory drawing showing, as an example, an ID number allocating manager list maintained by a contract signer.

FIGS. 95(a) and 95(b) are explanatory drawings showing, as an example, a contract signer table maintained by a service provider.

FIG. 96 is an explanatory drawing showing, as an example, a contract signer management table made for individual contract signers.

FIG. 97 is an explanatory drawing showing, as an example, a charging list.

FIGS. 98(a) and 98(b) are explanatory drawings showing, as an example, a user table maintained by a service provider.

DESCRIPTION OF THE EMBODIMENTS

Embodiment 1

(Network and Machine Configuration)

Figure 3:
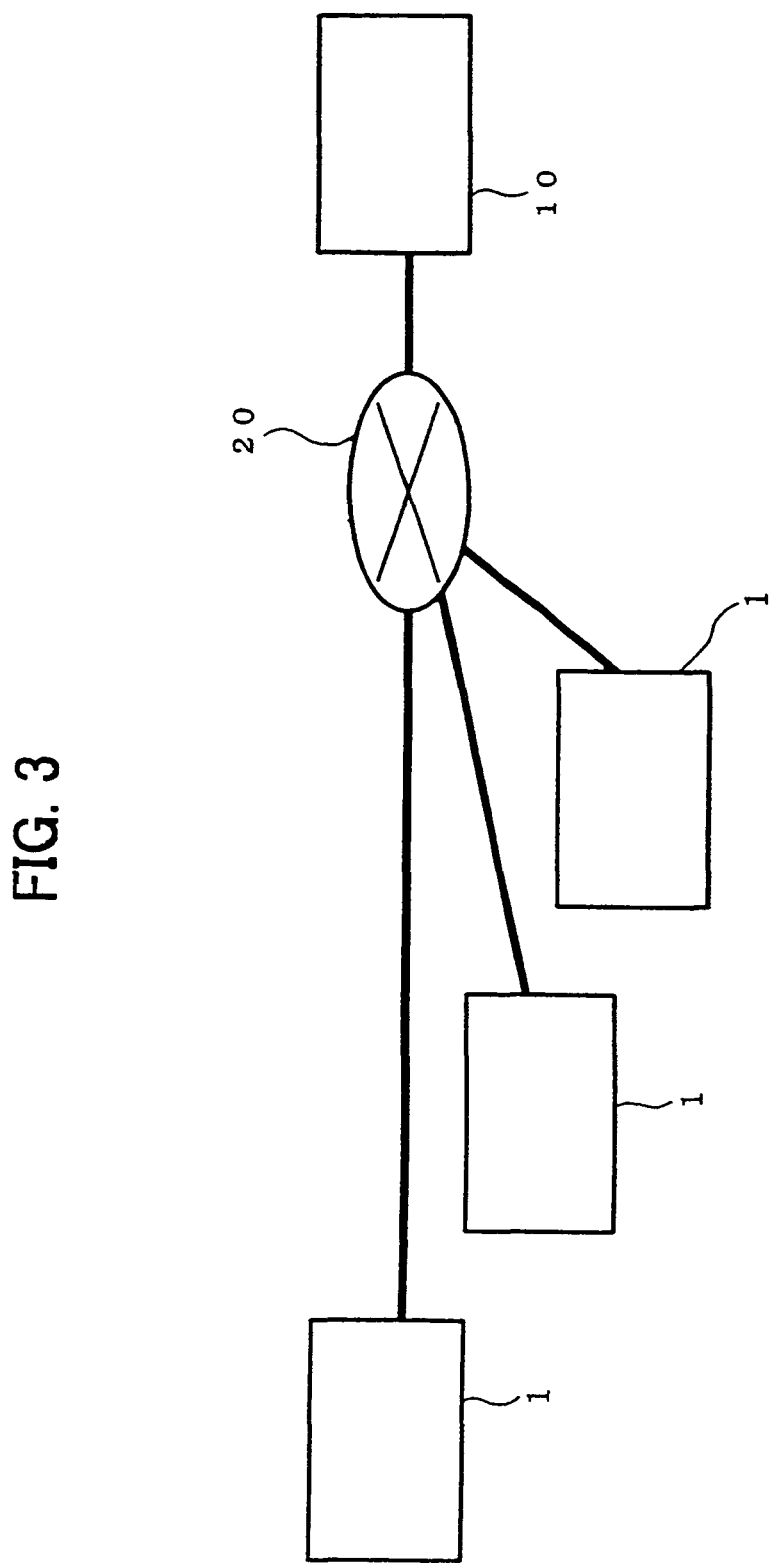
FIG. 3 is an explanatory drawing showing connection of a service management network system in accordance with the present invention.

FIG. 3 shows a typical network configuration of a service provider 10 and contract signers 1.

The service provider 10 provides service related to toner cartridges 60 and other products-in-circulation 6 to the contract signers (service receivers) 1. The product-in-circulation 6 will be detailed later.

In case of the service provider 10 being, for example, a leasing company, the service may be to sign a leasing contract of image forming apparatus main parts.

A network 20 is, for example, a telephone line network or may be a similar public network. The following will describe the relationship of the service provider 10 and a specified contract signer 1.

The service provider 10 supplies, as well as an image forming apparatus 2, toner cartridges 60 and other products-in-circulation 6 that are suitably used with the image forming apparatus 2. Generally, different models, even if they are all image forming apparatuses manufactured by the same manufacturer, should be used with different product-in-circulation; the model number, code number, etc. of the supplied product-in-circulation are determined or checked on the basis of data on the image forming apparatus main body.

Under these circumstances, the product-in-circulation 6 may be supplied in any, unlimited quantity. They may be supplied so that the contract signer 1 can keep a stock of one or more pieces of each product, except for those to be immediately used in the device main body.

Figure 1:
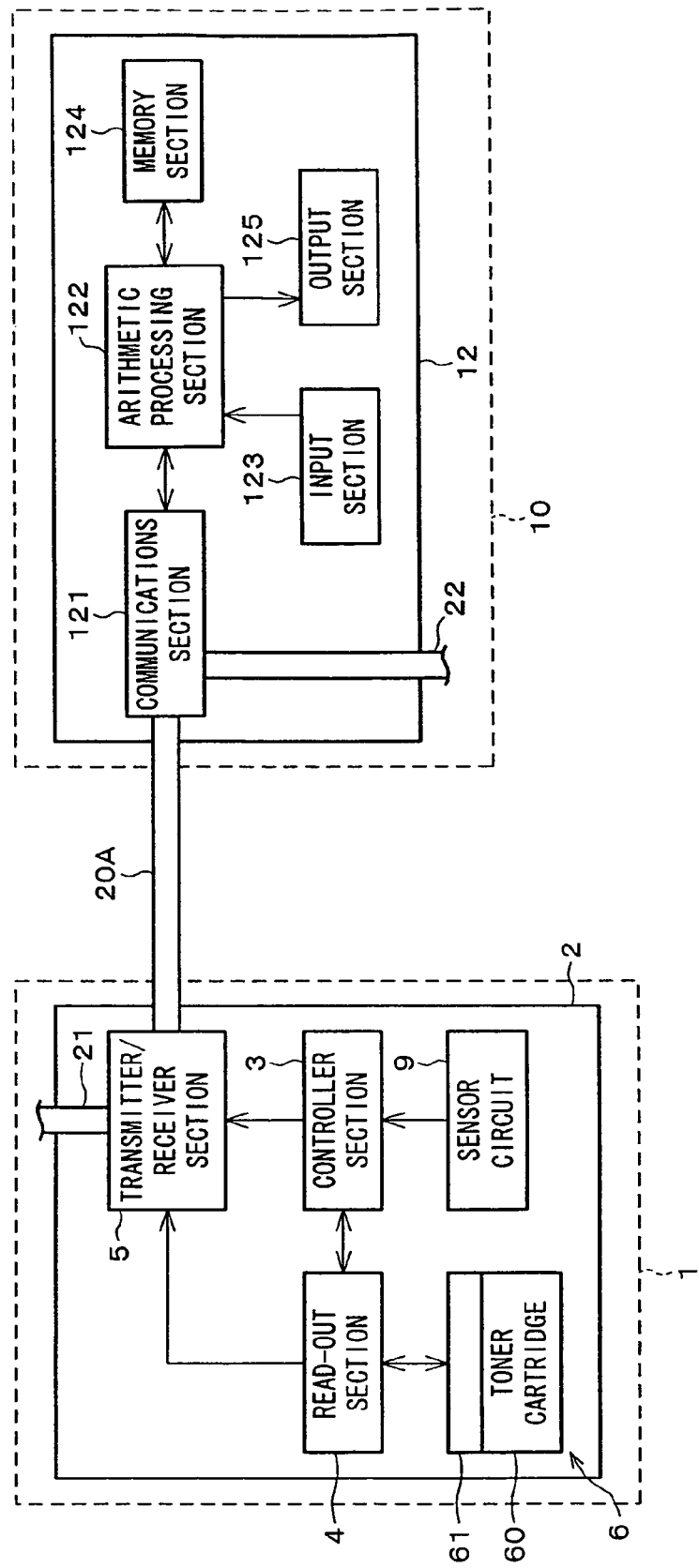
FIG. 1 is a schematic view showing a service management network system in accordance with the present invention.

The image forming apparatus 2 of the contract signer 1 is connected to a terminal station (service management device) 12 of the service provider 10 through telephone lines 20A, etc. as shown in FIG. 1, forming a part of the network 20.

Now moving to a description of the configuration of the image forming apparatus 2 of the contract signer 1, the image forming apparatus 2 includes image forming means (not shown); a toner cartridge 60 as a degradable part; a read-out section 4 for reading data stored in or on the toner cartridge 60 (will be detailed later); a transmitter/receiver section 5 for externally transmitting the read-out data; and a controller section 3 for controlling the read-out section 4 and the transmitter/receiver section 5. The sensor circuit 9 is composed of a sensor and its related circuits to detect whether the toner cartridge 60 is installed in the image forming apparatus 2. The sensor circuit 9 is built in typical copying machines and printers, so it is assumed that the built-in sensor is available for use. If there is no sensor circuit 9 provided, replacement means is still available; therefore the sensor circuit 9 is not essential.

Figure 2:
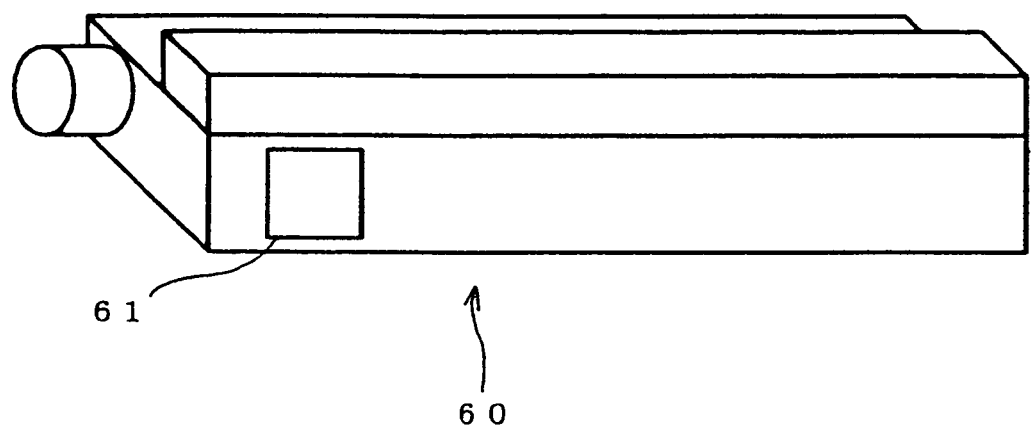
FIG. 2 is a schematic perspective view illustrating a configuration of a product-in-circulation in accordance with the present invention.

As described above, the toner cartridge 60 preferably records its own unique data either on or in it. For example, there is provided an IC chip (first data storage body) 61 as shown in FIG. 2 to store a product model number and an ID number in advance in internal EEPROM, ferroelectric memory, or other nonvolatile memory. Throughout the following description, it is assumed that the IC chip 61 stores an ID number, a part of which is a product model specific number. When the service provider 10 handles a single product model and does not need to distinguish between different product models, the product model number may be omitted. Alternatively, the unique data may be recorded in the form of a bar code or other simple method, because in the present invention, the ID number recorded in the IC chip 61 is not secret and does not need special protection.

Some products are conventionally marked using bar codes to distinguish between product-in-circulation for convenience in circulation and inventory management and other purposes. All the individual pieces of the same model share the same bar code to reduce labor and time in printing and management, etc. The bar code is therefore useless in distinguishing individual pieces unless they are of different models or products.

This makes a sharp contrast with the present invention. According to the present invention, different bar codes are given to different pieces of product-in-circulation 6 to distinguish between individual pieces. The present invention differs from the prior art in that individual pieces of product-in-circulation 6 are distinguishable according to the present invention, but not by the use of conventional bar codes.

According to the present invention, the IC chip 61 basically records nothing but a product model number and an ID number for that particular product, and does not have to be rewritten. The IC chip 61 therefore does not need to be large in memory capacity or versatile in function, permitting great simplification of both software and hardware, including memory controller.

A sensor may be provided, if necessary, to detect the quantity of remaining toner. By so doing, the quantity of the toner currently in use can be detected with improved precision.

The read-out section 4 varies depending on how data is recorded in the toner cartridge 60: if the data is recorded in the form of a bar code, the read-out section 4 is a bar code reader; if the data is recorded in an IC chip, the read-out section is electric or high frequency read-out means.

Figure 14:
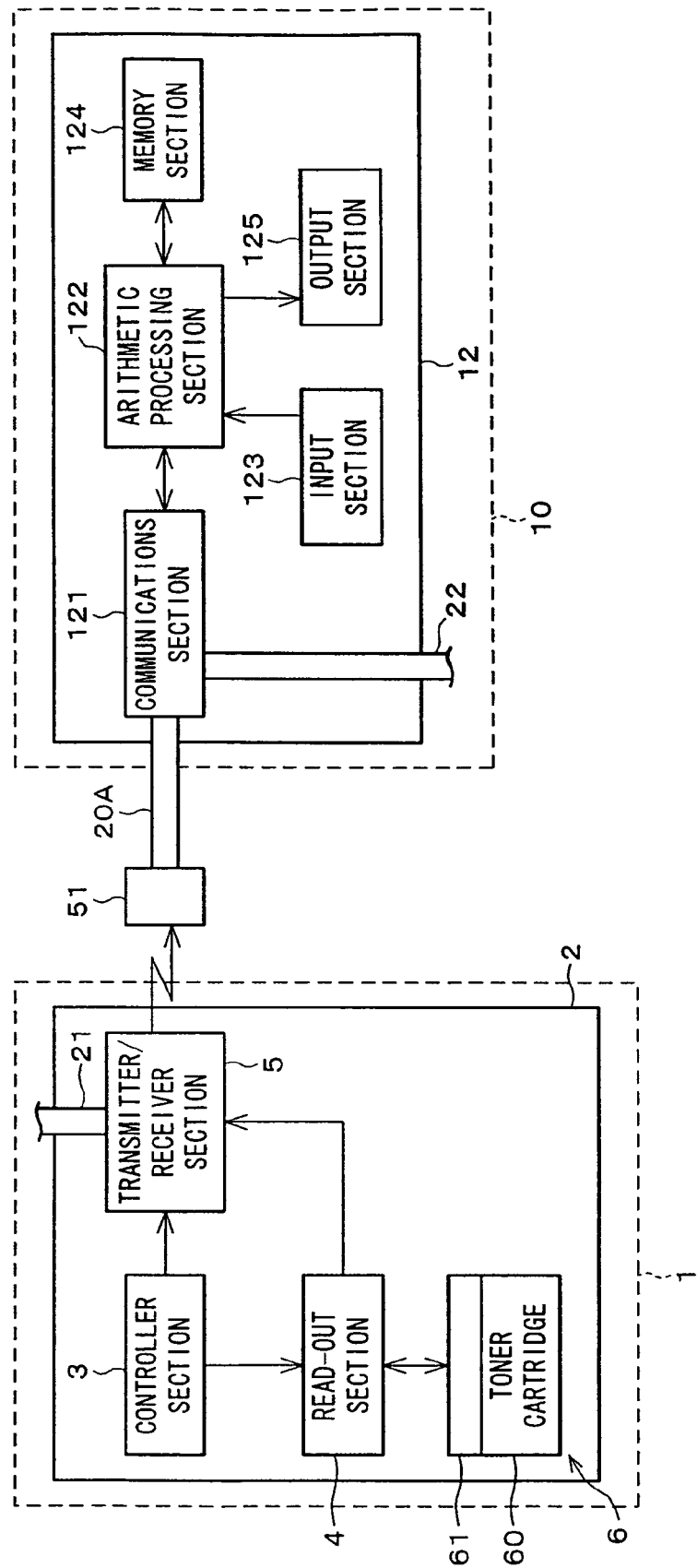
FIG. 14 is a schematic view showing another service management network system in accordance with the present invention.

The transmitter/receiver section 5 is a modem, for example, and is connected via telephone lines or a similar network like CATV. Data may be exchanged between the image forming apparatus 2 and the terminal station 12 only via physical lines or partly via radio transmission. An example is shown in FIG. 14, where the transmitter/receiver section 5 provided in, or connected to, the image forming apparatus 2 transmits data to a second transmitter/receiver section 51 of the contract signer 1 via radio transmission, and the second transmitter/receiver section 51 transmits data on to the network 20 (telephone lines 20A) via physical transmission lines. Alternatively, the transmitter/receiver section 5 may be capable of connecting to a local network 21. The second transmitter/receiver section 51 may of course be connected to the a communications section 121 of the terminal station 12 partly via radio transmission.

The sensor circuit 9 is composed of various sensors and peripheral circuits for processing signals from the sensors. The sensors include a door sensor and a cartridge sensor, and may be mechanical, optical, etc. The door sensor detects whether the door of the image forming apparatus 2 is open or closed. The cartridge sensor detects whether the toner cartridge 60 is installed in the image forming apparatus 2. The peripheral circuits include, among them, a filter circuit, a binarizer circuit, a voltage level adjusting circuit, and a waveform modifier circuit for modifying the waveforms of sensor outputs, so as to produce digital signals with 0 V to 5 V logical levels from sensor outputs.

The controller section 3 causes the read-out section 4 to access the IC chip 61 and read out toner cartridge data when, for example, the toner cartridge 60 is replaced. The controller section 3 further causes the transmitter/receiver section 5 to externally transmit the read-out data as required, after processing the data according to the way the data is transmitted. The controller section 3 monitors signals from various sensors to give predetermined commands according to the contents of the signals. When a CPU is used to control the entire image forming apparatus, the CPU may double as the controller section 3.

Now, the contents of the data recorded in the toner cartridge 60 is described. The IC chip 61 stores in advance, for example, 0011 0001 0010 1101 1010, a 20-digit binary number which carries data (ID number) unique to a toner cartridge 60. The number of digits may vary. The number is generated and managed by the service provider 10.

Next, the way the number represents data is described.

The first 4 digits represent the model of the toner cartridge 60. In this case, 16 models are distinguishable by the use of numbers 0000 through 1111. In the case of a color image forming machine using four toner cartridges 60, one for each of the four colors, Y (yellow), M (magenta), C (cyan), and Bk (black), the first two digits may represent color data. Table 1 gives such an example.

TABLE 1

|    | First Digit | Second Digit |
|----|-------------|--------------|
| Bk | 0           | 0            |
| Y  | 0           | 1            |
| M  | 1           | 0            |
| C  | 1           | 1            |

In this case, the remaining two digits can be used to distinguish between up to four models. An example is given in Table 2.

TABLE 2

| Product Name | Model Number | Third Digit | Fourth Digit |
|---|---|---|---|
| Toner Cartridge A (for AR-2000) | AR-2000TC | 0 | 0 |
| Toner Cartridge B (for AR-2001) | AR-2001TC | 0 | 1 |
| Toner Cartridge C (for AR-2010) | AR-2010TC | 1 | 0 |
| Toner Cartridge D (for AR-2200) | AR-2200TC | 1 | 1 |

Another example is given in Table 3, where two numbers represent toner cartridges A and B respectively, and the two others represent photosensitive cartridges C and D.

TABLE 3

| Product Name | Model Number | Third Digit | Fourth Digit |
|---|---|---|---|
| Toner Cartridge A (for AR-2000) | AR-2000TC | 0 | 0 |
| Toner Cartridge B (for AR-2001) | AR-2001TC | 0 | 1 |
| Photosensitive Cartridge C (for AR-2000) | AR-2000OPC | 1 | 0 |
| Photosensitive Cartridge D (for AR-2001) | AR-2001OPC | 1 | 1 |

These correspondence tables are prepared and stored in the terminal station 12 of the service provider 10 as product-in-circulation data tables as will be detailed later.

The remaining sixteen digits give, in the foregoing example, toner cartridges 60 of model 0011 their own, unique numbers (unique data). Each of such toner cartridges 60 is assigned its own, unique number selected from 65536 numbers from 0000 0000 0000 0000 through 1111 1111 1111 1111. This data is also added to the product-in-circulation data table stored in the terminal station 12 of the service provider 10. In the above description, the ID numbers were characterized as unique data that makes it possible to distinguish between individual toner cartridges 60; however, the model number and the ID number may collectively be treated as unique data.

FIG. 32 is an example of the product-in-circulation data table showing ID numbers allocated according to these rules. FIG. 32 shows a case where the unique data is related to contract signer's IDs. Each set of data (6-digit numbers in this case), if having entered in a "CONTRACT SIGNER'S ID" data cell, shows that the toner cartridge 60 has been supplied to that contract signer 1 identified by the contract signer's ID. The owner (contract signer 1) of the toner cartridge 60 bearing the unique data can be identified by searching the table using the unique data as the search key.

Now, the structure of the terminal station 12 (service management device) of the service provider 10 is described.

The terminal station 12 is a personal computer (PC), a work station (WS), or a similar machine, and includes a communications section 121, an arithmetic processing section 122, an input section 123, a memory section 124, and an output section 125.

The communications section 121 is responsible for establishing a connection to the network 20, and is a modem, for example, when the network 20 is telephone lines 20A. The communications section 121 may be capable of connecting to a local network 22.

The arithmetic processing section 122 executes operations on the data input via the communications section 121 or the input section 123, and is made of a CPU and memory. The memory is RAM or similar memory where results of operations are stored temporarily. If the operations are to be executed by software, a nonvolatile memory is provided to store a program to execute those operations. Alternatively, a memory section 124 (detailed later) may be provided to store a program that is read into RAM before it is executed.

The input section 123 is a keyboard, a mouse, a pointing device, an image scanner, a bar code scanner, or a similar device used to input data on contract signers 1, etc.

The memory section (first, second, and third memory sections, product-in-circulation data memory section, list memory section) 124 stores data input via the communications section 121 or the input section 123, as well as results of operations executed by the arithmetic processing section 122. The memory section 124 is a hard disk, an optical disk, or a similar device. The contents of the memory section 124 include product-in-circulation data tables like those shown in Tables 1-3, contract signer data tables (detailed later), service management tables (management tables recording updated data on the use of product-in-circulation) for contract signers, and application programs to execute the service management method in accordance with the present invention.

These tables can be associated with each other using a common key as the base key. For example, the product-in-circulation data table, the service management table, and the unique data-contract signer ID table can be associated with each other using unique data as the base key. The contract signer table, the service management table, and the unique data-contract signer ID table can be associated with each other using a contract signer ID as the base key. The memory section 124 is equivalent to a storage medium of the present invention.

The output section 125 is a CRT, a liquid crystal display, or a similar display device showing data on it. Alternatively, the output section 125 may be a printer or a similar device outputting data in the form of hard copies. Printers are dispensable these days when the use of paper is discouraged and electronic payment is readily available.

(Registration Process)

The following will describe the workings of the system.

The service provider 10 obtains data on a contract signer 1 as advance data. As shown in the contract signer table [1] of FIG. 8(a), the data is such that one can identify the contract signer 1: for example, a company name if the contract signer 1 is a company. The data should further include office names of a single company to distinguish between them if a separate contract is signed with each office.

Next, to process the contract signer data in the terminal station 12, the service provider 10 issues a contract signer ID to each contract signer 1. Each contract signer ID is a unique number given to a contract signer 1: for example, 000125.

Then, address data is obtained to delivery product-in-circulation 6 as serviced objects. So is payment method data to collect payments.

The foregoing data is stored in the memory section 124 in the terminal station 12 in the form of an electronic file. FIG. 8(a) shows an example where the file is displayed on the output section 125 of the terminal station 12.

Next, the service provider 10 dispatches a service person to the contract signer 1 to install and set up an image forming apparatus 2 and deliver the product-in-circulation 6. The image forming apparatus 2 is connected and set up so that it can communicate via the external network 20. A model number of the image forming apparatus 2 and an ID number which is unique to that particular image forming apparatus 2, as well as the issued contract signer ID and other data, may be transmitted when the image forming apparatus 2 is connected to the external network 20.

If the service provider 10 has to know nothing but the model of the image forming apparatus owned by the contract signer 1, all the data the service provider 10 needs is the model number, product model number, or other data with which the service provider 10 can identify the model. However, if the contract signer 1 has more than one image forming apparatus of the same model, and the service provider 10 needs data about each image forming apparatus, production number or other unique data with which the service provider 10 can identify each image forming apparatus is essential.

If the image forming apparatus 2 is a copying machine, it is equipped with numeric keys to enter, for example, the number of pages to be printed; this input means can be readily used to enter the ID number of the contract signer and/or the ID number of the image forming apparatus 2 to the image forming apparatus 2. If the contract signer ID number is stored in nonvolatile memory after it is entered for the first time, the contract signer 1 does not need to enter the data again when it must be transmitted to the service provider 10. If the image forming apparatus ID number is stored in nonvolatile memory on delivery, it does not thereafter need to be entered, and these series of operations are automatically completed by electronic means. The nonvolatile memory is built in as a part of the controller section 3.

Thus, the contract signer table [2] is filled in as shown in FIG. 8(b). The table shows, for example, that the two image forming apparatuses, an AR-2000 model and an AR-2001 model, owned by the contract signer identified by the ID number 000003 are serviced in accordance with the present invention.

The contract signer table [1] and the contract signer table [2] can be combined as common data to associate ID numbers (contract signer IDs). Hence, by referring to FIG. 8(a), one can tell that the contract signer identified by the ID number 000003 in FIG. 8(b) is "ABC Division, XYZ Co. Ltd."

By this step, the terminal station 12 can automatically detect the model(s) of the image forming apparatus(s) 2 owned by the contract signer 1 and collect data on the model(s) which is the serviced object.

When a performance-improved version of the toner cartridge 60 with a new model number is introduced into the market for use in the image forming apparatus 2, for example, the service provider 10 can provide the latest version of the toner cartridge 60 on the basis of the model data on the image forming apparatus 2. The ID number, which is unique to each piece of the product, is not essential; it is however included here. The ID number is useful for the service provider 10 to appropriately service its products, since the products can be possibly modified over an extended period of time albeit retaining the same old model numbers, and the modification may affect toner cartridges 60 and other products-in-circulation 6 in a way or the other. The ID number is also useful in providing additional services: for example, the service provider can inform the contract signers 1 of newly discovered defects of the image forming apparatus 2 based on the ID number before and after such a modification.

The terminal station 12 of the service provider 10 makes a service management file (the foregoing service management table) for each contract signer 1 and stores them in memory section 124. FIGS. 9(a) and 9(b) show an example of the file displayed on the output section 125 of the terminal station 12. In this example, cartridges in use are shown in the table of FIG. 9(a), and spare cartridges are shown in the table of FIG. 9(b). Alternatively, the table of cartridges in use can be omitted. As default, as shown in FIGS. 9(a) and 9(b), no data is given on the cartridges currently used in the image forming apparatus 2 of the contract signer 1 or the spare cartridges kept in stock by the contract signer 1.

The service provider 10 collects data on all the toner cartridges 60 that are to be delivered to the contract signer 1 and stores the data in the terminal station 12 of the service provider 10 immediately or later.

Figure 5:
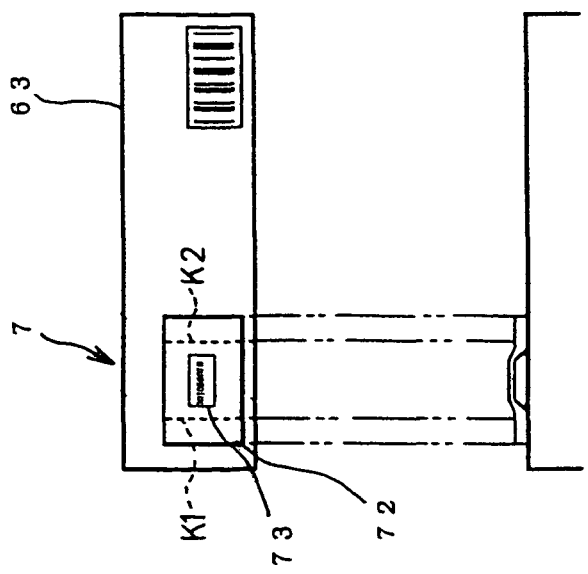
FIGS. 5(a)-5(c) are explanatory drawings illustrating a configuration of a product-in-circulation in accordance with the present invention.
Figure 5:
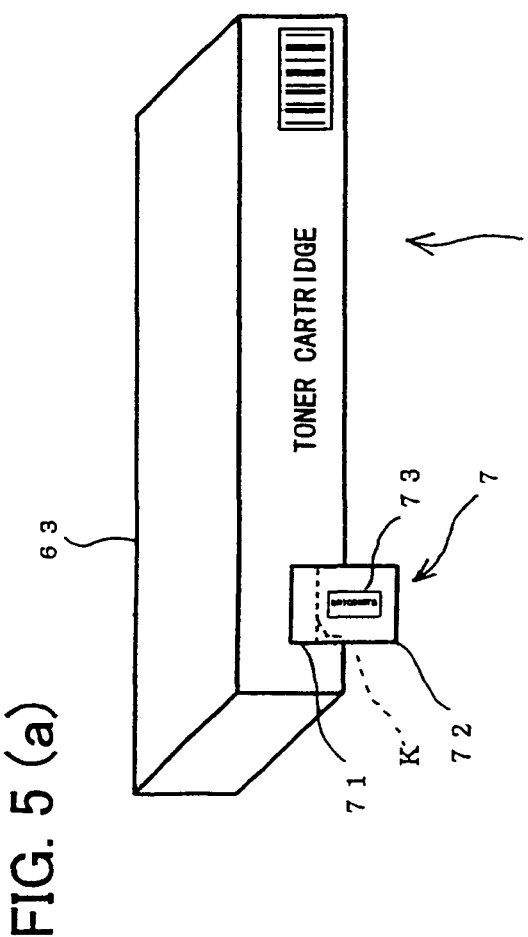
Figure 5:
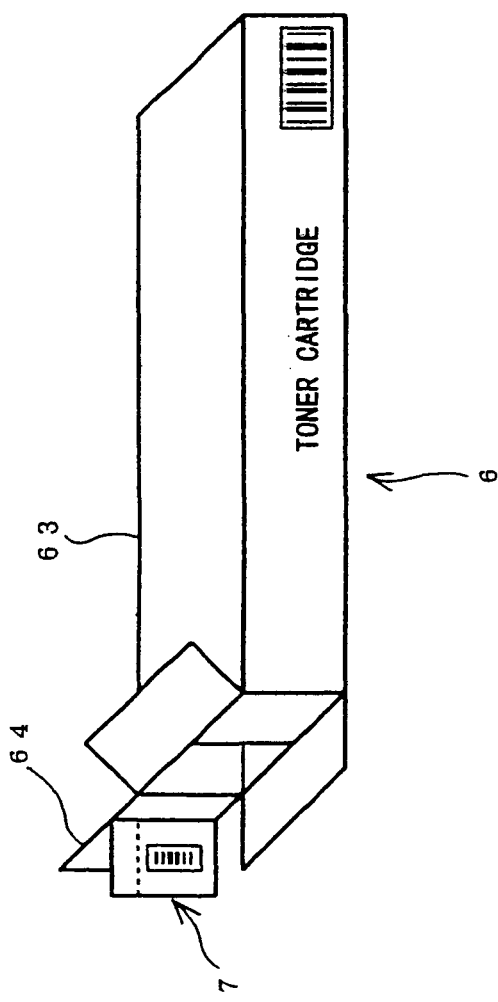

The data is collected by attaching a data storage body (second data storage body) 7 storing-data (unique data on the product-in-circulation) to distinguish each toner cartridge 60 from the others to packing material 63 of the product-in-circulation 6 as shown in FIGS. 5(a)-5(c) and reading the data in a data carrying section 73 of the data storage body 7 for the data by means of a scanner when the product-in-circulation is delivered to the contract signer 1. The contents of the data storage body 7 are identical to the contents stored in the IC chip 61 in the toner cartridge 60: for example, the ID number given to the toner cartridge 60. However, the data may be stored in different ways: it may stored in the form of a bar code that is readable by a bar code scanner. In the present invention, the ID number stored in the IC chip 61 as unique data on a product-in-circulation is not secret and does not need special protection; the ID number can be created easily without encryption, encoding, or other complex data processing.

By thus separately attaching a data storage body 7 whose contents (i.e., unique data of the product-in-circulation) are identical to those of the IC chip 61 to the packing material 63 of the product-in-circulation 6, upon delivery of the product-in-circulation 6, the service person can get data on the product-in-circulation 6 to be delivered from the data storage body 7 attached to the packing material 63 or the surface of the product-in-circulation 6. The service person does not have to open the packing material 63, etc. to take out the product-in-circulation 6 to get the unique data stored on the product-in-circulation 6, and therefore does not damage the commodity value of the product by opening the packing.

Having collected the data, the service person pulls off the data storage body 7 to confirm that the data has been read. By thus forming the data storage body 7 so that it can be detached from the product-in-circulation 6, one can tell based on the presence or absence of the data storage body 7 whether the product has been delivered or not. Since the data storage body 7 can be taken back, even if the scanner is out of order or other inconvenience occurs, the servicemen can still take it back to a service station where he/she can feed the data and complete advance registration.

In these cases, the data storage body 7 is attached so that it can be detached without opening the toner cartridge 60: as shown in FIG. 5(a), the data storage body 7 is secured partly at a part 71 to the outside of the packing material 63, a packaging material 62, or another protection member, using adhesive or staplers, so that the part 72 where the data is stored can be pulled off the part 71 along a tear-off line K.

The data storage body 7 is made of a film member, such as paper or resin, or a sheet member that is sufficiently thick and does not curl or cause other inconveniences. If the data storage body 7 is made of a hard sheet member, it is cut off along the line K. In view of durability and readability of data, hard resin is preferred.

FIG. 5(b) shows an alternative method to attach the data storage body 7, in which it is attached on its back, where no data is stored, to the packing material 63 of the product-in-circulation 6 using adhesive or other similar material, and the part 72 storing data 73 is torn off the attached part 71 along the tear-off lines K1 and K2.

A further alternative is shown in FIG. 5(c), in which the data storage body 7 is attached to the interior 64 of the lid of the protection member 63, but is assessable without damaging the product. By so doing, the data storage body 7 is not damaged during circulation and can therefore be made of paper or another fragile material.

In the description above, it was assumed that the product-in-circulation 6 was packed in packing material 63 during circulation; the data storage body 7 was therefore attached to the packing material 63. In practice, the packing material refers to the ultimate exterior of the product-in-circulation 6.

As detailed in the foregoing, the IC chip 61 and the data storage body 7 need to store the same data, but not necessarily in the same manner.

The data read out by the scanner is immediately transmitted to the terminal station 12 of the service provider 10 by communications means (not shown). Alternatively, the data read out by the scanner is stored on a floppy disk, memory stick, or a similar medium so that the medium can be taken back to the service station for later retrieval and input to the terminal station 12 of the service provider 10.

When the data read out by the scanner is transmitted immediately by communications means, the data is matched to the contract signer ID number before they are transmitted to the terminal station 12. By so doing, the terminal station 12 can associate the contract signer 1 with the data on the product-in-circulation 6 delivered to the contract signer 1.

Operations of the terminal station 12 are described now in more detail. The terminal station 12 identifies the contract signer 1 based on the incoming data from the communications section 121. This is achieved by the arithmetic processing section 122 identifying the contract signer ID contained in the incoming data. Next, the arithmetic processing section 122 recalls the service management tables related to the identified contract signer 1 (FIGS. 9(a) and (b)). The management table is made for each contract signer 1 as it becomes clear which models the contract signer 1 wants to be serviced, for example, when a contract is signed.

Then, the arithmetic processing section 122 retrieves the ID number of the toner cartridge 60 contained in the incoming data. The ID number goes in the "FULL DATA (FULL DIGITS)" cell in FIGS. 9(a) and 9(b). FIG. 10(b) shows the management table after the full incoming data is entered. Spare cartridges are numbered in the order of the incoming data; alternatively, they may be sorted by color. The full incoming data may be temporarily stored in a virtual memory region (or processing region) of the memory section 124 to sort cartridges by color by identifying the color data (the first two digits of the full data) contained in the full data, and automatically entered to the spare cartridge table as shown in FIG. 10(b). In such a situation, cartridges of the same color are sorted by the ID numbers, and their data is entered into the table in the ascending order of the ID numbers.

A further alternative is possible, where the data read out by the scanner is stored in combination with a contract signer ID number in a portable data terminal station or a similar device at the installation spot and then taken back to a service station of the service provider 10. The service person can transfer the data stored in the portable data terminal station to the terminal station 12 after establishing a physical line connection or radio communications between the terminal station 12 and the portable data terminal station.

A further alternative is possible, where the part 72 of the data storage body 7 is collected and taken back without using a scanner at the installation spot. The data is then input to the terminal station 12 by reading out the part 72 using a bar code scanner or another input section 123 connected to the terminal station 12 of the service provider 10 or by manual input through a keyboard or a similar input device. In this case, the unique data of the product-in-circulation 6 is again input in combination with the contract signer ID data. The earlier real-time method of electronic on-the-spot readout and transmission of data is more reliable in that it can eliminate a possibility of delivering goods that do not appear on the delivery slip by error, and in view of these advantages, is more preferred.

The unique data of the product-in-circulation 6 may be entered manually through a keyboard or a similar input device at the terminal station 12 of the service provider 10 in combination with the contract signer ID data before the product-in-circulation 6 is dispatched from the service provider 10 to the contract signer 1.

Hence, the terminal station 12 of the service provider 10 can store the number of the toner cartridges 60 that have been supplied to the contract signer 1, but are yet to be used, as well as their model numbers and ID numbers.

In the present embodiment, it is assumed that data is electronically read out and immediately transmitted on the spot.

The terminal station 12 of the service provider 10 updates the data based on incoming data. Specifically, FIG. 10(b) shows a case where black, yellow, magenta, and cyan toner cartridges 60 are supplied, two for each color, and twenty-digits, unique code data is entered for each cartridge. Date of delivery is additionally entered. In the table shown in the figure, the model data of the toner cartridges 60, etc. is not only represented in the form of code, but also accompanied by actual names, like "black toner" as an aid to the user. The arithmetic processing section 122 determines for each toner cartridge 60 whether or not the data on the toner cartridge 60 is entered into the spare cartridge table for the first time so far, and the table automatically shows "NEW (SPARE)" in all the cells under "CURRENT STATUS."

Consequently, the data on cartridges currently in use does not change at all right after delivery, and FIG. 10(a) is identical to FIG. 9(a).

The service person opens a necessary toner cartridge 60 that enables the image forming apparatus 2 to operate, and installs that toner cartridge 60 into the image forming apparatus 2. Having already been connected and properly set up for external communication, the image forming apparatus 2 transmits the data on the installed toner cartridge 60 to the terminal station 12 of the service provider 10. The data is transmitted together with the contract signer ID to enable the terminal station 12 to tell from which contract signer 1 the data is coming in.

Automated execution of the foregoing operations is now described. The image forming apparatus 2 is typically equipped with various sensors to detect opening of doors and installation of the toner cartridge 60, and the controller section 3 monitors these sensors. As installation of toner cartridge 60 is detected on the basis of signals from a toner cartridge sensor, the controller section 3 gives a command, causing the read-out section 4 to read out the data stored in the IC chip 61 of the toner cartridge 60. The controller section 3 then gives another command to the transmitter/receiver section S, causing the transmitter/receiver section 5 to the transmit data. This operation will be described in detail later.

FIG. 11(a) shows results of the arithmetic processing section 122 of the terminal station 12 of the service provider 10 having updated the data on cartridges currently used in the image forming apparatus 2 of the contract signer 1 on the basis of the incoming data from the communications section 121. FIG. 11(b) shows results of the arithmetic processing section 122 having updated data on some of the toner cartridges 60: they first appeared as spare cartridges in the column under "CURRENT STATUS," but the display is now updated from "NEW (SPARE)" to "IN USE" as a result of the foregoing operation.

The arithmetic processing section 122 checks the table of cartridges in use for the same unique data as that of the toner cartridge 60 contained in the data received by the communications section 121, to determine whether or not the toner cartridge 60 has been newly installed. Alternatively, the arithmetic processing section 122 checks the table of spare cartridges for the same unique data as that of the toner cartridge 60 contained in the data received by the communications section 121, to determine whether or not the toner cartridge 60 has been newly installed: if the same unique data is sorted in the table as "NEW (SPARE)" in the column under "CURRENT STATUS" and is also received by the communications section 121, the unique data is that of a newly installed toner cartridge 60.

This completes initial set-up and registration.

In the foregoing description, it was assumed that the model number, the unique ID number, and other data of the image forming apparatus 2 were automatically transmitted to the terminal station 12 of the service provider 10. An alternative configuration is possible where the service provider 10 executes registration through the input section 123 of the terminal station 12.

Figure 33:
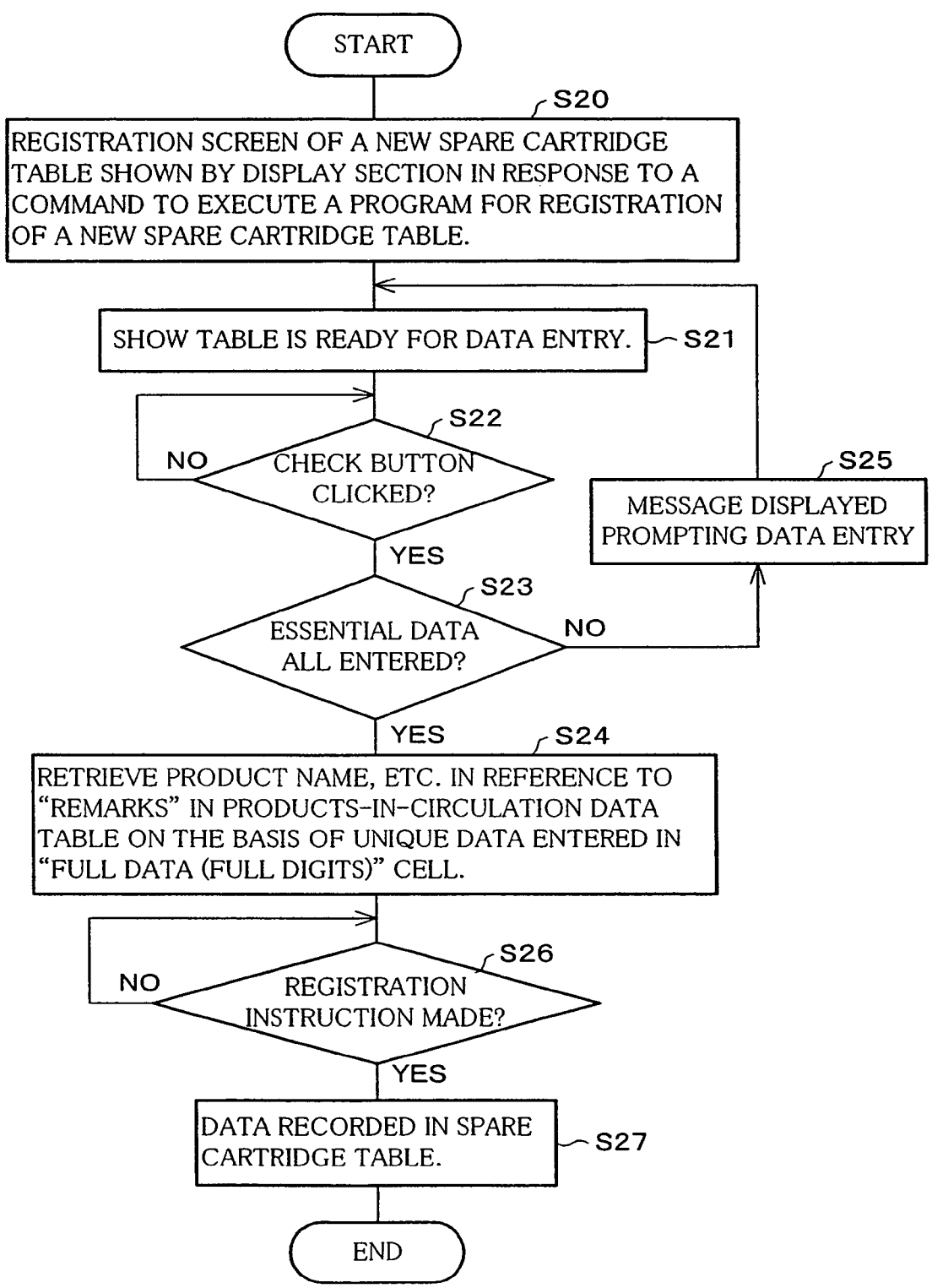
FIG. 33 is a flowchart showing a flow of control operations for an arithmetic processing section to handle a new registration to a spare cartridge table.

FIG. 33 is a flowchart showing control operation by the arithmetic processing section 122 when a new spare cartridge table is manually registered. The following will describe the control operations of the arithmetic processing section 122 in reference to the flowchart.

Step [20] (S20)

First, in response to an instruction from a program executing registration of a new spare cartridge table, the output section 125 displays a new registration window for a spare cartridge table shown in FIG. 9(b). The program executing registration of a new spare cartridge table is nothing but the program executing S21-S27 detailed below. The program is pre-installed in the memory section 124 in the terminal station 12 and launched at detection of a click on an on-screen execution button of the program for new registration displayed on the output section 125.

Step [21] (S21)

Cells showing "CONTRACT SIGNER ID," "MACHINE MODEL DATA," and "FULL DATA (FULL DIGITS)" in the column under "SPARE CARTRIDGE DATA" are now ready to accept data entry and are displayed in a special manner to show the machine is waiting for data entry through the input section 123. For example, a prompt message appears encouraging the user to enter data and notifying where to enter. FIGS. 9(a) and 9(b) show the tables after "CONTRACT SIGNER ID" (not shown) and "MAIN BODY MODEL" data have been entered.

Step [22] (S22)

A check button (not shown) is displayed on screen, allowing the person to confirm the data entered in the registration window. If the button is clicked on, the arithmetic processing section 122 executes S23. Otherwise, the arithmetic processing section 122 stands by.

Step [23] (S23)

In S23, the arithmetic processing section 122 checks as to whether every piece of essential data was entered in an appropriate cell. If there is no piece of essential data missing, the arithmetic processing section 122 executes S24. Otherwise, the arithmetic processing section 122 executes S25.

Step [24] (S24)

In S24, the product name and model number are read out in reference to the "REMARKS" cells in the product-in-circulation data table of FIG. 32 on the basis of the unique data entered in the "FULL DATA (FULL DIGITS)" cell, and then pasted to "COLOR DATA," "MODEL DATA," and other cells in the spare cartridge table. The "DATE OF DELIVERY" cell may be automatically filled in with the date of the entering of unique data into the "FULL DATA (FULL DIGITS)" cell, i.e., the date of the delivering of the toner cartridge 60 to the contract signer 1, in response to the entering. To this end, a timer function of the terminal station 12 is used.

This step is intended to alleviate the workload of the operator of the terminal station 12. The unique data (or full data in this case) of the toner cartridge 60 is numerically represented, and the operator cannot figure out a specific product name, model number etc. from the numeric data alone. The step is optional and not essential if the processing is handled all by a computer.

Step [25] (S25)

If there is any piece of essential data missing in S23, the arithmetic processing section 122 executes S25 where a prompt message appears encouraging data entry, before returning to S21. To be more specific, the arithmetic processing section 122 causes an error message like "Essential Data Missing. Try Again." to be displayed on-screen with a check button, and executes S21 again in response to a click on the button. In the second session of S21, the data entered in the previous session is not deleted, but retained as was entered: the cells are simply ready again for data entry.

Step [26] (S26)

Subsequent to S24, the arithmetic processing section 122 check as to whether registration of a new spare cartridge table has been completed and a registration instruction has been made by a click on a registration button.

Step [27] (S27)

The data entered in the spare cartridge table is recorded to complete the new registration. As a result, the manager window changes from that shown in FIGS. 9(a) and 9(b) to that shown in FIGS. 10(a) and 10(b).

By executing these steps, the terminal station 12 of the service provider 10 can store the number, models, ID numbers, and other data on the toner cartridges 60 that were delivered to the contract signer 1, but are still not in use.

(Replacement Process)

Now, the operations of the arithmetic processing section 122 when a toner cartridge 60 is replaced will be described.

A machine manager or user of the contract signer 1 who has a contract with the service provider 10 replaces an old toner cartridge 60 with a new one in spare stock based on a "Replace Toner Cartridge" message given by the image forming apparatus 2. The present embodiment will focus on a case where only black toner has run out.

The old toner cartridge 60 (spare cartridge No. 1 in FIG. 11(b)) is removed from the image forming apparatus 2, and a new toner cartridge 60 (spare cartridge No. 5) is installed replacing the old one.

Referring to FIGS. 7(a)-7(f), the following will describe internal operations of the image forming apparatus 2.

The image forming apparatus 2 is typically equipped with a sensor to detect a toner cartridge 60 being installed. The arithmetic processing section 122 detects installation and removal of a toner cartridge 60 on the basis of sensor reactions.

FIGS. 7(a), 7(b) show, as an example, the installation/removal operation of a toner cartridge 60 and associated sensor outputs. When there is a toner cartridge 60 installed, the sensor output signal is low; when there is no toner cartridge 60 installed, the sensor output signal is high.

The sensor circuit 9 produces a trigger pulse shown in FIG. 7(c) based on the sensor output signal. Specifically, a pulse signal is produced with a fixed width when the sensor output signal falls. This is achieved by a circuit including a mono multivibrator: the circuit feeds the sensor output signal to the mono multivibrator and produces a pulse that rises at a fall of the sensor output signal. The sensor output signal may be fed to a Shmit trigger circuit, filter circuit, etc., before supplied to the mono multivibrator to prevent noise and chattering in the sensor output signal from causing malfunction of the mono multivibrator.

The installation timing of the toner cartridge 60 is thus detected, and the read-out section 4 is triggered at this timing.

As the trigger is produced, the read-out section 4 accesses the IC chip 61 on the toner cartridge 60. FIG. 7(d) shows the duration of the access to the IC chip 61 by the read-out section 4. Specifically, the signal is a strobe signal, and address specification and data reading are done in the duration. The read-out data is stored in RAM or other volatile memory.

At the fall of the strobe signal, the pulse signal of FIG. 7(e) is produced with a fixed width.

The trigger pulse is used as a timing signal for the transmitter/receiver section 5 to transmit the data read by the read-out section 4. The transmitter/receiver section 5, for example, processes data appropriately to communications system based on the trigger pulse, before transmitting it as shown in FIG. 7(f).

With these operations, the image forming apparatus 2 transmits data on the unused toner cartridge 60 to the terminal station 12 of the service provider 10.

In the description so far, it was assumed that a sensor was disposed to detect a toner cartridge 60 installed in the image forming apparatus 2. If there is no such sensors, a door sensor may be used. The door is provided to allow internal access when the toner cartridge 60 needs be replaced or jammed paper needs be removed. As a safety precaution, the door is usually equipped with a sensor to detect the opening/closure of the door. To replace the toner cartridge 60, the door must be opened and then shut. Therefore, An access timing to the toner cartridge 60 may be produced based on signals from the door sensor, hence, the opening/closing of the door.

Alternatively, for a machine with no sensors at all, the controller section 3 may be programmed to cause a reading at a regular interval.

At the terminal station 12 of the service provider 10, the current status for the spare cartridges No. 1 and No. 5 is updated to "USED" and "IN USE" respectively as shown in FIG. 12(b). In the in-use cartridge table, the data (date of replacement, full data, unique data, spare cartridge) is updated only on the black toner cartridge as shown in FIG. 12(a).

Specifically, the arithmetic processing section 122 compares the unique data of the toner cartridge 60 for which the spare cartridge table shows "NEW (SPARE)" in the column under "CURRENT STATUS" with the unique data contained in the data received by the communications section 121; if the unique data of the toner cartridge 60 (spare cartridge No. 5) is detected, the arithmetic processing section 122 recognizes that the spare cartridge No. 1 of the same color is replaced with a spare cartridge No. 5. In other words, the arithmetic processing section 122 detects changes in the unique data of the product-in-circulation 6 received via the communications section 121 to serve as a replacement recognition section to recognize replacement of the product-in-circulation 6 by the contract signer 1.

Based on the recognition, the arithmetic processing section 122 updates the current status of the spare cartridge No. 5 to "IN USE." Concurrently, the arithmetic processing section 122 detects that the new toner cartridge 60 (spare cartridge No. 5) is for black toner and recognizes that the toner cartridge 60 (spare cartridge No. 1) also for black toner is used up and updates the current status of the spare cartridge No. 1 to "USED." The arithmetic processing section 122 updates the spare cartridge table through these recognition operations.

Now, there is no more spare black toner cartridge left, and the service provider 10 dispatches at least a black toner cartridge to the contract signer 1. FIGS. 12(a) and 12(b) show such a situation. New spare cartridge data is added for No. 9 by a process similar to the foregoing initial setup and registration.

Thus, the service provider 10 always monitors the spare toner cartridge data and prevents the contract signer 1 from running out of the consumable product by dispatching a new spare toner cartridge 60 to the contract signer 1 when or before the contract signer 1 runs out of spare toner cartridges 60.

To cause the terminal station 12 to electronically execute the foregoing operations, the arithmetic processing section 122 subtracts Nu from Nf where Nf is the number of toner cartridges delivered, and Nu is the number of toner cartridges used; if Nf−Nu equals 0, the arithmetic processing section 122 executes steps to instruct a dispatch. Nf is stored in the memory section 124 for individual contract signers 1. Nf is retrieved from the memory section 124 before executing the foregoing process and updated when a new cartridge is delivered. Nf may be set equal to the largest of the numbers successively assigned to the cartridges (the numbers appear in FIG. 11(b) in the column under "NO.").

Nu is calculated as follows.

The memory section 124 have in records the accumulative number of cartridges used up and in used to the previous update. As latest data is entered to the terminal station 12, the number of cartridges newly put in use this time is added to the accumulative number to keep Nu updated. Specifically, this is achieved, for example, in FIG. 12(b), by adding up the number of cartridges sorted as "USED" or "IN USE" under "CURRENT STATUS." The accumulative number of cartridges used and in use, which is stored in the memory section 124, is update also in this case.

The instruction for a delivery may be a message popping up on the output section 125 of the terminal station 12. Alternatively, the instruction may be sent via the communications section 121 and then over the local network 22 to the delivery department of the service provider 10 in the form of, for example, electronic mail. Further, a notice of delivery may be sent in advance via the communications section 121 and then over the network 20 (telephone lines 20A) to the contract signer 1.

Spare toner cartridges 60 may be dispatched to the contract signer 1 when N' grows smaller than N, where N is a predetermined reference value larger than 0, and N' is the number of spare cartridges kept in stock at the contract signer 1. When this is the case, the contract signer 1 has a smaller risk of running out of the product than when setting N=0; however, cartridges are dispatched more frequently. This is a trade-off situation between low risk and high frequency; experience will tell a suitable value for N.

(Accounting Process)

The following describes an accounting method. FIG. 13 shows lists of consumables to be subjected to accounting (accounting lists [1] through [3]). Each period of accounting is, for example, one month. The lists of consumables are created, for example, based on the spare cartridge tables of FIG. 11(a) and FIG. 12(b) by clipping cartridge data of those cartridges which were used during a one-month period before the closing date of accounting (15th day of the month in the present embodiment). Here, the cartridges which are clipped are those which are indicated by "USED" or "IN USE" in the cells under "CURRENT STATUS" in the spare cartridge table, and which has dates of installation within the one-month period before the closing date of accounting.

FIG. 13 is a list for the past three months.

As would be clear from the foregoing, the present invention has a feature that the contract signer 1 is charged only for those toner cartridge 60 that are actually used; the contract signer 1 is not charged for those that are not yet used. Thus, the contract signer 1 can reduce inventory and use the image forming apparatus 2 without running out of consumable products or going through bothersome management.

The present invention has a major feature that the number of spare cartridges can be confirmed by detecting installation of a new toner cartridge 60. Because of this feature, a single management method is capable of performing conventional management of the image forming apparatus 2 itself and novel inventory management of spare toner cartridges 60.

Incidentally, the present invention is further capable of detecting a contract signer 1 using non-original, imitative products not supplied by the service provider 10 in the following manner.

For example, the arithmetic processing section 122 compares the data received via the communications section 121 with the data registered in the service management tables of FIGS. 12(a), 12(b), etc. If the arithmetic processing section 122 detects the same ID number (unique data) as that already registered as "USED", it is likely that the contract signer 1 is using a pirated version; the arithmetic processing section 122 therefore executes steps (on-screen prompt message, email notification) to notify the service provider 10 of the situation.

Thus, the service provider 10 can take necessary actions to eradicate bogus products by, for example, sending a service person to the contract signer 1 who is likely to be using unauthorized imitations to gather information and investigate distribution routes of the unauthorized imitations.

The arithmetic processing section 122 compares the data received via the communications section 121 with the data registered in all the service management tables for all the contract signers 1. An ID number management file may be separately made and stored in the memory section 124 or other memory means, so as to control the ID numbers given to the product-in-circulation 6 during manufacture or packing; the arithmetic processing section 122 compares the data received via the communications section 121 with all the ID numbers registered in the ID number management file. When this is the case, as the arithmetic processing section 122 receives an ID number not registered in the ID number management file or any other suspicious data via the communications section 121, the arithmetic processing section 122 can determine that the contract signer 1 is using a non-original part not manufactured by a legitimate manufacturer.

If an arrangement is made so that the communications section 121 always receives both the contract signer ID and the ID number of the product-in-circulation 6 from the contract signer 1, the arithmetic processing section 122 can compare both the contract signer ID and the ID number of the product-in-circulation 6 with registered data and thus improve precision in checking for use of unauthorized imitations.

Figure 34:
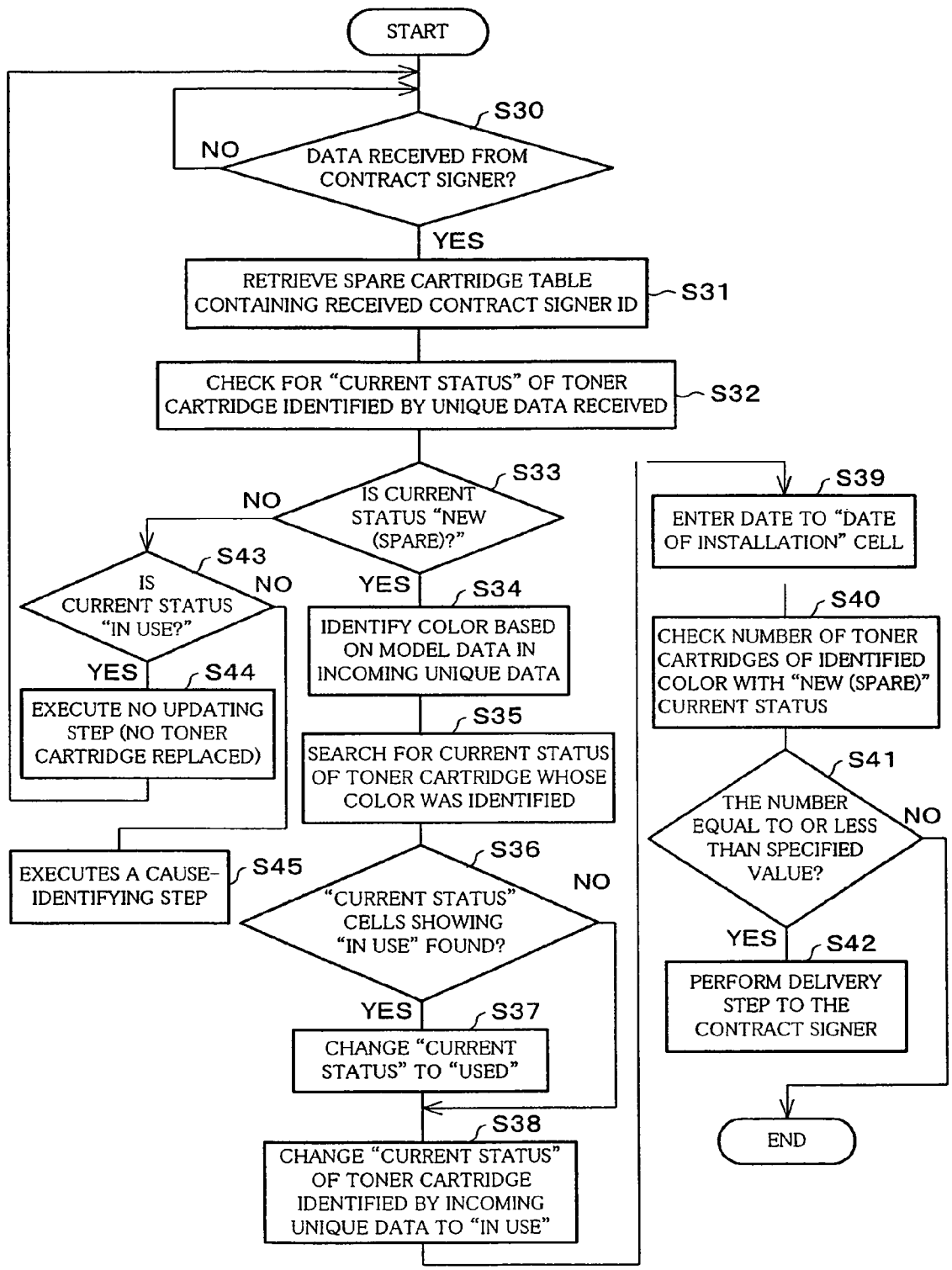
FIG. 34 is a flowchart showing a flow of control operations for an arithmetic processing section to automatically update a spare cartridge table.

Referring to the flowchart of FIG. 34, the following will describe in further detail the flow of control operations executed by the arithmetic processing section 122 in the foregoing automatic updating of the spare cartridge table, inventory management, and bogus product detection.

Step [30] (S30)

The arithmetic processing section 122 first determines via the communications section 121 whether or not it has received data (contract signer ID, unique data of the toner cartridge 60, etc.) of the product-in-circulation 6 from the image forming apparatus 2 of the contract signer 1. If the arithmetic processing section 122 has already received the data, the arithmetic processing section 122 executes S31; if not, the arithmetic processing section stands by for the reception.

Step [31] (S31)

The arithmetic processing section 122 detects the contract signer ID from the data on the product-in-circulation 6 received in S30 and searches the spare cartridge tables stored in the memory section 124 for the detected contract signer ID to retrieve the spare cartridge table (FIG. 10(b)) containing the contract signer ID. The arithmetic processing section 122 causes the output section 125 to display the retrieved spare cartridge table as necessary.

Step [32] (S32)

The arithmetic processing section 122 then checks the spare cartridge table for the current status of the toner cartridge 60 identified by the unique data (full data) received in S30.

Step [33] (S33)

The arithmetic processing section 122 subsequently determines whether or not the current status is "NEW (SPARE)." If the current status is "NEW (SPARE)," the arithmetic processing section 122 executes S34; otherwise, the arithmetic processing section 122 executes S43.

Step [34] (S34)

If the arithmetic processing section 122 determines in S33 that current status is "NEW (SPARE)," the arithmetic processing section 122 identifies the color of the toner cartridge 60 by retrieving the color data from the unique data (full data) on the toner cartridge 60 received in S30. A specific method is described as an example. According to the foregoing rules by which unique data is created, the first four digits in the incoming unique data (full data) is the data representing the color and compatible models. The color and compatible models can be identified by retrieving and analyzing the first four digits in reference to a product-in-circulation data table like Tables 1 to 3.

Taking the case of FIG. 12(b) as an example, the data of a product-in-circulation 6 received on Jun. 12, 2000 was that of No. 5 of the toner cartridge 60. The arithmetic processing section 122 determines from the first four digits, 0000, that the data is that of a black toner cartridge 60 compatible with AR-2000 model of image forming apparatuses 2.

If the contract signer 1 has only one image forming apparatus 2 as the serviced object, it can be omitted to store or read model data for individual machines; the arithmetic processing section 122 only has to analyze the color-representing, first two digits.

Step [35] (S35)

The arithmetic processing section 122 then checks, in the spare cartridge table, the "CURRENT STATUS" cells of the toner cartridges 60 of the color identified in S34.

Step [36] (S36)

The arithmetic processing section 122 determines from the result of the search the "CURRENT STATUS" cells in S35 whether there are any "CURRENT STATUS" cells showing "IN USE." If there are any "CURRENT STATUS" cells showing "IN USE," the arithmetic processing section 122 executes S37; otherwise, the arithmetic processing section 122 executes S38.

To be more specific, if there can be found no "CURRENT STATUS" cells showing "IN USE" in the present step, it means that the unique data of the image forming apparatus 2 of the contract signer 1 has been detected for the first time since it was registered in the spare cartridge table. In other words, one of toner cartridges 60 that were delivered to the contract signer 1, but still new has been installed in the image forming apparatus 2 for the first time, its unique data has been read by the read-out section 4 and transmitted to the terminal station 12.

If there can be found a "CURRENT STATUS" cell showing "IN USE" in the present step, it means that the toner cartridge 60 recognized as "IN USE" has been replaced with the toner cartridge 60 whose unique data was received in S30. In other words, a new toner cartridge 60 that was already delivered to the contract signer 1 has been installed replacing an old toner cartridge 60 in the image forming apparatus 2, and its unique data has been read by the read-out section 4 and transmitted to the terminal station 12.

Step [37] (S37)

If the arithmetic processing section 122 finds any "CURRENT STATUS" cell showing "IN USE" in S36, the arithmetic processing section 122 executes the present step to update the current status from "IN USE" to "USED" before proceeding to S38.

Step [38] (S38)

In the present step, the arithmetic processing section 122 updates the current status of the toner cartridge 60 identified by the unique data (full data) reviewed in S30 from "NEW (SPARE)" to "IN USE." Regardless of whether a toner cartridge 60 is installed for the first time in the image forming apparatus 2 or an old toner cartridge 60 is replaced with a new toner cartridge 60, new data is recorded in the spare cartridge table with a change in the current status to "IN USE," and the toner cartridge 60 installed in the image forming apparatus 2 can be identified on the basis of the record.

Step [39] (S39)

Subsequent to S38, in the present step, if the current status of the toner cartridge 60 whose unique data was received in S30 is "NEW (SPARE)," the arithmetic processing section 122 updates the "DATE OF INSTALLATION" to the date when the unique data is detected. This automatic date entry is made, as described above, based on the timer function of the terminal station 12, whereby the timer value when the unique data is received is copied and pasted.

Step [40] (S40)

Next, the arithmetic processing section 122 checks the toner cartridges 60 of the color identified in S34 for the number of those with "NEW (SPARE)" current status.

Step [41] (S41)

The number obtained in S40 is then compared with a specified value to determine whether the number of toner cartridges 60 with "NEW (SPARE)" current status exceeds the specified value. If the number does not exceed the specified value, the arithmetic processing section 122 executes S42.

If the number exceeds the specified value, the arithmetic processing section 122 ends the update of the spare cartridge table. Alternatively, the arithmetic processing section 122 returns to S30 to repeat the update of the spare cartridge table.

Step [42] (S42)

If in S41 the number of toner cartridges 60 with "NEW (SPARE)" current status does not exceed the specified value, it means that the contract signer 1 is running out of stock of toner cartridges 60 of that color; the arithmetic processing section 122 performs a delivery step to supply toner cartridges 60 to the contract signer 1. Please refer to the foregoing for details about inventory management.

Step [43] (S43)

Meanwhile, in S33, if the current status of the toner cartridge 60 identified by the incoming unique data is not "NEW (SPARE)," the arithmetic processing section 122 executes the present step, whereby it further determines whether the current status is "IN USE."

Step [44] (S44)

If, in S43 the current status is "IN USE," the arithmetic processing section 122 determines that no toner cartridge 60 in the image forming apparatus 2 has been replaced, but a toner cartridge 60 in use has been removed and reinstalled for some reasons as will be detailed later. When this is the case, the spare cartridge table is not updated.

Step [45] (S45)

Meanwhile, if in S43 the current status is not "IN USE" either, it means, among other possibilities, for example, that there is no record about the toner cartridge 60 or that its current status is "USED;", there must be something wrong. Since it is suspected that the toner cartridge installed in the image forming apparatus 2 is a pirated version, the arithmetic processing section 122 executes a cause-identifying step. Specifically, the arithmetic processing section 122 can display an on-screen warning on the output section 125 or inform a managing department of the service provider 10 of the situation by means of email or other means via a local network 22 to which the communications section 121 is connected.

FIG. 12(b) shows, as an example, the result of steps of updating the spare cartridge table. Compared to FIG. 11(b), it could be understood that the records of No. 1 and No. 5 are updated.

Embodiment 2

In embodiment 1, it was assumed that the image forming apparatus 2 that was used by the contract signer 1 and covered in the contract had a permanent connection to the terminal station 12 of the service provider 10. In view of the frequency of replacing cartridges, the connection may be made once a day, a week, or even a month. In such a case, settings are made in advance both by the contract signer 1 and by the service provider 10 regarding the connection time for transmission of data from the contract signer 1, so that memory means (not shown) records events which happen between 0:00 and 23:59 and a connection is established, for example, at every 24:00 for daily connection to transmit the records to the terminal station 12 of the service provider 10.

If a toner cartridge 60 has been replaced, data is transmitted of the newly installed toner cartridge 60; if no toner cartridge 60 has been replaced, data is transmitted either of the currently installed toner cartridge 60 or indicating that there has been no change at all. By the arrangement whereby some kind of data is transmitted when no toner cartridge 60 has been replaced, it becomes possible to tell failed connection from cases where none of the toner cartridges 60 is replaced.

Meanwhile, the terminal station 12 of the service provider 10 is in an active state at least during the period in which data is transmitted from the contract signer 1, for example, during a period covering 23:55 to 24:05 (five minutes before and after connection is started). By the wording "the terminal station 12 in an active state," we mean that the terminal station 12 is ready to suitably process the data transmitted from the contract signer 1.

The limited connection time is helpful in reducing connection fees over a telephone line network and power consumption by the communications devices 5, 121, etc., in the contract signer 1 and the service provider 10.

The image forming apparatus 2 is usually turned off during the night time and other non-working hours. If the connection time is specified during non-working hours as above, when the main switch for the image forming apparatus 2 is turned off, the communications means is also cut off from power and cannot start up to establish a connection. The communications means (transmitter/receiver section 5) should be therefore powered separately from the rest of the image forming apparatus 2. The memory (memory means) is preferably rewritable, nonvolatile memory so that it will not lose recorded contents when the communications means is turned off by an error.

Embodiment 3

Paper is sometimes jammed in the device during the use of the image forming apparatus 2 because of problem mostly caused by the device's transport system. To remove the jammed paper, the detachable toner cartridge 60 and its associated components need to be removed and then reinstalled in the image forming apparatus 2.

Such removal and reinstallation of a cartridge, which is irrelevant to replacement of a cartridge at all, adds complexity to data transmission and wastes the bandwidth of the network by unnecessary data transmission, if data is transmitted as described in the foregoing embodiment.

Such data is also unwanted by the service provider 10. In addition, if the date of replacement is updated as was described in reference to FIGS. 9(a) and 9(b) and FIGS. 12(a) and 12(b), the service provider 10 possibly fails to correctly charge the contract signer 1.

Figure 4:
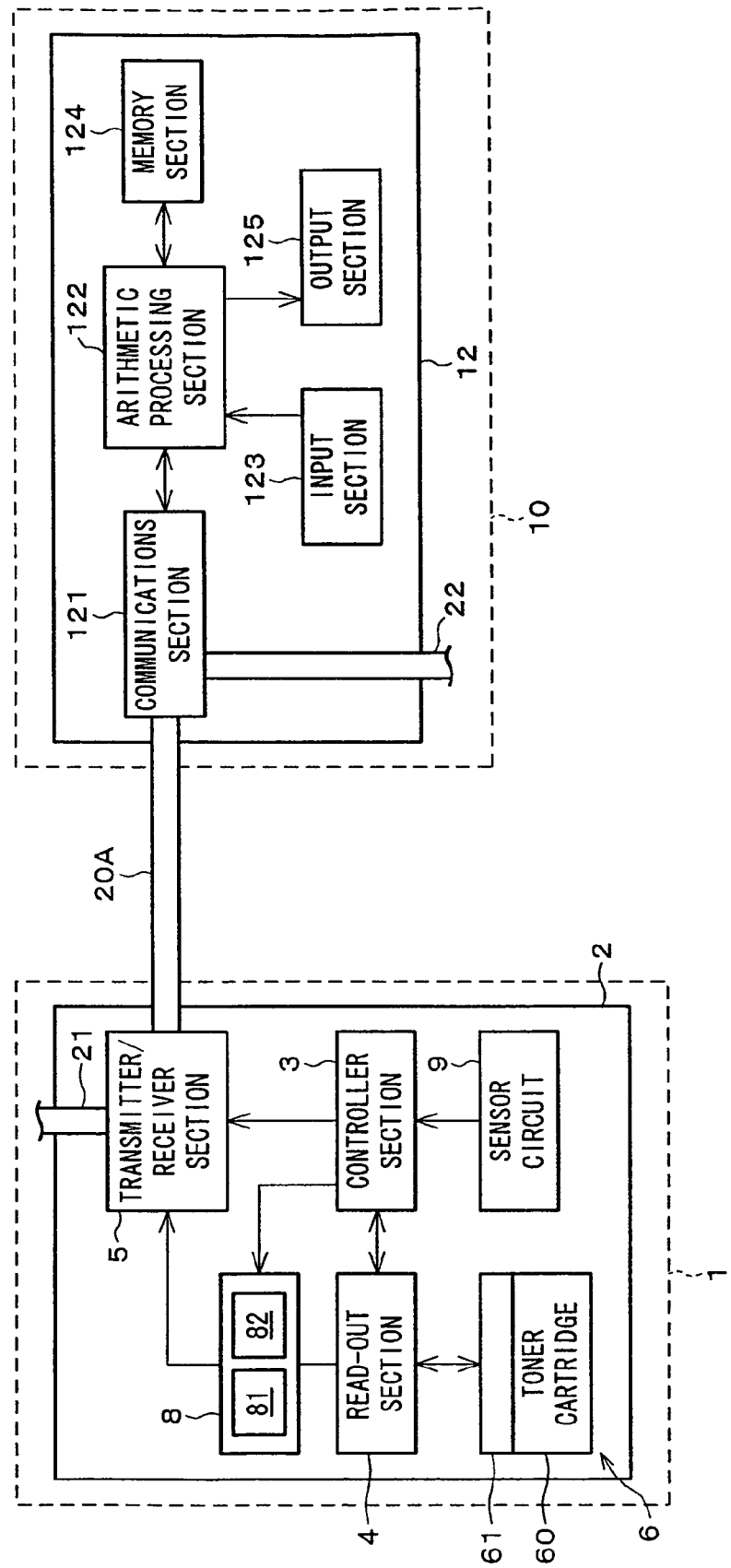
FIG. 4 is a schematic view showing another service management network system in accordance with the present invention.

Therefore, an arrangement is made in the present embodiment, whereby if a cartridge is removed and then reinstalled, no cartridge data is transmitted. To this end, as shown in FIG. 4, the image forming apparatus 2 is provided with a computing section 8. Composed of a memory section 81 and a comparator section 82, the computing section 8 causes the comparator section 82 to compare the latest data fed from the read-out section 4 with the data stored in the memory section

81. If the two sets of data disagree with each other, the data is transmitted to the transmitter/receiver section 5 to update the records stored in the memory section 81. If they agree with each other, a step is executed so that no data is transmitted and hence no records are updated.

The computing section 8 is not necessarily provided separately, but integrated as part of the controller section 3.

In addition, in an image forming apparatus that comes complete with a memory device, such as a hard disk, to perform functions related to image formation, the hard disk can be used as the memory section 81.

Embodiment 4

The process described in the previous embodiment was realized by an arrangement in the contract signer 1. Trouble is that the computing section 8 needs be provided-separately for additional cost.

In view of this problem, in the present embodiment, the process is realized by the service provider 10. If the incoming data is identical to that registered as "IN USE," the arithmetic processing section 122 determines that the cartridge has been removed and then reinstalled and updates no data; if the two sets of data are not identical, the arithmetic processing section 122 determines that the cartridge has been replaced and takes a step to update the spare cartridge table and the installed cartridge table. The process is realized by the same hardware as described in the previous embodiment or executed by means of software in the terminal station 12 as described earlier in reference to the flowchart of FIG. 34. The latter is preferred for its versatile applicability, low cost, and a wide range of choices of control methods.

The present invention is applicable not only to a printer, but also to a system constituted by two or more devices (e.g., host computer, interfaces, readers, printers) and a stand-alone device (e.g., a copying machine, a facsimile).

The object of the present invention can be of course achieved by (i) a memory medium provided in the system or device to record thereon program codes of software that realizes the functions of the foregoing and following embodiments and (ii) the computer (or CPU, MPU, etc.) provided in the system or device to read and execute the program codes recorded on the memory medium.

When this is the case, the program codes per se that is read in from the memory medium realize the functions of the foregoing and following embodiments, and the memory medium recording the program codes thereon is the present invention.

Examples of the memory medium to record the program codes include floppy disks, hard disks, optical disks, magneto-optical disks, magnetic tapes, and nonvolatile memory cards.

The program codes may be provided in such a form that they can be downloaded to the memory section 124 in the terminal station 12 from another computer system via a transmission medium, such as a communications network.

By reading and executing the program codes, the computer can realize the functions of the foregoing and following embodiments. In addition, needless to say, the OS (operating system), etc. running on the computer entirely or partly performs actual processing based on instructions in the program codes to realize the functions of the foregoing and following embodiments.

Needless to say, after the program codes read out from the memory medium are written into memory provided in an extension keyboard inserted in the computer or an extension unit connected to the computer, the CPU, etc. provided in the extension board or extension unit may entirely or partly perform actual processing based on instructions in the program codes to realize the functions of the foregoing and following embodiments.

When the present invention is applied to the foregoing memory medium, the memory medium stores program codes equivalent to the aforementioned flowcharts.

The scope of the present invention is not limited to the foregoing and following embodiments and may be varied in many ways within the metes and bounds of the claims.

The major feature of the present invention is related to the replacement service of consumables, degradables, etc. This neither necessarily assumes nor requires that a contract be made about image forming apparatus main bodies throughout the whole part. In other words, image forming apparatus main bodies that are on lease or bought by the contract signer through other distribution channels can be of course serviced in accordance with the present invention. Yet, if a customer who has agreed to have image forming apparatus main bodies on lease or rental or to buy them signs a service contract in accordance with the present invention at the same time as the signing of the lease/rental agreement or purchase of the main bodies, the service management method in accordance with the present invention can be carried out smoothly in terms of procedures.

The present invention is applicable not only to copying machines, printers, etc., but to all the replacement parts that have a short lifetime than the main device. It is preferred if unique data of a replacement part is created and can be read by the main body, since removal and installation of the replacement part are electronically detectable.

Embodiment 5

In embodiments 1 to 4, product-in-circulations 6 that are essential to the operation of the image forming apparatus 2 were serviced as examples. The present invention is not however limited to these examples and is applicable to provision of servicing of more general products to contract signers 1.

In the following embodiment, the term ordinary products is used referring to products in such conditions that they can be bought up straightly by typical consumers under normal circumstances, thereby inclusive of, in addition to the actually used or consumed goods, containers and cases holding them and packing and wrapping members.

Here, the degradable and consumable products wrapped in a package including the ordinary products and an unique data forming section (first data storage body), such as the foregoing IC chip 61, in which a product-unique ID number and other data are stored, are redefined as a product-in-circulation. In these senses, some ordinary products can be packed and wrapped anew (packaged) as a new product in the present service. The product-in-circulation in accordance with the present invention includes products that are repacked and rewrapped by the manufacturer itself in the foregoing manner with an enclosed first data storage body to sell them in packages or as bundled goods. In the present system, product-in-circulations will be sometimes referred to simply as products. Examples of such products include four or two tires or wheels sold in a bundle and everyday commodities or liquors, teas, and coffees sold in a package.

The product-in-circulation may be further processed, for example, to attach data storage bodies 7.

Such examples include, as well as products bought by end users, components of products when the contract signer 1 is a module manufacturer. For example, in the case of a computer device equipped with a liquid crystal display, the liquid crystal display, liquid crystal module, liquid crystal driver are all product-in-circulations.

Further examples include toiletries, such shampoo and soap; cosmetics; sanitary products for babies and the aged; automobile parts, such as tires and moduled components; office supplies; data storage-media, such as books, compact disks, video tapes, and digital video disks; preserved food; clothes; medical supplies; ICs and other electronic devices; toys; electric appliances and components; machinery and its components; pharmaceutical products; propene gas container; house and other building materials; metals; and plastic materials.

Further, as would be clear from the above examples, if actually used or consumed goods that are sold in a powder, liquid, gas form or near liquid form and that are therefore uncountable can be measured when put in a container of a fixed capacity, they are encompassed in the scope of the present invention.

(Network System)

Figure 15:
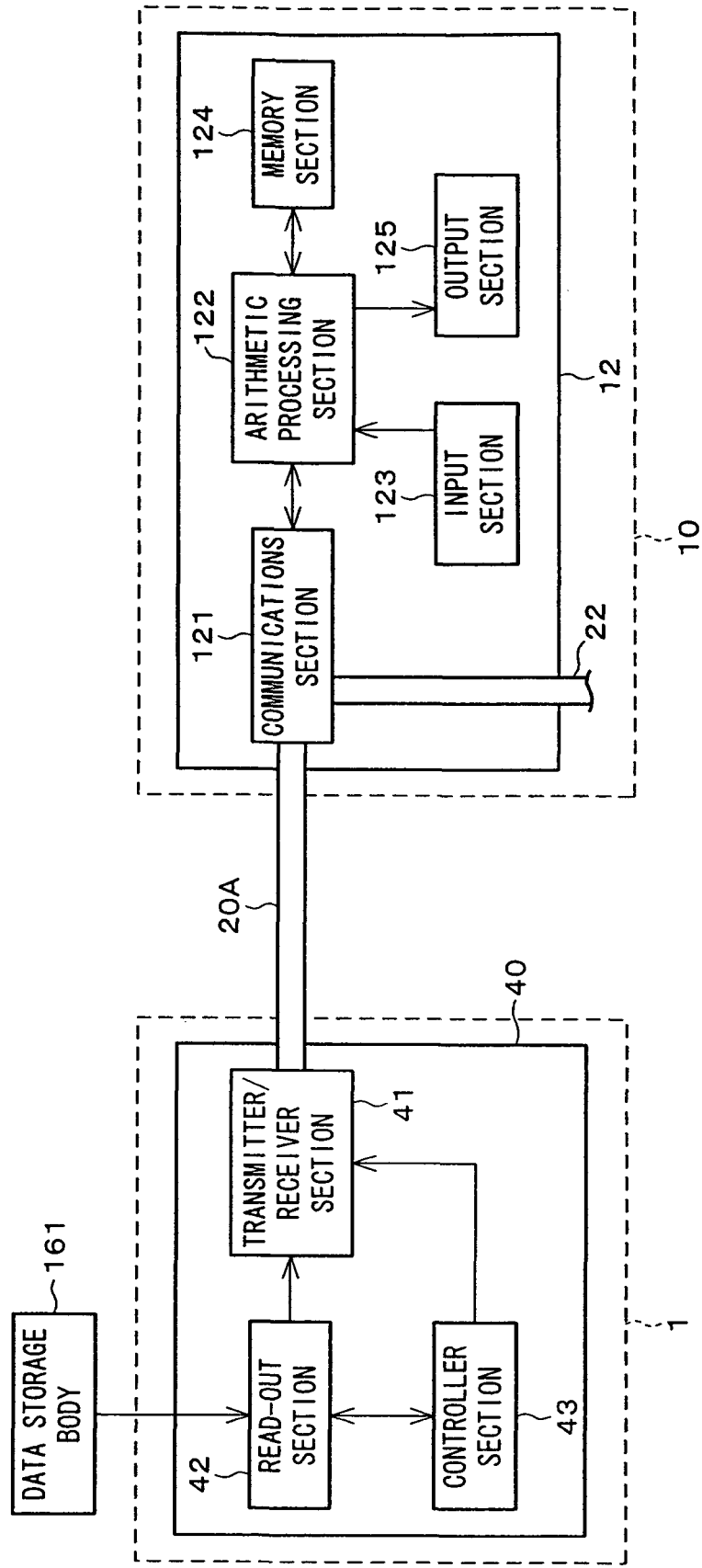
FIG. 15 is a schematic view showing another service management network system in accordance with the present invention.

As shown in FIG. 15, the service provider 10 first provides a second terminal station 40 to the contract signer 1 and delivers a product 65, such as paper as a supply product for a printer; a CD, DVD, or other optical disk, or a video tape on which images, movies, music, application software, or game software is stored. For consistency with embodiments 1 to 4, the product 65 here should be actually called the product-in-circulation 6; however, the terminology is used when product-in-circulations, such as toner cartridges 60, that are necessary to operate the machine need be distinguished from others. Under these circumstances, there are no specific restrictions on the kinds and number of products delivered. However, packaged products are excluded, and two or more products should be involved to effectively apply the present invention.

The service provider 10 gives the contract signer 1 brochures, etc. with a list of products delivered next time and onwards as necessary. Thus, the contract signer 1 can determine and order products delivered next time and onward. This is beneficial to both sides: the contract signer can buy those products that exactly match his/her needs, and the service provider 10 can increase the sales. Brochures are not essential and may be replaced with something else: for example, the service provider 10 makes a list of selected product-in-circulations 6 in advance so that the contract signer 1 selects what he/she would need from the list and that the service provider 10 can determine the product-in-circulations 6 to be delivered in advance in reference to the selection. Details will be given later.

In reference to the block diagram of FIG. 15 illustrating the hardware, the second terminal station 2 provided to the contract signer 1 is connected to the terminal station 12 of the service provider 10 via the transmitter/receiver section 41 and the telephone lines 20A, etc. The transmitter/receiver section 41 is, for example, a modem and may be connected via a similar network like CATV or a dedicated network system, instead of telephone lines.

Specifically, the second terminal station 40 is basically constructed of a read-out section 42 for reading data from a data storage body 161 (first data storage body replacing the IC chip 61) that accompanies the product 65; a controller section 43 for executing the control; and the transmitter/receiver section 41 for externally supplying the read-in data.

Figure 21:
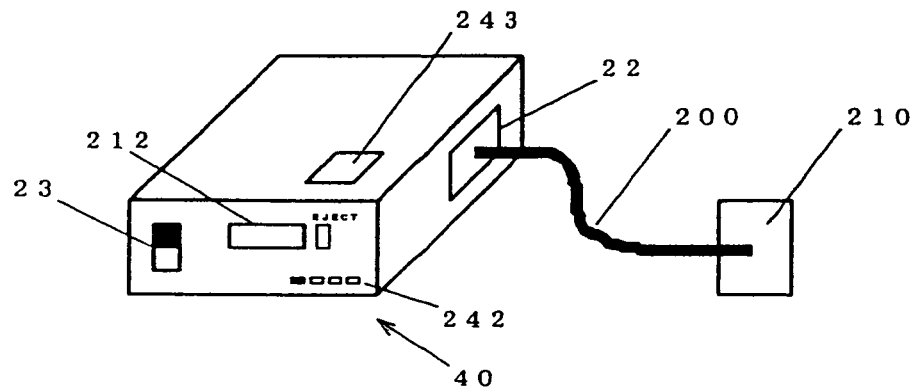
FIGS. 21(a) and 21(b) are schematic perspective views showing, as another example, a second terminal station for use in the service management network system of FIG. 15.
Figure 21:
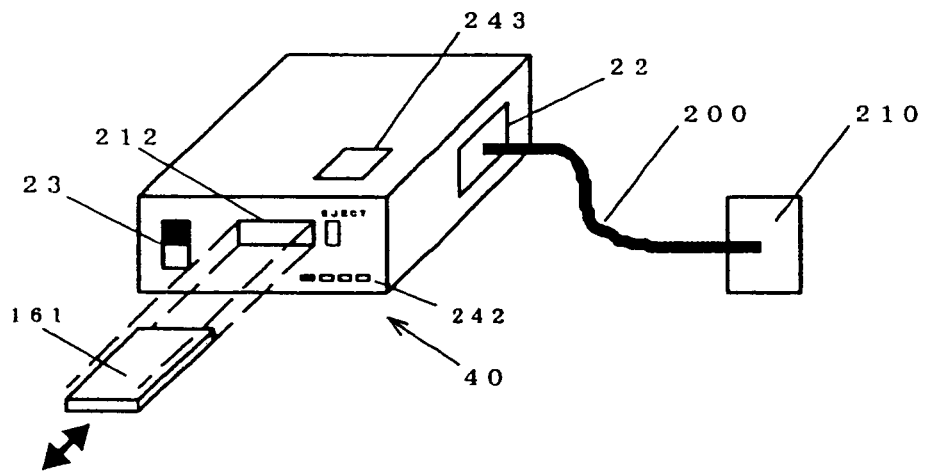

FIGS. 21(a) and 21(b) show the exterior of the second terminal station 40. The second terminal station 40 includes, for example, a power switch 23 for the whole device, a read slot 212 in which a read-out section 42 is located and the data storage body 161 is inserted, and a connector 22 to the transmitter/receiver section 41. A power supply cable and connector to the second terminal station 40 are omitted.

The second terminal station 40 is connected via a communications cable 200 to a network connector 210 installed in a house.

As shown in FIG. 21(b), when, for example, the data storage body 161, such as an IC card, is deliberately inserted or connected in the read slot 212 of the second terminal station 40, the controller section 43 automatically reads electronic data. Then, when a submission button 243 is pressed, the controller section 43 causes the transmitter/receiver section 41 to externally transmit the data.

The submission button 243 can be omitted if the transmission is done automatically.

The terminal station 12 of the service provider 10 register, update, correct, etc. the data of the contract signer 1 through the network 20 (telephone lines 20A) or/and the input section 123.

(Request of Product-In-Circulations)

In reference to FIGS. 16(a)-16(e), the following will describe how to determine the product-in-circulations 6 to be delivered in advance to the contract signer 1 in view of wishes of the contract signer 1.

FIGS. 16(a) and 16(b) shows an example of a page (hereinafter, advance request page) enabling the contract signer 1 to make a request over the Internet for product-in-circulations 6 to be delivered in advance.

Both have an entry box to enter the contract signer ID as data that confirms that the contract signer is an authorized user to receive service in accordance with the present invention.

FIG. 16(a) is for making a rough request for groups of products, such as office supplies, entertainment products, and everyday commodities. FIG. 16(b) shows subgroups. These pages can be used selectively. Alternatively, if "Entertainment Products" is selected in FIG. 16(a), for example, the advance request page of FIG. 16(b) appears showing subgroups to invite the contract signer to enter more data. When this is the case, the advance request page of FIG. 16(b) needs no entry box to enter the contract signer ID. As will be detailed in reference to FIG. 27, the advance request page may show specific names of product-in-circulations, such as "XYZ" data search and processing software.

The contract signer 1 select a preferred product group, product name, or the specific name of a product-in-circulation in the advance request page and then clicks on the submission button to transmit the results of the questionnaire to the terminal station of the service provider 10. The terminal station is typically a Web server and may be the foregoing terminal station 12.

FIG. 16(c) shows some source codes for the advance request page of FIG. 16(b) written in the HTML (Hypertext Markup Language). As can be seen here, the questionnaire can be conducted very easily by the use of a <FORM> tag. To enable the user to select two or more options, "checkbox" is used as the TYPE attribute of the <Input> tag. The file is stored in the Web server.

In an embodiment where the terminal station 12 is used in place of the Web server, a list of product-in-circulations 6 that can be delivered to the contract signer 1 written in the HTML is stored in a memory section (third memory section) 124 of the terminal station 12 and transmitted from the terminal station 12 to the terminal station 40 as an HTML document in response to a request by the second terminal station 40 having a browser function. Thus, the contract signer 1 can access the list of product-in-circulations 6 stored in the terminal station 12.

The service provider 10 then collects results from the contract signer 1.

Specifically, when the contract signer 1 selects "Software for PCs" as shown in FIG. 16(*b*), the code data "0210" specified in the NAME attribute is transmitted via the transmitter/receiver section 41 to the terminal station 12 according to the source code of FIG. 16(*c*). Likewise, when the contract signer 1 selects "Western Movies (DVD)," the code data "0220" is simultaneously transmitted.

Therefore, the terminal station 12 collects advance request data for each contract signer 1 in the form of, for example, (Contract Signer ID)+(Code Data Selected by Contract Signer)

Next, the terminal station 12 counts advance request data sent from all the contract signers 1. FIG. 16(*d*) shows an example of a count table. The code data items appearing in the data column correspond one-to-one to options in FIGS. 16(*a*) and 16(*b*) as dictated in the file of FIG. 16(*c*). FIG. 16(*e*) shows which product is represented by which code. The "Number of Replies" column in the count table shows the number of replies (requests) counted for each code.

Next, with respect to the number-of-replies column in FIG. 16(*c*), the codes are rearranged in a descending order of the number of replies.

Next, for example, the top ten items are designated as product-in-circulations 6 to be delivered in advance, that is, product-in-circulations 6 subject to the service management method in accordance with the present invention. The service provider 10 can freely determine how many product-in-circulations 6 should be subjected to the service.

Next, in reference to FIG. 16(*e*), the codes of the product-in-circulations 6 selected by the foregoing process are translated into product names, etc. so that people can understand.

If there are not many contract signers 1, the product-in-circulations 6 to be delivered in advance may be determined as preferred by the contract signer 1, etc.

The foregoing process is handled by the arithmetic processing section 122 and is a counting program and a request program stipulating the above procedures are stored in the memory section 124.

In this manner, the contract signer 1 makes an advance request for product-in-circulations 6 delivered to the contract signer 1 to select the product-in-circulations 6 he/she wishes to buy; the contract signer 1 is thereby supplied with the most suitable product-in-circulations 6 and is more likely to buy the supplied products. Further, the service provider 10 can prepare product-in-circulations 6 based on the counted advance requests. This facilitates ordering, inventory management, etc. of the service provider 10.

By presenting to the contract signer 1 a list of product-in-circulations 6 made in view of advance requests, the service provider 10 can inform the contract signer 1 of popular product-in-circulations 6. This would further improve the likelihood of the contract signer 1 to buy products and reduce bad inventory that would not lead to purchase.

The service provider 10 can recognize popular and unpopular product-in-circulations 6 based on, for example, the results of the advance request from the contract signer 1. By feeding back such results of the advance request quickly when selecting product-in-circulations 6 that are to be subjected to the service, the service provider 10 can provide service with more efficiency: for example, the likelihood of the contract signer 1 buying products would be enhanced.

(Configuration of Product-In-Circulation)

Figure 17:
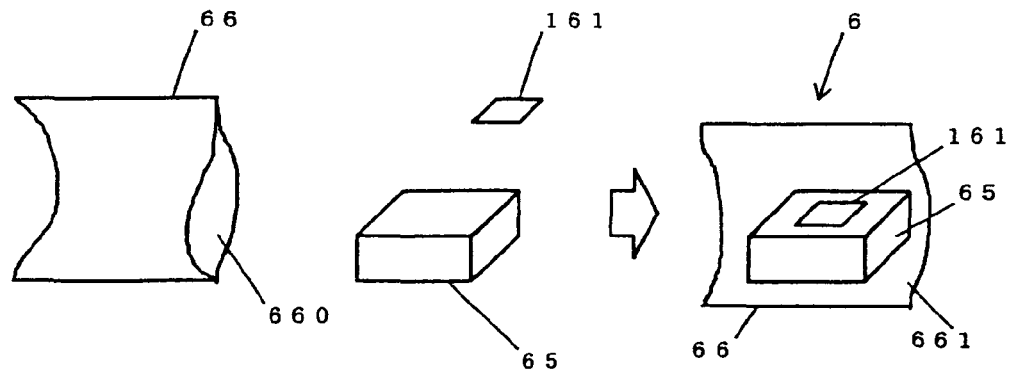
FIGS. 17(a)-17(c) are drawings showing, as an example, integration of unique data of an ordinary product.
Figure 17:
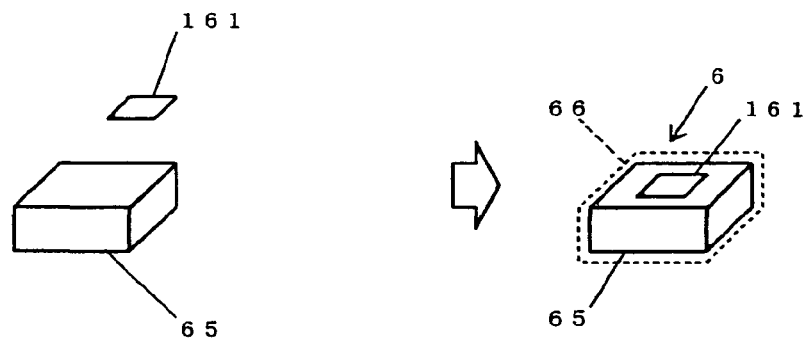
Figure 17:
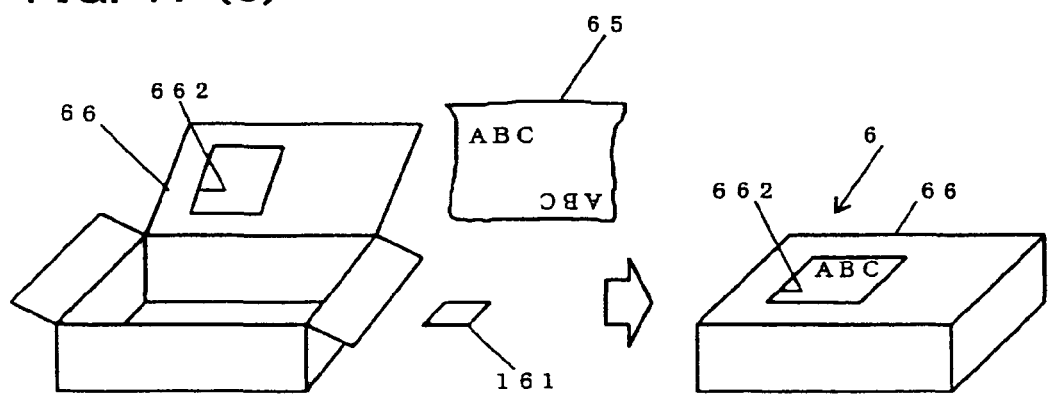

In reference to FIGS. 17(*a*)-17(*c*) and 19(*a*)-19(*c*), the following will describe product-in-circulations 6.

FIG. 17(*a*) shows an example of preparing a product-in-circulation 6 by wrapping the product 65 and the data storage body 161 (data holder section) with transparent wrapping material 66 that is shaped like a plastic bag with an opening 660 through which the product 65 and the data storage body 161 enter the bag-like wrapping material 66. The wrapping material 66 is sealed after the product 65 and the data storage body 161 are placed inside by thermally closing the opening 660 (seal section 661).

To protect the data storage body 161 from damage due to the product 65 colliding or rubbing against the data storage body 161 inside the wrapping material 66, the data storage body 161 is adhered or secured to the product 65 using tape, etc as necessary.

If the wrapping material 66 can accommodate a larger volume than that of the product 65, the resultant product-in-circulation 6 is likely to be far larger in volume than the product 65. To prevent this from happening, the wrapping material 66 may be evacuated when sealed.

FIG. 17(*b*) shows an example of wrapping the product 65 and the data storage body 161 with wrapping material 66 that can be used for laminate wrapping. In comparison with the method of FIG. 17(*a*), the material 66 fits the product 65 and the data storage body 161 and thereby prevent the product 65 from colliding and damaging the data storage body 161. Also, the wrapping material 66 adds little to the total volume.

All the foregoing examples of the wrapping material 66 were made of transparent resin so that the content is visible from the outside without opening the seal.

FIG. 17(*c*) shows an example of placing the product 65 and the data storage body 161 in wrapping material 66 that is shaped like a cardboard box. In the foregoing two examples, the product 65 was wrapped in transparent wrapping material 66 and therefore visible from the outside after being wrapped. To meet the demand, the cardboard-box-shaped wrapping material 66 is provided with an opening 662 that is covered with transparent resin film; the product 65 thereby becomes visibly recognizable. To confirm the attachment of the data storage body 161, no special arrangement is necessary other than placing the data storage body 161 at such a place that it is at least partly visible from the outside through the opening 662.

In the foregoing examples, card-shaped media, such as a magnetic card and an IC card, are suitably used as the data storage body 161. Details of the data storage body 161 will be given later.

Figure 18:
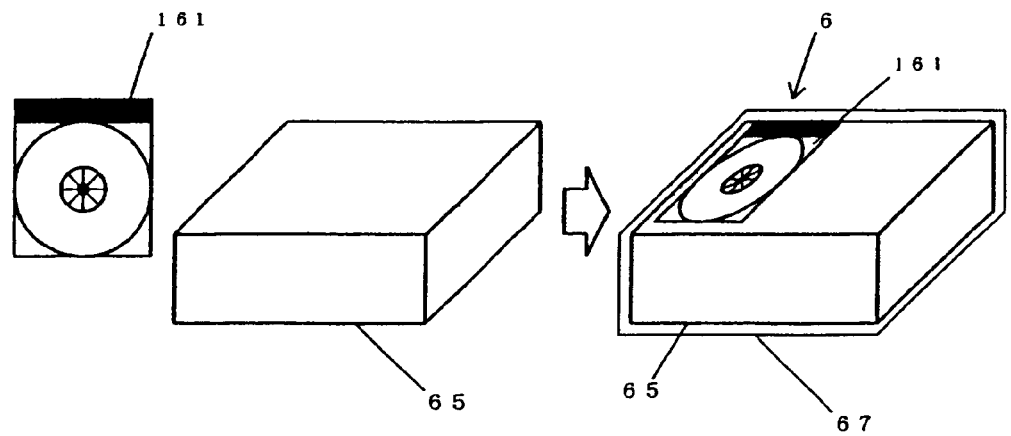
FIGS. 18(a)-18(c) are drawings showing, as another example, integration of unique data of an ordinary product.
Figure 18:
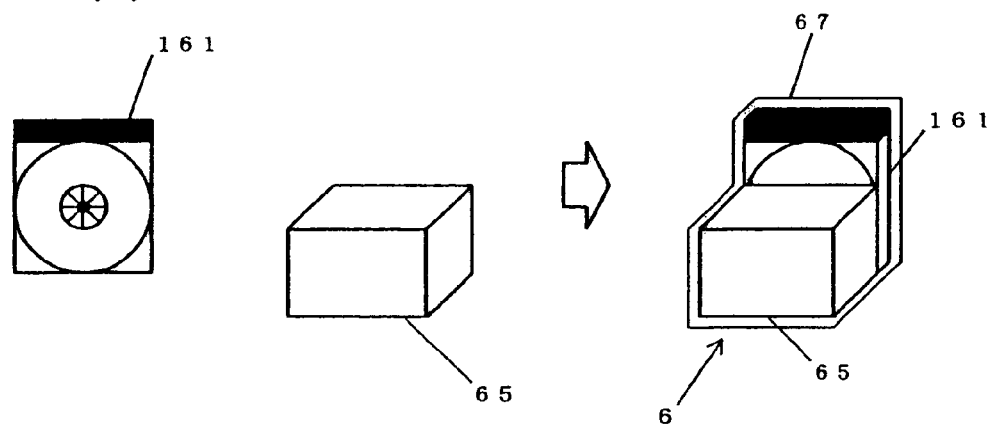
Figure 18:
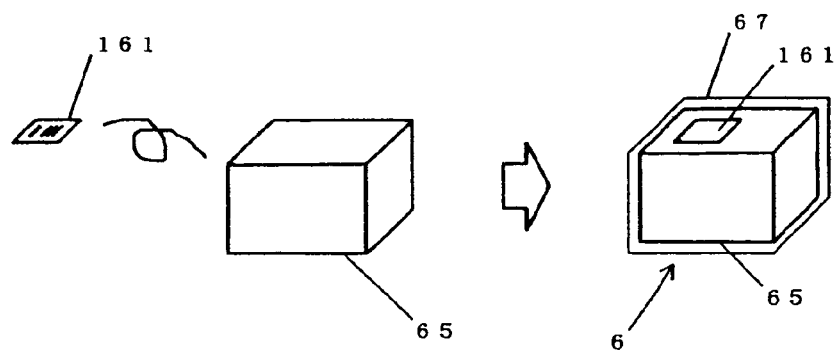

FIGS. 18(*a*) and 18(*b*) show examples where a disk-shaped medium is used as the data storage body 161. FIG. 18(*a*) shows a data storage body 161 smaller than the product 65. The product 65 is, for example, 100 sheets of A4-sized recording paper. FIG. 18(*b*) shows a data storage body 161 as large as or larger than the product 65. The product 65 is, for example, a cartridge for use with an inkjet printer. In either case, the product 65 and the data storage body 161 is wrapped fittingly using the transparent resin film 67.

FIG. 18(*c*) shows an example where a medium with a bar code is used as the data storage body 161. When such data is created, the data storage body 161 is attached to the product 65 with the data-formed surface down and wrapped fittingly with transparent resin film 67, to prevent the data content from being visually and easily read and reproduced in manufacture of fake copies and to protect the data-formed surface from damage. Instead of being wrapped fittingly, the data storage body 161 may be adhered to the product 65 using adhesive tape, etc.

Figure 19:
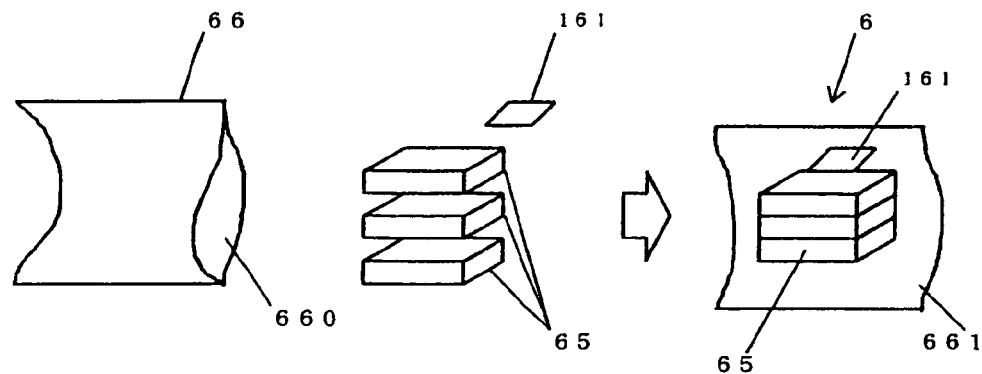
FIGS. 19(a)-19(c) are drawings showing, as a further example, integration of unique data of an ordinary product.
Figure 19:
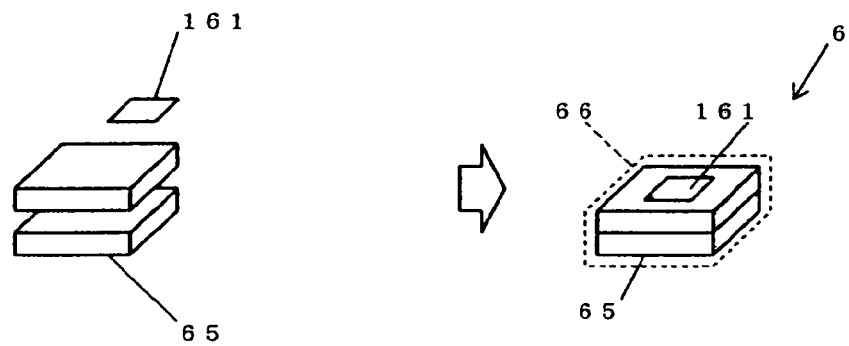
Figure 19:
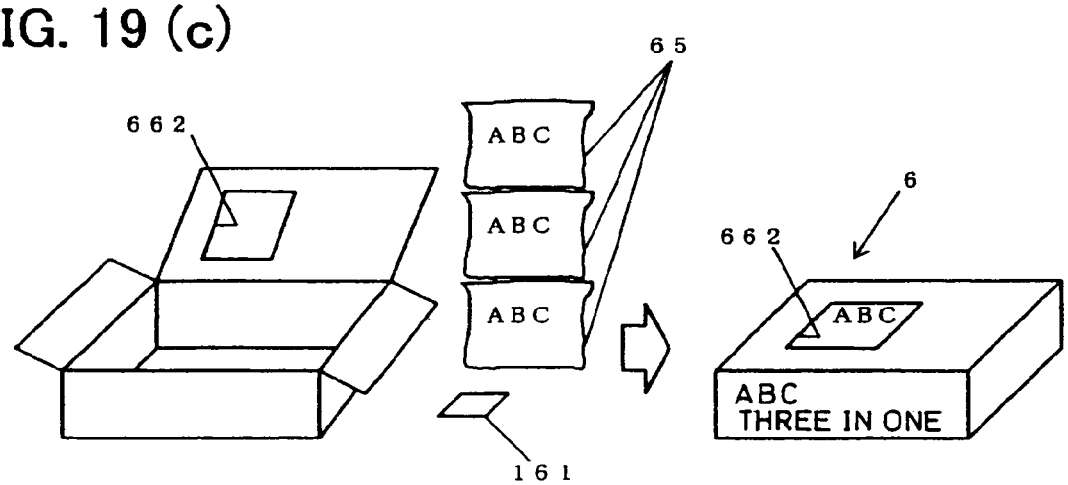

Further, some products 65 may be packed and wrapped in a single package. For example, 100 sheets of ordinary paper, 20 sheets of photographical paper, and sticker paper, all for use in inkjet printers, may be wrapped in a single package. In such cases, the packages will be handled as a new product to which a service management method is applied in accordance with the present invention. FIGS. 19(*a*)-19(*c*) show examples.

FIGS. 19(*a*)-19(*c*) correspond to FIGS. 17(*a*)-17(*c*) respectively.

So far, the wrapping material (packing and wrapping member) 66 was made at least partly transparent for easy recognition of the product 65, since the entire product 65 was repacked and rewrapped. If the product 65 is only partly wrapped, the product 65 is bare in the other parts; the wrapping material 66 is therefore not necessarily transparent.

First Data Storage Body

Example 1

The data storage body 161 preferably stores thereon or therein the unique data of the product. For example, in the example of FIG. 21(*b*), the data storage body 161 is an IC chip storing unique data in the form of electronic data.

A product model number and an ID number are recorded in advance in EEPROM, mask ROM, or other nonvolatile ROM in an IC chip or recorded by an easy method, such as a bar code. To eradicate unauthorized copies, the former is preferred, because copies or similar products are difficult to manufacture.

In the present invention, the IC chip basically does not have to record anything more than a product model number and an ID number for specific product.

The IC card or IC chip is not anything special. Commercially available memory and cards, i.e., compact flashes (CF), smart media (SM), memory sticks (MS), can be used.

The IC card or IC chip required in the present invention basically does not have to record anything more than a product model number and an ID number for specific product or be rewritable under typical circumstances. The IC card or IC chip therefore only needs limited memory capacity and functions, which helps a lot in trimming down the memory controller and other software, as well as hardware, in size.

First Data Storage Body

Example 2

Now, another data formation method will be described.

Reversible recording material can be used as the data storage body 161. For example, some methods, such as thermochromism, photochromism, and electrochromism, exploit heat, light, magnetism, or electricity to record and delete data.

Among them, heat-sensitive storage media which exploit heat energy are easy to handle and already commercially used in supermarkets and car parts shops. The storage media are advantageous in that they can be recycled and reused. Reversible heat-sensitive storage media can be divided into different types: examples include types that exploit coloring and decoloring properties of a leuco dye which is a electron-donating dye precursor, those that exploit scattering of light caused by phase separation or phase change of a polymer compound, and those that exploit optical changes between transparency and opacity (murkiness) caused by a variation in a refractive index.

The read-out means can be basically means for reversible heat-sensitive storage media.

First Data Storage Body

Example 3

Another data formation method will be described.

Figure 22:
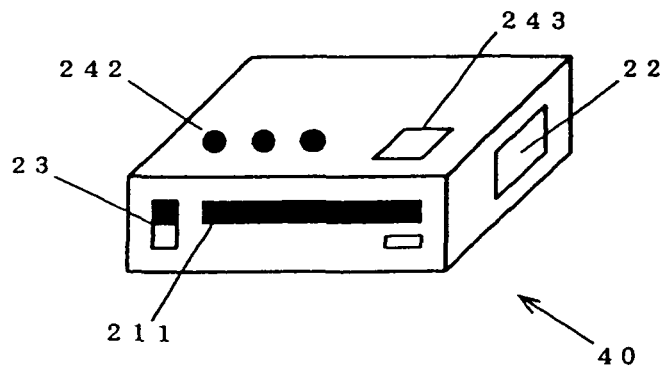
FIGS. 22(a)-22(c) are schematic perspective views showing, as a further example, a second terminal station for use in the service management network system of FIG. 15.
Figure 22:
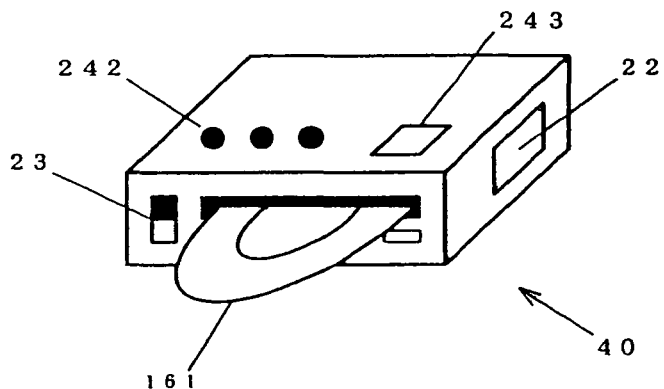
Figure 22:
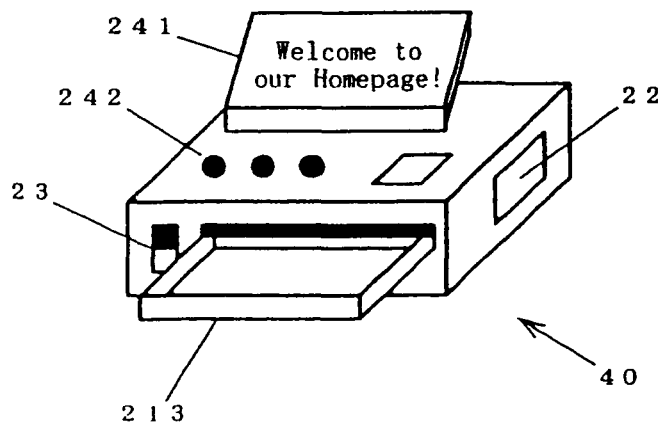

FIG. 22(*b*) shows a data storage body 161 that is a magneto-optical storage medium. The medium is already in commercial use as an MD for music and data storage, MD2, MO, etc. It can store data repeatedly and is reusable. The read-out means can be basically a driver and pickup for magneto-optical storage media and needs no modification. Therefore, putting the system on sale is relatively easy and requires no new investment in plant facilities.

The present invention requires only a small data-storage capacity which is much smaller than actual capacities of commercial used disks. Therefore, relatively small disks can be used. In this case, conventional pickups can be used with a small modification added to the design. The data storage body 161 needs to be small in size so that it can be attached to the product: 5-cm disks are preferred to 12-cm disks. Meanwhile, in the field of optical disks, studies are continuously conducted to reduce the size of the disk. The commercial system, if manufactured in compliance with these standards and sale phase, can be introduced and utilized with no special investment in plant facilities and leaves possibilities open for other applications.

The unused capacity of the data storage body 161 can be utilized to additionally store product lists for a next delivery, information on new products, and advertisement in advance.

First Data Storage Body

Example 4

In the foregoing, the unique data of a product was magnetically or electronically recorded in a magnetic card, an IC chip, or an IC card. A lower-cost, easier method will be now described.

The data storage body 161 will be described in detail. As shown in FIG. 18(*c*), the data storage body 161 is, for example, a 15 mm×50 mm medium on which a decimalized, nine-digit alphanumeric, such as A00000001 or A99999999, is printed. The alphanumeric is data by which the product-in-circulation 6, a consumable product, can be identified. The notation and the number of digits are not limited to this example. The data can be represented by binary alphanumeric or have fourteen digits. The data may be represented by numbers alone, not by alphabets. The storage medium may come in other dimensions: if there are a variety of products to which the medium is attached, the medium is preferably of such a size that match to the smallest product so that storage media of a single size can be packed together with products of various sizes and a single type of read-out means can be used with regardless of the size of the product.

The alphanumeric is now described in terms of meaning.

The leftmost digit is data to identify the type of product and can represent up to 26 distinct types by the use of 26 alphabets.

The numeric part is an ID number of, for example, the A-type product. Each piece of the product is assigned its unique number.

The data does not have to be printed: it may be recorded in various forms including punched holes, lumps and dents, and a bar code.

The medium may be made of paper, plastic, metal, or their composite. Paper media are disposable and can be manufactured at low cost and treated easily after disposal. Plastic ones are durable and therefore can be recycled or reused. Metal ones, being more durable and more suited to recycling and reuse, are environmentally friendly.

The thickness of the medium, although variable depending on the material and overall size, should be decided in view of the dimensions of various data cards already in actual use. If the thickness of a paper or plastic medium is too small, the medium may curl up.

The smaller the media, the smaller conventional consumable products can accommodate the media. However, if the media are too small, they are difficult to handle and easy to lose. Media smaller than a postage stamp would be impracticable.

Unique Data of Product

Example 1

Figure 20:
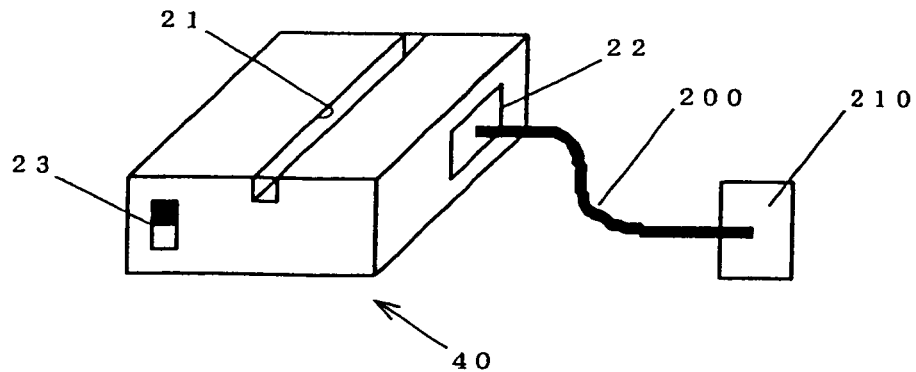
FIGS. 20 (a)-20(c) are schematic perspective views showing, as an example, a second terminal station for use in the service management network system of FIG. 15.
Figure 20:
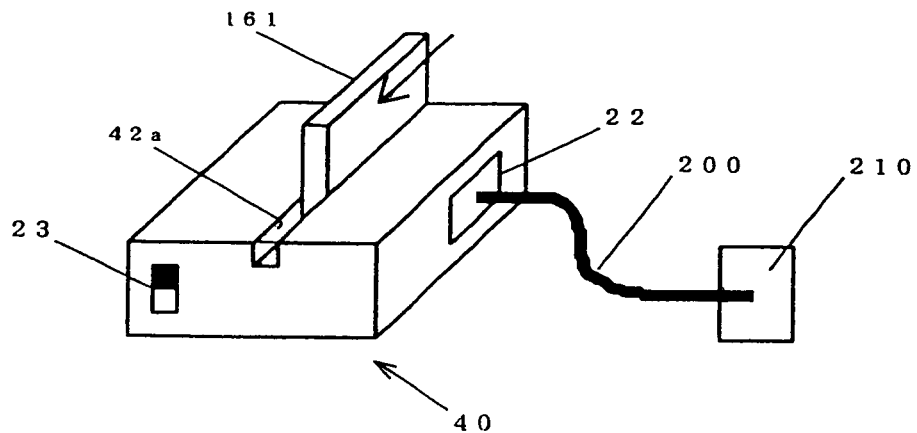
Figure 20:
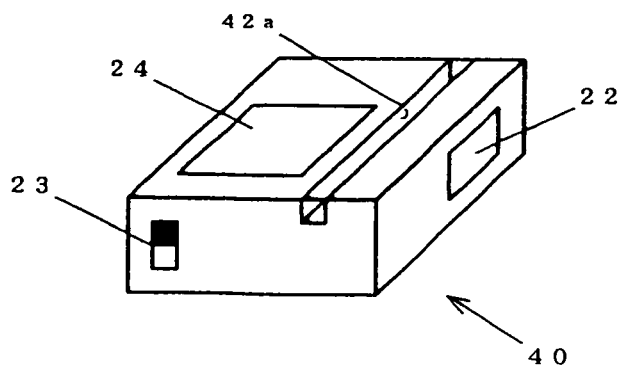

The data storage body 161 has preferably unique data of the product recorded thereon or therein. For example, the data storage body 161 is a magnetic card as shown in FIG. 20(*b*) and has unique data recorded magnetically.

In the present invention, the data storage body 161 basically records only a product model number and an ID number for that particular product.

Next, the recorded data is described in terms of its content. The magnetic card records data to identify the product 65 in the form of binarized 20-digit number: for example 0011 0001 0010 1101 1010. The number of digits may vary. Binary notation is used here in compliance with principles of memory; decimal notation might be used instead for better man-to-machine interface and would make it possible for general, non-expert people with no knowledge about binary numbers to handle the data represented by familiar decimal notation without binary-decimal conversion.

Now, the number is described in terms of its meaning.

The first four digits is data to identify the type of product 65 and in this case can represent up to 16 distinct types by the use of numbers from 0000 through 1111. For example, the first two digits represent product's top level groups and the next two digits represent groups of a next level. A possible combination of digits and groups of both levels is shown in Table 4.

TABLE 4

| Product Group | | First 4 Bits | |
|---|---|---|---|
| Top Level | Second Level | Top Level Group Bits | Second Level Group Bits |
| A6 IJ Paper | Ordinary Paper | 0 0 | 0 0 |
| A6 IJ Paper | Special Paper | 0 0 | 0 1 |
| A6 IJ Paper | Glossy Paper | 0 0 | 1 0 |
| A6 IJ Paper | Photographic Paper | 0 0 | 1 1 |
| A4 IJ Paper | Ordinary Paper | 0 1 | 0 0 |
| A4 IJ Paper | Special Paper | 0 1 | 0 1 |
| A4 IJ Paper | Glossy Paper | 0 1 | 1 0 |

TABLE 4-continued

| Product Group | | First 4 Bits | |
|---|---|---|---|
| Top Level | Second Level | Top Level Group Bits | Second Level Group Bits |
| A4 IJ Paper | Photographic Paper | 0 1 | 1 1 |
| A3 IJ Paper | Ordinary Paper | 1 0 | 0 0 |
| ... | ... | ... ... | ... ... |
| Postcard | Ordinary Paper | 1 1 | 0 0 |
| ... | ... | ... ... | ... ... |

To be more specific, the top level group bits are designated to stipulate paper sizes, and the second level group bits are designated to stipulate paper types.

For example, the top level group bits "00" represent a product 65 that is A6-size inkjet paper, and there are prepared four sets of second level group bits to further categorize the product 65 under these top level group bits: "00," "01," "10," and "11" that represent ordinary paper, special paper, glossy paper, and photographic paper respectively.

Similarly, the top level group bits "01" represent that a product 65 that is A4-size inkjet paper, and there are prepared four sets of second level group bits to further categorize the product 65 under these top level group bits: "00," "01," "10," and "11" that represent ordinary paper, special paper, glossy paper, and photographic paper respectively.

The top level group bits "11" represent a product 65 that is inkjet paper of a postcard size with postcode boxes, etc. printed on the back side, and there are prepared four sets of second level group bits to further categorize the product 65 under these top level group bits: "00," "01," "10," and "11" that represent ordinary paper, special paper, glossy paper, and photographic paper respectively.

The remaining sixteen digits, in the foregoing example, are an ID number of the product identified by the model number 0011 (A6-size photographic inkjet paper). Each piece of the product is assigned its unique number selected from 65536 numbers of 0000 0000 0000 0000 through 1111 1111 1111 1111.

Thus, if the contract signer 1 buys two pieces of the product 65, or two packs of A6-size photographic inkjet paper, the two pieces or packs are assigned different ID numbers. Thus, the service provider 10 can obtain precise purchase data based on ID number data.

If sticker paper, photocopy paper, or OHP transparencies for use with inkjet printer are added as a product 65, the top level group should be assigned three or more bits.

A bit or bits may be allocated to distinguish between packs of paper containing different numbers of sheets, for example, a pack of 20 sheets of photographic paper and a pack of 50 sheets of photographic paper.

Unique Data of Product

Example 2

So far, we have dealt with inkjet printer paper of a single manufacturer. Different models of even a single manufacturer require suitable paper of different properties. Also, there is special paper suited for a certain image forming method, such as special paper for use with video printers. The present invention is easy to adapt to these applications.

In addition, as will be detailed below, the present invention can handle inkjet printer paper of several manufacturers at the same time.

The data storage body 161 records data to identify the product 65 in the form of binarized 24-digit number: for example 000011 000101 011010 101101. The number of digits may vary. The 24-digit number is now described in terms of meaning.

The first six digits are data to identify the type of product 65 and in this case can represent up to 64 distinct types by the use of numbers from 000000 through 111111. For example, the first two digits represent product's top level groups, the next two digits represent second level groups, and the last two digits represent third level groups. A possible combination of digits and groups of three levels is shown in Table 5.

TABLE 5

| Product Group | | | First 6 Bits | | | | | |
|---|---|---|---|---|---|---|---|---|
| | | | Top Level Group Bits | | Second Level Group Bits | | Third Level Group Bits | |
| Top Level | Second Level | Third Level | | | | | | |
| A Corp. IJ Paper | A6 | Ordinary Paper | 0 | 0 | 0 | 0 | 0 | 0 |
| A Corp. IJ Paper | A6 | Photographic Paper | 0 | 0 | 0 | 0 | 0 | 1 |
| A Corp. IJ Paper | A6 | Special Paper | 0 | 0 | 0 | 0 | 1 | 0 |
| A Corp. IJ Paper | A6 | Glossy Paper | 0 | 0 | 0 | 0 | 1 | 1 |
| A Corp. IJ Paper | A6 | Ordinary Paper | 0 | 0 | 0 | 1 | 0 | 0 |
| ... | ... | ... | ... | ... | ... | ... | ... | ... |
| A Corp. IJ Paper | B5 | Ordinary Paper | 0 | 0 | 1 | 0 | 0 | 0 |
| ... | ... | ... | ... | ... | ... | ... | ... | ... |
| A Corp. IJ Paper | Postcard | Ordinary Paper | 0 | 0 | 1 | 1 | 0 | 0 |
| ... | ... | ... | ... | ... | ... | ... | ... | ... |
| B Corp. IJ Paper | A6 | Ordinary Paper | 0 | 1 | 0 | 0 | 0 | 0 |
| ... | ... | ... | ... | ... | ... | ... | ... | ... |
| C Corp. IJ Paper | A6 | Ordinary Paper | 1 | 0 | 0 | 0 | 0 | 0 |
| ... | ... | ... | ... | ... | ... | ... | ... | ... |
| D Corp. IJ Paper | A6 | Ordinary Paper | 1 | 1 | 0 | 0 | 0 | 0 |
| ... | ... | ... | ... | ... | ... | ... | ... | ... |
| D Corp. IJ Paper | Postcard | Glossy Paper | 1 | 1 | 1 | 1 | 1 | 1 |

To be more specific, the top level group bits are designated to stipulate manufacturer data, the second level group bits are designated to stipulate paper sizes, and the third level group bits are designated to stipulate paper types.

For example, the top level group bits "00" represent a product 65 that is inkjet paper of A Corp., and there are prepared four sets of second level group bits to further categorize the product 65 under these top level group bits: "00," "01," "10," and "11" that represent A6, A4, B5, and postcard sizes respectively. Further, there are prepared four sets of third level group bits to further categorize the product 65 under these second level group bits: "00," "01," "10," and "11" that represent ordinary paper, photographic paper, special paper, and glossy paper respectively.

Similarly, the top level group bits "01" represent a product 65 that is inkjet paper of B Corp., and there are prepared four sets of second level group bits to further categorize the product 65 under these top level group bits: "00," "01," "10," and "11" that represent A6, A4, A3, and postcard sizes respectively. Further, there are prepared four sets of third level group bits to further categorize the product 65 under these second level group bits: "00," "01," "10," and "11" that represent ordinary paper, photographic paper, special paper, and glossy paper respectively.

The top level group bits "10" and "11" represent products 65 that are inkjet paper of C Corp. and D Corp. respectively.

The remaining digits, in the foregoing example, are an ID number of the product 65 identified by the model number 000011 (A6-size inkjet, glossy paper of A Corp.).

Unique Data of Product

Example 3

Other contents of recorded data are now described. The data storage body 161 records data to identify the product 65 in the form of binarized 20-digit number: for example, 0011 0001 0010 1101 1010. The number of digits may vary.

The 20-digit number is now described in terms of meaning.

The first four digits are data to identify the type of product 65 and in this case can represent up to 16 distinct types by the use of numbers from 0000 through 1111. For example, the first two digits represent product's top level groups and the next two digits represent groups of a next level. A possible combination of digits and groups of both levels is shown in Table 6.

TABLE 6

| Product Group | | First 4 Bits | |
|---|---|---|---|
| | | Top Level Group Bits | Second Level Group Bits |
| Top Level | Second Level | | |
| A Corp. Cartridge | Model a1 | 0 0 | 0 0 |
| A Corp. Cartridge | Model a2 | 0 0 | 0 1 |
| A Corp. Cartridge | Model a3 | 0 0 | 1 0 |
| A Corp. Cartridge | Model a4 | 0 0 | 1 1 |
| B Corp. Cartridge | Model b1 | 0 1 | 0 0 |
| B Corp. Cartridge | Model b2 | 0 1 | 0 1 |
| B Corp. Cartridge | Model b3 | 0 1 | 1 0 |
| B Corp. Cartridge | Model b4 | 0 1 | 1 1 |
| C Corp. Cartridge | Model c1 | 1 0 | 0 0 |
| ... | ... | ... | ... |
| D Corp. Cartridge | Model d1 | 1 1 | 0 0 |
| ... | ... | ... | ... |

To be more specific, the product 65 is an ink cartridge for use in an inkjet printer. The top level group bits are designated to stipulate manufacturer data, and the second level group bits are designated to stipulate model data.

For example, the top level group bits "00" represent a product 65 that is an ink cartridge for use in an inkjet printer of A Corp., and there are prepared four sets of second level group bits to further categorize the product 65 under these top level group bits: "00," "01," "10," and "11" that represent model a1, model a2, model a3, and model a4 respectively.

Similarly, the top level group bits "01" represent a product that is an ink cartridge for use in an inkjet printer of B Corp., and there are prepared four sets of second level group bits to further categorize the product 65 under these top level group bits: "00," "01," "10," and "11" that represent model a1, model a2, model a3, and model a4 respectively.

The top level group bits "10" and "11" represent products that are ink cartridges for use in an inkjet printer of C Corp. and D Corp. respectively.

Cartridges come in various configurations, including (i) those containing the primary colors and black in one cartridge, (ii) those containing the primary colors in one cartridge and black in another, and (iii) those containing the primary colors in individual cartridges and black in another. For configurations (ii) and (iii), more digits are allocated to the second level group bits to distinguish between colors.

The remaining 16 digits are, in the foregoing example, an ID number of a product identified by a model number 0011.

Unique Data of Product

Example 4

Other contents of recorded data are now described. The data storage body 161 records data to identify the product 65 in the form of binarized 20-digit number: for example, 0011 0001 0010 1101 1010. The number of digits may vary.

The 20-digit number is now described in terms of meaning.

The first four digits are data to identify the type of product 65 and in this case can represent up to 16 distinct types by the use of numbers from 0000 through 1111. For example, the first two digits represent product's top level groups and the next two digits represent groups of a next level. A possible combination of digits and groups of both levels is shown in Table 7.

TABLE 7

| Product Group | | First 4 Bits | |
|---|---|---|---|
| Top Level | Second Level | Top Level Group Bits | Second Level Group Bits |
| CD-ROM | Music | 0 0 | 0 0 |
| CD-ROM | Games | 0 0 | 0 1 |
| CD-ROM | General | 0 0 | 1 0 |
| CD-ROM | Business | 0 0 | 1 1 |
| DVD | Movies | 0 1 | 0 0 |
| DVD | Car Navigation | 0 1 | 0 1 |
| DVD | Database | 0 1 | 1 0 |
| ... | ... | ... ... | ... ... |
| VHS | Movies | 1 0 | 0 0 |
| ... | ... | ... ... | ... ... |
| Unrecorded | New VHS Tape | 1 1 | 0 0 |
| ... | ... | ... ... | ... ... |

To be more specific, the top level group bits "00" represent a product that is a CD-ROM, and there are prepared four sets of second level group bits to further categorize the product under these top level group bits: "00," "01," "10," and "11" that represent music, game applications, general applications, and business applications respectively.

Similarly, the top level group bits "01" represent a product that is a DVD-ROM, and there are prepared four sets of second level group bits to further categorize the product 65 under these top level group bits: "00," "01," "10," and "11" that represent movies, car navigation software, and encyclopedia and other database, and so on respectively.

The top level group bits "10" and "11" represent products that are a video tape and a new tape of VHS format respectively.

The top level groups are not limited to the foregoing example, but may include MD and other magneto-optical disks, removable hard drive disks, floppy disks, super disks and other magnetic disks, rewritable DVDs, rewritable CDs, and PDs (Phase Change Optical Disks) and other optical disks. Third level groups may be used to further categorize the second level groups.

The remaining 16 digits are, in the foregoing example, an ID number of a product identified by a model number 0011. Each piece of the product is assigned its unique number selected from 65536 numbers of 0000 0000 0000 0000 through 1111 1111 1111 1111.

Second Terminal Station 40

Example 1

FIGS. 20(a)-20(c) shows an example of a second terminal station 40 provided to the contract signer 1 when a magnetic card is used as the data storage body 161. The second terminal station 40 is provided with a slit section 42a into which the magnetic card is inserted. As the magnetic card is moved deliberately along the slit section 42a as shown in FIG. 20(b), its data is read out by a fixed head section (not shown) provided in the slit section 42a of read-out device.

The data read out is transmitted externally from communications means composed primarily of a transmitter/receiver section 41, a communications connector 22, a communications cable 200, and a network connector 210 and fed via the network 20 to the communications section 121 of the terminal station 12.

Alternatively, the data storage body 161 may be fixed instead of the read-out device with the head section disposed so as to be movable for data read-out.

Second Terminal Station 40

Example 2

Other configurations of the second terminal station 40 will be now described in reference to FIGS. 21(a) and 21(b).

FIGS. 21(a) and 21(b) show an example of a memory card used as the data storage body 161. The second terminal station 40 is provided with a connector section 212 which connects to the memory card. Data is read out electrically through the connection of the connector section 212 to the memory card.

The readout data is externally transmitted by communications means composed of a transmitter/receiver section 41, a communications connector 22, a communications cable 200, a network connector 210, etc.

There are provided a submission button 243 to instruct transmission and an eject button to eject the memory card.

A display section 242 may be provided to display, for example, an error message.

The display section 242, thus provided, can notify the user whether the data readout and transmission has been completed without an error. The user can therefore carry out the process, while feeling a sense of security.

Second Terminal Station 40

Example 3

Another example of the second terminal station 40 will be now described in reference to FIGS. 22(a)-22(c)

FIG. 22(a)-22(c) shows an example where the data storage body 161 is an optical disk. The head in the read-out device reads out data from the optical disk, while the optical disk is rotating. Basically, the second terminal station 40 here is an optical disk drive device and can be constructed as in either FIG. 22(a) or 22(c), depending on how to insert the optical disk.

FIGS. 22(a) and 22(b) show constructions where the optical disk as the data storage body 161 is inserted in a disk insertion slot 211. Since this construction does not include a loading tray 213 as does the construction shown in FIG. 22(c), it have several advances including a quick loading, increased reliability of the device, and low cost because of fewer components used.

The method of FIG. 22(c) requires a tray 213 to house an optical disk and has several advantages in comparison with the method of FIG. 22(a), including better protection against dust and versatility for disks of various diameters.

In the present invention, the data storage body 161 is preferably rewritable for recycling purposes. However, the second terminal station 40 only needs to read data stored in the data storage body 161; no other functions are essential. The pickup in the second terminal station 40 should be readout only and does not need to have any extra functions to prevent undesirable writing or erasure of data.

For example, no magnetic circuit is required if the data storage body 161 is a magneto-optical disk in which data is stored by magnetic modulation. In a case of a phase-change type of optical disk, laser with a relatively low output power is sufficient, because it only has to perform reproduction, not writing or erasure; The lower output improves reliability and leads to cost reduction. The control circuit is less complex, because it only has to execute reproduction.

Disk-type data storage bodies 161 are not limited to magneto-optical disks and may be magnetic disks, phase-change types of optical disks, etc. Further, if the data storage body does not need to be recycled, it may be a CD-ROM, CD-R, or another similar medium.

Second Terminal Station 40

Example 4

As shown in FIGS. 20(c), 22(c), and 23(a)-23(c), the second terminal station 40 that is provided for a consumer includes a data storage body 161 and may additionally include a read-out section for reading data stored in the data storage body 161, an interface section for communications with the service provider 10, and display sections 24, 241 composed of, for example, a liquid crystal display.

By configuring the display sections 24, 241 from liquid crystal displays, etc. in this manner, an increased amount of data can be quickly displayed. On top of the same advantage as those of the foregoing embodiment, data can be downloaded and displayed over the Internet.

For example, the second terminal station 40, if provided with a browser function, can display HTML (HyperText Markup Language) documents that are used in the WWW (World Wide Web). A possible document content is a list of product-in-circulations 6 that can be delivered to the contract signer 1. A list used in typical online shopping can be used for this purpose. For example, the contract signer 1 can specify which product(s)-in-circulation he/she wishes to be delivered by somehow selecting the product(s) from the list.

Such a second terminal station 40 is also beneficial to the service provider 10, who can provide those HTML documents that are written for users accessing from personal computers to contract signers 1 without modifying the documents and does not have to prepare files separately. The browser function may be a unique variation of a typical browser used on a personal computer (PC) with some existent features removed or tweaked and new, unique features added; the elimination of useless features reduce software workload and leads to more compact hardware, and the addition of unique features increase convenience.

The second terminal station 40 is intended to be a data terminal station that the user can use without deep knowledge about an operating system. The second terminal station 40 starts up quickly, requires no special knowledge or training to use, comes with limited functions, but in a small size, consumes little power, and provides much more advantages to the user, in comparison with typical personal computers.

Figure 23:
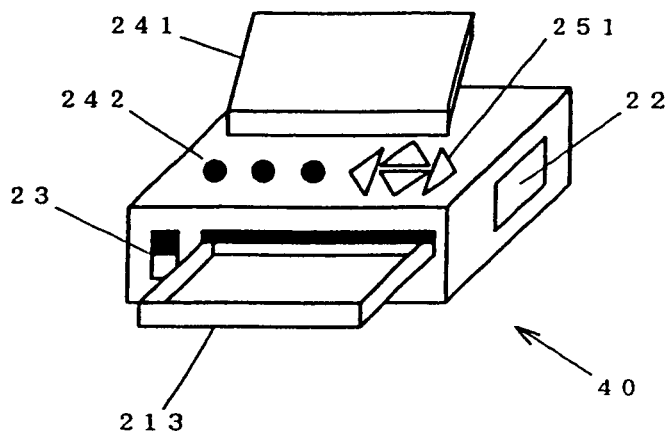
FIGS. 23(a)-23(c) are schematic perspective views showing, as a still another example, a second terminal station for use in the service management network system of FIG. 15.
Figure 23:
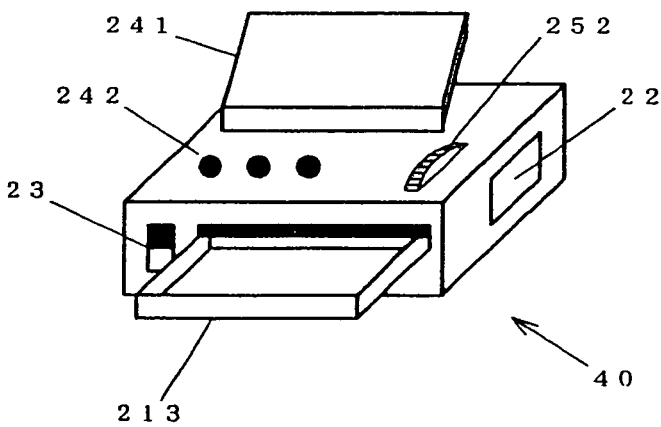
Figure 23:
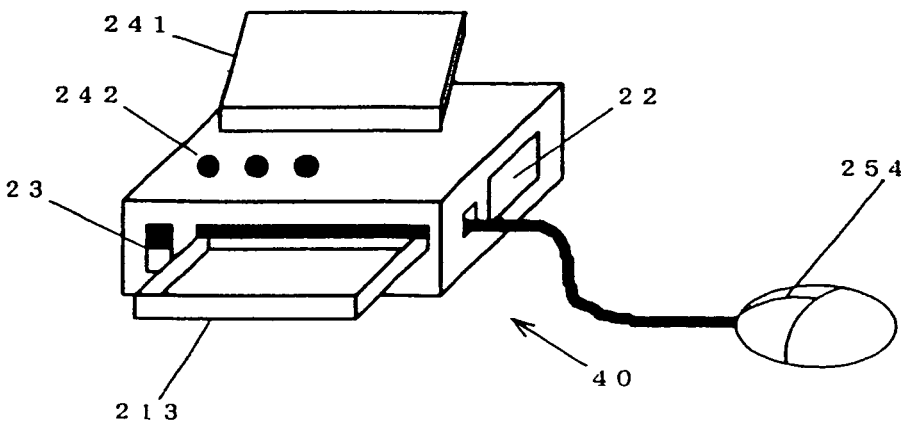

A push button 251 as shown in FIG. 23(a) and/or a dial button 252 as shown in FIG. 23(b) may be provided as a selection section to scroll and switch pages (both forward and backward) and send a command (click) in browsing. Alternatively, a pointing device of a electrostatic capacitance type may be provided in advance. A further alternative is to provide a connector for a mouse and other input devices 254 as shown in FIG. 23(c).

Further, a keyboard or a connector for an external keyboard may be provided in advance to allow entering URLs (Uniform Resource Locators) and other data to connect to the Internet.

The foregoing input means serves as a selection section to select desired product-in-circulations from a list of product-in-circulations that are available for delivery.

A display of management data of a contract signer 1 can be produced too. Specifically, data, for example, monthly accounts, of the contract signer 1 is stored as a database in the second terminal station 40; the contract signer 1 can obtain and display current monthly accounts by accessing the file. The contract signer 1 can thereby confirm current data in real time and does not have to have invoices or bills printed on paper, which promotes elimination of paper from office.

A product list for a next delivery may be sent via a network too. Compared to distributing catalogues, this is beneficial to the service provider 10 in that the service provider 10 can cut down on production cost and time because of elimination of paper edition of such a list and distribute latest information quickly and to the contract signer 1 in that the contract signer 1 can make a request quickly and does not have to keep the paper edition.

Second Terminal Station 40

Example 5

The present embodiment differs from the previous embodiment in that the second terminal station 40 has an email function, as well as, or in place of, the browser function. The data storage body 161 here is configured identically to example 2 or 4 of the data storage body 161 and have advantages as immediately below when the data formed in the data storage body 161 is such that it can be directly recognized by humans.

If, for example, only the read-out section 42 in the second terminal station 40 has gone out of order, data on the contract signer 1, such as the ID number and products purchased, can be transmitted to the service provider 10 by manual operation.

Second Terminal Station 40

Example 6

The second terminal station 40 of the present embodiment differs from the one of the previous embodiment in that the former is provided with a large volume hard disk and a TV tuner function. The large volume hard disk may be either a built-in type or an externally connected type. The provision enables the second terminal station 40 to receive and record television broadcasting and act as a set-top box or home server.

Audio output can be provided by an audio board and/or built-in speakers. Alternatively, audio and/or speaker jacks are prepared to establish connection to an external amplifier and speakers.

If cable television is available, a single cable can be used both to receive TV broadcasting and to connect to the Internet.

Second Terminal Station 40

Example 7

Figure 24:
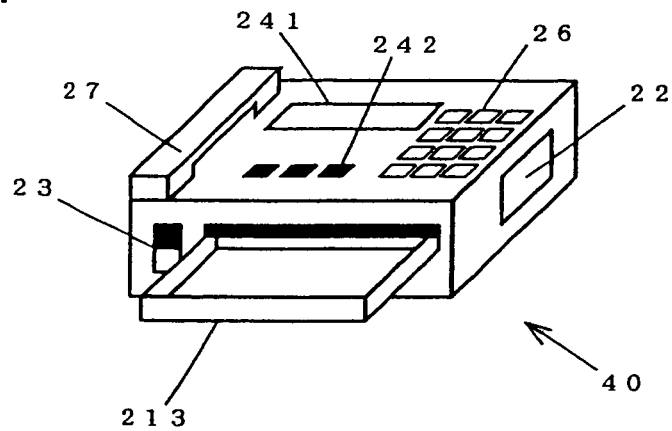
FIG. 24 is a schematic perspective view showing, as another example, a second terminal station for use in the service management network system of FIG. 15.

The second terminal station 40 shown in FIG. 24 has a telephone function in addition to the basic configuration of FIG. 15 and comes complete with necessary telephony functions and a keyboard 26 to allow telephone number entry.

Similarly to example 5, when the data formed in the data storage body 161 is such that it can be directly recognized by humans, and for example, only the read-out section in the second terminal station 40 has gone out of order, data on the contract signer 1, such as the ID number and products purchased, can be transmitted to the service provider 10 by manual operation.

It is possible to configure the second terminal station 40 so that the same operation can be carried out through two or more auxiliary telephones in the same manner as through typical conventional, non-mobile phones.

Second Terminal Station 40

Example 8

Figure 25:
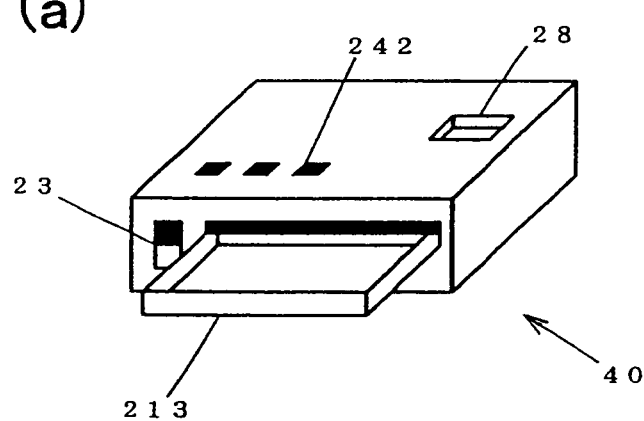
FIGS. 25(a) and 25(b) are schematic perspective views showing, as another example, a second terminal station for use in the service management network system of FIG. 15.
Figure 25:
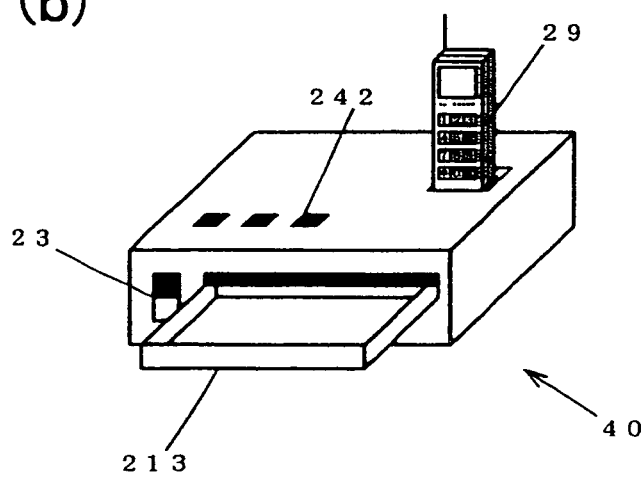

The second terminal station 40 shown in FIGS. 25(*a*) and 25(*b*) has an interface section 28 for connection to a mobile phone (or so-called personal handy phone) 29 in addition to the basic configuration of FIG. 15. Necessary telephony functions are provided in the mobile phone 29 and can be omitted in the second terminal station 40. So, the second terminal station 40 basically only has to read data from the data storage body 161 and does not need display sections 241, 242.

More details are now given.

(Step 1) As the data storage body 161 is installed in the terminal station 40, the controller section 43 (see FIG. 15) causes a head section, drive section, etc. to read out data from the data storage body 161, and the read-out section stands by.

(Step 2) As the second terminal station 40 gets connected to a mobile phone 29 and receives from the mobile phone 29 a request signal to read out data, the controller section 43 reads out data from the data storage body 161 and causes transmission of the read-out data, as well as unique data of the terminal station 40, to the mobile phone 29 to occur. The display section 242 may be used to show whether connection has been successfully made to the mobile phone 29 and to display current status or an error message for (electrically) failed connection.

(Step 3) The mobile phone 29 stores in memory the data transmitted from the second terminal station 40.

(Step 4) The mobile phone 29 makes a connection to the terminal station 12 over a network.

(Step 5) The mobile phone 29 transmits the data stored in the built-in memory to the terminal station 12.

In step 1, if the second terminal station 40 has separate built-in memory means, the data readout can be stored in the memory. When this is the case, the controller section 43 causes retransmission of the stored data to the mobile phone 29 upon the establishment of a connection between the second terminal station 40 and the mobile phone 29. Further, the display section 242 can produce a display showing whether the memory means has the data stored therein.

Step 3 and step 4 may be executed in reverse order.

The data transmitted together with the data read out from the data storage body 161 is not limited to the unique data of the second terminal station 40 and may be user data (contract signer ID) allocated to the contract signer 1 by the service provider 10. In this case, the second terminal station 40 needs to include nonvolatile memory to store the user data, on top of the basic configuration.

The above configurations have an advantage that if it is only the telephony functions that have become outdated and obsolete because of technological development, the contract signer 1 can continue using the second terminal station 40 as such by only replacing the mobile phone. Conversely, if the second terminal station 40 becomes outdated first, the contract signer 1 only needs to replace the second terminal station 40 and can continue using the mobile phone 29 as such.

Further, if telephony functions are arranged separately, the contract signer 1 can make the best use out of the mobility of the mobile phone 29.

(Sales System: Registration)

The following will describe how the system operates.

The second terminal station 40, provided to the contract signer 1, is connected and set up to communicate externally. As communications become ready, the model number, unique ID number, and other data of the second terminal station 40 are sent to the terminal station 12 of the service provider 10. Because of this step, the terminal station 12 can automatically detect the model of the second terminal station 40 of the contract signer 1 and single out that contract signer 1 using a model data table and an associated contract signer data table.

Alternatively, contract signer IDs are provided separately to all contract signers, and the contract signer 1 transmits its ID to the terminal station 12 together with other data so that the terminal station can identify the contract signer 1. FIG. 30 shows an example of the terminal station table and the customer table managed in the terminal station 12.

The terminal station table, as shown in the left-hand side of the figure, is a table establishing one-to-one or one-to-many relations between terminal station IDs (unique data of machines) and contract signer IDs (unique data of contract signers). The customer table, as shown in the right-hand side of the figure, is a table establishing one-to-one relations between contract signer IDs and general data of contract signers, such as names. The two tables can be combined based on contract signer IDs, a common key. For example, by searching the customer table with the contract signer ID as the key word, it can be found out that the name of the contract signer 1 who is identified by the terminal station ID "000001" is "Mr. S. Smith."

As shown in FIG. 26, a management table is prepared for each contract signer 1 in the terminal station 12 of the service provider 10. At this stage, as shown in FIG. 26, no data has been entered in the terminal station 12 of the service provider 10.

Subsequently, the service provider 10 collects data about all the products delivered in advance to the contract signer 1 and stores the data in the terminal station 12 of the service provider 10 immediately or later.

The data collecting method was already described and detailed description is omitted here.

The terminal station 12 of the service provider 10 enters to the management table the data of products 65 delivered to the contract signer 1 in reference to the incoming data as shown in FIG. 27. In FIG. 27, product types and other data are displayed in codes, and also supplementarily in actual product names, etc., for a better user interface. At this stage, the purchase status cells all show "n/a."

This concludes an initial setup and registration.

(Sales System: Purchase)

Now, the following will describe operations when a product is purchased.

The contract signer 1 breaks the packing of the product 65 that he/she has decided to buy and installs the data storage body 161 into the second terminal station 40. The data storage body 161 cannot be detached from the product 65 without breaking the packing. The present embodiment has a feature that the data storage body 161, storing unique data to identify the product 65, is packed separately from the product 65, but in the same packing or wrapping material. Put differently, the data storage body 161 is placed inside the same the packing or wrapping material as the product 65 to confirm breaking the packing, as well as to identify the product 65.

The packing or wrapping material is a different thing from the packing or wrapping material for the product 65, and breaking the former packing or wrapping material does not cost the product 65 its commercial value.

The second terminal station 40, which is already connected and set up to be ready for external communications, transmits product data formed in the installed data storage body 161 to the terminal station 12 of the service provider 10.

In the terminal station 12 of the service provider 10, the arithmetic processing section 122 identifies the contract signer 1 and the product 65 based on the incoming data, and as shown in FIG. 28 detects the opening (i.e., purchase) of the product 65 by the contract signer 1 to update the data appearing in the corresponding purchase status cells in the management table from "NEW (SPARE)" to "Purchased."

The contract signer 1, who has a contract with the service provider 10, purchases what he/she needs from the delivered products 65. The purchase is confirmed by opening the product 65 the contract signer 1 wants to purchase, reading the data of the data storage body 161, which is available only after breaking the packing, with the second terminal station 40, and registering the data in the terminal station 12 of the service provider 10 over a network, i.e., storing in the management table.

(Sales System: Accounting)

The following describes an accounting method. FIG. 31 shows lists of consumables to be subjected to accounting. Each period of accounting is, for example, one month. The lists of consumables are created, for example, based on the management table by clipping data of those products which were used during a one-month period before the closing date of accounting (15th day of the month in the present embodiment). Here, the products which are clipped are those which are indicated by "PURCHASED" in the cells under "PURCHASE STATUS" in the management table and which have dates of installation within the one-month period before the closing date of accounting.

FIG. 31 is a list for the past three months.

As would be clear from the foregoing, the present invention has a feature that the contract signer 1 is charged only for those products 65 that are actually purchased for use; the contract signer 1 is not charged for those that are not yet used. Thus, the contract signer 1 can use the products 65 immediately when they are necessary, reduce advance payment and unnecessary inventory and use the product 65, no matter when the contract signer needs it, without running out of consumable products or going through bothersome management.

(Sales System: Collection Unused Products and Delivery of New Products)

The following will describe a system to collect unused products and deliver new products.

The service provider 10 collects unpurchased products 65 among those delivered in the previous month and delivers new products of this month once per month, on a fixed data and time, in accordance with the period of accounting.

FIG. 29 shows a case in which every $1^{st}$ day of the month is designated a collection and delivery day. Among the products 65 delivered in the previous month, i.e., March 1, those that were not purchased by the contract signer 1 are specified. The specification is performed by the arithmetic processing section 122 searching the management table of FIG. 29 for those products 65 that meets both condition 1 that the data stored in the purchase status cell be "NEW (SPARE)" and condition 2 that the date of delivery fall in a collection period.

However, if every $1^{st}$ day of the month is designated a collection day, condition 2 is unnecessary. Alternatively, the service provider 10 can specify products 65 to be collected in the on-screen management table of FIG. 29 displayed by the output section 125 using a pointing device, etc.

By the foregoing process to specify the products 65 to be collected, Nos. 2, 3, 4 are specified, for example. Either the arithmetic processing section 122 or the service provider 10 instructs the dispatch section of products 65 to collect the product 65, Nos. 2, 3, 4. Thus, the product 65, Nos. 2, 3, 4 are collected on April 1. As collection data is entered in the terminal station 12 of the service provider 10, as shown in the figure, the data appears in date-of-collection cells.

Together with the collection of unpurchased products, new products, Nos. 6, 7, 8 for April are delivered to the contract signer 1. Settings and registration upon delivery are done as in the foregoing, and description is omitted here. As data upon new delivery is entered to the terminal station 12 of the service provider 10, as shown in the figure, the data appears in date-of-delivery cells.

The service provider 10 may select new products by making a prediction or suggestion based on the purchase history of the contract signer 1 and also in view of additional data, such as family members. As already described in the foregoing, the contract signer 1 may select product 65 to his/her likings from a pre-distributed list of all the products that can be delivered and inform the service provider 10. The product list may be stored in the magneto-optical disk shown in example 1 of the data storage body 161, distributed as a catalogue, or posted so that it is accessible over the Internet. By these methods, the service provider 10 can provide products 65 that suit the needs of the contract signer 1.

If unpurchased products from the previous month are collected on the same day as the delivery of new products for this month, the collection and delivery jobs are done simultaneously and therefore preferable.

Collection of Unused Products

Example 1

The sales system of the present invention involves two kind of services: delivery of new products 65 and collection of unpurchased products 65.

In view of current logistics systems, these services are offered through express mail and parcel services. Further, visiting a bunch of contract signers 1 and doing both delivering and collecting products 65 at the same time improves efficiency.

In such a case, if the products collected from and newly delivered to a contract signer 1 and those collected from and newly delivered to another contract signer 1 are mixed chaotically, the delivery and collection is a time-consuming process. Further, if products 65 differ from one contract signer 1 to the other, the number of products that the service provider 10 must handle grow tremendously, and precise management of products 65 will go beyond abilities of servicemen actually doing the delivery and collection.

If only one container is used for each contract signer 1, and products for delivery and collection are mixed, they cannot be discriminated from one another quickly or doing so is time-consuming. For example, when both the delivery products and the collection products are optical disks, comparing titles and other data to the contents registered in the terminal station 12 of the service provider would ensure correct delivery and collection. However, such an environment is difficult to create, and the comparison is time-consuming. Before the registration process, each product is either collected or delivered depending on the presence of the second data storage body 7. Once the registration process is over, servicemen cannot precisely distinguish between collected products and delivered products.

To solve these problems, the present invention has a feature that two dedicated containers are prepared for each contract signer 1, one for delivery and the other for collection. Thus, unexpected mixture of collected products and newly delivered products is avoided.

Based on advance requests, etc. from contract signers 1, the service provider 10 puts the products 65 in individual new delivery containers of the contract signers 1 at a product distribution base. At the place of the contract signer 1, the service person delivers the products, unpacked from the new delivery container, to the contract signer 1.

The contract signer 1 puts in advance unpurchased products 65 in the container delivered last time (or last month if a collection is scheduled every month). Then, the contract signer 1 receives a new delivery container from the service person and gives back the container containing unpurchased products 65 to the service person on a new delivery and collection day.

To ensure accuracy, data including at least the date of delivery, and optionally the scheduled date of collection, should be formed in each container. This data enables it to distinguish between delivery containers and collection containers at the date and time of this new delivery and collection.

Alternatively, containers' colors and delivery months may be associated. For example, if a collection is scheduled every month, those containers that are delivered in even-numbered months are assigned the blue, and those containers that are delivered in odd-numbered months are assigned the gray. The coloring enables instantaneous recognition.

Collection of Unused Products

Example 2

The present embodiment is closely related to the previous embodiment and provides structures of delivery vehicle carrying the containers and methods of loading the containers in the delivery vehicle.

The delivery vehicle has a cargo compartment divided or separated into two parts, one for new delivery containers and the other for collection containers.

The structure further improves on the delivery of new products and collection of old products both in efficiency and accuracy.

As described in the foregoing, according to the present invention, the machine user is charged not for all the consumable products delivered to prevent a situation where the machine cannot operate when consumable products have run out, but only for the actually used consumable products. Therefore, the contract signer can replace consumable products without stocking up unnecessary inventory.

The product delivery job for advance delivery and the accounting job does not have to be done in the same period. The product delivery job is scheduled and done based on actual consumption, whilst the accounting job can be done regularly, for example, every month, irrespective of the product delivery job. The two jobs are thereby scheduled and done for maximum efficiency and convenience.

According to the present invention, the machine user is charged not for all the consumable products delivered to the contract signer to prevent a situation where general consumable products not related to operation of any machine have run out, but only for the actually used consumable products. Therefore, the contract signer can select necessary consumable products for use from those delivered in advance without bearing unnecessary payment. Further, if the consumable products delivered in advance reflect requests from the contract signer, the contract signer can further reduce products in stock.

A service management method in accordance with the present invention, as described in the foregoing, is characterized in that it includes the steps of:

registering data of product-in-circulations delivered to a service receiver in a terminal station (for example, a management table in a computer);

obtaining current status of the product-in-circulations from the service receiver (for example, entering into the management table);

recognizing use as a purchase action when the current status shows data considered to be use of the product-in-circulations (in other words, specifying product-in-circulations considered to have been purchased by the service receiver in the management table to which the current status has been entered); and calculating (for example, causing a computer to calculate or to execute the step to calculate) an account based on the number of product-in-circulations recognized as purchase actions out of the number of the product-in-circulations delivered.

This is a system whereby the service receiver does no special managing of product-in-circulations, and is charged not for unused product-in-circulations delivered in advance, but only for the actually used product-in-circulations. The service receiver can also reduce unnecessary advance expenses.

The service provider also benefits from the system, since it is ensured that the service provider can has the service receivers' custom and can expect stable sales of product-in-circulations. Additionally, the service provider can eradicate pirated product-in-circulations that are not involved in the service, since the service provider register on his/her own data of product-in-circulations delivered in advance. In other words, the service provider provides those product-in-circulations the service receiver uses directly to the service receiver and register them in his/her own terminal station; therefore, pirated products are never registered, hence never used.

In addition, the service provider can manage product-in-circulations used by many service receivers under a single system. If it is known that different service receivers use product-in-circulations of the same identity No., authorized products can be distinguished from pirated products. By issuing a warning, etc. to the service receiver using the product-in-circulations recognized as being a pirated version, the service provider can eradicated unauthorized products.

As in the foregoing, the service provider can easily know use of product-in-circulations of the same ID No. Further, the service provider can identify the service receiver to whom the product-in-circulations was delivered based on the data product-in-circulations registered by none other than the service provider; therefore, the service receiver who is using pirated versions can be easily found out.

A service management method in accordance with the present invention is further characterized in that it includes the steps of:

registering unique data of product-in-circulations delivered to a service receiver in a terminal station (for example, in a management table in a computer);

detecting use of the product-in-circulations by the service receiver over a network (for example, based on detection of the unique data);

recognizing the use as a purchase action; and calculating (causing a computer to execute the step to calculate) charges based on the number of product-in-circulations recognized as purchase actions out of the number of the product-in-circulations delivered.

According to this, in addition to the foregoing advantages, the service provider can obtain purchase status from a remote service receiver surely and almost in real time, since the service provider detects use of product-in-circulations by the service receiver over a network.

The service provider can also easily receive purchase status from two or more service receivers.

The unique data of product-in-circulations is data to specify (identify) individual product-in-circulations and registered in a terminal station of the service provider. Use of product-in-circulations by the service receiver can be thus detected. For example, if the unique data is transmitted from the computer of the service receiver to the terminal station of the service provider via a network, the service provider can recognize that the service receiver has used the product-in-circulation bearing the unique data by comparing the incoming unique data to the registered unique data.

These registration and comparison of unique data, recognition of use, and calculation of charges based on the number of recognized product-in-circulations can be done by computer programs.

A service management method in accordance with the present invention is further characterized in that in the step of detecting use of the product-in-circulations by the service receiver over a network, the unique data of product-in-circulation is detected in a pair with unique data of the service receiver.

This makes it possible to identify two or more service receivers who use product-in-circulations and managed charges precisely for individual service receivers. The unique data of product-in-circulations and the unique data of the service receiver can be transmitted in any manner, as long as the service provider can detect the two sets of data as a pair. For example, the unique data of product-in-circulations and the unique data of the service receivers can be transmitted as a single set of data or as ostensibly two sets of data. In other words, by transmitting the two sets of data concurrently, but over different networks, the service provider can receive the two sets of data and related them to each other.

If two or more service receivers transmit data at the same time, a problem occurs such that the service provider fails to detect the unique data of product-in-circulations and the unique data of the service receiver and relate them to each other. This problem can be solved by scheduling different transmission time for different service receivers in advance so that the service receivers do not transmit data simultaneously. Alternatively, the service provider determines whether it could receive the unique data of product-in-circulation and the unique data of the service receiver and related them to each other; if a result turns out that the service provider has detected that two or more service receivers transmitted data at the same time, the service provider, deeming the data transmissions invalid, sends error messages to the service receivers who transmitted the data and requests a retransmission of the data. The error messages, instructions, etc. may be transmitted to the terminal stations of the service receivers.

Supplementary data may be added to the two sets of data to relate the two sets to each other. When this is the case, for example, the transmission time can be employed as the supplementary data.

A service management method in accordance with the present invention is further characterized in that a programmed computer executes the steps of:

accessing a management table storing unique data of product-in-circulations provided to a machine installed for the service receiver, by which data the product-in-circulations delivered to a service receiver are specified, the managing table containing current status of the product-in-circulations which is updated in real time on the basis of reception of the unique data from the machine, so as to read out the number of product-in-circulations that can be recognized as having been purchased by the service receiver; and calculating charges payable by the service receiver on the basis of the read-out number of the product-in-circulations.

According to this, the product-in-circulations are product-in-circulations loaded in the machine installed for the service receiver. The management table stored in, for example, memory means in the computer of the service provider is adopted to store the unique data by which the product-in-circulations to be delivered to the service receiver are specified and also to store the current status of the product-in-circulations at the service receiver. The current status is updated in real time on the basis of reception of the loaded unique data of the product-in-circulations from the machine of such a type in which the product-in-circulations are loaded. In other words, those product-in-circulations of which the unique data is received are recognized as having been purchased and the purchase is recorded in the management table.

Therefore, by accessing the management table, the number of product-in-circulations which have been recognized as being purchased is read out. This produces the same advantaged as those detailed in the foregoing.

A service management method in accordance with the present invention includes the features of the (computer-executable) service management method to offer product-in-circulations required to run a machine, and is characterized in that includes the steps of:

registering unique data of product-in-circulations delivered to the service receiver in a terminal station (for example, the management table on the computer of the service provider) by the service provider;

reading out unique data of product-in-circulation provided to the machine installed for the service receiver (for example, by the machine);

transmitting data containing at least the read-out data to (the computer of) the service provider (for example, by the machine);

detecting the data via a network by the service provider (for example, by means of the computer of the service provider);

recognizing the loading in the machine as a purchase action on the basis of the unique data (put differently, the service provider specifying product-in-circulations recognized by the service receiver as having been purchased in the management table on the basis of the unique data received from the machine);

calculating (causing a computer to calculate) charges on the basis of the number of those product-in-circulations recognized as purchase actions out of the number of the product-in-circulations delivered.

According to this, the use of product-in-circulations can be detected by a simple step, executed by the service receiver, of reading out the unique data of product-in-circulation loaded in the machine, and the service provider determines whether the use is equivalent to a purchase on the basis of the unique data. Thus, the number of consumed product-in-circulations can be accurately known.

If an arrangement is made for the machine installed for the service receiver to automatically execute the step of reading out the unique data of product-in-circulations and the step of transmitting data containing at least the read-out data to the service provider, it is ensured that the steps are executed without the service receiver bothering to do anything with conscious efforts. Besides, the steps are executed over a network and can be carried out in real time.

Further, executing the step of reading out the unique data of product-in-circulations provided to the machine installed for the service receiver is equivalent to concurrently executing both the step of obtaining the current status of the product-in-circulations by the service receiver and the step of recognizing the use as a purchase action when the current status is such data showing the use of the product-in-circulations; this facilitates the operation.

If the data that contains at least the data read out by the machine is detected over a network, and new unique data is contained in that detected data, it is preferable to recognize that the service receiver has used, i.e., purchased, the product-in-circulations. This is to address a possible case where the data detected over a network contains unique data that has been already detected, for example, when a product-in-circulation installed in the machine is removed and then reinstalled for some reasons.

Since the data formed on the product-in-circulations is unique data, if a product-in-circulation with the same data has been already registered by the service provider, a check operation is done because the data shows that there exist two or more product-in-circulations having the same data. Typically, the product-in-circulation detected later is likely to be a pirated version (i.e., a product bearing "copied" unique data of an original product) and is therefore removed.

A service management method in accordance with the present invention is further characterized by including the steps of:

specifying product-in-circulations that are yet to be used and will be collected from the service receiver after a predetermined period (for example, in the management table) out of those product-in-circulations delivered to the service receiver.

According to this, by specifying the product-in-circulations to be collected, unused product-in-circulations can be collected from the service receiver. A situation do not occur where product-in-circulations are delivered, but not used for a long time, and therefore not purchased, but stocked at the service receiver. The collected product-in-circulations can be supplied to another service receiver. That is, if product-in-circulations are not used during a predetermined period after delivery, the service receiver is considered as being not willing to purchase the products and the products are supplied to another service receiver; thus, the product-in-circulations have increased purchase or sales opportunities.

A service management device in accordance of the present invention is further characterized in that it includes:

a first memory section for registering unique data of product-in-circulations to be delivered to a service receiver;

a communications section for detecting use of the product-in-circulations over a network; and an arithmetic processing section for calculating charges on the basis of the number of products whose use is detected out of the delivered product-in-circulations.

The registration of the unique data in the memory section facilitates specification of the product-in-circulations delivered to the service receiver and enables the arithmetic processing section to manage current status of the product-in-circulations in a detailed manner for individual product-in-circulations. Since the communications section detects the use of the product-in-circulations over a network, the service provider can obtain purchase status from a remote service receiver surely and almost in real time.

Further, since each product-in-circulation provided to the service receiver is assigned unique data which is registered in the memory section, when the unique data is detected by the communications section over a network, the arithmetic processing section can recognize that the service receiver has used the product-in-circulation bearing the unique data.

Further, by determining whether the detected unique data coincides with registered unique data, the service provider can easily detect if the service receiver uses pirated versions. If the service provider detects identical unique data from different service receivers, the service provider can detect circulation of pirated versions in the market.

Further, if an arrangement is made so that the product-in-circulations is used when loaded in a machine and that the machine reads out the unique data of product-in-circulations to transmit it to the service management device, for example, in the case of an image forming apparatus, the arithmetic processing section can electronically determine, depending on whether the product-in-circulations loaded in the machine bear identical data, whether the same product-in-circulation is removed and reinstalled to remove jammed paper or for some other reasons or a product-in-circulation is replaced with a new product-in-circulation. Therefore, it is possible to recognize as a purchase action of the product-in-circulation a notification of the data of the installed product-in-circulation if the data is new.

If the unique data of the product-in-circulations is stored in pairs with data of service receivers upon registration, even when the service receiver transmits only data of a product-in-circulation to the service management device during use of the product-in-circulation, the service management device can identify the service receiver using the product-in-circulation. Therefore, compared to a case where a pair of the unique data of the product-in-circulation and the data of the contract signer are received upon use of the product-in-circulation, the amount of data that must be received is reduced; the load on the network and the operation processing load can be thereby reduced.

A service management device in accordance with the present invention is characterized in that the first memory section registers the unique data of product-in-circulations to be delivered to the service receiver so that the data is associated to data of the service receiver.

This makes it possible to identify two or more service receivers on the basis of the unique data of the product-in-circulations. In other words, by using the unique data of product-in-circulations as basic management data, the service provider can manage not only the product-in-circulations, but also the service receivers. The service provider can manage delivery and purchase data (those product-in-circulations delivered and actually purchased) for each service receiver and offer various services catered especially to each service receiver on the basis of the unique data of product-in-circulations.

A service management device in accordance with the present invention is further characterized in that the arithmetic processing section calculates the number of product-in-circulations that are yet to be used and are still stocked by the service receiver on the basis of data indicative of replacement of a product-in-circulation, compares a result of the calculation with a specified value, and issues, if the number of product-in-circulations becomes equal to the specified value, an instruction to supply the service receiver new product-in-circulations.

On top of the foregoing advantages, according to this, the inventory of spare product-in-circulations is monitored and new product-in-circulations are dispatched when the number of unused ones becomes equal to the specified value or lower; the service receiver does not run out of product-in-circulations.

A service management device in accordance with the present invention is further characterized in that the arithmetic processing section calculates charges for a product-in-circulation used by the service receiver during a period on the basis of the data of the use of the product-in-circulation and the data of date and time of replacement of the product-in-circulation. According to this, on top of the foregoing advantages, the service provider can charge the service receiver regularly and automatically.

A service management device in accordance with the present invention is characterized in that:

it further includes a second memory section for storing data transmitted from the service receiver;

the arithmetic processing section compares the stored data with the latest transmitted data and if there is discrepancy, updates the stored data.

Thus, repeated transmission of identical unique data does not cause update of the content of the second memory section and the same product is not counted repeatedly in, for example, charge management. Further, charge management and other processes can be performed when the content of the second memory section is updated.

A service management device in accordance with the present invention is characterized in that:

it further includes a third memory section for registering a list of product-in-circulations that can be delivered to the service receiver; and the list registered in the third memory section can be accessed from the outside via a network.

According to this, the list registered in the third memory section can be accessed from the outside via a network and therefore allows the service receiver to select candidate product-in-circulations to be delivered. The service receiver thus has most suitable product-in-circulations delivered and is more likely to purchase products. The service provider can prepare product-in-circulations and manage orders and inventory of the service provider, on the basis of this kind of advance request. Further, the service provider can reduce inventory that does not lead to purchase.

The service provider can know popular product-in-circulations and unpopular product-in-circulations from the selection by the service receiver. By feeding back the result of the advance request quickly upon selection of product-in-circulations as service objects, the service receiver is more likely to purchase products.

A product-in-circulation in accordance with the present invention is further characterized in that unique data is provided to the product in advance.

The unique data of the product-in-circulation allows the service provider to confirm upon delivery of product-in-circulations which product-in-circulation has been delivered in advance to which service receiver.

Further, when detecting the data of use of product-in-circulations by the service receiver by, for example, electronically, it can be determined whether an identical product-in-circulation is being used or the old product-in-circulation is replaced with a new product-in-circulation. Therefore, it is possible to recognize as the purchase of the product-in-circulation a notification of detection of the data of the product-in-circulation if the data is new.

The unique data formed on the product-in-circulation may be in the form of, for example, code that does not make sense on its own, but that can be translated to a product name when reference is made to a product table prepared by the service provider.

In this case, the unique data of product-in-circulations of the present invention, when obtained or deciphered by a third party, does not pose a high risk to the service provider or the service receiver and therefore does not need to be encrypted, encoded, or otherwise subjected to difficult processing. Therefore, compared to when such data is read out as a security measure, the size of both the hardware and software can be reduced. Further, the processing time can be reduced and data can be read out quickly since no encoding is necessary.

The service provider can identify contract signers by obtaining unique data of product-in-circulations alone if the data of the product-in-circulations and the data of the service receivers are registered upon the delivery of the product-in-circulations in such a manner that they can be related to each other. In other words, compared to when data of the service receiver who is the use of the product-in-circulations is obtained paired with the unique data of the product-in-circulations, the amount of data conveyed is reduced and transmission load is reduced when sent over a network.

When the foregoing product-in-circulations are used according to the service management method in accordance with the present invention, if a third party manufactures and sells unauthorized versions of product-in-circulations complete with the unique data of the product-in-circulations, the unauthorized versions are not subjected to service unless they are provided by the service provider. Pirated versions are thus eradicated.

A product-in-circulation in accordance with the present invention is further characterized in that it is accompanies by a first data storage body in which the unique data of product-in-circulation is formed.

According to this, no unique data needs to formed directly on the product-in-circulations and no changes need be made at all to manufacturing processes of the product-in-circulations. A separate step of manufacturing first data storage bodies on which the unique data is formed and a simple additional step of attaching the first data storage bodies to product-in-circulations enables the product-in-circulations to be handled as serviced objects in accordance with the present invention.

A product-in-circulation in accordance with the present invention is further characterized in that:

it is a single pack containing two or more products; and a first data storage body on which unique data of the packed product-in-circulation is formed is attached to the packed product-in-circulation.

This allows not only individual product-in-circulations, but new products created by bundling two or more old product-in-circulations or combining, them with other product-in-circulations, to be handles as service objects in accordance with the present invention. For example, take tires of a car as an example: when four tires in general and two in some special cases (one for the front and the other for the rear) or, if the temporary tire is identical to the mounted tire, five tires in general and three in those special cases are sold as a smallest combination, two or more tires can be handled as a service object in accordance with the present invention. Alternatively, a new pack of products may be created combining different product-in-circulations, such as shampoo and conditioner.

Further, when individual manufacturers of product-in-circulations fail to create effective combinations of product-in-circulations or to quickly combine them and put on sales, the service provider can still swiftly respond to market trends and make the best combination of the product-in-circulations for sales.

A product-in-circulation in accordance with the present invention is further characterized in that:

the product is packed in packing material;

the first data storage body bearing unique data of the product-in-circulation is disposed inside the packing material; and the packing material is at least partly transparent at a place corresponding to position of the first data storage body.

According to this, the position of the first data storage body disposed inside the packing material corresponds to a transparent part of the packing material; the content of the packed product, i.e., the type, model, and other data, are visually or optically recognizable without breaking the packing. The product can be thus checked easily.

The data formed on the first data storage body can be either visually or optically detected; therefore, the second data storage body mentioned later can be omitted which is used to obtain data of delivered product-in-circulations upon the delivery of the product-in-circulations without the service person opening the packing material. It can also be said that the structure of the packing material is closely related to the fact that the data formed on the first data storage body is nothing secretive in particular.

A product-in-circulation in accordance with the present invention is characterized in that it further includes:

protective material for packing or wrapping the product-in-circulation; and a second data storage body, provided on the surface of the protective material or inside the protective material, for storing the same content of data as the unique data of the product-in-circulation.

According to this, the service person can obtain the data of the product-in-circulation to be delivered from the second data storage body attached to the surface of the product-in-circulation, for example, on the packing material, upon the delivery of the product-in-circulation; therefore, he/she can obtain the unique data formed on the product-in-circulation without having to open the packing material and take out the product-in-circulation. The commodity value of the product is thus preserved.

The data formed in the second data storage body can be obtained using a scanner. For example, if the unique data is provided in the form a bar code, it can be read easily and quickly and speeds up the checking of delivered products upon delivery, for example.

Further, if the second data storage body is attached to the surface of the product-in-circulation, the reading of the data becomes even easier and takes less time.

If the second data storage body is disposed inside the product-in-circulation, attention has to be paid not to damage the commercial value of the product when opening it. However, since the second data storage body is not broken or otherwise affected when compared to a case where it is attached to the surface, the second data storage body is not lost, damaged, or otherwise becomes inoperative before reading out the data.

If the second data storage body is formed so that it can be detached from the product-in-circulation, it can be determined whether the product has already been delivered, depending upon the presence of the second data storage body. Further, the second data storage body can also be taken away and collected; a situation does not occur where an advance registration cannot be completed, because the scanner is out of order. The reading and advance registration of the data can be completed as the service person takes the detached second data storage body back to the office of the service provider.

A product-in-circulation in accordance with the present invention is further characterized in that the second data storage body is formed so as to be detachable from the product-in-circulation.

According to this, it is easily determined by checking the presence of the second data storage body whether the product-in-circulation has been already delivered. Further, the service provider can take the second data storage body back to the office and register the product-in-circulation at the office after delivery. Therefore, when compared to the registration of unique data of the delivered product-in-circulation upon delivery, it is ensured the delivered product-in-circulation is checked accurately. Both methods, if used together, improve accuracy.

Further, if the second data storage body is attached to the product-in-circulation using glue, etc. that allows repeated attaching and detaching without damaging the appearance of the product-in-circulation, the second data storage body can be attached again after it is detached upon delivery. This kind of situation is possible when a product-in-circulation is delivered to a service receiver, but was not purchased as a result of making the most use of the service in accordance with the present invention, and the service provider collects the unused product-in-circulation and supplies it to another service receiver.

A product-in-circulation in accordance with the present invention is characterized in that it further includes an IC chip storing the unique data of the product-in-circulation.

According to this, IC chips, whose installation has been planned conventionally to eradicate pirated products, can be used with no modification. The unique data of the product-in-circulation essential in the present invention can be stored without incurring extra cost to cover new hardware.

A product-in-circulation in accordance with the present invention is further characterized in that it is a cartridge containing toner.

Electrophotographic image forming apparatuses are designed so as to replace used toner cartridges and other degradables. Therefore, the electrophotographic image forming apparatuses have a larger after-servicing market than that of the image forming apparatus main bodies, and thus manufacture and sales of pirated products are widespread. In these circumstances, the service management method in accordance with the present invention is still capable of eradicating pirated products and providing original product-in-circulations. The service provider is guarantees and manages every process in manufacture, logistics, and sales of product-in-circulations, allowing no pirated products to find their way to customers. Further, since it is the service provider that registers product-in-circulations upon delivery, the service provider is capable of covering only authorized product-in-circulations under the service.

A product-in-circulation in accordance with the present invention is further characterized in that it is a cartridge containing ink.

According to this, ink cartridges for use in inkjet printers have similar advantages as the foregoing toner cartridge.

A service management network system in accordance with the present invention is further characterized in that in addition to the foregoing arrangement, the read-out section of the machine detects the unique data of a product-in-circulation from the product-in-circulation on the basis of data of a time when the product-in-circulation is installed in the machine.

For example, a sensor for detecting whether a product-in-circulation is installed in the machine is disposed to detect a timing of a rise or fall of an output signal from the sensor, and the read-out section operates in synchronization with the timing to read unique data. According to this, the operatability of the machine to read unique data improves.

To replace a used product-in-circulation, it has to be removed and a new product-in-circulation has to be installed. Therefore, the timings for the old product-in-circulation to be removed and for the new one to be installed can be used as trigger signals for the operation of the read-out section.

A service management network system in accordance with the present invention is further characterized in that:

the machine includes an operation section having a memory section for storing data supplied from the read-out section; and a comparator for comparing the latest data supplied from the read-out section with the data in memory; and the controller section causes the content in the memory section to be updated when the latest data supplied from the read-out section differs from data in the memory section.

According to this, it can be electronically determined whether the same product-in-circulation has been removed and then reinstalled to remove jammed paper or for some other reasons, or an old product-in-circulation has been replaced with a new product-in-circulation. The controller section thus recognizes the installation of a product-in-circulations only if the data of the installed product-in-circulation is new.

According to this, a unique data is detected from a new product-in-circulation by the read-out section in the machine and transmitted from the transmitter/receiver section to a second group communications section via a network, enabling the arithmetic processing section to confirm the purchase of a new product-in-circulation.

A service management network system in accordance with the present invention is further characterized in that the arithmetic processing section calculates the number of unused product-in-circulations stocked by the first group on the basis of the data indicative of replacement of the product-in-circulation in the machine of the first group, compares a result of the calculation with a specified value, and if the number of product-in-circulations becomes equal to a specified value, issues an instruction that the first group dispatches new product-in-circulations.

According to this, in addition to the advantages of the arrangement of the foregoing service management network system, since the inventory of spare product-in-circulations is monitored and new product-in-circulations are dispatched when the spare ones decreases to or below the specified value, the machine user never runs out of product-in-circulations.

A service management network system in accordance with the present invention is further characterized in that:

the arithmetic processing section calculates charges for the product-in-circulations used by the first group during a period on the basis of data of use, and data of the date and time of replacement, of the product-in-circulation in the machine.

According to this, a regularly-recurring charging process can be automatically performed.

A service management network system in accordance with the present invention is characterized in that:

it further includes a second memory section for storing data transmitted from the first group; and the arithmetic processing section compares the incoming latest data with the data in memory and if they differ, updates the data in memory.

According to this, it can be electronically determined by the remote control whether the same product-in-circulation has been removed and then reinstalled to remove jammed paper or for some other reasons, or an old product-in-circulation has been replaced with a new product-in-circulation. Therefore, it is possible to recognize as a purchase action of the product-in-circulation on the basis of a notification of the data of the installed product-in-circulation if the data is new. Therefore, the arithmetic processing section does not need to execute charging and other unnecessary processes when the data indicates that the same product-in-circulation is installed again.

A service management network system in accordance with the present invention is further characterized in that the machine is an image forming apparatus.

According to this, the data of toner cartridge and other products-in-circulations in image forming apparatuses connected to the network can be managed over the network in a centralized manner.

A service management network system in accordance with the present invention is further characterized in that it includes a first group and a second group, the first group having a machine constituted by:

a read-out section for detecting unique data from a product-in-circulations provided with unique data;

a transmitter/receiver section for externally transmitting the read-out data via a network; and a controller section for controlling the read-out section and the transmitter/receiver section, the second group having a service management device constituted by:

a communications section for communicating with the first group;

a product-in-circulation data memory section for registering data of the product-in-circulation in the first group;

an arithmetic processing section for checking current status of the product-in-circulation and calculates charges on the basis of the number of used product-in-circulations out of the number delivered.

According to this, the service can be expanded to cover not only those product-in-circulations essential to use the machine, but almost all ordinary products generally found in distribution, that is, all products such that the service receiver can have them delivered to keep a stock of spare products and the service provider can charge for the number of products used.

This is because the read-out section in the machine has a function to detect the unique data from the product-in-circulation provided with unique data and does not require the product-in-circulation to be installed in the machine. Almost all products generally found in distribution can carry unique data provided in the form of an IC chip, bar code, or another data storage medium to identify individual products.

The service management device may be provided separately with an input section through which the current status of the product-in-circulation can be entered to allow manual input of the current status of the product-in-circulation when necessary.

A service management network system in accordance with the present invention is further characterized in that:

the service management device includes a list memory section for registering a list of product-in-circulations that can be delivered to the first group; and the machine of the first group includes: a display section for producing a display of the list; and a selection section for selecting specific product-in-circulations appearing in the list.

According to this, the list of product-in-circulations registered in the list memory section in the service management device is exchanged between the communications section in the service management device and the transmitter/receiver section in the machine and appears on the display section in the machine. The service receiver selects desired product-in-circulations from the list appearing on the display section for coverage under the service, using the selection section. Therefore, those product-in-circulations that are unlikely to be purchased are not delivered, and the those delivered are far more likely to be purchased.

The service provider can automatically obtain data of the selection made by the service receiver. Therefore, if the data is analyzed generally or statistically, the service provider can make suggestions to the service receiver: for example, the service provider can add to the product-in-circulations list those product-in-circulations that match the likes of the service receiver and that can be delivered.

If the Internet is used as the network, and a browser application is used as means to display a registered list of product-in-circulations that can be delivered, the present service can be provided using conventional technologies.

Embodiment 6

Figure 35:
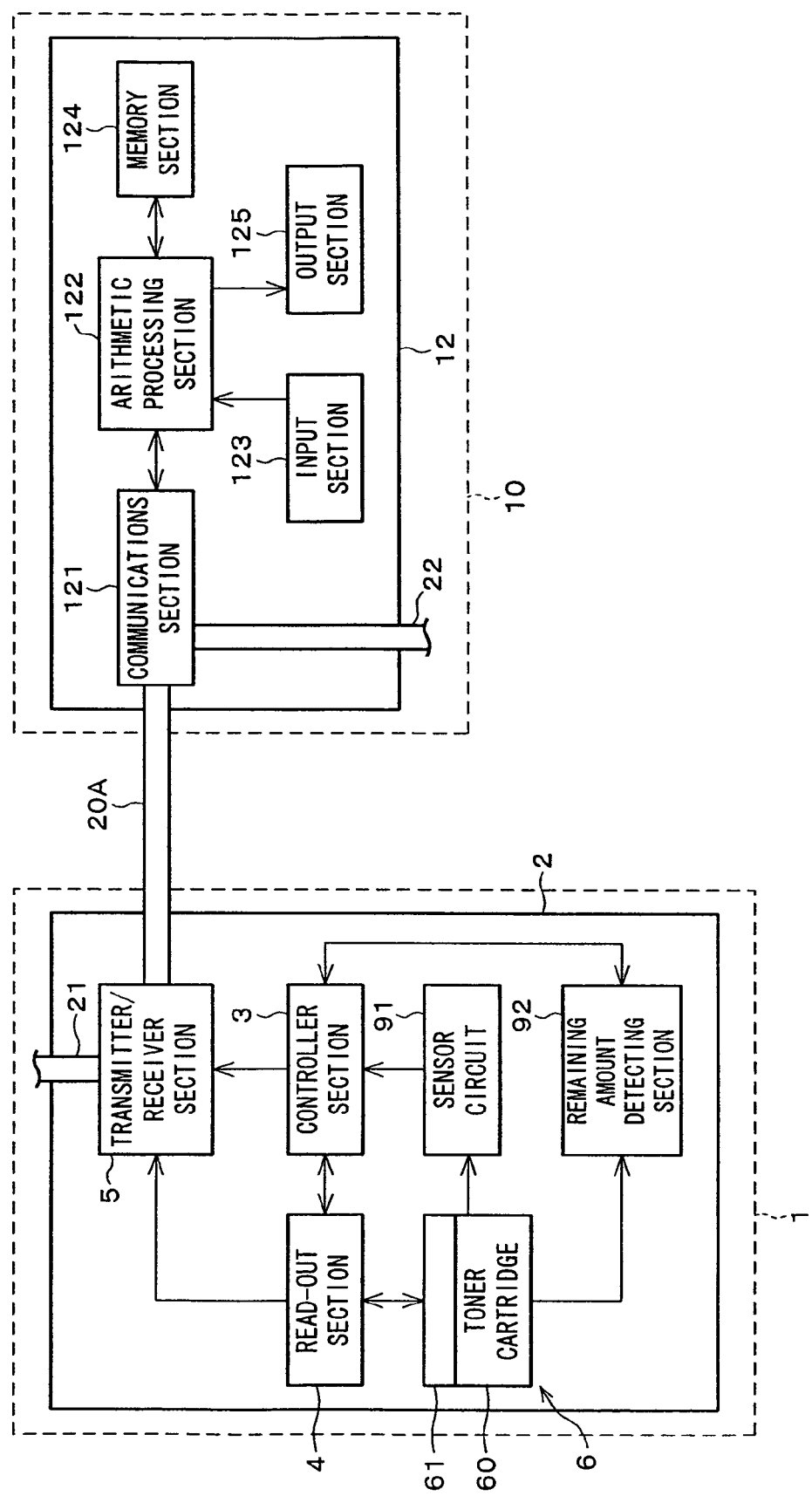
FIG. 35 is a schematic view showing another service management network system in accordance with the present invention.

The following describes a structure of an image forming apparatus 2 on the side of a contract signer 1, with reference to FIG. 35. The image forming apparatus 2 includes, in addition to the structure described in FIG. 1, a sensor circuit 91 and a remaining amount detecting section 92 for detecting the amount of remaining toner in the cartridge 60. The controller section 3 controls both the sensor circuit 91 and the remaining amount detecting section 92.

Figure 36:
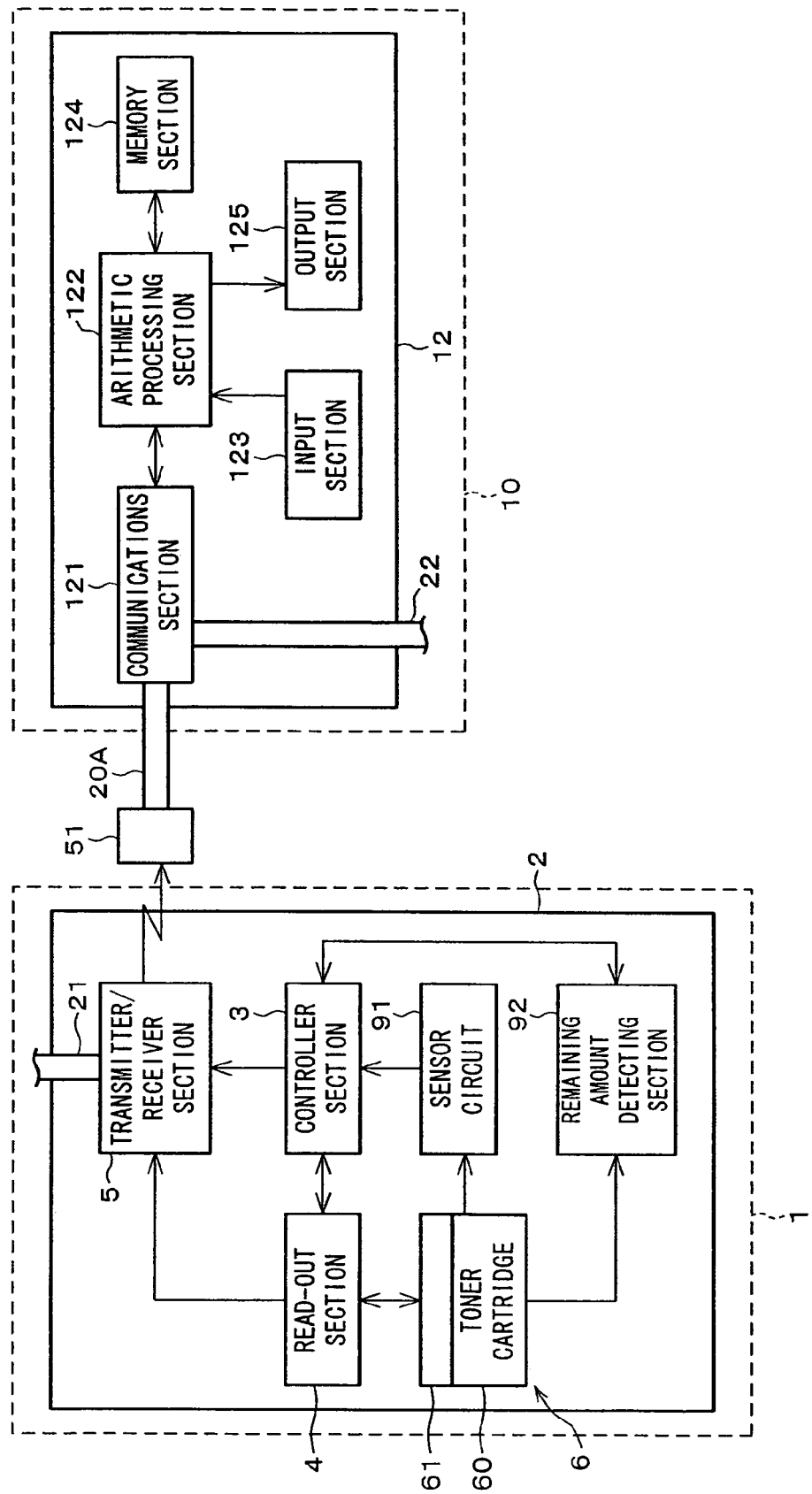
FIG. 36 is a schematic view showing still another service management network system in accordance with the present invention.

As shown in FIG. 36, the mode of communication of a transmitter/receiver section 5, which is installed in or connected to the image forming apparatus 2, may be wireless, so as to transmit data wireless from the transmitter/receiver section 5 to a second transmitter/receiver section 51 which is provided in the contract signer 1, while the second transmitter/receiver section 51 may be connected on line to a telephone line 20A (network 20). This was all described in FIG. 4.

The sensor circuit 91, in principle, is the same as the sensor circuit 9 which was described in FIG. 1, and is made up of various sensors for detecting whether the toner cartridge 60 is installed in the image forming apparatus 2, and peripheral circuits for modifying signals from these sensors. Also, since the sensor circuit 91 is usually provided in common copying machines and printers, the sensor circuit 91 is deemed to be the ones which are already provided in these apparatuses. However, the sensors may be substituted by other means and are not necessarily required.

The remaining amount detecting section 92 is for detecting the amount of toner being used. For example, detection may be carried out by directly measuring the amount of remaining toner, for example, by measuring a change in mass using a mass sensor, or by measuring a change in thickness of a toner layer using a displacement sensor. Alternatively, the amount of toner being used may be detected indirectly by measuring test toner density on a photosensitive drum or a developing roller, or by estimating the amount of consumed toner by calculation, using such data as the number of prints made.

Note that, the remaining amount detecting section 92 usually detects the amount of remaining toner while almost all the toner has been used up. Thus, the detection range of the remaining amount detecting section 92 should be from the state where almost all toner is used up to the state where the toner is used up completely. Also, in view of the cost of the sensor, analog detection to detect the amount of remaining toner is not necessarily required, and detection may be carried out in levels (digitally). For example, two level sensors X and Y are provided, and the following judgement is made from results of detection by the two sensors X and Y.

TABLE 8

| X | L | L | H | H |
|---|---|---|---|---|
| Y | L | H | L | H |
| LEVEL OF REMAINING TONER AMOUNT | L1: VERY HIGH | L2: HIGH | L3: LOW | L4: VERY LOW |
| COEFFICIENT OF CHARGE | m1 | m2 | m3 | m4 |

(H: High level, L: Low level)

In this case, the charge is calculated by $$P = p * mi \quad (1)$$

Here, P(p*mi) is the fee charged to the contract signer 1 according to the amount of toner consumed, and it is the product of base fee p and charge coefficient mi. Here, mi is the coefficient of charge which increases in correlation with the amount of toner consumed. In Table 1, m1<m2<m3<m4, where the values of mi (i=1, 2, 3, 4) are decided in advance by experiment, etc. For example, m1=0.7, m2=0.8, m3=0.9, and m4=1. Note that, p and/or mi may be set for each color.

When the toner cartridge 60 is replaced, the controller section 3 instructs a read-out section 4 to read out toner cartridge data by accessing an IC chip 61 (described later; see FIG. 2). Further, the controller section 3 obtains data of remaining toner amount from the remaining amount detecting section 92. Further, the controller section 3 instructs the transmitter/receiver section 5, as required, to transmit the cartridge data read out and the data of remaining toner amount to outside. The controller section 3 further monitors signals from various sensors to give predetermined instructions according to the content of the signals. When the image forming apparatus employs a CPU for the control of the entire apparatus, the CPU can be used for the controller section 3.

The structure of a terminal station 12 (service managing apparatus) of a service provider 10 was already described above.

Note that, a communications section 121 and an input section 123 make up a data collecting section which collects data of remaining amount of product-in-circulation, for example, from the image forming apparatus 2 of the contract signer 1.

(Registration Process)

The following explains operations of the terminal station 12. The communications section 121 receives, via a local network 22, unique data of the product-in-circulation which was read in by a scanner, and an ID number of a service receiver. An arithmetic processing section 122 extracts the ID number of the service receiver from the received data, and reads out a management table (see FIG. 37(b)) corresponding to the service receiver from a memory section 124 based on the ID number of the service receiver.

Then, the arithmetic processing section 122 extracts the unique data of the product-in-circulation from the received data, and inputs it in the management table (see FIG. 38(b)) read out.

By the foregoing operation, the data obtained from the contract signer 1 is transmitted via the network to the terminal station 12 of the service provider 10, and the data is written in a management file stored in the memory section 124 of the terminal station 12.

That is, the terminal station 12 updates data based on received data. FIG. 38(b) illustrates the case where two sets of toner cartridges 60 have been delivered for each color of black, yellow, magenta, and cyan, and different code data of 20 digits are inputted for the respective toner cartridge 60. The other data include date of delivery. Note that, in FIG. 38(b), in view of user interface, the display of data which indicates the type of the toner cartridge 60 employs not only the code data but additionally the actual words such as "black toner". At this stage, the cells under "CURRENT STATUS" all display "NEW (SPARE)" automatically.

Therefore, immediately after delivery, there is no difference in the data of the cartridges currently in use and the data of remaining amount between FIG. 38(a) and FIG. 37(a).

Then, a service person opens the toner cartridge 60 needed to operate the image forming apparatus 2, and sets it therein. Here, the image forming apparatus 2 has been connected and set so that it can communicate with outside. Thus, the image forming apparatus 2 transmits the data of the toner cartridge 60 to the terminal station 12 on the side of the service provider 10. The data of the toner cartridge 60 is transmitted with a service receiver ID so as to allow the terminal station 12 to identify the contract signer 1 who has sent the data.

The following explains the case where the foregoing operation is carried out automatically. The image forming apparatus 2 generally includes various sensors for detecting open/close of a door, or installation/removal of the toner cartridge 60. The controller section 3 has the function of monitoring these sensors. The controller section 3, detecting installation of the toner cartridge 60 based on a signal from a toner cartridge sensor, instructs the read-out section 4 to read out data stored in the IC chip 61 of the toner cartridge 60. Further, the controller section 3 instructs the transmitter/receiver section 5 to transmit the data. Details of this operation will be described later.

Further, the controller section 3 obtains the amount of remaining toner in the toner cartridge 60 installed from the remaining amount detecting section 92. In this case, since the toner cartridge 60 is new, the output of the remaining amount detecting section 92 indicates L1 (VERY HIGH), when the toner is detected in 4 levels as shown in Table 8. Note that, in the case of parallel transfer, there may be provided two signal lines (three including the ground line) which connect the remaining amount detecting section 92 and the controller section 3 to notify the results of Table 8, and the signal lines may be related to each other as shown in Table 9. Thus, when a new cartridge is installed, the logic level "0" is outputted to the signal lines both for the upper and lower bits.

TABLE 9

| AMOUNT OF REMAINING TONER | UPPER BIT | LOWER BIT |
| --- | --- | --- |
| L1 | 0 | 0 |
| L2 | 0 | 1 |
| L3 | 1 | 0 |
| L4 | 1 | 1 |

Here, Table 9 is related to Table 8 in such a way that "0"=Low level, and "1"=High level.

FIG. 39(a) and FIG. 39(b) show a screen of cartridge data when new toner cartridges 60 are installed. The data of remaining amount is displayed "L1" for all toner cartridges 60 installed in the image forming apparatus 2.

The terminal station 12 on the side of the service provider 10, in receipt of the data, updates, based on the transmitted data, data of the cartridges currently in use in the image forming apparatus 2 of the contract signer 1 as shown in FIG. 39(a). Further, as shown in FIG. 39(b), the toner cartridges 60 which are entered under "SPARE CARTRIDGE DATA", and are put to use by the foregoing operation are updated from "NEW (SPARE)" to "IN USE" in the cells under "CURRENT STATUS".

This completes initial setting and registration.

Note that, the foregoing described the case where data such as the machine model of the image forming apparatus 2 and the ID numbers of the products are automatically sent to the terminal station 12 on the side of the service provider 10. However, such data may be registered in the terminal station 12 from the input section 123 by the service provider 10.

(Consumption Process)

The following describes a process prior to replacing the toner cartridge 60. The controller section 3 monitors the two signals which are obtained from the remaining amount detecting section 92, and transmits the content of the signals from the transmitter/receiver section 5 to the terminal station 12.

More specifically, the controller section 3 monitors the two signals from the remaining amount detecting section 92 periodically (e.g., every hour). As the toner is consumed to reach level L2 (High) as indicated in Table 1, the remaining amount detecting section 92 outputs data of upper bit="0" and lower bit="1" to the controller section 3. When the toner is consumed further and reaches level L3, the remaining amount detecting section 92 outputs data of upper bit="1" and lower bit="0" to the controller section 3. The controller section 3 instructs the transmitter/receiver section 5 to transmit the obtained data of remaining toner amount (in this case, L2 or L3) to the terminal station 12.

FIG. 40(a) and FIG. 40(b) show an example of the case where the terminal station 12 obtained the data of remaining toner amount from the image forming apparatus 2, and updated the data. It can be seen that the black toner cartridge is consumed most, with the level of remaining toner amount L3, and the levels of remaining toner amount of the other toner cartridges 60 are L2.

(Replacing Process)

The following describes operation of replacing the

The following describes operation of replacing the toner cartridge 60.

The manager or user of the apparatus in the contract signer 1 in contract with the service provider 10 replaces the toner cartridge 60 with a new one which is provided as a spare, based on the message "REPLACE TONER CARTRIDGE" on the image forming apparatus 2. The following example is based on the case where only the black toner is consumed.

FIGS. 41(a) and 41(b) show an example of a cartridge data screen immediately before the cartridge is replaced. The levels of remaining toner amount for the toner cartridges of black, magenta, yellow, and cyan are L4, L3, L2, and L2, respectively.

The toner cartridge 60 after use (spare cartridge No. 1) is taken out of the image forming apparatus 2, and a new toner cartridge 60 (spare cartridge No. 5) is installed instead.

The internal operation of the image forming apparatus 2 was already described with reference to FIG. 7(a) through FIG. 7(f).

In the terminal station 12 of the service provider 10, the communications section 121 receives new unique data which indicates the newly installed toner cartridge 60. The data is then sent to the arithmetic processing section 122. In response, the arithmetic processing section 122 verifies the change in unique data of the toner cartridge 60 which was installed in the specific image forming apparatus 2, and updates the corresponding management table in the memory section 124. That is, the arithmetic processing section 122 functions as a replacement verifying section.

As a result, as shown in FIG. 42(b), the cells of the spare cartridge No. 1 and spare cartridge No. 5 under "CURRENT STATUS" are updated to "USED" and "IN USE", respectively, and their data of remaining toner amount are updated to "L4" and "L1", respectively. The "L4" of the cartridge No. 1 does not change, whereas "L1" of the cartridge No. 5 is changed as the toner is consumed.

The terminal station 12, detecting that the toner cartridge (e.g., No. 1) which had been used by the contract signer 1 has been replaced with the new toner cartridge (e.g., No. 5), maintains the toner data of the toner cartridge No. 1 of the state immediately before it was replaced, and hereinafter does not update this data. This enables determining the amount of toner used by the contract signer 1 in the toner cartridge No. 1.

Also, as shown in FIG. 42(a), in the table of installed cartridges, the data of only the black toner cartridge (date of replacement, full data, unique data, data of remaining amount, corresponding spare cartridge) are updated.

At this stage, since there is no spare black toner cartridge, the service provider 10 sends at least a black toner cartridge to the contract signer 1. FIG. 43(b) shows this state, in which new spare cartridge data of No. 9 is added.

In this manner, the service provider 10 constantly monitors the spare toner cartridge data, and sends a new spare toner cartridge 60 to the contract signer 1 at the time or before the spare toner cartridge 60 is used up, so as to prevent shortage of the expendables in the contract signer 1.

Note that, the operation by the terminal station 12 of electrically monitoring and calculating the number Nu of the product-in-circulation used is as already explained above.

(Accounting Process)

The following describes an accounting method. FIG. 44 shows lists of expendables subject to accounting (accounting lists [1] through [3]). Each accounting period is, for example, one month. The lists of expendables are created, for example, based on the spare cartridge tables of FIG. 39(b) and FIG. 40(b) by clipping cartridge data of those cartridges which were used during a one-month period before the closing date of accounting (15th day of the month in the present embodiment). Here, the cartridge data which are clipped are those which are indicated by "USED" in the cells under "CURRENT STATUS" in the spare cartridge table, and which have dates of installation within the one-month period before the closing date of accounting.

FIG. 44 displays lists of the past three months. For example, the accounting list [3] shows the toner cartridge 60 which was used during the period 2000.05.16-2000.06.15, which is the toner cartridge No. 1 in FIGS. 42(a) and 42(b). Note that, the toner cartridge No. 1 has been taken out of the image forming apparatus 2, and thus its remaining amount has been decided and does not change.

However, there are cases where the toner cartridge No. 1 is once taken out of the image forming apparatus 2 while it still has a large amount of remaining toner, to be replaced by another toner cartridge 60, and installed again in the image forming apparatus 2. In such a case, the amount of remaining toner cannot be decided at the time when the toner cartridge is first taken out of the image forming apparatus 2, and the accounting cannot be performed to calculate the account. Further, if the toner cartridge 60 used is not recovered by the service provider 10, there is always a chance that it is installed again in the image forming apparatus 2.

This drawback can be solved by the following methods.

For example, one option is to prohibit the use of the toner cartridge which was replaced once with another toner cartridge 60. This can be implemented, for example, by providing a non-volatile memory area in the controller section 3 of the image forming apparatus 2 to store therein the history of the unique data of the toner cartridge 60 which was obtained from the read-out section 4. The controller section 3 compares the unique data which was obtained from the read-out section 4 with all the history data of unique data stored in the memory area, so as to judge whether the unique data obtained is stored-data or newly inputted data. If it is stored-data, the toner cartridge 60 is judged as having being replaced with another toner cartridge 60 and having being used. In order to more accurately detect that the toner cartridge 60 is used, data from the remaining amount detecting section 92 is considered.

Thus, the controller section 3 displays an error message such as "PLEASE USE A NEW TONER CARTRIDGE" on the display section (not shown) of the image forming apparatus 2, and prohibits image forming operation which ignores this message.

However, in this method, in the event when the toner cartridge 60 is replaced with a new one while it still has a relatively large amount of toner remaining, no further image formation can be carried out once the new toner cartridge 60 is used up and when no spare toner cartridge 60 is available. In an emergency situation like this, it is convenient to allow the use of the toner cartridge 60 which was once replaced with a new toner cartridge 60 but still has toner.

To this end, accounting of the toner cartridge 60 which was once replaced with a new toner cartridge 60 is performed based on the remaining amount data which the old toner cartridge 60 had when the installation of the new toner cartridge 60 was detected. For example, when the level of remaining amount is L1, $$P = p * m1$$

is calculated.

When the old toner cartridge 60 was not installed in the image forming apparatus 2 and recovered by the service provider 10 while it still has the level of remaining amount L1, the calculated charge is made final.

On the other hand, when the old toner cartridge 60 was installed again in the image forming apparatus 2 before it is recovered by the service provider 10 and the toner was consumed to the level of remaining amount L4, the foregoing charge is cleared and a charge as given below is borne $$P=p*m4.$$

The following describes the case where the time when the toner cartridge 60 was replaced with a new one and the time when the toner cartridge 60 was installed again are in different accounting periods.

When the time the toner cartridge 60 was replaced with a new one is in the accounting period 2000.06.16-2000.07.15, and when the time the toner cartridge 60 was installed again is in the accounting period 2000.07.16-2000.08.15, accounting is performed first with respect to the accounting period 2000.06.16-2000.07.15. That is, $$P=p*m1$$

is calculated and the calculated charge is billed for the month of June, 2000.

Then, accounting is performed for the accounting period 2000.07.16-2000.08.15 according to the following equation $$P = (p*m4) - (p*m1)$$
$$= p*(m4 - m1)$$

The calculated charge is billed for the month of July, 2000.

In this manner, when the same toner cartridge 60 is used over periods of months with a different toner cartridge 60 in between, accounting is performed for the amount of toner consumed in each accounting period.

Alternatively, when the toner cartridge 60 is taken out of the image forming apparatus 2 and replaced with a new toner cartridge 60, accounting may be delayed until the toner cartridge 60 used is recovered by the service provider 10. That is, in the foregoing example, no charge is borne for the month of June, and the charge given below is billed for the month of July $$P=p*m4.$$

Because accounting of a particular toner cartridge 60 is performed only in a specific month, the bill will look simpler and accounting does not become complex and thus easy to manage. This contrasts to the former method in which the time of consumption by the contract signer 1 is close to the time of accounting and billing, allowing the service provider to redeem money earlier.

Note that, the charge coefficient mi is a constant, and the base fees p is varied according to color. This allows appropriate fee setting.

The accounting lists may be used as bills.

As described, one of the features of the present invention is that only the toner cartridge 60 actually used by the contract signer 1 is subject to accounting while unused toner cartridges 60 are not. This allows the contract signer 1 to use the image forming apparatus 2 without unnecessary stocks or shortage of expendables while avoiding complicated management.

Further, a feature of the accounting method of the present invention is that it is based on not only the number of toner cartridges used but also the amount of toner consumed. In this way, the fee charged to the contract signer 1 for the consumed amount of toner will be fair even when there is a large amount of toner remaining in the toner cartridge 60 recovered, and there will be no waste. Further, reuse of remaining toner contributes as a whole to improving efficiency of using toner, in addition to being resource-efficient and energy-efficient in a toner manufacturing process.

Further, because the number of spare cartridges is checked by detecting installation of a new toner cartridge 60, only a single management method is required to manage the image forming apparatus in the way it is conventionally done and to manage stocks of spare toner cartridges 60.

Embodiment 7

(Network Structure and Apparatus Structure)

Figure 51:
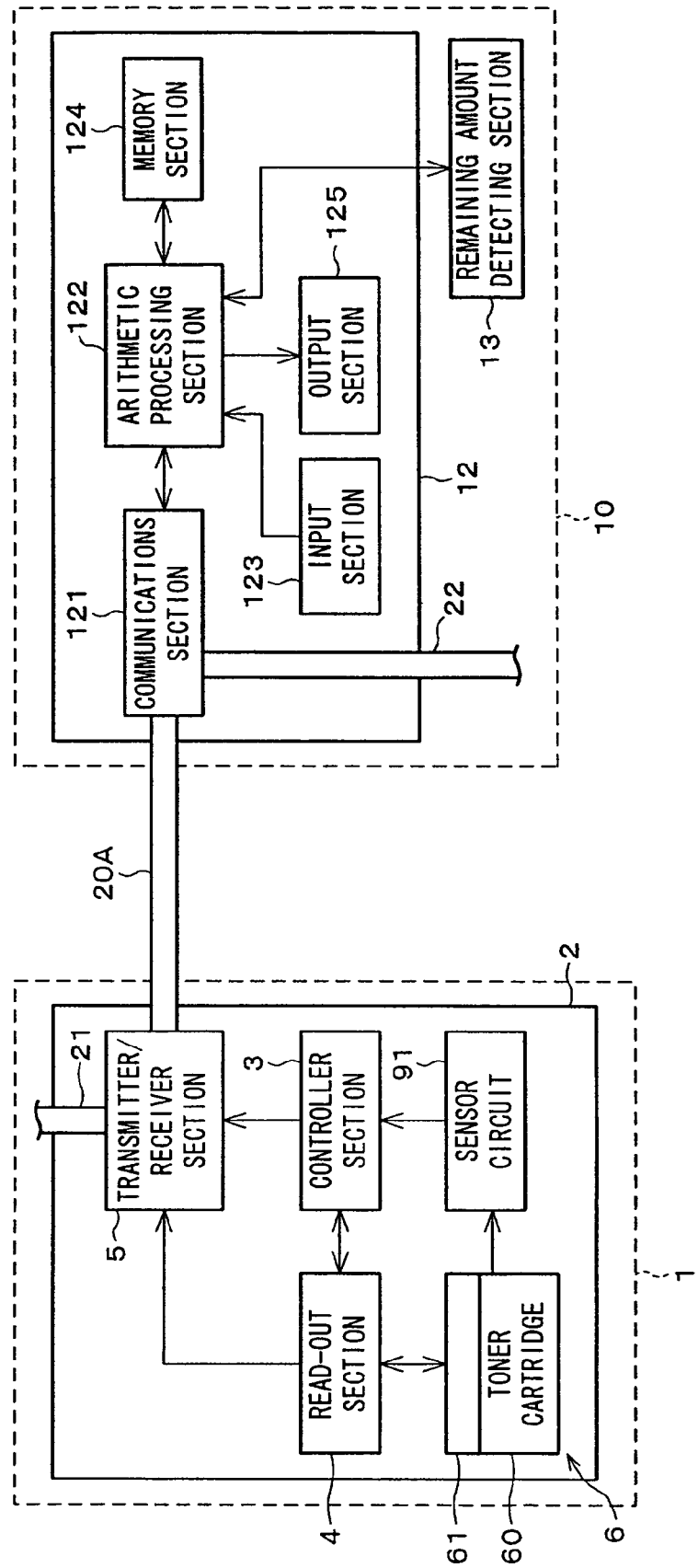
FIG. 51 is a schematic view showing yet another service management network system in accordance with the present invention.

A structure of an image forming apparatus 2 on the side of a contract signer 1 is shown in FIG. 51. The image forming apparatus 2 lacks the function of the remaining amount detecting section 92 that was described in Embodiment 6. The operation of the other elements are basically the same as those described in Embodiment 1, and explanations thereof are omitted here.

First, a structure of a terminal station 12.

(service managing apparatus) of a service provider 10 will be explained.

The terminal station 12 is, for example, a personal computer (PC) or a work station (WS), and includes a communications section 121, an arithmetic processing section 122, an input section 123, a memory section 124, and an output section 125.

Further, to an I/O interface section (not shown) of the terminal station 12 is connected a remaining amount detecting device 13. The remaining amount detecting device 13 includes a measurement section and an I/O interface section. The measurement section has the function of, for example, an electronic force balance. This measures the weight of toner cartridge 60 or remaining toner after recovery. The arithmetic processing section 122 and the remaining amount detecting device 13 exchange data via the I/O interface section.

The terminal station 12 calculates a charge based on weight data of toner cartridge 60 or weight of remaining toner after recovery which are obtained from the remaining amount detecting device 13.

(Registration Process)

The following describes system operation.

First, data of the contract signer 1 is obtained as background data by the service provider 10. The method or procedure as to how it is obtained or stored in the form of an electric file (FIGS. 8(a) and 8(b)) in the memory section 124 of the terminal station 12 is as already described above.

Note that, in the terminal station 12 of the service provider 10 is created and stored in the memory section 124 a service management file for each contract signer 1. FIGS. 45(a) and 45(b) show an example of a displayed file on the output section 125 of the terminal station 12. Here, an installed cartridge table (FIG. 45(a)) and a spare cartridge table (FIG. 45(b)) are created, but only the spare cartridge table may be provided. Initially, as shown in FIGS. 45(a) and 45(b), no data have been entered for the installed cartridges in the image forming apparatus 2 of the contract signer 1 and for the spare cartridges supplied to the contract signer 1.

The service provider 10 collects all data of toner cartridges 60 which are to be supplied to the contract signer 1, and stores the data simultaneously or at a later time in the terminal station 12 of the service provider 10.

After the data have been collected, a service person recovers the data storage medium 7 to check whether the data have been read.

The data read by the scanner are immediately sent to the terminal station 12 on the side of the service provider 10 via communication means (not shown).

By the foregoing operation, the terminal station 12 on the side of the service provider 10 comes to store data with regard to the number, the type, and the ID number of unused toner cartridges 60 supplied to the contract signer 1.

The terminal station 12 on the side of the service provider updates data based on the received data. FIGS. 45(a) and 45(b) through FIGS. 47(a) and 47(b) show service management tables storing data of installed cartridges and data of spare cartridges. The operation of the terminal station 12 for updating the data content is as already explained with reference to FIGS. 9(a) and 9(b) through FIGS. 11(a) and 11(b).

(Replacement Process)

FIGS. 48(a) and 48(b) show how the installed cartridge table and the spare cartridge table are updated in response to replacement of the toner cartridge 60. The operation of the terminal station 12 for updating the data content is as already explained with reference to FIGS. 12(a) and 12(b).

At this stage, no spare toner cartridge of black is provided, and thus the service provider 10 sends the at least a black toner cartridge to the contract signer 1. FIGS. 49(a) and 49(b) show this state, in which new spare cartridge data No. 9 has been added.

(Accounting Process)

The service provider 10 recovers the toner cartridge 60 which was used and replaced. For example, when the terminal station 12 detects from the data collecting section the toner cartridge (No. 1) which was used, instructions for recovering the toner cartridge (No. 1) are displayed on the output section 125 such as a CRT. Alternatively, the detection is notified to a terminal (not shown) which is connected to the local network 22. In this case, examples of a displayed message include "JUNE 1, USE OF TONER CARTRIDGE (0000 0000 0101 0000) BY THE CLIENT (USER ID: 000125) DETECTED", and "RECOVER THE TONER CARTRIDGE".

Note that, while it may be possible to detect the change from the state of FIGS. 47(a) and 47(b) to the state of FIGS. 48(a) and 48(b) to detect the toner cartridge used (No. 1), it is more reliable to display the foregoing message.

In receipt of the notification, a service person or a carrier under contract is sent to the contract signer 1 to recover the detected toner cartridge 60 from the contract signer 1.

Note that, the time of recovery may be the same as the time when supplying new product-in-circulation to improve efficiency.

The service provider 10, by the remaining amount detecting device 13, detects the current status of the recovered toner cartridge 60. That is, when the remaining amount detecting device 13 has the function of the electronic force balance, the amount of toner consumed is calculated by the following Equation (2):

$$\text{(Consumed Toner Amount } m\text{)} = \text{(Initial Weight of Toner Cartridge)} - \text{(Weight of Toner Cartridge After Recovery)} \quad (2)$$

Since the remaining amount detecting device 13 is connected to the terminal station 12, the result of measurement m is fed to the terminal station 12. That is, the measurement result is entered in the accounting list of FIG. 50 and stored in the memory section 124.

In the foregoing Embodiments, the remaining amount detecting section 92 was required to be provided in the image forming apparatus 2. This imposed restrictions on such factors as a detection level, accuracy, and method, and therefore it was difficult to conduct accurate and precise measurement. In contrast, in the present Embodiment, the consumed amount of toner is detected by the service provider 10 after the toner cartridge is recovered, thus providing a method which is free from such restrictions.

Note that, other than the foregoing detection method of consumed amount of toner, the consumed amount of toner may be directly calculated by the following Equation (3) by collecting only the remaining toner from the toner cartridge 60:

$$\text{(consumed toner amount } m\text{)} = \text{(initial mass of toner)} - \text{(mass of recovered toner)} \quad (3)$$

The arithmetic processing section 122 of the terminal station 12 calculates a charge by the following Equation (4)

$$P = p'^* m \quad (4)$$

where the consumed toner amount m is a variable.

This Equation (4) is different from Equation (1) in that while mi is discrete in the former, m in the latter is continuous. Thus, a charge can be calculated more precisely. Here, the units of P, p', and m are [yen], [yen/g (gram)], and [g], respectively.

FIG. 50 shows one example of lists of expendables (accounting lists [4] through [6]) subject to accounting. The lists of expendables are created, for example, based on the spare cartridge tables of FIG. 47(b) and FIG. 48(b) by clipping cartridge data of those cartridges which were used during a one-month period before the closing date of accounting (15th day of the month in the present embodiment). Here, the cartridge data which are clipped are those which are indicated by "USED" in the cells under "CURRENT STATUS" in the spare cartridge table, and which has dates of installation within the one-month period before the closing date of accounting.

Unlike the lists of expendables shown in FIG. 44, the consumed amount m is an analog value.

Figure 53:
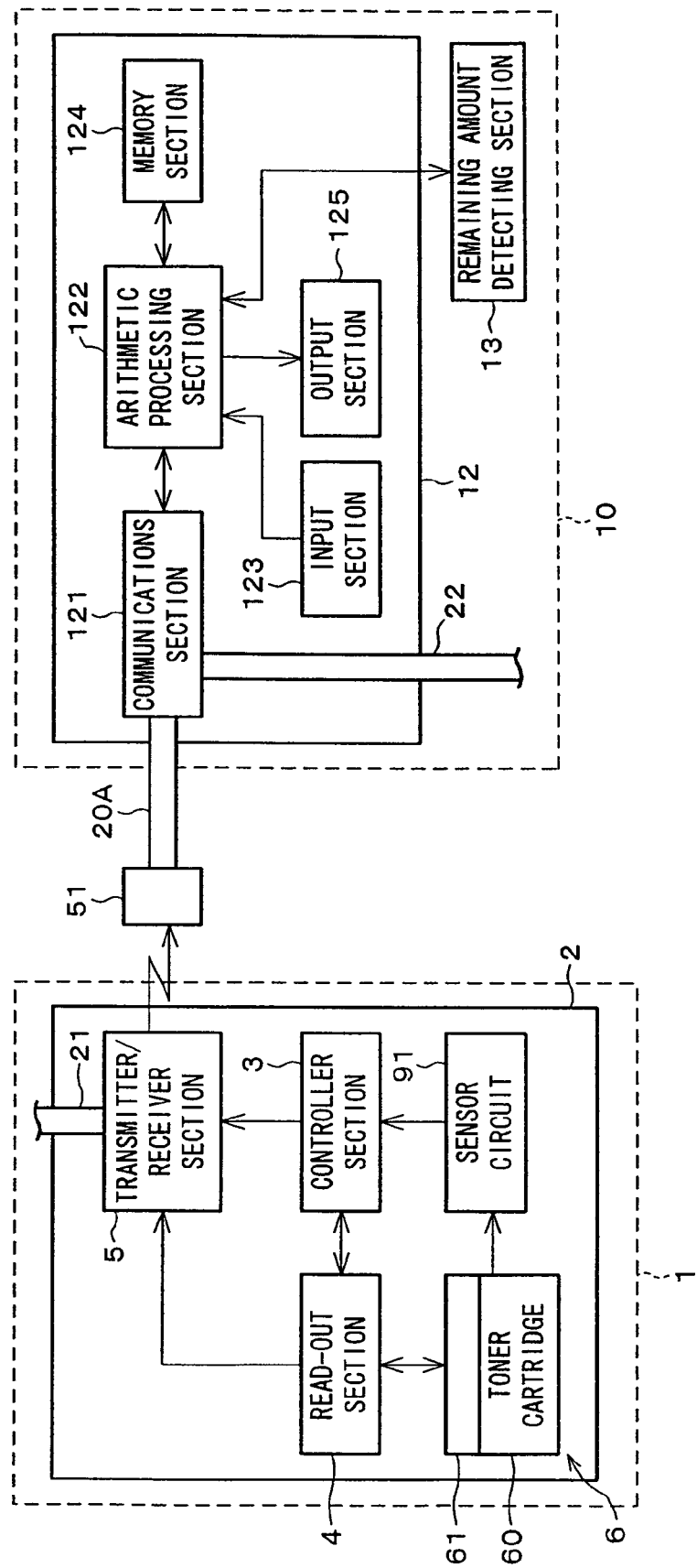
FIG. 53 is a schematic view showing another service management network system in accordance with the present invention.

Note that, as with the foregoing Embodiments, as shown in FIG. 53, the mode of communication of the transmitter/receiver section 5 which is installed in or connected to the image forming apparatus 2 may be wireless, so as to transmit data wireless from the transmitter/receiver section 5 to a second transmitter/receiver section 51 which is provided in the contract signer 1, while the second transmitter/receiver section 51 may be connected on line to a telephone line 20A (network 20).

Figure 52:
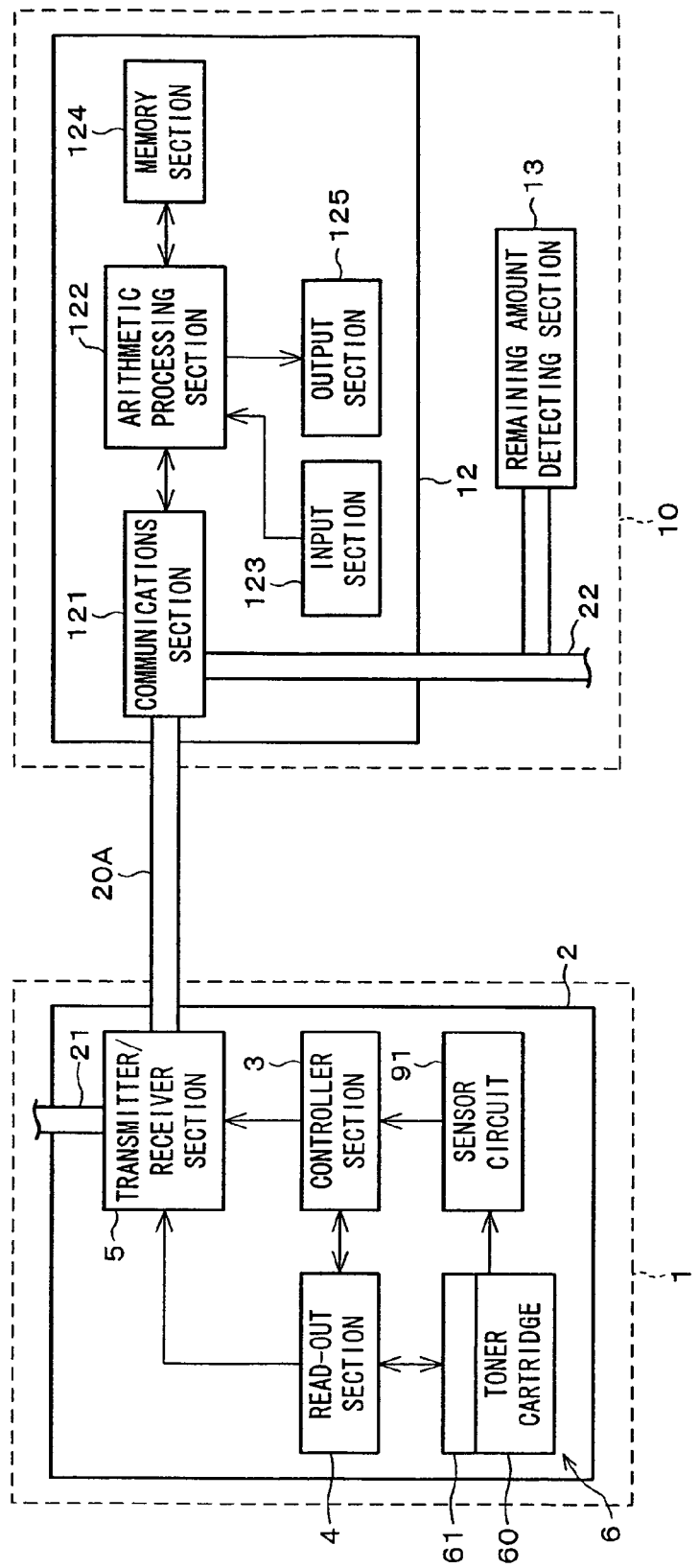
FIG. 52 is a schematic view showing another service management network system in accordance with the present invention.

Further, as shown in FIG. 52, the remaining amount detecting device 13 may be connected to the terminal station 12 by the local network 22. The remaining amount detecting device 13 is adapted to have a function so that the I/O interface section is compatible with network connection. In this way, the remaining amount detecting device 13 needs not be provided close to the terminal station 12, and, for example, the terminal station 12 can be provided in a management room, and the remaining amount detecting device 13 may be provided in a separate room such as a measurement room.

The toner, the expendables, stored in the toner cartridge 60 these days has a smaller particle diameter than ever in the order of several microns, and the toner easily flows out of the toner cartridge 60 after it is used. This has become hazard to the human body and to the apparatuses such as the terminal station 12. Under these circumstances, it is necessary to place the terminal station 12 and the remaining amount detecting device 13 in separate rooms, and therefore there is great benefit in connecting them by a network.

Further, input to the terminal station 12 may be made manually by the user.

Figure 54:
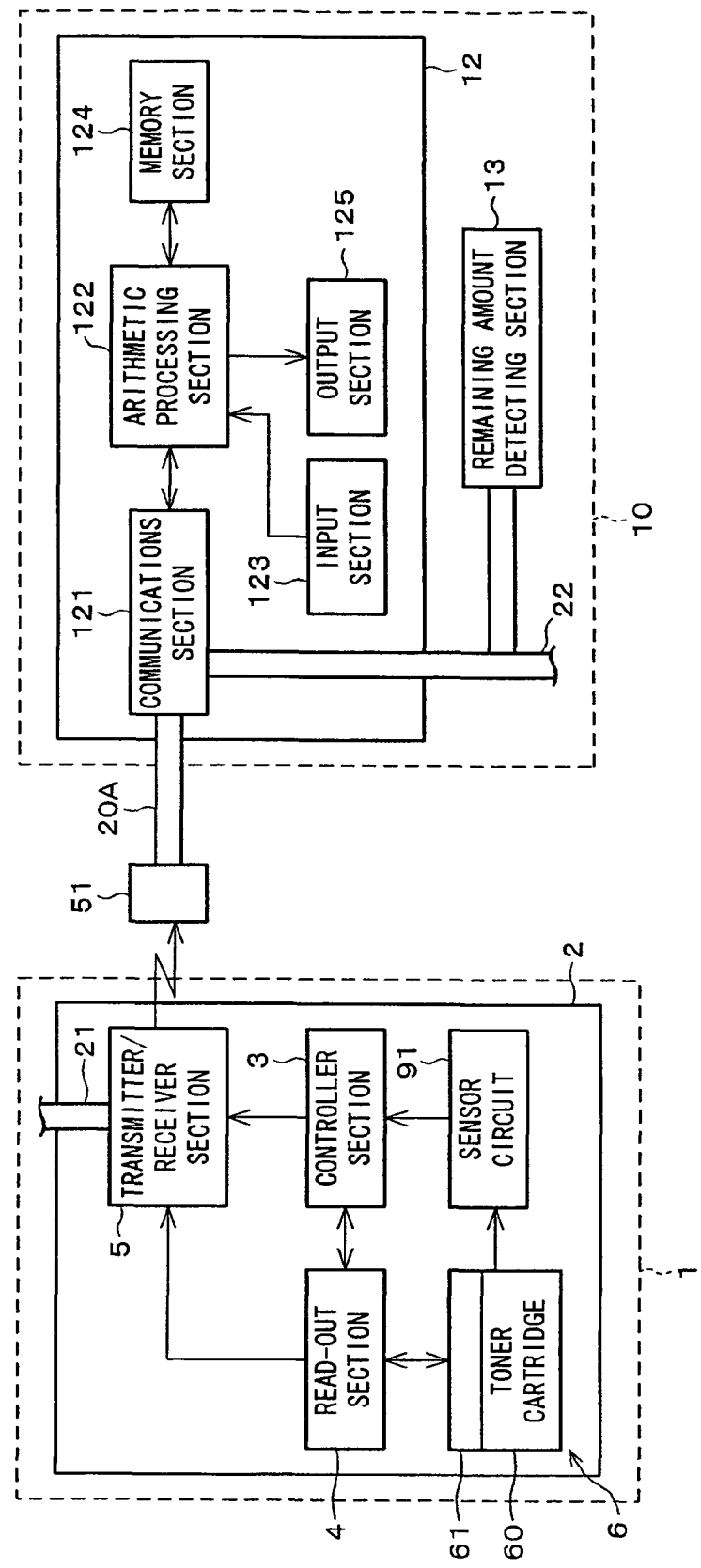
FIG. 54 is a schematic view showing another service management network system in accordance with the present invention.

Further, as shown in FIG. 54, the mode of communication of the transmitter/receiver section 5 which is installed in or connected to the image forming apparatus 2 may be wireless, so as to transmit data wireless from the transmitter/receiver section 5 to a second transmitter/receiver section 51 which is provided in the contract signer 1, while the second transmitter/receiver section 51 may be connected on line to a telephone line 20A (network 20), and the remaining amount detecting device 13 may be connected to the terminal station 12 by the local network 22.

Embodiment 8

The following describes another calculation method of accounting based on Embodiment 6.

Fee P includes toner fee P1 and fixed fee P2 for the elements other than toner, such as a toner cartridge casing, a developing roller, and a developing blade. That is, $$P=P1+P2 \quad (5)$$

The toner fee P1 is determined from the charge coefficient mi which is in accordance with remaining toner data L1 transmitted from the image forming apparatus 2, and is calculated from base fee p″ and the charge coefficient mi according to the following Equation (6)

$$P1=p'''*mi \quad (6).$$

Therefore, Equation (5) can be expressed by the following Equation (7)

$$P=p''*m+P2 \quad (7).$$

As described, the feature of the present embodiment is that only the toner cartridge 60 actually used by the contract signer 1 is subject to accounting while unused toner cartridges are not. Further, the amount of toner remaining in the used toner cartridges 60 is not subject to accounting. This allows the contract signer 1 to use the image forming apparatus 2 by paying fees only for the amount of toner consumed, without unnecessary stocks or shortage of expendables while avoiding complicated management.

Further, by separately setting fees for the toner part and the cartridge part excluding the toner part, fees can be set taking into consideration the cost of reuse or recycling.

Embodiment 9

The following describes another calculation method of accounting based on Embodiment 7.

Fee P is given by Equation (5) as with Embodiment 8.

Toner fee P1 is progressive, and is calculated by the following Equation (8)

$$P1=p''''*m \quad (8)$$

where p‴ is [yen/g] and m is the amount of toner used in grams. Therefore, Equation (5) can be expressed by the following Equation (9)

$$P=p''''*m+P2 \quad (9).$$

As described, the feature of the present embodiment is that only the toner cartridge 60 actually used by the contract signer 1 is subject to accounting while unused toner cartridges 60 are not. Further, the amount of toner remaining in the used toner cartridge 60 is not subject to accounting. This allows the contract signer 1 to use the image forming apparatus 2 by paying fees only for the amount of toner consumed, without unnecessary stocks or shortage of expendables while avoiding complicated management.

In the foregoing, the fixed fee P2 for the elements other than toner, such as the toner cartridge casing, the developing roller, and the developing blade is a constant. That is, recovered toner cartridges 60 are generally disposed and are recycled only when their performance can be guaranteed. That is, the components other than toner do not have a difference in terms of performance between a virgin material and a recycled material, or the difference, if any, is negligible. Therefore, a price difference based on this difference does not need to be taken into consideration.

However, a demand for recycling has not been higher in recent years in view of environmental friendliness, efficient use of resources, and reduction of wastes, etc., and the degradation in performance of a virgin material after repeated recycling has become a problem which cannot be ignored.

Further, there are cases where recovered components can be re-used, for example, depending on a relationship between the remaining life of the components at the time of recovery and the life of the apparatus itself.

The present invention was made to be also applicable to a situation like this, and one of the features of the present invention is that the expendables such as the toner cartridge includes memory means for storing the history of use of the expendables.

The memory means is, for example, an EEPROM, which is a rewritable non-volatile memory, and stores data of history of use of individual components of the toner cartridge 60 (e.g., developing roller, cover element, and blade, etc.). The history of use includes data of lot numbers of individual components, rounds of recycle or reuse, and total number of prints made by the components.

The terminal station 12 calculates the fixed fee P2 from these data, and additionally as required by weighing these data. For example, the fixed fee P2 is varied according to rounds of recycle, as shown in Table 10.

TABLE 10

| | ROUNDS OF RECYCLE | | | | |
|---|---|---|---|---|---|
| | 0 | 1 | 2 | ... | i |
| FIXED FEE P2 | P2-p0 | P2-p1 | P2-p2 | ... | P2-pi |

Here, pi is a deduction, and p0=0, p1<p2<...<pi. Further, $\Delta p_i = p_i - p_{i-1}$ does not need to have a fixed value, and, for example, may be $\Delta p1 \ll \Delta p2 \ll ... \ll \Delta p_i$. That is, pi may be set so that the deduction becomes larger as the rounds of recycle proceed.

Alternatively, the fixed fee P2 may be varied according to the number of prints made by the developing roller, as shown in Table 11.

TABLE 11

| | THE NUMBER OF SHEETS | | | |
|---|---|---|---|---|
| | 0 to 2,000 | 2,000 to 5,000 | 5,000 to 7,000 | ... |
| FIXED FEE P2 | P2-p2000 | P2-p5000 | P2-p7000 | ... |

Here, p2000<p5000<p7000..., and so on.

Further, the fixed fee P2 may be varied according to the matrix as shown in Table 12 with a plurality of parameters.

TABLE 12

| THE NUMBER OF PRINTS MADE BY DEVELOPING ROLLER | ROUNDS OF RECYCLE | | | |
|---|---|---|---|---|
| | 0 | 1 | 2 | 3 |
| 0 to 2,000 | p11 | p12 | p13 | p14 |
| 2,000 to 5,000 | p21 | p22 | p23 | p24 |
| 5,000 to 7,000 | p31 | p32 | p33 | p34 |
| ... | ... | ... | ... | ... |

Here, pij (i, j=1, 2, . . . ) is set depending on which of the rounds of recycle and the number of prints made by the developing roller is weighted.

Embodiment 10

The foregoing described the case where the product-in-circulation 6 includes a container such as the cartridge. The following describes the case where the product-in-circulation 6 makes up the expendables themselves such as the toner.
(Registration Process)

First, the data of a contract signer 1 is obtained as background data by a service provider 10. The way the data is obtained is as described with reference to FIGS. 8(*a*) and 8(*b*).

Note that, in a terminal station 12 of the service provider 10 is created and stored in a memory section 124 a service management file for each contract signer 1. FIG. 58 shows an example of a displayed file on an output section 125 of the terminal station 12. Toner replenish data is added to the management files shown in FIGS. 37(*a*) and 37(*b*) and other drawings. Initially, no data is entered with respect to the cartridges installed in an image forming apparatus 2 of the contract signer 1.

Then, the service provider 10 collects unique data with respect to all toner cartridges 60 to be supplied to the contract signer 1, and stores the unique data simultaneously or at a later time in the terminal station 12 of the service provider 10.

After the data have been collected, a service person recovers the data storage medium 7 to confirm that the data has been readout.

The data read out by the scanner are immediately sent to the terminal station 12 on the side of the service provider 10 via communication means (not shown).

By the foregoing operation, the terminal station 12 on the side of the service provider 10 comes to store data with regard to the number, the type, and the ID number of unused toner cartridges 60 supplied to the contract signer 1.

The terminal station 12 on the side of the service provider updates data based on the received data. That is, with reference to FIG. 59 which shows a supplied state of the toner cartridges 60, two for each color of black, yellow, magenta, and cyan, the code data of 20 digits, which differ by the toner cartridge 60, are entered as the unique data. The other entered data includes date of delivery.

Then, the service person opens the toner cartridge 60 needed to operate the image forming apparatus 2 and sets it therein. A remaining amount detecting section 92 detects the amount of remaining toner in the installed toner cartridge 60, and outputs the result of detection to the controller section 3. Here, the image forming apparatus 2 has been connected and set so that it can communicate with outside. Thus, the image forming apparatus 2 transmits the data of the toner cartridge 60 set and the data of remaining toner amount detected to the terminal station 12 of the service provider 10. These data are transmitted with a service receiver ID so as to allow the terminal station 12 to identify the contract signer 1 who has sent the data.

The terminal station 12 of the service provider 10, in receipt of the data, updates data of the cartridges 60 installed in the image forming apparatus 2 of the contract signer 1, as shown in FIG. 60. For example, dates of installation are entered, and the cells under "CURRENT STATUS" are changed from "NEW (SPARE)" TO "IN USE" at the time of installation. Further, since the toner cartridges 60 installed are new, "FULL" is entered in the cells under "REMAINING QUANTITY".

This completes initial setting and registration.

Note that, the foregoing described the case where the data of the image forming apparatus 2, such as the model number and the ID number distinct to the product are automatically sent to the terminal station 12 of the service provider 10. However, these data may be registered in the terminal station 12 by the service provider 10.

Further, the unique data need not be obtained if the service person calls the service management file for each contract signer 1 supplied with the toner cartridges 60, and manually inputs the data of remaining toner amount and replenished toner amount always through the input section 123 as the toner is used. Such an embodiment is also included in the service management method of the present invention.
(Toner Replenishing Process)

The following describes operation of replenishing toner when the toner in the toner cartridge 60 is consumed.

FIG. 61 shows a state after toner is consumed. Here, the amount of remaining toner in the black toner cartridge installed in the image forming apparatus 2 is very low, and the level of remaining amount is L4. The terminal station 12 therefore displays instructions for replenishing toner on a portion of a display screen or on the other terminals connected to the local network 22.

The instructions include the message, for example, "JUNE 1, BLACK TONER OF THE CLIENT (USER ID:000125) IS ALMOST EMPTY. PLEASE SEND A SERVICE PERSON AND REPLENISH TONER". Alternatively, the cell of remaining amount data of black toner (here, "L4") in FIG. 61 may be flashed to notify the manager operating the terminal station 12.

There service person in response to the instructions replenishes toner with respect to the image forming apparatus 2 of the contract signer 1 currently under service. There are various ways to replenish toner.

The first method is to replenish toner so that the amount of toner in the toner cartridge 60 reaches a defined value. Here, for the measurement of replenished amount, the weight of replenished toner is measured. For example, the amount of replenished toner may be measured from the weighted values before and after the replenishment using a weight sensor. This does not require accurate matching to the defined value, and thus less burden is put on a service person.

The second method involves the use of a toner pack of a known amount, which is opened to replenish toner. For example, when three toner packs, each pack containing a [gram], are used, the replenished amount is calculated by a*3. According to this method, the service person is not required to measure the amount of replenished toner on site, and thus no measurement instruments such as a weight sensor are needed, thus further reducing burden on a service person.

Further, the third method may be adopted when the level of remaining toner amount can be checked at the service provider 10 as shown in FIG. 61, whereby replenishing toner of an amount according to the level of remaining toner amount is prepared at the service provider 10 before sending a service person to replenish the toner. Compared with the second method, it is not required to open the packs, and the service person will know in advance how much amount should be replenished, which is advantageous in reducing the time required to replenish the toner.

FIG. 62 shows an example of management tables after replenishment. In this example, not only the black toner but the toners of the other colors are also replenished. The amount of replenished toner of each color is indicated by Sb, Sy, Sm, and Sc for black, yellow, magenta, and cyan, respectively, which are entered in the cells under "REPLENISHED AMOUNT" in the management tables after replenishment. Further, as a result of this, the data of remaining amount of the respective colors in the management tables are updated to "FULL".

(Accounting Process)

FIG. 63 shows one example of lists of expendables (accounting lists [7] through [9]) subject to accounting. The lists of expendables are created, for example, based on the spare cartridge tables of FIG. 59 and FIG. 60 by clipping cartridge data of those cartridges which were used during a one-month period before the closing date of accounting (15th day of the month in the present embodiment). Here, the cartridge data which are clipped are those which are indicated by "USED" and "IN USE" in the cells under "CURRENT STATUS" in the spare cartridge table, and which has dates of installation within the one-month period before the closing date of accounting.

To describe the accounting lists individually, the expendables used in the period 2000.03.16-2000.04.15 are black toner cartridge, yellow toner cartridge, magenta toner cartridge, and cyan toner cartridge. The count starts from the date they are installed in the image forming apparatus 2. Further, accounting is based on Equation (5), and only the container fee P2 is subject to accounting, and no accounting has been performed yet for the toner fee P1. This is because the amount of consumed toner could not be measured in the accounting period, even though toner was actually consumed in this accounting period. Therefore, all the accounting performed in this accounting period is the sum of fees P2 associated with, for example, the container such as the toner cartridge 60 (P2b+P2y+P2m+P2c)

Further, in the accounting list [8], since no expendables are used in the period 2000.04.16-2000.05.15, the charge is 0.

In the accounting list [9], the expendables used in the period 2000.05.16-2000.06.15 are toners of black, yellow, magenta, and cyan. The count starts from the date they were replenished. Also, only the toner fee P1 is subject to accounting. This is because the container fees P2 have been charged already in the accounting list [7]. The toner fee P1 is the product of base fee p [yen/gram] and the replenished amount [gram]. Thus, the accounting performed in this accounting period is with respect to the sum of fees P1 associated with the toner of the toner cartridge 60 (pb*Sb+py*Sy+pm*Sm+pc*Sc).

Further, as in FIG. 54, the mode of communication of the transmitter/receiver section 5 which is installed in or connected to the image forming apparatus 2 may be wireless, so as to transmit data wireless from the transmitter/receiver section 5 to a second transmitter/receiver section 51 which is provided in the contract signer 1, while the second transmitter/receiver section 51 may be connected on line to a telephone line 20A (network 20).

Figure 55:
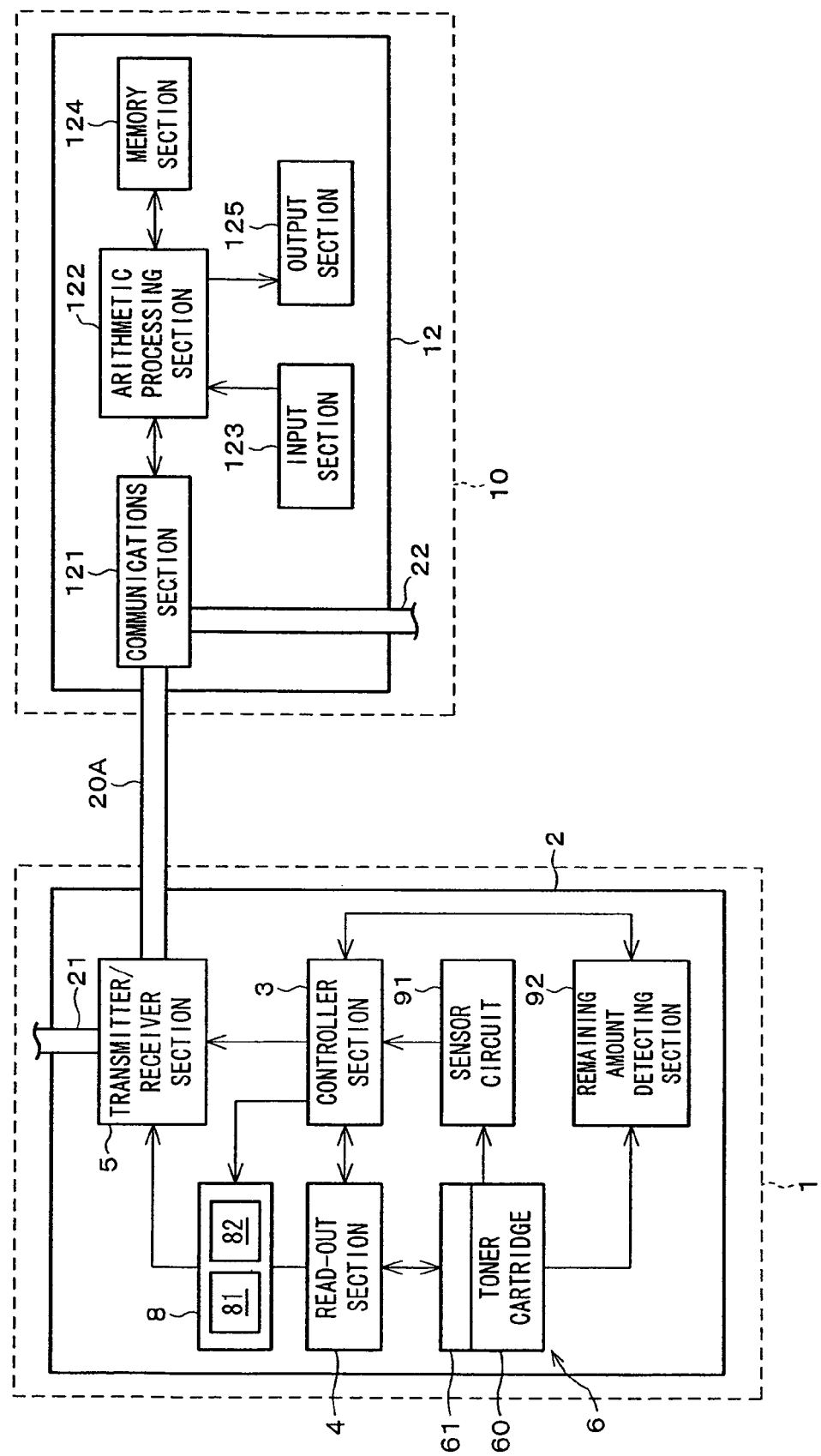
FIG. 55 is a schematic view showing another service management network system in accordance with the present invention.

Further, as described with reference to FIG. 4, the image forming apparatus 2 may be provided with an arithmetic section 8 which includes a memory section 81 and a comparator 82, as shown in FIG. 55, so as to prevent transmission of cartridge data when the same cartridge is inserted and ejected in and out of the image forming apparatus 2.

Figure 56:
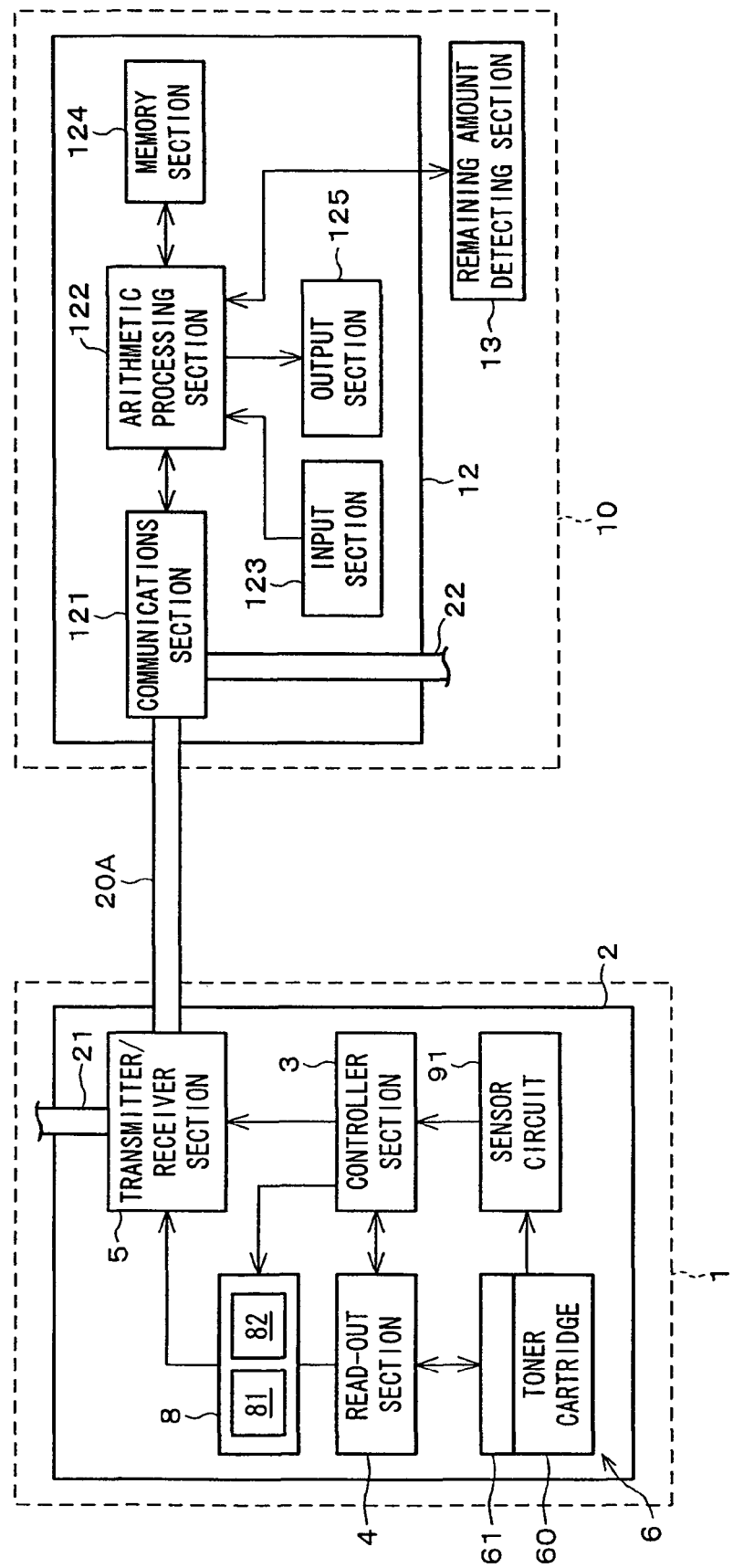
FIG. 56 is a schematic view showing another service management network system in accordance with the present invention.
Figure 57:
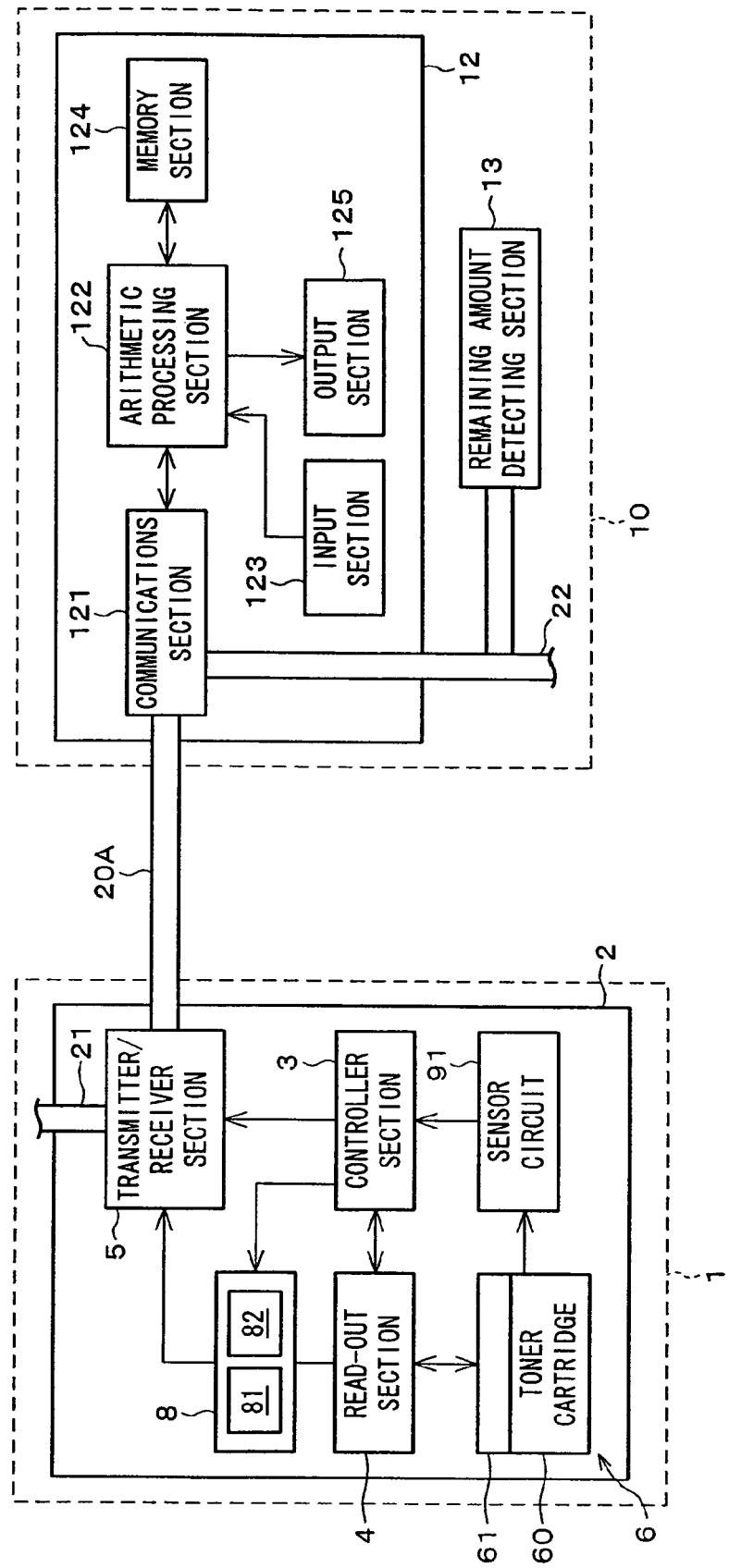
FIG. 57 is a schematic view showing another service management network system in accordance with the present invention.

The following describes another modification example with reference to FIG. 56 and FIG. 57.

The system structure of FIG. 56 additionally includes the arithmetic section 8 in the system structure of FIG. 51.

Further, the system structure of FIG. 57 additionally includes the arithmetic section 8 in the system structure of FIG. 52.

As described, a service management method of the present invention includes the steps of: registering in a terminal unique data of product-in-circulation which is supplied to a service receiver; obtaining unique data and remaining amount data of product-in-circulation supplied to the service receiver; and calculating a charge according to a remaining amount of the product-in-circulation supplied to the service receiver, based on the obtained unique data and remaining amount data of the product-in-circulation and the registered unique data of the product-in-circulation.

This is the system in which no charge is borne for the unused delivered product-in-circulation, and accounting is performed only with respect to actually used product-in-circulation, and therefore the service receiver can avoid unnecessary pre-payment.

The service provider, on the other hand, can make sure to keep clients, and the product-in-circulation can be sold stably. Further, since the data of product-in-circulation supplied first to the clients are registered by the service provider itself, unauthorized product-in-circulation, to which the service is not applicable, can be excluded. That is, because the product-in-circulation used by the service receiver is directly supplied by the service provider and is registered in the terminal of the service provider, unauthorized product-in-circulation will not be registered, and therefore will not be used.

Further, based on unique data of the product-in-circulation, the service provider can centrally manage the product-in-circulation which is used by a plurality of service receivers. This makes it possible to distinguish between authorized products and unauthorized products, thus allowing the service provider, for example, to warn the service receiver about the product-in-circulation used by the service receiver which was found to be an unauthorized product, so as to exclude unauthorized products.

That is, the unique data of the product-in-circulation is ID data which can be formed on the product-in-circulation and which can identify each product-in-circulation. Therefore, when the service provider tries to register a product-in-circulation which has already been registered, checking comes into operation because two or more product-in-circulations having the same data exist, and the one which is detected later, which is generally more likely to be an unauthorized product, having copied unique data of the authorized product, is excluded.

In this manner, the service provider can easily check if there is same product-in-circulation used, and based on the unique data of the product-in-circulation which was registered by the service provider, the service provider can identify the service receiver who has received it. Thus, the service provider can easily locate the service receiver using the unauthorized product.

Further, remaining amount data of product-in-circulation is obtained and a charge is determined based on the consumed amount of the product-in-circulation. Thus, for example, even when there is toner or ink remaining in a toner cartridge or ink cartridge, no charge will be borne to the amount of the remaining toner or ink, thus providing a service method which is economical for the service receiver.

Note that, in the case where the toner or ink has a date of expiry, the toner or ink which was recovered after the date of expiry cannot be re-used directly. If such a toner or ink is not subject to accounting, it will be deducted despite it cannot be re-used. This may not be profitable for the service provider. In such a case, only the remaining toner or remaining ink which was recovered before the date of expiry is deducted from accounting.

A service management method of the present invention includes the steps of: storing remaining amount data in relation to the corresponding unique data; and updating and storing any change of the obtained unique data and/or the remaining amount data, when at least one of these two data was changed.

According to this method, since the remaining amount data is changed as the product-in-circulation is used and the unique data is changed when new product-in-circulation starts being used after the old one, by storing the remaining amount data and the unique data in relation to each other, the history of use of the product-in-circulation in the service receiver can be grasped, and accounting can be performed regularly based on the history of use.

Note that, in managing the data in the form of a database, by relating data other than the unique data of the product-in-circulation (e.g., remaining amount data, name of service receiver, and ID number, etc.) to the unique data of the product-in-circulation, the data other than the unique data can be related to one another using the unique data as a main key. For example, using the unique data as a common key, it is possible to find the name of the service receiver and remaining amount data of the product-in-circulation used by this service receiver.

A service management method of the present invention is for product-in-circulation having at least an expendable and a container of the expendable, and includes the steps of: registering in a terminal unique data of product-in-circulation which is supplied to a service receiver; obtaining the unique data of the product-in-circulation used by the service receiver; verifying replacement of the product-in-circulation in the service receiver by detecting a change in the obtained unique data of the product-in-circulation; recovering the product-in-circulation after use after verifying replacement of the product-in-circulation; measuring a remaining amount of an expendable of the recovered product-in-circulation; and calculating a charge according to the remaining amount of the expendable.

The foregoing effects can also be obtained by this method. In addition, the service receiver is not required to detect the remaining amount, or transmit the detected remaining amount data. This is because, compared with the foregoing service management method, the remaining amount of the expendable of the product-in-circulation is measured after the product-in-circulation used is recovered.

Specifically, in order for the service receiver to detect a remaining amount without any trouble, the service receiver needs to be provided with a remaining amount detecting function. However, such an additional feature increases the size of the apparatus or results in a complicated structure. In view of this drawback, the remaining amount is measured on the side of the service provider, and it is not required to provide the remaining amount detecting section for the apparatus, thus reducing the size of the apparatus, a burden on the arithmetic process by way of a simpler control flow, and hardware such as a memory for storing the control flow.

Further, because the remaining amount of the expendable is measured on the side of the service provider, there will be no fluctuation of charge due to a variance in accuracy of detecting the remaining amount in the apparatus. As a result, the remaining amount of toner can be measured easily and accurately by the same criteria.

As described, in the present invention, the remaining amount data plays a major role in calculating a charge, and thus the present system can be appreciably employed where the variance in detection accuracy of the remaining amount detecting function of the apparatus should pose a problem.

A service management method of the present invention includes the steps of: registering in a terminal data of product-in-circulation which is supplied to a service receiver; detecting remaining amount data of the product-in-circulation supplied to the service receiver on the side of the service provider; obtaining the detected remaining amount data via a network; and calculating a charge according to the remaining amount of the product-in-circulation supplied to the service receiver, based on the registered data of the product-in-circulation and the obtained remaining amount data.

According to this method, the remaining amount can be detected by the simple step of detecting the remaining amount of the product-in-circulation on the side of the service receiver. Thus, a charge according to the remaining amount of the product-in-circulation can be calculated almost real time by transmitting the remaining amount data to the service provider via a network.

Note that, the step of detecting the remaining amount data of the product-in-circulation and the step of transmitting data containing at least the detected remaining amount data to the service provider are preferably carried out automatically by a device provided in the service receiver. This allows these steps to be carried out without fail and without conscious effort by the service receiver or without causing any trouble to the service receiver. Further, since the process is carried out via a network, it can be processed real time.

A service management method of the present invention is for product-in-circulation having at least an expendable and a container of the expendable, and includes the steps of: registering in a terminal unique data of product-in-circulation which is supplied to a service receiver; detecting the unique data of the product-in-circulation which is used on the side of the service receiver; obtaining the detected unique data by a terminal via a network; verifying replacement of the product-in-circulation in the service receiver by detecting a change in the obtained unique data of the product-in-circulation; recovering the product-in-circulation after use after verifying replacement of the product-in-circulation; measuring a remaining amount of an expendable of the recovered product-in-circulation; and calculating a charge according to the remaining amount of the expendable.

According to this method, the foregoing effects can be obtained with respect to the product-in-circulation having at least an expendable and a container for the expendable.

A service management device of the present invention includes: a first memory section for registering unique data of product-in-circulation which is delivered to a service receiver; communications section for detecting at least remaining quantity data of the product-in-circulation via a network; and an arithmetic processing section for calculating a charge based on the remaining amount data of the product-in-circulation.

According to this arrangement, the communications section detects use of the product-in-circulation via a network.

Thus, the service provider can make sure to obtain a purchase status of the service receiver almost real time at a remote location.

Further, because the unique data which is allocated to each product-in-circulation supplied to the service receiver is registered in the memory section, the arithmetic processing section can electrically judge, for example, whether the product-in-circulation detached and attached is the same one as in the case of a paper jam in the image forming apparatus, or it was replaced with new product-in-circulation, based on the data of the product-in-circulation installed. Thus, when the data of the product-in-circulation installed in new, a notification of this result can be regarded as the purchase of the product-in-circulation by the service receiver.

Note that, by storing the unique data of the product-in-circulation and the service receiver data in pair at the time of registration, the terminal can specify the service receiver who has used the product-in-circulation even when the terminal receives only the product-in-circulation data from the service receiver. Thus, compared with the case where the unique data of the product-in-circulation and the contract signer data are received in pair when the product-in-circulation is used, the transmitted data volume can be reduced, thereby reducing a load on the network and the arithmetic process.

Further, in the service management device of the present invention, the arithmetic processing section, based on data indicative of replacement of the product-in-circulation, calculates remaining amount of unused product-in-circulation stocked by the service receiver, and compares the result of calculation with a defined value, and when the remaining amount of the product-in-circulation has reached the defined value, notifies the service receiver that new product-in-circulation will be sent.

According to this arrangement, the stocks of spare product-in-circulation are monitored, and new product-in-circulation is sent when the stocks fall below the defined value. Thus, in addition to the foregoing effects, the product-in-circulation will not go out of stock in the service receiver.

Further, in the service management device of the present invention, the arithmetic processing section calculates the fee for the product-in-circulation used by the service receiver within a certain period, based on use data of the product-in-circulation and data indicative of the date the product-in-circulation was replaced.

With this arrangement, in addition to the foregoing effects, accounting can be automatically carried out on a regular basis.

The service management device of the present invention further includes a second memory section for storing data transmitted from the service receiver, wherein the arithmetic processing section compares the data stored in the second memory section and newly transmitted data, and when they are different, updates the stored data.

According to this arrangement, the remaining amount data changes as the product-in-circulation is used, and the unique data starts being changed when the new product-in-circulation is used after the old one was used. Thus, by storing the remaining amount data and the unique data in relation to each other, it is possible to grasp the history of use of the product-in-circulation in the service receiver, thus enabling regular accounting based on the history of use.

Further, even in the case where the same-unique data are sent repeatedly, the content of the second memory section is not updated. Thus, there will be no double count in accounting management, etc. Further, processes such as accounting management can be carried out at the timing when the content of the second memory section is updated.

A service management network system of the present invention is an apparatus which is detachably provided with consumable or expendable product-in-circulation having unique data to be specifiable, and is made up of:

a first group including a read-out section for detecting the unique data of the product-in-circulation; a transmitter section for transmitting data from the read-out section to outside via a network; and a controller section for controlling the read-out section and the transmitter section; and a second group including communications section for communicating with the first group; a first memory section for registering data of the product-in-circulation of the first group; a replacement verifying section for verifying replacement of the product-in-circulation by the service receiver by detecting a change in the unique data of the product-in-circulation obtained by the communications section; and a remaining amount detecting section for measuring a remaining amount of the product-in-circulation.

This allows the foregoing service management method which takes advantage of measuring a remaining amount of the product-in-circulation on the side of the service provider to be realized by the IT technology such as a network system or an IC chip.

Further, the replacement of the product-in-circulation with a spare in the first group can be considered as a purchase.

Further, even when the product-in-circulation is an unauthorized product, the apparatus operates to read the unique data of the product-in-circulation formed on the product-in-circulation. Thus, product-in-circulation which do not have the unique data can be excluded based on this check.

In the service management network system of the present invention, the read-out section of the apparatus, triggered by installation of the product-in-circulation in the apparatus, detects the unique data of the product-in-circulation.

Thus, since the installation of the product-in-circulation in the apparatus includes replacement of the product-in-circulation, by detecting the unique data of the product-in-circulation at the foregoing timing, the replacement verifying section of the second group can detect any change in the unique data of the product-in-circulation most efficiently.

Replacement of the product-in-circulation requires a procedure of detaching the installed product-in-circulation after use and installing new product-in-circulation. Thus, the timing of this procedure of detaching and installing the product-in-circulation can be used as a trigger signal for the read-out operation.

Note that, the timing can be detected, for example, by providing a sensor which detects the product-in-circulation installed in the apparatus, and by detecting a timing of rise or fall of a sensor output signal, so as to operate the read-out section in synchronism with this timing and read out the unique data.

In the service management network system of the present invention, the apparatus further includes an arithmetic section having a memory section for storing data inputted from the read-out section, and a comparator for comparing the newly inputted data from the read-out section with stored data, wherein the controller section carries out a control of updating the stored content of the memory section when the newly inputted data from the read-out section is different from the stored data.

Thus, it is possible to judge, by electrical operation, whether the product-in-circulation detached and attached is the same one as in the case of a paper jam, or it was replaced with new product-in-circulation. Thus, only when the data of the product-in-circulation, installed is new, it is regarded as the installation of new product-in-circulation.

Further, the unique data of the new product-in-circulation is detected by the read-out section of the apparatus, and it is transmitted to the communications section of the second group from the transmitter/receiver section via the network, and thus the arithmetic processing section can recognize purchase of the new product-in-circulation.

Embodiment 11

(Network Structure and Apparatus Structure)

The structures as shown in FIG. 3 and FIG. 35 are applicable to the structures of an image forming apparatus 2 on the side of a contract signer 1, a terminal station 12 on the side of a service provider 10 (service management device), and a network 20.

Note that, the remaining amount detecting section 92 is not necessarily required in the present embodiment and may not be provided at all.

As described, a toner cartridge 60 preferably includes on its surface or inside unique data. For example, as shown in FIG. 2, an IC chip 61 is provided, and the model number, the ID number, and the recycle data such as rounds of recycle and reuse are stored in the EEPROM or a non-volatile memory such as a ferroelectric memory in the IC chip 61. Alternatively, the data may be recorded more conveniently, for example, in the form of a bar code.

In the present invention, the data stored in the IC chip 61 are basically the model number, and the ID number and the recycle data of a specific product. These data are created at the time of manufacture and assemble of the toner cartridge 60, and therefore no data need to be overwritten during use by the contract signer 1. This requires less memory capacity and functions, and the software and hardware such as a memory controller can be greatly downsized.

Further, by optionally providing the remaining toner amount detecting sensor, the amount of toner currently in use can be detected relatively accurately.

Figure 78A:
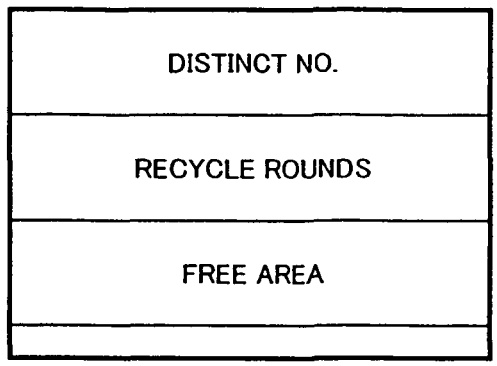
FIGS. 78(a)-78(c) are explanatory drawings showing a configuration of memory regions of an IC chip.
Figure 78B:
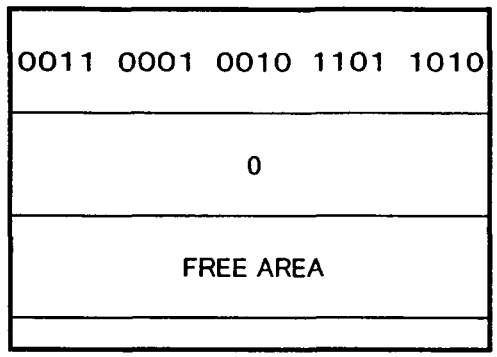

The following describes recorded content of the data stored in the toner cartridge 60. The IC chip 61 includes the unique data for specifying the toner cartridge 60, and other data such as rounds of recycle or reuse of the toner cartridge 60. For example, the unique data for specifying the toner cartridge 60 is the binary number of 20 digits such as 0011 0001 0010 1101 1010, which is stored beforehand in an area a, for example, as shown in FIGS. 78(a) and 78(b), which is a memory area of the IC chip 61. Note that, the number of digits is not just limited to 20. Also, the number is created and managed by the service provider 10.

Figure 78C:
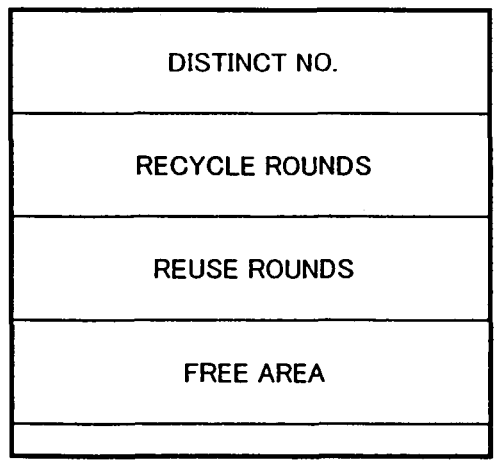

The service provider 10, as shown in FIGS. 78(a) and 78(b), writes data indicative of rounds of recycle or reuse of the toner cartridge 60 in an area b, which is another memory area of the IC chip 61. Note that, as shown in FIG. 78(c), an area b1 and an area b2 may be separately provided for storing rounds of recycle and rounds of reuse, respectively. Further, a free area is created for the items which require the contract signer 1 to write in data, i.e., a storage area for such conventional data as a converted value of the number of prints, or a printing time.

However, the present invention can also be realized without creating such items in the free area, and therefore less memory capacity is required than the case where the items are provided. Further, the function of writing data in the free area is not required either on the side of the image forming apparatus 2, thus simplifying the structure of the apparatus. Nevertheless, the items can be appreciably used when the use of items can provide more accurate service by enabling accurate management of the status of the toner cartridge 60.

(Product-In-Circulation Manufacturing Process)

The product-in-circulation 6 is manufactured by the manufacturer of the toner cartridge 60 by assembling components making up the toner cartridge 60 and by filling toner, followed by packaging and wrapping.

Here, the IC chip 61 stores unique data of the product-in-circulation 6 and recycle data of the product-in-circulation, for example, such as rounds of recycle.

For example, when the toner cartridge 60 is manufactured using a container which was made from a virgin material, 0 is inputted for the recycle rounds. Similarly, 1 is inputted when the container is made from a recycled material which was obtained by recovering the toner container 60 with zero round of recycle and by crushing and materializing it.

(Registration Process)

The following describes system operation.

First, the service provider 10 collects data with respect to all toner cartridges 60 to be supplied to the contract signer 1, and stores the data simultaneously or at a later time in the terminal station 12 of the service provide 10.

The data are collected in the manner as described based on FIG. 5(a), i.e., the data storage medium 7 having data (unique data of product-in-circulation 6) which can specify toner cartridge 60 is separately attached to a packaging material 63 of the product-in-circulation 6, and the data created in a data creating area 73 of the data storage medium 7 is read out by a scanner when the toner cartridge 60 is supplied to the contract signer 1.

Note that, since the data for specifying the product-in-circulation 6 is more important, the data storage medium 7 does not require recycle data. However, depending on the contract signer 1, use of recycled goods may or may not be acceptable. In an event like this, it may be beneficial to know in advance whether the goods to be supplied to the contract signer 1 are recycled goods or not. In this case, the data storage medium 7 includes data which indicates rounds of recycle of the product-in-circulation 6, in addition to the unique data of the product-in-circulation 6.

In a more detailed description of the operation of the terminal station 12, the terminal station 12 specifies the contract signer 1 from the received data. This can be done by identifying the user ID included in the received data. Then, management tables (FIGS. 64(a) and 64(b)) which relate to the specified contract signer 1 are called. The management tables are created for each contract signer 1 at the time when the subject of service becomes clear, for example, when the contract is made.

Then, the ID number of the toner cartridge 60 included in the received data is extracted. The ID number is the data to be entered in the cells of full data in the drawings. FIG. 65(b) shows a state after input of the full data. The method of data input is as already described above.

The following describes the case where data are read and transmitted electrically and simultaneously on site.

The terminal station 12 on the side of the service provider 10 updates data based on the received data. That is, with reference to FIG. 65(a) which shows a supplied state of the toner cartridges 60, two for each color of black, yellow, magenta, and cyan, the code data with 20 digits, which differ by the toner cartridge 60, are entered. The other entered data includes date of delivery. When the spare cartridge data are inputted for the first time, the cells under "CURRENT STATUS" all display "NEW (SPARE)" automatically.

Thus, at the time immediately after delivery, there is no change in the cartridge data and the data indicative of recycle rounds of the installed cartridges as shown in FIG. 65(a), and they are the same as those shown in FIG. 64(a).

Then, the service person opens the toner cartridge 60 needed to operate the image forming apparatus 2 and sets it therein. The remaining amount detecting section 92 detects the amount of remaining toner in the installed toner cartridge 60, and outputs the result of detection to the controller section 3. Here, the image forming apparatus 2 has been connected and set so that it can communicate with outside. Thus, the image forming apparatus 2 transmits the data of the toner cartridge 60 thus set to the terminal station 12 of the service provider 10.

The data may include data of recycle rounds, in addition to the unique data. This is because the recycle round data is needed when calculating the charge, and it can be transmitted at any timing before the calculation. The recycle round data is transmitted with a contract signer's ID so as to allow the terminal station 12 to identify the contract signer 1 who has sent the data.

The foregoing operation may be carried out automatically as already described. Further, with regard to the flow of control operation by the arithmetic processing section 122 when carrying out the new registration process of the spare cartridge table (FIG. 64(b)) by manual input, it is as explained above based on the flowchart of FIG. 33.

(Replacement Process)

The following will describe operation when the toner cartridge 60 is replaced.

The apparatus manager or apparatus user in the contract signer 1 in contract with the service manager 10 replaces the toner cartridge 60 with a new one which is stocked as a spare, in response to the message "REPLACE TONER CARTRIDGE" on the image forming apparatus 2. The present embodiment describes the case where only the black toner is consumed.

The toner cartridge 60 (spare cartridge No. 1) as shown in FIG. 66(b) is taken out of the image forming apparatus 2 to be replaced with a new toner cartridge 60 (spare cartridge No. 5).

The internal operation of the image forming apparatus 2 as shown in FIGS. 7(a) through 7(f) is as described above.

In the terminal station 12 of the service provider 10, the cells of the cartridges No. 1 and No. 5 under "CURRENT STATUS" are updated to "USED" and "IN USE", respectively. Also, as shown in FIG. 67(a), in the installed cartridge table, only the data (date of replacement, full data, unique data, recycle rounds, and corresponding spare cartridge) of the black toner cartridge 60 are updated.

That is, the arithmetic processing section 122 compares the unique data of the toner cartridge 60 which is recorded "NEW (SPARE)" in the cell under "CURRENT STATUS" in the spare cartridge table, and the unique data included in the data received by the communications section 121, and, when the unique data of the toner cartridge 60 of the same color (spare cartridge No. 5) is detected, the arithmetic processing section 122 verifies that the black spare cartridge No. 1 has been replaced with the black spare cartridge No. 5. That is, the arithmetic processing section 122 detects a change in unique data of product-in-circulation 6 as received by the communications section 121, so as to function as a replacement verifying section which verifies replacement of product-in-circulation 6 by the contract signer 1.

Further, the arithmetic processing section 122, based on this verification, updates the cell of the spare cartridge No. 5 under "CURRENT STATUS" from "NEW (SPARE)" to "IN USE". Here, the arithmetic processing section 122 has already detected that the new toner cartridge 60 (spare cartridge No. 5) is the black toner cartridge, and therefore verifies that the black toner cartridge 60 (spare cartridge No. 1) was used, and updates the cell of the spare cartridge No. 1 under "CURRENT STATUS" from "IN USE" to "USED". By the foregoing judging operation of the arithmetic processing section 122, the spare cartridge table is updated.

At this stage, no spare black toner cartridge is available, and thus the service provider 10 sends at least a black toner cartridge to the contract signer 1. FIGS. 68(a) and 68(b) show this state, in which data of new spare cartridge data No. 9 is added in the same manner as the foregoing process of initial setting and registration. The installed cartridge table of FIG. 68(a) is the same as that of FIG. 67(a).

The flow of control operation by the arithmetic processing section 122 concerning the automatic updating process of the spare cartridge table is as described above based on the flowchart of FIG. 34. FIG. 67(b) shows an example of a result of the spare cartridge table. Comparing this with FIG. 66(b), the records of No. 1 and No. 5 are updated.

The following describes how the installed cartridge table is updated. The installed cartridge table is basically a clipping of the spare cartridge table, and no data content has been modified therein and only the layout has been reorganized on the display.

In this manner, only the data of the spare cartridge table is handled, and modification to data of the installed cartridge table is prohibited, thus always matching data between the two tables.

More specifically, the subject to update in the installed cartridge table is the records of data which are entered in the cells under "DATE OF INSTALLATION" in the spare cartridge table. In the case when there are plural records of the same color data, the record in the installed cartridge table is updated based on the record with the earliest date in the cells under "DATE OF INSTALLATION".

Thus, in the case of FIG. 65(b), while data has been entered partially, the cells under "DATE OF INSTALLATION" are empty, and therefore no data has been entered in the corresponding installed cartridge table of FIG. 65(a).

Further, in the example as shown in FIG. 67(b), there are two records, No. 1 and No. 2, having the color data "00". However, comparing their cells under "DATE OF INSTALLATION", No. 5 has the earlier date, and thus the record of No. 5 is displayed as the data of the black toner cartridge 60 in the installed cartridge table.

(Accounting Process)

The following describes an accounting method. FIG. 69 shows lists of expendables to be subjected to accounting (accounting lists [1] through [3]). Each accounting period is, for example, one month. The lists of expendables are created, for example, based on the spare cartridge tables of FIG. 66(a) and FIG. 67(b) by clipping cartridge data of those cartridges which were used during a one-month period before the closing date of accounting (15th day of the month in the present embodiment). Here, the cartridge data which are clipped are those which are indicated by "USED" or "IN USE" in the cells under "CURRENT STATUS" in the spare cartridge table, and which has dates of installation within the one-month period before the closing date of accounting.

In Embodiment 6, the fee P1 for the toner cartridge 60 is fixed. That is, the recovered toner cartridges 60 are generally disposed and are recycled only when their performance can be guaranteed. Thus, the components other than toner do not differ in performance between a virgin material and a recycled material, or the difference, if any, is negligible. Therefore, a price difference based on this difference does not need to be taken into consideration.

However, a demand for recycling has not been higher in recent years in view of environmental friendliness, efficient use of resources, and reduction of wastes, and the degradation in performance of a virgin material after repeated recycling has become a problem which cannot be ignored.

Further, there are cases where the recovered components can be re-used depending on a relationship between the remaining life of the components at the time of recovery and the life of the apparatus itself.

The present invention was made to be also applicable to a situation like this, and one of the features of the present invention is that memory means for storing the history of use of products is provided for the expendables such as a toner cartridge in circulation, and the contract signer is charged only for the expendables he/she has actually used, and the rounds of recycle or reuse are reflected in the charge.

The memory means is, for example, an EEPROM, which is a rewritable non-volatile memory, and stores data ("use history data" hereinafter) concerning the history of use of individual components of the toner cartridge 60 (e.g., developing roller, cover member, blade, etc.). The use history data includes lot numbers, rounds of recycle and reuse of individual components, and the total number of prints made with these components.

The terminal station 12 calculates the toner cartridge fee P from the use history data, and additionally as required by weighing the use history data.

For example, the toner cartridge fee P is varied according to rounds of recycle, as shown in Table 13.

TABLE 13

| | ROUNDS OF RECYCLE | | | | |
|---|---|---|---|---|---|
| | 0 | 1 | 2 | ... | i |
| FEE P | P-p0 | P-p1 | P-p2 | ... | P-pi |

Here, pi is a deduction, and p0=0, p1<p2<...<pi. Further, $\Delta p_i = p_i - p_i(i-1)$ does not need to have a fixed value, and, for example, may be $\Delta p1 \ll \Delta p2 \ll ... \ll \Delta p_i$. That is, pi may be set so that the deduction becomes larger as the rounds of recycle proceed.

Alternatively, the toner cartridge fee P may be varied according to the frequency of use of the developing roller, for example, according to converted values from printed numbers, as shown in Table 14.

TABLE 14

| | THE NUMBER OF SHEETS | | | |
|---|---|---|---|---|
| | 0 to 2,000 | 2,000 to 5,000 | 5,000 to 7,000 | ... |
| FEE P | P-p2000 | P-p5000 | P-p7000 | ... |

Here, p2000<p5000<p7000..., and so on.

Further, the fee P may be varied according to the matrix as shown in Table 15 with a plurality of parameters.

TABLE 15

| THE NUMBER OF PRINTS MADE BY DEVELOPING ROLLER | ROUNDS OF RECYCLE | | | |
|---|---|---|---|---|
| | 0 | 1 | 2 | 3 |
| 0 to 2,000 | p11 | p12 | p13 | p14 |
| 2,000 to 5,000 | p21 | p22 | p23 | p24 |
| 5,000 to 7,000 | p31 | p32 | p33 | p34 |
| .. | ... | ... | ... | ... |

Here, pij (i, j=1, 2, . . . ) is the toner cartridge fee which is set depending on which of the recycle rounds and the number of prints made by the developing roller are weighted.

For example, when there is no dependency on the number of prints made by the developing roller, or when ignoring it,
p11=p21=p31=...
p12=p22=p32=...,
and this corresponds to the case of Table 13.

Also, when there is no dependency on the recycle rounds, or when ignoring it,
p11=p12=p13=...
p21=p22=p23=...,
and this corresponds to the case of Table 14.

Further, when taking into account both the number of prints made by the developing roller and the recycle rounds, generally, the following relations are given:
p11≠p21≠p31≠...
p12≠p22≠p32≠...;
and
p11≠p12≠p13≠...
p21≠p22≠p23≠...,
and this requires the matrix as shown in Table 15.

Here, the converted values from the number of prints made by the developing roller concern a technology such as durability of the developing roller, whereas the recycle rounds concern a technology such as recycle characteristics of the material itself, or a method of disassembly or removing impurities, etc. Therefore, the harder of these two categories in terms of technical difficulty is given less weight in terms of dependency. For example, when it is more difficult to improve performance of the recycled material than to improve durability of the developing roller, and the former requires more capital investment and manufacturing cost, a change Δ in fee involving the number of prints made
|p11−p21|, |p21−p31|, |p31−p41|, ...
is made larger than a change Δ in fee involving the recycle rounds
|p11−p12|, |p12−p13|, |p13−p14|, ...
In this way, when the life of the developing roller is short, a more deduction is given in order to keep the cost of recycling below this deduction even when the recycle rounds are large. Thus, a margin for the selling price can be ensured with respect to the manufacturing cost.

FIG. 69 shows accounting lists of the past three months which were calculated according to the rule of Table 13 with respect to the contract signer 1 with the ID number "000125". In the tables, the items under "ADJUSTMENT" correspond to pi. Similarly, the "ADJUSTMENT" given by the calculation according to the rules of Table 14 and Table 15 corresponds to p2000, p5000, . . . , and pij, respectively.

In the accounting list [1], the black toner cartridge (No. 1), Y toner cartridge (No. 2), M toner cartridge (No. 3), and C toner cartridge (No. 4) which were recognized as "IN USE" are read out from the spare cartridge table of FIG. 66(b) with the dates of installation. Further, the toner cartridges of the respective colors are given their quantities and base fees. The rounds of recycle is 0 for all the toner cartridges 60, and the cells under "ADJUSTMENT" read 0, and the sub-totals calculated by P-p1 are only the base fees P. Note that, in FIG. 69, the base fees are different depending on a cartridge type, i.e., color, but they may be the same.

In the accounting list [2], there is no subject of accounting in the period 2000.04.16-2000.05.15, and only "N/A" is displayed.

In the accounting list [3], the black toner cartridge (No. 5) used on Jun. 12, 2000 in the period 2000.05.16-2000.06.15 has one round of recycle as shown in FIGS. 67(a) and 67(b). Thus, the cell under "RECYCLE ROUNDS" has the numerical value 1, which was read out from the spare cartridge table, and the adjustment and the sub-total are pi and Pb-pi, respectively.

As described, in the present invention, only the toner cartridge 60 actually used by the contract signer 1 is subject to accounting while unused toner cartridges 60 are not. This allows the contract signer 1 to use the image forming apparatus 2 without unnecessary stocks or shortage of expendables while avoiding complicated management.

Further, the number of spare toner cartridges is checked by detecting installation of a new toner cartridge 60 in the image forming apparatus 2. Thus, only a single management method is required to manage the image forming apparatus in the way it is conventionally done and to manage stocks of spare toner cartridges 60.

Further, the biggest feature is that the charge is varied according to rounds of recycle of the toner cartridge 60. This allows a difference in performance of the toner cartridges 60 due to recycle rounds to be converted into a charge, thus maintaining proper proportions of price and performance.

Note that, the difference in performance includes not only initial performance but also aging over time.

Embodiment 12

The following describes yet another embodiment of the present invention. Note that, for convenience of explanation, elements having the same functions as those described in the foregoing embodiments are given the same reference numerals and explanations thereof are omitted here.

The operation of the remaining amount detecting section 92 as shown in FIG. 35 is as described above based on Table 8 in Embodiment 6.
(Registration Process)

In a terminal station 12 of a service provider 10 are created, for each contract signer 1, a service management file as shown in FIGS. 70(a) and 70(b) which additionally include cells for recording data of remaining amount in the installed cartridge table (FIG. 64(a)) and the spare cartridge table (FIG. 64(b)) which are provided as a service management file. The service management file of FIGS. 70(a) and 70(b) is stored in a memory section 124. FIGS. 70(a) and 70(b) show an example when the file is displayed in an output section 125 of the terminal station 12.

The terminal station 12 on the side of the contract signer 1 receives data of toner cartridge 60 which was electrically read out from a data storage medium 7 of the toner cartridge 60 supplied to the contract signer 1 and transmitted therefrom. The terminal station 12 then updates data of the service management file based on the received data. That is, FIG. 71(b) shows the case where toner cartridges 60, two for each color of black, yellow, magenta, and cyan are supplied, but immediately after delivery, the installed cartridge data, the data of remaining amount, and the data of recycle rounds in FIG. 71(a) have not been changed, and the content of FIG. 71(b) is the same as that of FIG. 71(a).

Further, a controller section 3 obtains remaining toner amount data L1 of the installed toner cartridge 60 from the remaining toner amount detecting section 92. In this case, since the toner cartridge 60 is new, the output of the remaining amount detecting section 92 indicates L1 (VERY HIGH), when the toner is detected in 4 levels as shown in Table 8. Note that, in the case of parallel transfer, there may be provided two signal lines (three including the ground line) which connects the remaining amount detecting section 92 and the controller section 3 to notify results of Table 8, and the signal lines may be related to each other as shown in Table 9. Thus, when a new cartridge is installed, the logic level "0" is outputted to the signal lines both for the upper and lower bits.

FIGS. 72(a) and 72(b) show a screen of cartridge data when new toner cartridges 60 are installed. The remaining amount data of all toner cartridges 60 installed in the image forming apparatus 2 are indicated by "L1".

The terminal station 12 on the side of the service provider 10, in receipt of the data, updates data of the installed cartridges in the image forming apparatus 2 of the contract signer 1 based on the transmitted data, as shown in FIG. 72(a). Further, as shown in FIG. 72(b), among toner cartridges 60 of the spare cartridge data, those set to be in use by the foregoing operation are updated from "NEW (SPARE)" to "IN USE". Further, the recycle rounds are also updated based on data transmitted from the contract signer 1, or inputted on the side of the service provider 10.
(Consumption Process)

The operation of the controller section 3 up to replacement of the toner cartridge 60 is as already described in Embodiment 6.

FIGS. 73(a) and 73(b) show an example when the terminal station 12 obtained the toner remaining amount data L1 from the image forming apparatus 2 and updated the data. The toner of the black toner cartridge 60 is consumed most and the level of remaining toner amount is L3. The levels of remaining toner amount of the other toner cartridges 60 are L2.
(Replacing Process)

The following will describe operation when the toner cartridge 60 is replaced.

The apparatus manager or apparatus user in the contract signer 1 in contract with the service manager 10 replaces the toner cartridge 60 with a new one which is stocked as a spare, in response to the message "REPLACE TONER CARTRIDGE" on the image forming apparatus 2. The present embodiment describes the case where only the black toner is consumed.

FIGS. 74(a) and 74(b) show an example of a screen of cartridge data immediately before the replacement. As shown in these Figures, the levels of remaining toner amount of the toner cartridges of black, magenta, yellow, and cyan are L4, L3, L2, and L2, respectively.

The used toner cartridge 60 (spare cartridge No. 1) is taken out of the image forming apparatus 2 to be replaced with a new toner cartridge 60 (spare cartridge No. 5). The operation of the image forming apparatus 2 when data of the new toner cartridges 60 are sent to the terminal station 12 of the service provider 10 from the image forming apparatus 2 is as described above based on FIGS. 7(a) through 7(f).

In the terminal station 12 of the service provider 10, the cells of the cartridges No. 1 and No. 5 under "CURRENT STATUS" are updated to "USED" and "IN USE", respectively, and their remaining toner amount data Li are updated to "L4" and "L1", respectively. The value L4 of the spare toner cartridge No. 1 does not change, whereas the value L1 of the spare cartridge No. 5 is varied as the toner is consumed.

The terminal station 12, detecting that the toner cartridge (e.g., No. 1) which had been used by the contract signer 1 has been replaced with the new toner cartridge (e.g., No. 5), maintains the toner data of the spare toner cartridge No. 1 of the state immediately before it was replaced, and does not update this data. This enables determining the amount of toner used by the contract signer 1 from the toner cartridge No. 1.

Further, the recycle rounds of the spare toner cartridge No. 5 are read out from the IC chip 61 and are sent to the terminal station 12. It can be seen in FIG. 75(b) that the spare cartridge No. 5 is a recycled product, and has one round of recycle.

Further, as shown in FIG. 75(a), in the table of installed cartridges, the data of only the black toner cartridge (date of replacement, full data, unique data, data of remaining amount, recycle rounds, and corresponding spare cartridge) are updated.

At this stage, since there is no spare black toner cartridge, the service provider 10 sends at least a black toner cartridge to the contract signer 1. FIG. 76(b) shows this state, in which new spare cartridge data of No. 9 is added.

In this manner, the service provider 10 constantly monitors the spare toner cartridge data, and sends a new spare toner cartridge 60 to the contract signer 1 at the time or before the spare toner cartridge 60 is used up, so as to prevent shortage of expendables in the contract signer 1. The number of stocks of spare toner cartridges 60 is calculated in the manner as already described in Embodiment 1.

(Accounting Process)

The following describes an accounting method. The fee P of the toner cartridge 60 includes toner fee P1 and fixed fee P2 for the components other than toner, such as the toner cartridge casing, the developing roller, and the developing blade, etc. That is, $$P = P1 + P2 \qquad (10).$$

The toner fee P1 is decided by the charge coefficient mi according to the toner remaining amount data Li which is transmitted from the image forming apparatus 2, and is calculated from the base fee p and the charge coefficient mi by the following Equation (11)

$$P1 = p*mi \qquad (11).$$

Here, P1 (=p*mi) is the fee the contract signer 1 is charged according to a consumed amount of toner, and is the product of the base fee p and the charge coefficient mi. The charge coefficient mi increases its value in correlation with a consumed amount of toner, and in the case of Table 2, m1<m2<m3<m4, and the value of mi (i=1, 2, 3, 4) is decided beforehand by experiment, etc. For example, m1=0.7, m2=0.8, m3=0.9, and m4=1. Note that, p and/or mi may be set for each color.

Meanwhile, P2 is deducted by a deduction pi according to recycle rounds in the manner the toner fee P is deducted as described above based on Table 13. Thus, by substituting P2 by P2−pi, Equation (10) becomes $$P = p*mi + (P2 - pi) \qquad (12).$$

In this manner, by setting separate fees for the expendable part such as the toner part and the container part such as the cartridge part, so as to charge fees progressively for the toner part and according to rounds of recycle or reuse for the cartridge part, it is possible to set fees which take into consideration cost of reuse or recycling.

FIG. 77 shows lists of expendables to be subjected to accounting (accounting lists [4] through [6]). Each accounting period is, for example, one month. The lists of expendables are created, for example, based on the spare cartridge tables of FIG. 72(b) and FIG. 73(b) by clipping cartridge data of those cartridges which were used during a one-month period before the closing date of accounting (15th day of the month in the present embodiment). Here, the cartridge data which are clipped are those which are indicated by "USED" or "IN USE" in the cells under "CURRENT STATUS" in the spare cartridge table, and which has dates of installation within the one-month period before the closing-date of accounting.

FIG. 77 displays lists of the past three months which were created by calculations according to the rules of Tables 8 and 9. In the lists, the items indicated by "ADJUSTMENT" correspond to the deduction pi according to recycle rounds.

In the accounting list [4], the recycle rounds indicate 0 for all toner cartridges 60 in the period 2000.03.16-2000.04.15, and the cells under "ADJUSTMENT" read 0, and the sub-totals ③ calculated by P2−pi are only the base fees P2. Note that, in FIG. 77, the base fees are different depending on a cartridge type, i.e., color, but they may be the same. Further, in the progressive part, the sub-total ⑥ is given by the product of the base fee p and the charge coefficient mi of each toner cartridge. The total ⑦ is given by the sum of subtotals ③ and ⑥, and the sum of totals ⑦ gives a ground total ⑧.

In the accounting list [5], there is no subject of accounting in the period 2000.04.16-2000.05.15, and; only "N/A" is displayed.

In the accounting list [6], the black toner cartridge (No. 5) used on Jun. 12, 2000 in the period 2000.05.16-2000.06.15 has one round of recycle as shown in FIGS. 75(a) and 75(b). Thus, the cell under "RECYCLE ROUNDS" has the numerical value 1, and the adjustment and the sub-total ③ are p1 and Pb−p1, respectively. In the progressive part, the toner remaining amount data L1 of the black toner cartridge (No. 5) is L1, and based on this, m1 is substituted in the charge coefficient mi according to Table 7, so as to calculate the sub-total 6 by the product of the base fee p and the charge coefficient m1. The total ⑦ is given by the sum of subtotals ③ and ⑥, and the sum of totals ⑦ gives a ground total ⑧.

The charge is calculated for each toner cartridge by Equation (12). Further, the charge coefficient mi according to the toner remaining amount data Li takes a single value, and different base fees p are set for the respective colors. This allows appropriate fee setting.

The lists may be used as a bill.

As described, one of the features of the present invention is that only the toner cartridge 60 actually used by the contract signer 1 is subject to accounting while unused toner cartridges 60 are not. This allows the contract signer 1 to use the image forming apparatus 2 without unnecessary stocks or shortage of expendables while avoiding complicated management.

Further, one of the features of the accounting method of the present invention is that accounting is based on not only the number of toner cartridges used but also the amount of consumed toner. In this way, the fee charged to the contract signer 1 for the consumed amount of toner will be fair even when there is a large amount of toner remaining in the toner cartridge 60 recovered, and there will be no waste. Further, reuse of remaining toner contributes as a whole to improving efficiency of using toner, in addition to being resource-efficient and energy-efficient in a toner manufacturing process.

Further, because the number of spare cartridges is checked by detecting installation of a new toner cartridge 60, only a single management method is required to manage the image forming apparatus in the way it is conventionally done and to manage stocks of spare toner cartridges 60.

Further, the biggest feature is that the amount of money charged is varied according to rounds of recycle of the toner cartridge 60. This allows a difference in performance of the toner cartridges 60 due to recycle rounds to be converted into a charge, thus maintaining proper proportions of price and performance.

Note that, the difference in performance includes not only initial performance but also aging over time.

Further, because recycle rounds of the product-in-circulation 6 can be obtained via the network 20, the service provider 10 can in effect carry out product-in-distribution management, such as a trouble forecast, with respect to the product-in-circulation 6 in the market based on the obtained data. For example, when the product-in-circulation 6 happens to be a product which is recycled many times, the service provider 10 can forecast, for example, that the life of this product-in-circulation is comparatively shorter than usual non-recycled products, so as to intentionally recover the product-in-circulation 6 before the toner is consumed. This is made possible by the system where accounting is performed according to the amount of toner used. As a result, it is possible to prevent troubles which may be caused when recycled components are used for the product-in-circulation 6.

(Reuse Process)

The foregoing examined the recycle rounds of a resin material such as the container making up the toner cartridge 60. This is "reuse" at the material level but it not "reuse" at the component level, such as the container made from the recycled material.

The following describes "reuse" at the component level, i.e., re-using the components. In this case, as shown in FIG. 78(c), the IC chip 61 must store rounds of reuse, in addition to rounds of recycle. When no recycled materials are used, the recycle rounds are not needed and only the rounds of reuse are provided.

The service provider 10 recovers a used toner cartridge 60 by way of a service person. The toner cartridge 60 is then inspected with respect to each individual component in a recycle factory, so as to judge whether they can be re-used or not. If re-usable, these components are put to reuse after washing or relatively minor fixing, etc. If not, they are disposed or put to recycle to be replaced with new components. The new components may be virgin components made of a virgin material, or recycled components made from a recycled material.

For example, when the container is put to reuse, as shown in FIG. 78(c), rounds of reuse are inputted in area b2 of the IC chip 61. Specifically, the value stored in the area b2 of the IC chip 61 is read out and updated by overwriting a value which exceed the original value by 1. When not re-using but replaced with a new component, the value is reset to 0. These processes are carried out by the terminal station 12 of the service provider 10.

Embodiment 13

The following will describe still another embodiment of the present invention. Note that, for convenience of explanation, elements having the same functions as those described in the foregoing embodiments are given the same reference numerals and further explanations thereof are omitted here.

A toner cartridge 60 includes, in addition to the container, other major components such as the developing roller and a layer thickness regulating member. Further, the container is made up of a plurality of components including cover members K1, K2, . . . and so on, one or a plurality of which may be made from a recycled material. In this case, these components are all recycled products when viewed as the toner cartridge as a whole, and when only single data is used as the recycle data as in the foregoing embodiments, all toner cartridges 60 are considered equivalent, provided that the rounds of recycle are the same. However, because recycle cost, life, and degree of degradation are all different among components, the service provider 10 cannot earn profit if they are measured by the same criteria.

In order to solve this problem, a table with a list of individual components of the toner cartridge 60 is created as shown in Table 16 in the terminal station 12 of the service provider 10, i.e., in the memory section 124. With the use of recycle rounds given in this table, it is possible to eliminate the problem which are caused by such factors as a difference in performance among components, a manufacturing cost associated with recycling, and the costs of disassembling and assembling the components, while using single recycle data.

Note that, the calculation of recycle rounds using the table is performed by the terminal station 12 of the service provider 10, and the contents stored in the IC chip 61 are single recycle data. Thus, unlike the conventional example, it is not required to store individual data of each component, and the memory capacity can be reduced from conventionally.

TABLE 16

| DEVELOPING ROLLER | R1 |
| LAYER THICKNESS REGULATING SECTION | R2 |
| COVER MEMBER K1 | R3 |
| COVER MEMBER K2 | R4 |
| . . . | . . . |
|  | Ri |
| . . . | . . . |

Here, Ri (i=1, 2, . . . ) indicates recycle rounds given to the toner cartridge 60, where i indicates a recycled component. For example, R1, R2, R3, . . . indicate recycle rounds given to the toner cartridge 60 when the developing roller, the layer thickness regulating member, and the cover member K1 are the only recycled products.

Further, when the developing roller and the layer thickness regulating member are the recycled products, the recycle rounds are given by the sum of (1) recycle round R1 which given to the toner cartridge 60 when the developing roller is the recycled product and (2) recycle round R2 which is given to the toner cartridge 60 when the layer thickness regulating member is the recycled product.

Generally, $R1 \neq R2 \neq R3 \neq Ri$, and they are calculated by weighing based on a difference in performance and a difference in manufacturing costs among the components. For example, when the recycle round R3 of the cover member K1 is used as a reference, the recycle rounds R1 and R2 of the developing roller and the layer thickness regulating member are weighted so that R1=R3 and R2=R3. That is, when the developing roller is the recycled product with one recycle round, the recycle round is regarded as three using the cover member K1 as a reference, despite that the recycle round of the developing roller itself is one, in order to keep balance with the other recycled products in view of importance of the developing roller. Similarly, the recycle round of the layer thickness regulating member, which is actually one, is regarded as two using the cover member K1 as a reference.

In the foregoing example, the recycle round R3 of the cover member K1 is related to the recycle rounds R1 and R2 of the developing roller and the layer thickness regulating member by R3<R1, R2. This is because it was considered to be more advantageous, in view of performance, or reliability of performance such as duration of sustained performance, to recycle those components, such as the cover members K1 and K2, which have relatively less influence on the performance as a whole of the toner cartridge 60 than the major components such as the developing roller. However, not limiting to this, the relation R1, R2<R3 is also possible when giving priority to scattering of toner which is caused by degradation of the cover members K1 and K2 and may be harmful to the human body and environment.

Embodiment 14

The following describe yet another embodiment of the present invention. Note that, elements having the same functions as those described in the foregoing embodiments are given the same reference numerals and further explanations thereof are omitted here.

(Network Structure and Apparatus Structure)

An image forming apparatus 2 on the side of a contract signer 1 and a terminal station 12 of the service provider 10 have the structure as shown in FIG. 57.

The terminal station 12 differs from the terminal station 12 of FIG. 35 in that the remaining amount detecting device 13 is connected to an I/O interface section (not shown), and the arithmetic processing section 122 and the remaining amount detecting device 13 exchange data via the I/O interface section. The remaining amount detecting device 13 has a measurement section and the I/O interface section, and the measurement section has the function of, for example, an electronic force balance. This allows the arithmetic processing section 122 to obtain data (remaining amount data) which was given by measuring the weight of toner cartridge 60 recovered from the contract signer 1 or the weight of remaining toner amount.

The arithmetic processing section 122 of the terminal station 12 calculates the charge which takes into account the amount of toner used, based on weight data of the recovered toner cartridge or weight data of the remaining toner amount which was obtained from the remaining amount detecting device 13.

(Accounting Process)

In the foregoing embodiments, the used toner cartridge 60 is recovered from the contract signer 1 after accounting is finished in the terminal station 12, for example, when the service provider 10 delivers a new toner cartridge 60.

On the other hand, in the present embodiment, a remaining amount of toner is measured by the service provider 10, and thus the toner cartridge 60 still having toner but is nonetheless unnecessary is recovered from the contract signer 1 before accounting is carried out.

Thus, in order to recover the toner cartridge 60 which was replaced with a new one, the service provider 10, for example, monitors the cartridge data screen, and detects a change in state of the spare cartridge table from FIG. 74(b) to FIG. 75(b), so as to detect the used toner cartridge (No. 1). Upon this detection, the service provider 10 sends a service person to recover this toner cartridge 60.

Note that, the detection of the toner cartridge 60 may be carried out by monitoring the cartridge data screen by a person as in the foregoing example, or may be carried out on software so that the arithmetic processing section 122 monitors whether data which indicates "USED" has been inputted in the cell under "CURRENT STATUS". Also, the time of recovery is preferably when new product-in-circulation 6 is delivered, so as to improve efficiency of operation.

The service provider 10 detects the current status of the recovered toner cartridge 60 by the remaining amount detecting device 13. That is, when the measurement section of the remaining amount detecting device 13 has the function of the electronic force balance, the amount of consumed toner can be calculated by the following Equation (13):

(Consumed Toner Amount $m$)=(Initial Weight of Toner Cartridge)−(Weight of Recovered Toner Cartridge) (13)

Note that, since the initial weight of the toner cartridge is defined for each type of the toner cartridge 60, it is stored, for example, in the remaining amount detecting device 13 and values according to different types of the toner cartridge 60 are called for.

The remaining amount detecting device 13 is connected to the terminal station 12, and thus the consumed toner amount m, which is the result of measurement, is incorporated in the terminal station 12, and the arithmetic processing section 122 enters it in the cell under "CHARGE COEFFICIENT mi" in the accounting list of FIG. 77 and store it in the memory section 124.

The foregoing embodiments required that the remaining amount detecting section 92 be provided inside the image forming apparatus 2. This imposed restrictions on such factors as level, accuracy, and method of detection, and it was difficult to make accurate and precise measurements. In the present embodiment, on the other hand, the consumed toner amount is detected by the service provider 10 after recovering the toner cartridge 60, thus providing a method which is free from these restrictions.

Note that, as an alternative method of detecting the consumed amount of toner, the consumed toner amount may be calculated directly by the following Equation (14) by collecting only the remaining toner from the toner cartridge 60

(Consumed Toner Amount $m$)=(Initial Mass of Toner)−(Mass of Toner after Recovery) (14)

In this case, as in the foregoing example, the initial mass of the toner is defined for each type of the toner cartridge 60 and values according to different types of the toner cartridge 60 are called for.

The arithmetic processing section 122 of the terminal station 12 calculates the charge (toner fee P1 and fixed fee P2) by the following Equation (15):

$$P1 = p'^* m \quad (15).$$

Here, the units of P, p', and m are [yen], [yen/g], and [g], respectively. Note that, this Equation (15) differs from Equation (11) in that the m in the former takes a continuous value, while mi in the latter is a discrete value. Thus, the charge can be calculated more precisely.

Therefore, the fee P charged to the contract signer 1 is given by $$P = p'^* m + (P2 - pi) \quad (16)$$

according to Equation (12) which takes into account the deduction pi according to recycle rounds of the components of the toner cartridge 60.

FIG. 79 shows lists of expendables to be subjected to accounting (accounting lists [7] through [9]). Each accounting period is, for example, one month. The lists of expendables are created, for example, based on the spare cartridge tables of FIG. 74(b) and FIG. 75(b) by clipping cartridge data of those cartridges which were used during a one-month period before the closing date of accounting (15th day of the month in the present embodiment). Here, the cartridge data which are clipped are those which are indicated by "USED"

or "IN USE" in the cells under "CURRENT STATUS" in the spare cartridge table, and which has dates of installation within the one-month period before the closing date of accounting.

Unlike the accounting lists [4] through [6] of FIG. 77, the consumed amount m (mb, my, mm, and mc) is an analog value.

Note that, the present embodiment can also employ the structure of any of FIG. 52 through FIG. 57 as described above.

As described, a service management method of the present invention includes the steps of: registering in a management table of a computer data of product-in-circulation (product-in-circulation) to be supplied to a service receiver; and calculating by a computer a charge of the product-in-circulation supplied to the service receiver according to a remaining amount and recycle data and/or reuse data of the product-in-circulation supplied to the service receiver, based on data of the product-in-circulation supplied to the service receiver, and remaining amount data and the recycle data and/or reuse data which are obtained (via the communications section or an input section of the computer).

According to this method, the remaining amount data of product-in-circulation is obtained to calculate an account based on the remaining amount of the product-in-circulation, i.e., a consumed amount. Thus, even when, for example, there is a remaining toner as in the case of a toner in a toner cartridge, there will be no charge for the amount of remaining toner, and it is possible to provide a more economical and precise service method for the service receiver.

As described, a service management method of the present invention is a method employing a computer for supplying product-in-circulation needed to operate an apparatus, and includes the steps of: registering in a management table of the computer by a service provider unique data for specifying the product-in-circulation supplied to a service receiver, and recycle data and/or reuse data; receiving from the service receiver via a network (by operation of the computer by the service provider) data including at least the unique data of the product-in-circulation installed in an apparatus provided for the service receiver and the read out by the apparatus; specifying in the management table (by the service provider) the product-in-circulation to be verified as a purchase by the service receiver, based on the data received from the service receiver; and calculating by the computer a charge to the service receiver, based on the number of the product-in-circulation specified and its recycle data or reuse data.

According to this method, the foregoing effects can be obtained by the described process carried out by the service provider by operating the computer. In particular, by managing the recycle data and/or reuse data, for example, by the computer of the service provider, only the unique data of the product-in-circulation can be transferred via the network, thus reducing a load on the network.

Here, the data can be obtained without any problem when the manufacturer of the product-in-circulation is the service provider of the present invention, because the unique data of the product-in-circulation can be inputted in the computer, together with the recycle data, when the unique data is given to the product-in-circulation in manufacture. In this case, the computer which gives the unique data to the product-in-circulation, for example, in manufacture of the product-in-circulation may be the same as the computer which inputs the recycle data and/or reuse data.

On the other hand, when the manufacturer of the product-in-circulation and the service provider of the present invention are different, the service provider requests the manufacturer to create the unique data of the product-in-circulation and the recycle data and/or reuse data of the product-in-circulation in pair in a data storage medium such as an IC chip. Further, the recycle data and/or the reuse data which are related to the unique data of the product-in-circulation are obtained as an electrical file and stored in the management table of the computer. This allows the recycle data and/or reuse data of the product-in-circulation to be obtained from the file, using the unique data of the product-in-circulation as a guide.

As described, a service management method of the present invention is a method employing a computer for supplying product-in-circulation needed to operate an apparatus, and includes the steps of: registering in a management table of the computer by a service provider unique data for specifying the product-in-circulation supplied to a service receiver, and recycle data and/or reuse data; receiving from the service receiver data including at least the unique data and the recycle data and/or reuse data of the product-in-circulation installed in an apparatus provided for the service receiver; specifying in the management table the product-in-circulation to be verified as a purchase by the service receiver, based on the data received from the service receiver; and calculating by the computer a charge to the service receiver, based on the number of the product-in-circulation specified and its recycle data or reuse data.

The foregoing effects can also be obtained by this method. In particular, since the service provider receives the recycle data and/or reuse data from the service receiver, it is not required to manage the recycle data and/or reuse data altogether. Thus, a management load on the service provider can be reduced.

As described, a service management method of the present invention includes the steps of: reading out remaining amount data and recycle data and/or reuse data of the product-in-circulation used by the service receiver by accessing a management table which stores data for specifying the product-in-circulation supplied to the service receiver, remaining amount data of the product-in-circulation used by the service receiver, and the recycle data and/or reuse data of the product-in-circulation; and calculating a charge to the service receiver, based on the remaining amount data of the product-in-circulation read out, and the recycle data or reuse data, wherein these steps are executed by a computer program.

According to this method, as with the foregoing functions and effects, it is possible to provide an economical service method for the service receiver based on records on the management table.

As described, a service management device of the present invention includes: a memory section for registering unique data for specifying the product-in-circulation delivered to the service receiver; communications section for detecting the unique data, recycle data and/or reuse data of the product-in-circulation via a network; and an arithmetic processing section for calculating a charge based on the number or amount of the product-in-circulation used, and the recycle data and/or reuse data.

According to this arrangement, by registering the unique data in the memory section, it becomes easier to specify the product-in-circulation delivered to the service receiver, and the arithmetic processing section can manage the current status of the product-in-circulation precisely for each product-in-circulation. Further, since the current status of use of the product-in-circulation by the service receiver is detected via the network, the service provider can obtain a purchase status of the service receiver with certainty and almost real time at a remote location. Further, the purchase status can be obtained easily even when there are more than one service receiver. Further, since the service provider does not need to manage the recycle data and/or reuse data altogether in the memory section, a management load on the service provider can be reduced.

Further, because the unique data is allocated to each product-in-circulation supplied to the service receiver and stored in the memory section, the detection of the unique data by the communications section via the network can be regarded as, by the arithmetic processing section, the use of the product-in-circulation having the unique data by the service receiver.

Further, by judging whether the detected unique data matches the registered unique data, it is possible to easily detect whether the product used by the service receiver is authorized or not. Further, circulation of an unauthorized product can also be detected when the same unique data is detected from different service receivers.

Further, when the product-in-circulation is of a type which is used by being installed in the apparatus, and the apparatus is adapted to read the unique data of the product-in-circulation and send it to the service management device, the arithmetic processing section can electrically judge, depending on whether the data of the product-in-circulation installed in the apparatus is the same or different, whether the product-in-circulation detached and attached is the same one as in the case of a paper jam, for example, in an image forming apparatus, or it was replaced with new product-in-circulation. Thus, when the data of the product-in-circulation installed is new, a result of this notification can be regarded as the use of this product-in-circulation.

Note that, if the unique data of the product-in-circulation and the service receiver data are stored in pair at the time of registration, the terminal can specify the service receiver that has used the product-in-circulation, even when the service receiver transmits only the product-in-circulation data to the terminal in the process of using the product-in-circulation. Thus, compared with the case where the unique data of the product-in-circulation and the service receiver data are transmitted in pair when using the product-in-circulation, the transmitted data volume can be reduced, which in turn reduces a load on the network and the arithmetic process.

The product-in-circulation of the present invention is made up of a plurality of components, wherein data indicating a value which is the sum of weighted values of the number of recycle and/or reuse of the components is stored as data indicative of the number of recycle and/or reuse of the product-in-circulation in a data storage medium which is circulated together with the product-in-circulation.

According to this method, the service provider can make sure to obtain the data indicative of the number of recycle and/or reuse with the product-in-circulation, corresponding one to one to each product-in-circulation, when supplying or recovering the product-in-circulation to or from the service receiver. Further, with the use of a portable reader for reading data, the location and time of accounting can be set flexibly.

Further, in the case where a plurality of components make up the product-in-circulation and the number of recycle and/or reuse of these components is directly stored in the product-in-circulation or in the data storage medium such as an IC chip, since the data indicative of the number of recycle and/or reuse is the data which indicates a value of sum, the data volume stored in the data storage medium can be reduced compared with the case where the number of recycle and/or reuse of the plurality of components is individually stored.

For example, when the data is created by forming irregularities on the product-in-circulation, the area of irregularities can be reduced, and the mold does not become complex, and the manufacturing cost can be reduced as a result. Further, when the data is created on an IC chip, the memory capacity of the IC chip can be reduced.

Further, by storing the data indicative of the number of recycle and/or reuse, etc., on the IC chip, the IC chip, which has been studied for installation for the purpose of excluding unauthorized products can be directly used to store the unique data of the product-in-circulation needed in the present invention, without inducing additional costs to the hardware.

A service management network system of the present invention is an apparatus detachably provided with consumable or expendable product-in-circulation having unique data to be specifiable, and is made up of:

a first group including a read-out section for detecting the unique data from the product-in-circulation; a remaining amount detecting section for measuring a remaining amount of the product-in-circulation; a transmitter section for transmitting data from the read-out section and the remaining amount detecting section to outside via a network; and a controller section for controlling the read-out sections the remaining amount detecting section, and the transmitter section; and a second group including communications section for communicating with the first group; a memory section for registering data of the product-in-circulation of the first group, including recycle data and/or reuse data; and an arithmetic processing section for calculating a charge based on the remaining amount, and the recycle data and/or reuse data of the product-in-circulation obtained via the communications section.

According to this arrangement, in addition to the foregoing effects, it is possible to provide a charging service which causes no waste on the service receiver by the simple step of reading out the unique data and the remaining amount of the product-in-circulation installed in the apparatus on the side of the service receiver based on the amount of product-in-circulation actually used.

A service management network system of the present invention is an apparatus detachably provided with consumable or expendable product-in-circulation having unique data to be specifiable, and is made up of:

a first group including a read-out section for detecting the unique data from the product-in-circulation; a transmitter section for transmitting data from the read-out section to outside via a network; and a controller section for controlling the read-out section and the transmitter section; and a second group including communications section for communicating with the first group; a memory section for registering data of the product-in-circulation of the first group, including recycle data and/or reuse data; a replacement verifying section for verifying replacement of the product-in-circulation by the service receiver by detecting a change in the unique data of the product-in-circulation obtained by the communications section; a remaining amount detecting section for measuring a remaining amount of the product-in-circulation; and an arithmetic processing section for calculating a charge based on the remaining amount, and the recycle data and/or reuse data of the product-in-circulation.

The foregoing effects can also be obtained by this arrangement. Further, compared with the foregoing service management method, the remaining amount detecting section of the apparatus can be omitted, and therefore it is possible to reduce a load on the arithmetic process by the smaller apparatus and simpler control flow, and also hardware such as a memory for storing the control flow. Further, since the remaining amount detecting section is provided on the side of the service provider, the amount of remaining toner can be measured more conveniently and accurately. Thus, a charge can be set more precisely.

Note that, the service management method of the present invention may be adapted so that the following steps are executed by a computer program: registering (in the memory section by the arithmetic processing section of the computer) data of product-in-circulation supplied to the service receiver; obtaining a current status of the product-in-circulation in the service receiver (via the communications section or the input section of the computer by the arithmetic processing section); judging (by the arithmetic processing section), when the data of the current status can be regarded as use of the product-in-circulation (by the arithmetic processing section), that the use of the product-in-circulation is a purchase; and calculating a charge based on the number of product-in-circulations which were judged as a purchase among the number of supplied product-in-circulation, and the recycle data and/or reuse data of product-in-circulations.

According to this method, there will be no charge for the unused product-in-circulation which has only been supplied to the service receiver, and a charge is borne with respect to only product-in-circulations which are judged as being purchased by the service receiver. Thus, the service receiver can avoid unnecessary pre-payment.

The service provider, on the other hand, can make sure to keep clients by providing the foregoing service, and the product-in-circulation can be sold stably. Further, since the data of product-in-circulation supplied first to the clients are registered by the service provider itself, unauthorized product-in-circulation, to which the service is not applicable, can be excluded. That is, because product-in-circulations used by the service receiver are directly supplied by the service provider and are registered in the terminal of the service provider, unauthorized product-in-circulation will not be registered, and therefore the service of the present invention will not be applied to unauthorized products.

Further, since the service provider can centrally manage the same product-in-circulation which may be used by different service receivers, the use of the same product-in-circulation by different service receivers, when it is detected, is recognized to distinguish an authorized product from an unauthorized product. This allows the service provider, for example, to warn the service receiver using the product-in-circulation which was found to be an unauthorized product, so as to exclude the unauthorized product.

In this manner, the service provider can easily check the use of the same product-in-circulation, in addition to specifying the service receiver to which the product-in-circulation was supplied, based on data of the product-in-circulation which were registered by the service provider. Thus, the service receiver using the unauthorized product can be located with ease.

Further, a charge is calculated based on recycle data or reuse data of the product-in-circulation which is also registered or separately obtained. Therefore, by reflecting degradation of recycled components in the charge, the recycled products and non-recycled products can be injected into the same market.

The service management method of the present invention may be adapted so that a computer program executes the steps of: registering unique data for specifying the product-in-circulation supplied to the service receiver; detecting use of the product-in-circulation by the service receiver via a network; verifying the use of the product-in-circulation as a purchase; and calculating a charge based on the number of product-in-circulation which was verified as a purchase among the number of supplied product-in-circulation and recycle data or reuse data of the product-in-circulation.

According to this method, in addition to the foregoing effects, by registering the unique data, it becomes easier to specify the product-in-circulation supplied to the service receiver, and the current status of the product-in-circulation can be managed more precisely with respect to each product-in-circulation. Further, since the use of the product-in-circulation by the service receiver is detected via a network, the service provider can obtain a purchase status of the service receiver with certainty and almost real time at a remote location.

Further, the purchase status can also be obtained with ease when there is more than one service receiver.

The service management device of the present invention may be adapted to include: a memory section for registering unique data for specifying the product-in-circulation supplied to the service receiver, and recycle data and/or reuse data; communications section for detecting the current status of the product-in-circulation via a network; and an arithmetic processing section for calculating a charge based on the number of product-in-circulations used among those supplied to the service receiver, and the recycle data and/or reuse data.

According to this arrangement, by storing the unique data in the memory section, it becomes easier to specify the product-in-circulation supplied to the service receiver, and the arithmetic processing section can precisely manage the current status of the product-in-circulation with respect to each product-in-circulation. Further, since the memory section can manage the unique data of the product-in-circulation supplied to the service receiver and the recycle data and/or reuse data altogether, it is possible to easily confirm in advance whether the data required to calculate the account are available. Therefore, the charge can be calculated with certainty and accurately, thus providing reliable and accurate service.

Further, in addition to the foregoing effects, by the detection of the current status of the product-in-circulation used by the service receiver via a network, the service provider can obtain the current status of the service receiver with certainty and almost real time at a remote location.

The product-in-circulation of the present invention is preferably a cartridge with toner.

Image forming apparatuses of an electrophotographic system is generally designed to assume replacement of consumables such as a toner cartridge, and thus manufacture and selling of unauthorized products have become so common, due to the size of the after-market which is larger than the market of the image forming apparatuses themselves. This is a situation where the service management method of the present invention is applicable, by which authorized products can be supplied while excluding unauthorized products. Further, because the product-in-circulation in manufacture, circulation, and sold are all guaranteed and managed by the service provider, entry of unauthorized products is prevented, and further, since it is the service provider that registers the product-in-circulation when it is supplied, only the product-in-circulation authorized by the service provider can be subject to the service.

Embodiment 15

The present embodiment concerns a replacement part provided in an apparatus having a communication facility, the distribution of which is managed by a service provider so as to ensure its intended performance or function by replacing used one with new one in good time, and specifically concerns an original product identification method, a replacement part applicable to the method, an original product management device, an original product countermeasure device, an original product management network system and a program executing the original product identification method, which are used in checking if the replacement part installed in the apparatus in replace of the used part is an original product registered at the service provider or not.

The present invention enables a distribution manager of the replacement part to instantaneously recognize if the replacement part installed in the apparatus is original or imitative, and to prevent the imitation of the original replacement part from being circulated in the market, or at least to suppress the circulation of such imitative product to the minimum even if occurred.

(Replacement Part)

In the present invention, functionally, the replacement part is defined to be a part of the apparatus, and its function in the apparatus can be maintained or recovered by replacing used one with new one in good time. In the present embodiment, explanations will be given through the case of adopting an image forming apparatus as an example of the apparatus having a communication facility.

In the case of the image forming apparatus as an example of the apparatus having a communication facility, members corresponding to the replacement parts include: a toner cartridge, a developer cartridge, a photoreceptor cartridge, a cartridge provided with a developer material and a photoreceptor as one integral part, an ink cartridge, a cartridge provided with an ink tank and a print head as one integral part, a thermal transfer ink sheet cartridge, etc. In the field of the image forming apparatuses, the foregoing replacement parts are sometimes called "supplies".

Figure 6:
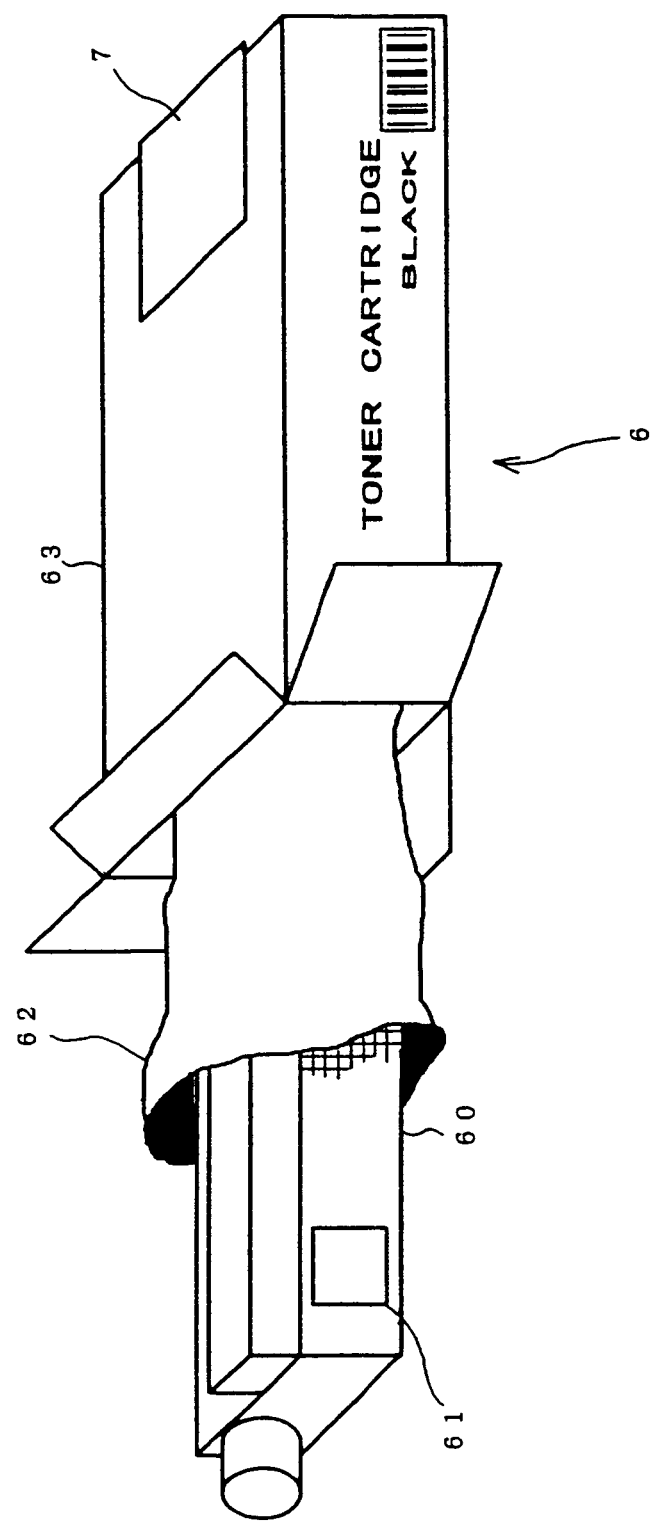
FIG. 6 is a drawing illustrating how a product-in-circulation is packed in accordance with the present invention.

The toner cartridge 60 shown in FIG. 6 which has been explained earlier as one example of the product-in-circulation 6 is also an example of the replacement parts. Therefore, hereinafter the product-in-circulation 6 is referred to as a replacement part 6. The details of the toner cartridge 60 are as explained earlier. Here, "the replacement part 6 in circulation" indicates not only the toner cartridge 60 but also a packaging material, and a packing material; while, "the replacement part 6 installed in the apparatus" indicates the toner cartridge 60 only.

(Network Structure and Apparatus Structure)

The structure of the network 20 in which the image forming apparatus 2 on the side of the contract signer 1 is connected to the terminal station 12 on the side of the service provider 10 is as explained earlier in the embodiment 1 in reference to FIGS. 1 and 3.

Figure 80:
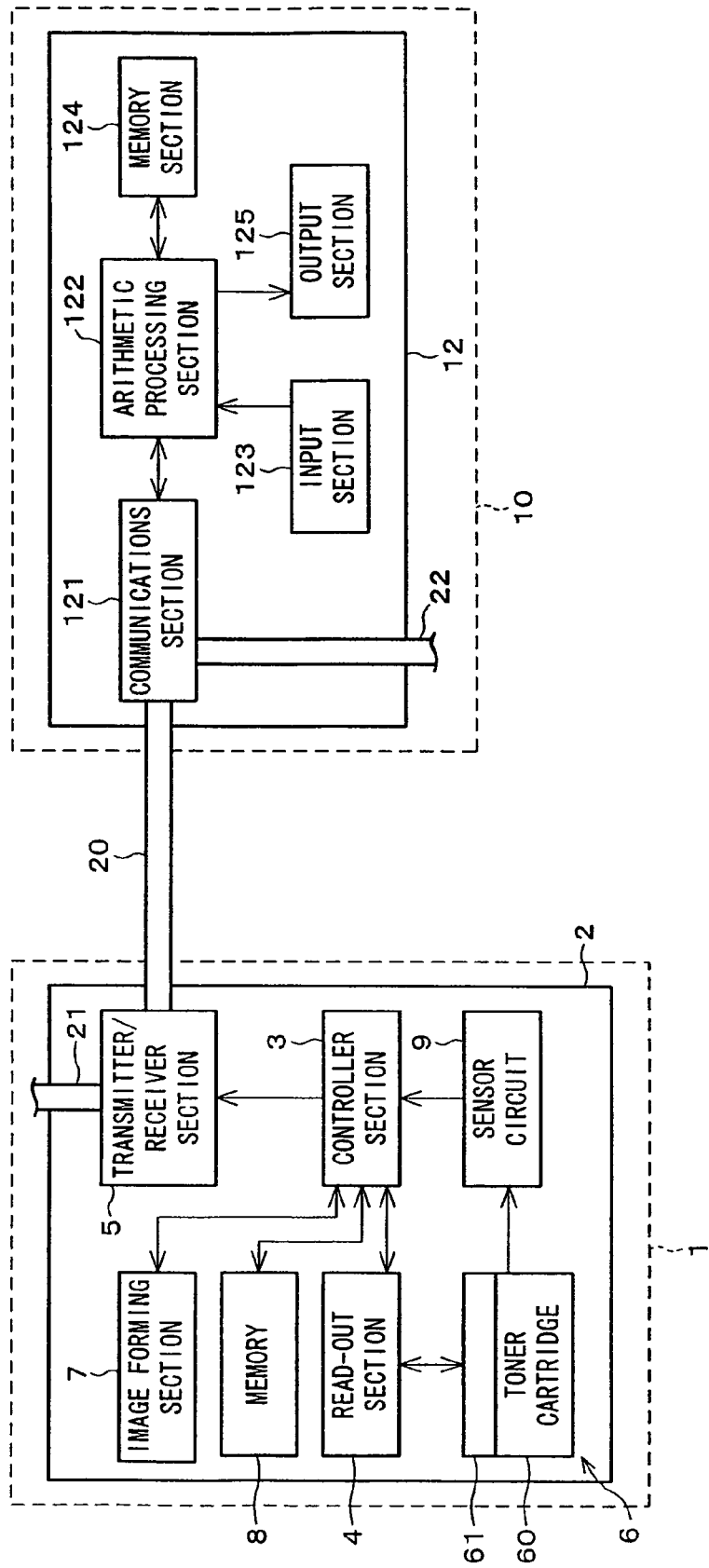
FIG. 80 is a schematic view showing another service management network system in accordance with the present invention.
Figure 81:
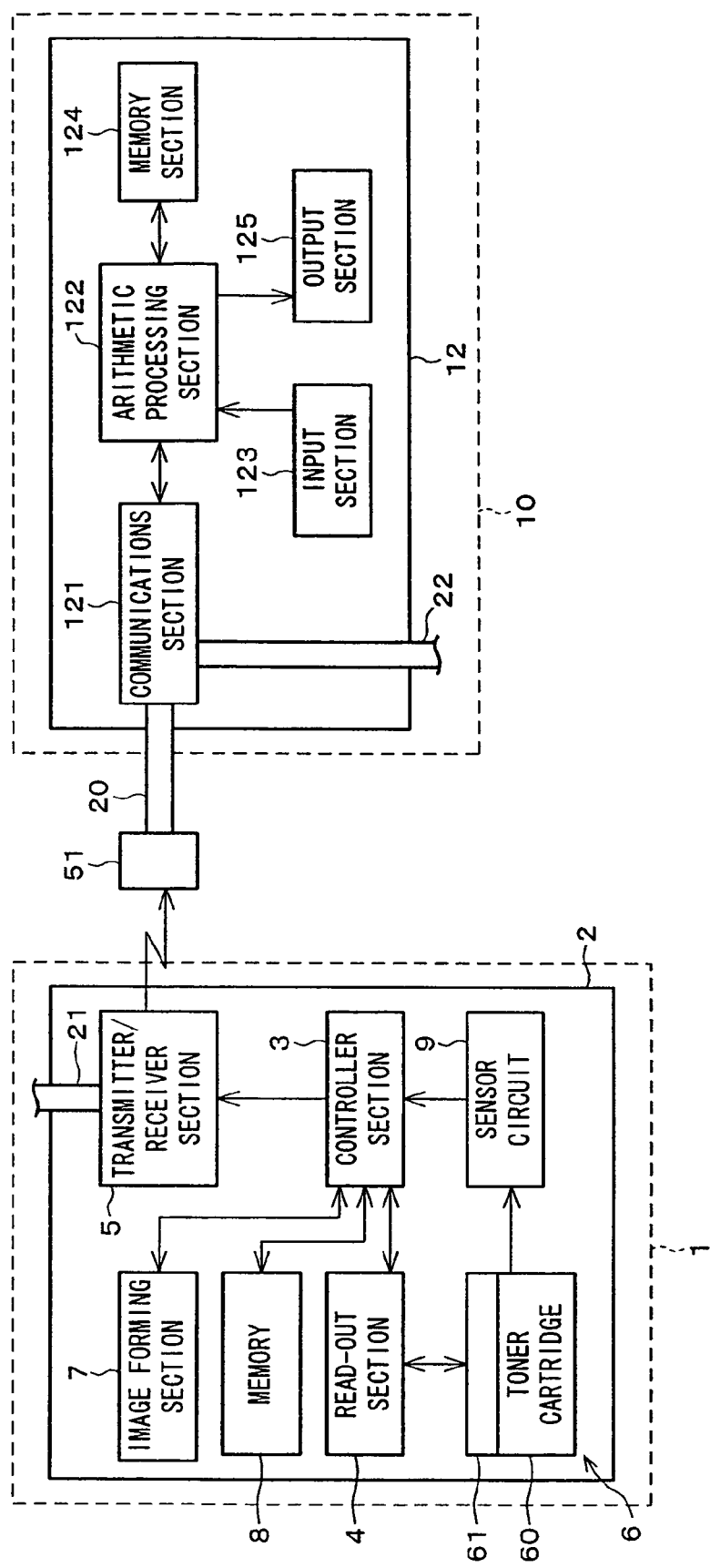
FIG. 81 is a schematic view showing yet another service management network system in accordance with the present invention.

In the following, the structure of the image forming apparatus 2 on the side of the contract signer 1 will be explained. In the present embodiment, the image forming apparatus 2 serves as an original product countermeasure device. As illustrated in FIG. 80, the image forming apparatus 2 includes an image forming section 7 for forming a toner image on a recording material such as a paper sheet, etc., a toner cartridge 60 (an expendable), a read-out section 4 for reading data (explained earlier) recorded on the toner cartridge 60, a transmitter/receiver section 5 for outputting data as read to the exterior, a controller section 3 for controlling the read-out section 4, the transmitter/receiver section 5, and the image forming section 7, a memory section 8 for registering therein data on contract signers (explained earlier) for use in identifying each contract signer 1, and a sensor circuit 9 for detecting if the toner cartridge 60 is installed in the image forming apparatus 2. The details of each of the above members are as explained earlier in the embodiment 1.

Next, the content of the data recorded on the toner cartridge 60 will be explained.

In the IC chip 61 illustrated in FIG. 2, the numeral data for use in identifying individual toner cartridge 60 are recorded in the IC chip 61. An example of the numeral data is shown below.

0|0|100|2|00 00000101.

It should be noted here that the number of digits for this numeral data is not intended to be limited to the above example. Further, the segmentation mark "|" and the space in the numeral data are indicative of each data group for ease in explanations, and the numeral data may be continuous or discontinuous with segmentation indicative marks (space, comma, etc.,) inserted therein, to be suited for the adopted method of reading out data. The foregoing numeral data is to be prepared by the service provider 10, and is controlled in an "replacement part data table" at the terminal station 12.

Next, the meaning of the numbers used in the numeral data will be explained. The numeral data is composed of upper 8 bits and lower 8 bits, where the data of the upper 8 bits is provided for use in identifying the model type of the replacement part 6, while the data of lower 8 bits is the unique data provided for use in identifying each replacement part 6. Here, it may be defined such that the unique data of the replacement part 6 is constituted by the entire numeral data of 16 bits in combination of product type identification data of upper 8-bits and unique data of the lower 8 bits.

Firstly, the data of upper 8 bits will be explained. The number in the top first digit is the product type identification data, specifically indicative of whether the replacement part 6 is original or quasi-original.

The original replacement part 6 indicates the one manufactured in a captive factory, and the quasi-original replacement part 6 indicates the one manufactured in a factory of a licensed company, and the number in the top first digit is provided for distinguishing the one manufactured in the captive factory from the one manufactured in the licensed company, examples of which are shown in the table 17 below.

TABLE 17

| Number | MEANING |
|---|---|
| 0 | ORIGINAL PRODUCT |
| 1 | QUASI-ORIGINAL PRODUCT (PRODUCT PRODUCED BY LICENSED COMPANY a) |
| 2 | QUASI-ORIGINAL PRODUCT (PRODUCT PRODUCED BY LICENSED COMPANY b) |
| 3 | QUASI-ORIGINAL PRODUCT (PRODUCT PRODUCED BY LICENSED COMPANY c) |
| 4 | SERVICE |
| ... | |

In the case where all the products are in-house products, the data of the foregoing number in the top first digit is unnecessary, and thus can be omitted. However, even when all the products are in-house products, the top first digit data may be used in specifying a product not subjected to service (the number "4" in the above example).

Next, the number in the second top digit is the product identification data for use in roughly classifying each of replacement parts 6 of plural types, examples of which are shown in the Table 18 below.

TABLE 18

| NUMBER | MEANING |
|---|---|
| 0 | TONER CARTRIDGE FOR ELECTROPHOTOGRAPHY |
| 1 | PHOTOCONDUCTOR CARTRIDGE FOR ELECTROPHOTOGRAPHY |
| 2 | INK CARTRIDGE FOR INK JET PRINTER (INCLUDING HEAD PART) |
| 3 | INK CARTRIDGE FOR INK JET PRINTER (INK TANK ONLY) |
| 4 | INK SHEET CARTRIDGE FOR VIDEO PRINTER (SUBLIMATIC TYPE) |
| 5 | INK SHEET CARTRIDGE FOR VIDEO PRINTER (MELTING TYPE) |
| 6 | INK SHEET CARTRIDGE FOR WORD PROCESSOR (SUBLIMATIC TYPE) |
| 7 | INK SHEET CARTRIDGE FOR FACSIMILE (SUBLIMATIC TYPE) |
| ... | |

The numbers in the top three to five digits are the product identification data for use in the medium classification of the plural replacement parts. For example, in the case where the toner cartridges 60 for electrophotography can be further classified into plural types, for example, by physical shape, structure, etc., the product identification data is used in identifying respective types in the same class (the toner cartridge for electrophotography in this example) by the above rough classification. Generally, the product identification data for the medium classification corresponds to the model types of the image forming apparatus 2. An example of the medium classification in the case of the toner cartridges 60 for electrophotography by the rough classification is given in the Table 19 below.

TABLE 19

| Number | Model Type | |
|---|---|---|
| 000 | S-2000 | ANALOG COPYING MACHINE |
| 001 | S-2001 | ANALOG COPYING MACHINE |
| ... | | |
| 100 | BL-2000 | DIGITAL COPYING MACHINE |
| 101 | BL-2001 | DIGITAL COPYING MACHINE |
| ... | | |
| 200 | MX-2000 | PRINTER |
| 201 | MX-2001 | PRINTER |
| ... | | |
| 300 | BR-2000 | COPYING MACHINE |
| 301 | BR-2001 | COPYING MACHINE |
| ... | | |

The number in the sixth digit from the top is the product identification data for use in identifying the color of the toner stored in the toner cartridge 60, an example of which is shown in Table 20 below.

TABLE 20

| NUMBER | MEANING |
|---|---|
| 0 | BLACK (Bk) |
| 1 | YELLOW (Y) |
| 2 | MAGENTA (M) |
| 3 | CYAN (C) |
| 4 | PHOTO YELLOW (PY) |
| 5 | PHOTO MAGENTA (PM) |
| 6 | PHOTO CYAN (PC) |
| ... | |

Additionally, the bottom two digits in the upper 8 bits are blank data, and are not used effectively in this example. However, these are provided to make the product identification data to be one byte. Also, these two digits can be used when a greater amount of data is required for the classification of the replacement parts 6.

According to the above-explained rule, the data "0 0 100 2 00" indicates an original magenta toner cartridge (in-house product) for a digital copying machine, model BL-2000.

Next, the data of the lower 8-bits will be explained.

In the above example, the data of the lower 8-bits indicate the unique number for each of the toner cartridges 60 of the type 0 0 100 2 00. These data of lower 6-bits are also added in the replacement part data table at the terminal station 12 on the side of the service provider 10.

Next, the terminal station 12 (original product management device) of the service provider 10 will be explained. Its fundamental structure is as explained in the first embodiment in reference to FIG. 1.

The examples of the data stored in the memory section 124 include the data in the replacement part data in the above tables 17 to 20, a contract signer's data table (to be described later), a service management table for each contract signer, an application program storing a processing flow of the service management method of the present invention.

(Registration of ID Number of Replacement Part)

On the side of the service provider 10, unique data for each replacement part 6 subjected to service is recorded in an IC chip 61 in the manufacturing process of replacement parts 6, according to the rules shown in the Tables 17 to 20, and further, a list of all the unique data is stored in the memory section 124 in a form of electric data. An example of the replacement part ID number list (cartridge management file, a replacement part management file, or a replacement part management table) is shown in FIGS. 82(a) and 82(b) in the case of an original magenta toner cartridge (in-house product) for the digital copying machine, model BL-2000. For the preliminary data, the date and time produced are recorded.

If the manufacturer of the replacement parts 6 is not the service provider 10, the unique data is prepared and recorded on the side of the manufacturer, and the service provider 10 obtains the unique data from the manufacturer, and registers the unique data as obtained. Here, in the case of recording the unique data in the IC chip 61, the preparation and the management of the data are generally performed electrically, and the unique data can be obtained in a form of electric data with ease.

(Registration of Contract Signers' Data)

Next, operations of the system will be explained.

First, the service provider 10 obtains the data on the contract signer 1 as preliminary data. The details of this data are as explained earlier in the Embodiment 1 in reference to FIG. 8(a).

Then, the service provider 10 sends a service person to the contract signer 1 for the settings of the image forming apparatus 2. The image forming apparatus 2 is set and connected to an external network 20 so as to be capable of communicating with the external network 20. Specifically, the access address such as a telephone number, a URL, etc., is registered according to the method of making an access to the terminal station 12 of the service provider 10. After the data is being registered, the data as desired is automatically transmitted to the access address.

Further, in order to identify each contract signer 1, the data on the contract signer, such as the ID number of the contract signer, etc., is registered in the image forming apparatus 2. The data as registered is stored in the non-volatile memory 8. For the data on the contract signer 1, any data which can identify the contract signer 1 may be adopted. However, the detailed data on the contract signer 1 is registered in the contract signer's data table at the terminal station 12 of the service provider 10, and the purpose of registering the data on the contract signer 1 in the image forming apparatus 2 is to specify the transmitting end of desired data (unique data on the replacement part 6 in this example). Therefore, for the contract signer's data, the data of small data amount which is by itself meaningless and is easy to deal with as electric data is preferable among the data registered at the terminal station 12 of the service provider 10, such as contract signer's ID, etc.

In the case of adopting the contract signer's ID, a ten key provided in a normal copying machine can be used, and based on the ID number transmitted by the contract singer 1, the name of the contract signer can be specified based on the contract signer table [1] (see FIG. 8(*a*)) stored in the memory section 124.

In contrast, in the case of adopting such character data as "ABC Co., Ltd., abc operation department", although it is advantageous in that the name of the contract signer can be checked directly from the transmission data of the contract signer 1 without a need of making a reference to the contract signer table [1], it is disadvantageous in view of data transmission efficiency since such character data results in an increase in amount of data. Moreover, for the input of such character data, input means such as a key board, etc., is separately required. Also in consideration of the possibility that the transmission data is leaked out to the third person, it is preferable to adopt code data such as a contract signer's ID number, etc., which cannot be used by the third person who obtain the data in bad faith in order to prevent both the service provider 10 and the contract signer 1 from suffering any damage.

When adopting the ID number of the contract signer, it may be arranged such that the model number of the image forming apparatus 2, the ID number for an individual apparatus, etc., may be transmitted together with the contract signer's ID number, etc.

In the case of using the apparatus ID number only for the purpose of identifying the type of the image forming apparatus 2 the contract signer 1 possesses, the model number, the product number, or coded data thereof which can specify the model type of the image forming apparatus 2 may be adopted. However, in the case where the contract signer 1 possesses a plurality of image forming apparatus 2 of the same type, and it is therefore required to obtain data for each image forming apparatus 2, unique data such production number which can identify individual image forming apparatus 2 is preferably.

In the case where the image forming apparatus 2 is a copying machine, such as an analog/digital composite type copying machine, etc., a ten-key keyboard is provided for use in specifying the printing number, as input means, and thus, the contract signer's ID number and/or the apparatus ID number may be input to the image forming apparatus with ease by using such input means. Here, by arranging so as to record contract signer's ID number as once input in the non-volatile memory section 8, it becomes unnecessary to input the contract signer's ID number again when transmitting data to the service provider 10 from the contract signer 1. Further, by arranging so as to record the ID number of an apparatus in the non-volatile memory section 8 at the time of delivery, the subsequent input operation can be omitted, and it is possible to automatically perform a sequential operation electrically.

In the foregoing manner, necessary items are filled in the contract signer table [2] at the terminal station 12 as illustrated in FIG. 8(*b*), from which, for example, it can be seen that the contract signer of the ID number of 000003 receives services of the present invention for two image forming apparatuses 2 (AR-2000, and AR-2001).

The contract signer table [1] and the contract signer table [2] can be combined as common data relating to the contract signer's ID number. Therefore, by referring to FIG. 8(*a*), it can be seen that the contract signer whose ID number 000003 is "C Co., Ltd., ccc operation department".

By carrying out the above step, it is possible to automatically detect the type of the image forming apparatus 2 of the contract signer 1 at the terminal station 12, and it is thus possible to obtain the model type identification data for the apparatus subjected to the service.

In this way, even when the model number of the toner cartridge 60 for the image forming apparatus 2 by changing the model to the upgraded model, it is still possible to provide the toner cartridge 60 most currently installed in the apparatus based on the type identification data of the image forming apparatus 2. The apparatus ID number for use in identifying each apparatus is not always necessary. However, it is possible to make minor changes even among the apparatuses of the same type, and in the case changes are made concerning the replacement part 6 such as the toner cartridge 60, etc., the apparatus ID number is used so that such changes can be reflected timely and correctly. Additionally, the apparatus ID number is used also in the event of any trouble occurred before and after the minor changes are made in the apparatuses of the same type for the additional services of informing the contract singer 1 of any inconveniences which the contract signer 1 possibly suffers.

Next, the service person unwraps the toner cartridge 60 which is required for operating the image forming apparatus 2, and installs the toner cartridge 60 in the image forming apparatus 2. On the other hand, the image forming apparatus 2 is already connected to the external terminal station 12 so as to be capable of communicating therewith, and thus the image forming apparatus 2 is permitted to transmit the data on the toner cartridge 60 installed therein to the terminal station 12 on the side of the service provider 10. In this case, the contract signer's ID number is also transmitted to the terminal station 12 together with the data on the toner cartridge 60 so that the terminal station 12 can recognize the contract signer 1 of the transmitting end.

The method of automatically performing the foregoing operations is as explained earlier in the embodiment 1.

The foregoing operations may be performed automatically or with aid of the service person. Namely, upon reading out the ID number of the replacement part 6, a message indicating that the ID number has been read out is displayed in the display section (not shown) of the image forming apparatus 2, and the data may be transmitted by depressing the data transmission button by the service person according to the displayed message. In this way, the service person can recognize from the displayed message that the ID number has been read out properly. Therefore, the service person can recognize in which stage, an error occurred, and it is therefore possible to find a solution to the problem in an early stage. The details of the foregoing operation will be explained later.

As shown in FIG. 82(*b*), upon receiving the data, in the terminal station 12 on the side of the service provider 10, the column "data on place of delivery" (code data on the delivery end, date of delivery) is updated in the replacement part ID number list shown in FIG. 82(*a*). In FIG. 82(*b*), the replacement parts 6 of 00100200000001 to 00100200000005 are delivered to the contract signer 1 of the contract signer's ID number 000125, while the replacement parts 6 of 00100200000006 and 00100200000007 are delivered to the contract signer 1 of the contract signer's ID number 093637.

In the foregoing example, the replacement part 6 delivered by the service person of the service provider 10 is an original product (in-house product), the collating process of the replacement part 6 to be performed in the initial device is omitted. However, in some cases, the collating process is necessary to determine if the product as installed is original or imitative, for example, in the case where the manufacturer of the replacement parts entrusts other company with the foregoing operations performed by the service person. It is also possible that plural replacement parts 6 having the same ID number are manufactured in the manufacturing process, and in this case, it is necessary to determine if the replacement part 6 having the ID number overlapped with another replacement part 6 is manufactured due to an error in the manufacturing process or fabricated by the third person in bad faith, i.e., the imitative product. For this purpose, it is desirable to always perform the collating process of the ID number of the replacement part 6.

The foregoing explanations have been given through the case where the number of the model type of the image forming apparatus 2, the apparatus ID number for an individual apparatus 2 are automatically transmitted to the terminal station 12 on the side of the service provider 10; however, it may be also arranged such that the service provider 10 registers the foregoing data to the terminal station 12 by means of the input section 123.

(Collating Process)

In the following, the collating process will be explained through the case where the used toner cartridge 60 is replaced with new one.

Among contract signers 1 who made a contract with the service provider 10, the manager of the apparatus 2 or the user of the apparatus 2 performs a process of replacing the used toner cartridge with new one in stock based on the message "replace toner cartridge" received from the image forming apparatus 2. In the present embodiment, explanations will be given through the case where only the toner in black color has been consumed. The unused toner cartridges 60 kept in stock include: not only those guaranteed to be original but also those the contract signer 1 obtained from other route. It is therefore possible that the new toner cartridges 60 possessed by the contract signer 1 as stock include imitative toner cartridge without his/her conscious.

In the collating process of the present embodiment, it is determined if the toner cartridge 60 installed in the image forming apparatus 2 by the contract signer 1 is original or imitative in the terminal station of the service provider 10 via the network. As a result of the foregoing collating process performed at the terminal station 12, if it is determined that the toner cartridge 60 installed in the image forming apparatus 2 is original, the image forming apparatus 2 is permitted to perform a printing operation; on the other hand, if it is determined that the toner cartridge 60 is imitative, the image forming apparatus 2 is prohibited to perform a printing operation.

Figure 83:
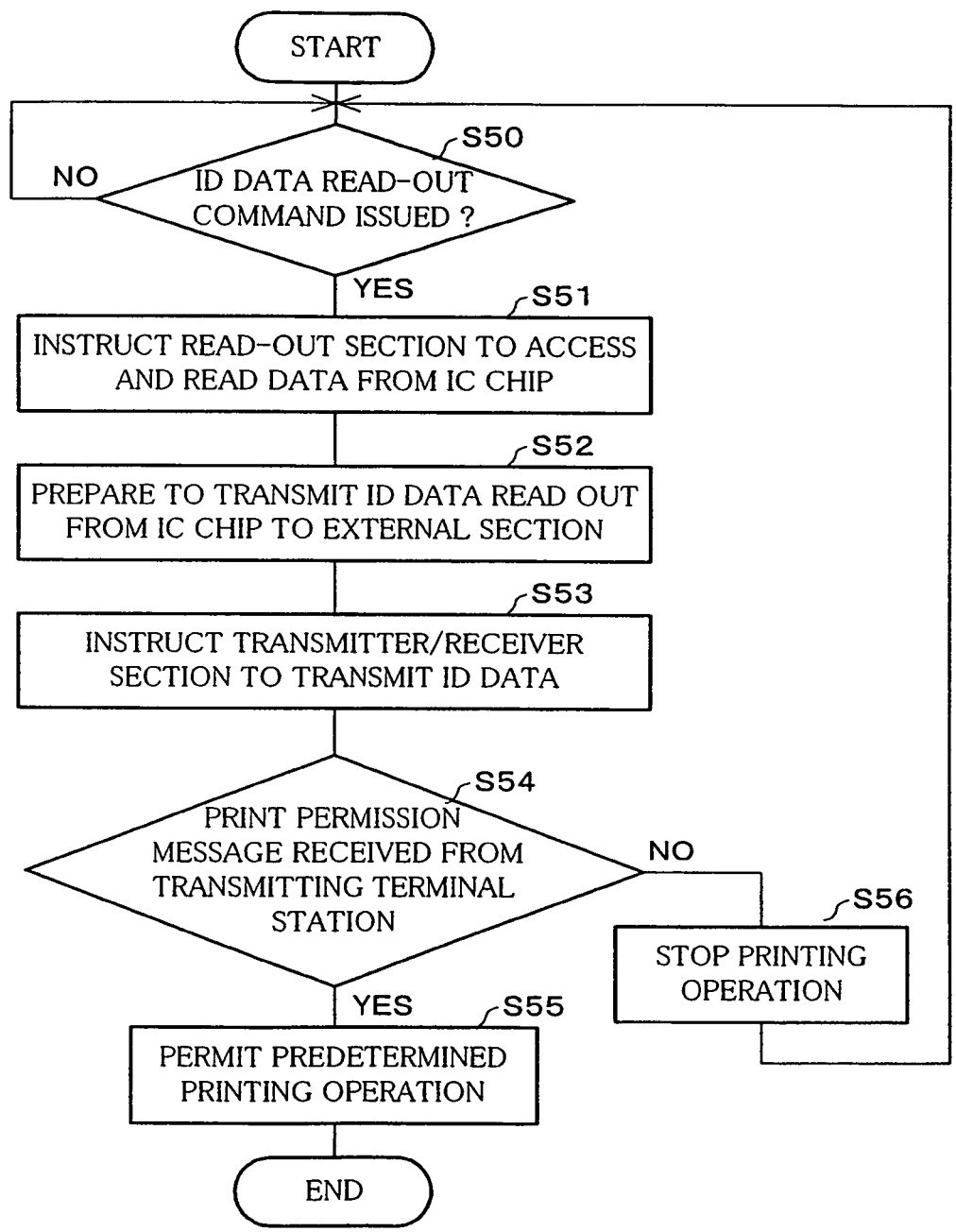
FIG. 83 is a drawing showing, as an example, a process executed by a controller section in a machine of a service receiver.

In the following, internal operations of the image forming apparatus 2 will be explained in reference to FIGS. 7(*a*) through 7(*f*) and FIG. 83.

First, the used toner cartridge 60 is taken out of the image forming apparatus 2, and then the new toner cartridge 60 is installed in the apparatus 2 to be replaced with the used one. At this time, the controller section 3 performs a control process of permitting/prohibiting an operation using the toner cartridge 60, i.e., a printing operation by the image forming section 7. In the following, the control process of permitting or prohibiting the printing operation will be explained step by step.

Step [50] (S50)

The controller section 3 monitors if a command for reading out ID data has been issued, and this monitoring step is repeated until the command is issued. When such command is issued, a sequence goes to S51. In the following, an example is given for the case in which the ID data reading command is issued for detecting if the toner cartridge 60 is installed.

Generally, the image forming apparatus 2 is provided with sensors for detecting if the toner cartridge 60 is installed. Therefore, based on the result of detection performed by the user, removal and installation of the toner cartridge 60 can be detected.

FIG. 7(*a*) and FIG. 7(*b*) show an example of installing/removing operation of the toner cartridge 60 and an example of sensor outputs at the timing of performing such operations. Specifically, the sensor output signal is in the low level when installing the toner cartridge 60, while in the high level when removing the toner cartridge 60 from the apparatus 2.

Next, the sensor circuit 9 generates a trigger pulse illustrated in FIG. 7(*c*) based on the sensor output signal, details of which are as explained earlier in the embodiment 1. The generation of the trigger pulse indicates that a timing at which the state of the toner cartridge 60 has changed from the removed state to the installed state is detected by the sensor circuit 9. Here, the controller section 3 detects the trigger pulse outputted from the sensor circuit 9 as a command for reading out ID data.

As explained, the controller section 3 detects a timing of installing the toner cartridge 60, and this timing as detected is considered to be a trigger for the operation performed by the read-out section 4.

Step [51] (S51)

Next, upon generating the trigger pulse by the sensor circuit 9, the controller section 3 makes an access to the IC chip 61 of the toner cartridge 60 and gives an instruction for reading out the data from the IC chip 61. FIG. 7(*d*) indicates a period in which the read-out section 4 makes an access to the IC chip 61. Specifically, the trigger pulse is a strobe signal, and in the above period, operations of identifying an address and reading out the data are performed. Here, the data as read out are stored in the non-volatile memory section such as RAM, etc.

As illustrated in FIG. 7(*e*), a pulse signal of a predetermined pulse width is generated from the read-out section 4 at a timing the strobe signal falls.

Step [52] (S52) Step [53] (S53)

The controller section 3 uses the trigger pulse as a timing signal for transmitting from the transmitter/receiver section 5 the data as read by the read-out section 4. Namely, the controller section 3 controls the transmitter/receiver to process the data according to the adopted transmission system and transmit the data as processed as shown in FIG. 7(*f*).

The processing of the data may be performed by the controller section 3 or by the transmitter/receiver section 5. In the structure wherein the processing of the data is performed by the transmitter/receiver section 5, the burden in processing by the controller 3 can be reduced, the thus, the controller section 3 is thus permitted to perform other process. For example, in the case of adopting the CPU, which controls the entire image forming apparatus 2, as the controller section 3, it is possible to make the CUP to perform the process related to the image forming process. As a result, an overall operation of the image forming apparatus can be performed efficiently at high speed.

With the foregoing operation, the data related to the unused toner cartridge 60 is transmitted to the terminal station 12 on the side of the service provider 10.

Step [54] (S54)

Next, the controller section 3 monitors if a print permission message or a print permission signal is received from the terminal station 12 of the transmitting end, and if so, a sequence goes to S55, and if no, the sequence goes to S56.

Step [55] (S55)

In this case, it is indicated that the toner cartridge 60 installed in the image forming apparatus 2 is confirmed to be original at the terminal station 12 on the side of the service provider 10. In this state, the controller section 3 gives an instruction to the image forming section 7 to perform a predetermined operation. The image forming apparatus 2 is then permitted to perform an image forming operation.

Step [56] (S56)

On the other hand, if a response from the terminal station 12 of the transmitting end is a message or a signal indicative of "NO", it is indicated that the terminal station 12 on the side of the service provider 10 confirms the toner cartridge 60 installed in the image forming apparatus 2 to be an imitative product. In this case, the controller section 3 prohibits the image forming section 7 to perform operations using the toner cartridge 60, i.e., image forming operations.

Specifically, in the case of a copying machine, etc., even if a signal instructing the formation of an image is input in the controller section 3, for example, by depressing a start button for forming an image, such signal as input is ignored, and a continuing or starting of an image forming operation is stopped. Similarly, the foregoing process can be applied to the case of receiving a print request from other PC via a network.

Here, it may be arranged so as to display a message such as "The toner cartridge installed is not proper. Please replace it with proper toner cartridge." in the display section such as a liquid crystal display, etc., in order to inform the operator of the reason of prohibiting the image forming operation. In this way, the reason of an inferior operation can be clarified, and such problem that the operator misunderstands the cause of a mechanical trouble such as a mechanical trouble of the image forming apparatus 2, etc., can be prevented.

Then, after carrying out the process in S56, a sequence goes back to S50, and upon installing another toner cartridge 60, the foregoing operations are to be repeated.

Figure 84:
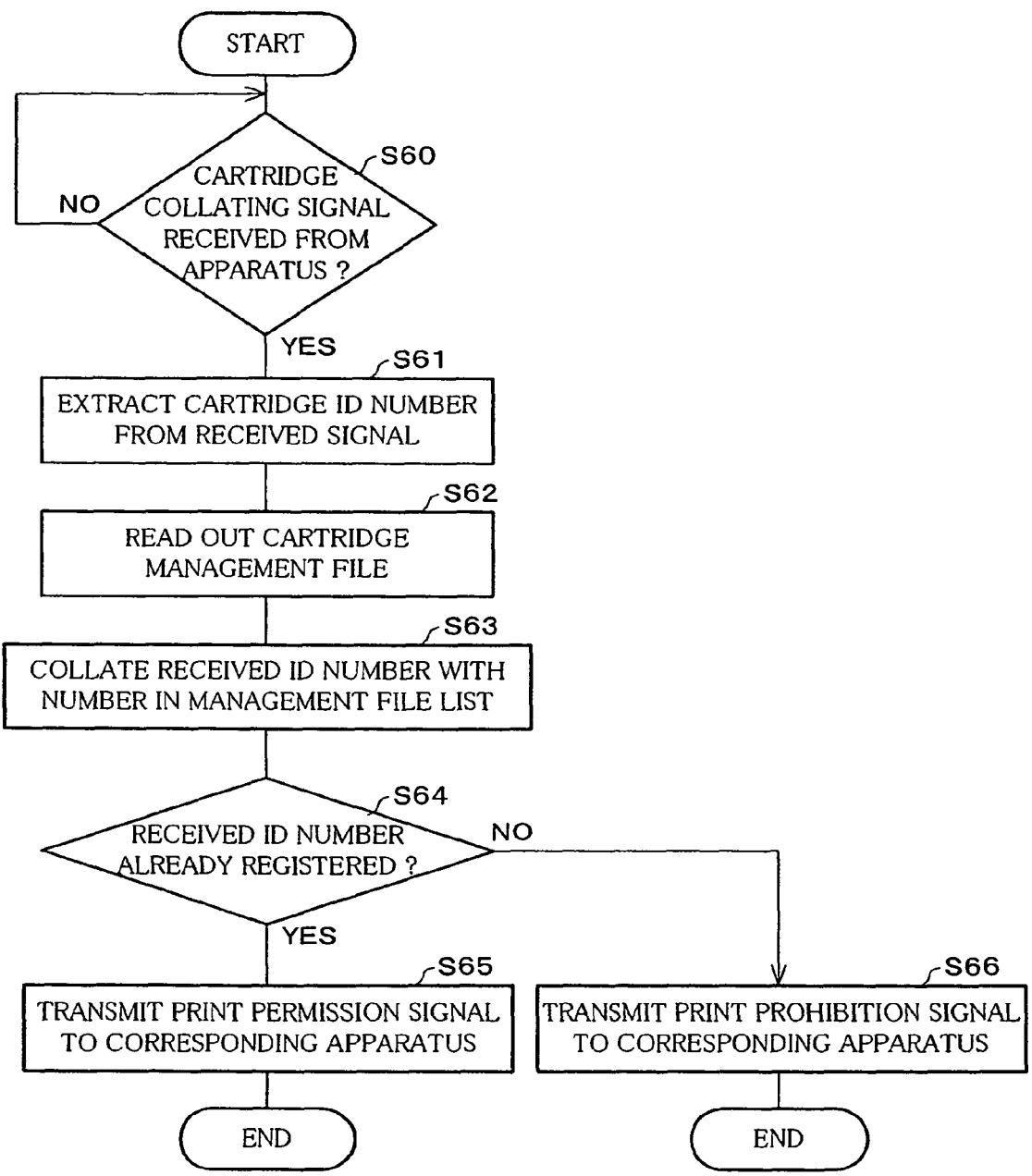
FIG. 84 is a drawing showing, as an example, a process executed by an arithmetic processing section in a terminal station of a service provider.

Next, the operations at the terminal station 12 on the side of the service provider 10 will be explained in reference to FIG. 84.

Step [60] (S60)

The arithmetic processing section 122 monitors if a cartridge collation signal is received from the image forming apparatus 2 of the contract signer 1. If received, a sequence goes to S61. Here, due to the structure of the network, in the case where the image forming apparatus 2 of the contract signer 1 is connected to the terminal station 12 via a server (not shown), the data as received by the terminal station 12 is the data received from the server.

The process in S60 is not limited to the above process, and may be arranged so as to monitor if unique data (cartridge ID number) identifying the toner cartridge 60 as received from the image forming apparatus is contained in a signal as received from the image forming apparatus 2. As explained in reference to FIGS. 7(*a*) through 7(*f*), this monitoring process is based on the provision that upon newly installing the toner cartridge 60 in the image forming apparatus 2, the image forming operation 2 performs processes of reading out the cartridge ID number from the IC chip 61 of the toner cartridge 60 and transmitting the cartridge ID signal as read from the transmitter/receiver section 5.

More specifically, upon receiving a signal requesting for a permission of an access to the terminal station 12 via an image forming apparatus 2 only, or a server of the image forming apparatus 2 and the terminal station 12, after authorizing the image forming apparatus 2 or the server to make an access, the arithmetic processing section 122 determines if the cartridge ID number of the toner cartridge 60 is included in the signal received from the image forming apparatus 2 or the server. If the cartridge ID number of the toner cartridge 60 is detected, a sequence goes to S61. On the other hand, if the cartridge ID number is not detected, a sequence goes back to S60, or goes to other process related to the signal as received.

Step [61] (S61)

Next, the arithmetic processing section 122 extracts the cartridge IN number from the signal as received. Namely, since the received signal includes at least the data (contract signer's ID) identifying the contract signer 1 and the cartridge ID number of the toner cartridge 60 subjected to the collation, and the cartridge ID number is extracted from the received signal. Here, the contract signer's ID is used as the transmitting end data from which the result of collation is transmitted, and the objective of the collation may be the entire data in combination of the contract signer's ID and the cartridge ID number. In this case, still improved effects of preventing the fabrication of the imitative product by the third person can be achieved.

Step [62] (S62)

The arithmetic processing section 122 reads out the cartridge management file illustrated in FIGS. 82(*a*) and 82(*b*) from the memory section 124.

Step [63] (S63)

Next, the arithmetic processing section 122 collates the ID number as received and detected with the cartridge management file. Namely, the received cartridge ID number is compared with the registered cartridge ID number in the cartridge management file. In the case where the entire data in combination of the contract signer's ID and the cartridge ID number is subjected to collation, both the cartridge ID number and the contract signer's ID as registered as the place of delivery are read out from the cartridge management file illustrated in FIGS. 82(*a*) and 82(*b*), and to be collated with the ID number as received and detected.

Step [64] (S64)

Next, the arithmetic processing section 122 determines if the ID number as received has already been registered, specifically, by comparing the cartridge ID number as received with the ID number registered in the cartridge management file. If the same ID number has been already registered, a sequence goes to S65. If not, on the other hand, the sequence goes to S66.

Step [65] (S65)

If the received ID number has already been registered, the arithmetic processing section 122 determines the toner cartridge installed in the apparatus to be original. In this case, the arithmetic processing section 122 generates a print permission message or a print permission signal to be transmitted to the image forming apparatus 2 subjected to the replacement of the toner cartridge 60.

Step [66] (S66)

On the other hand, if the ID number as received has not been registered, the arithmetic processing section 122 determines the toner cartridge to be imitative. In this case, the arithmetic processing section 122 generates a print prohibit message or a print prohibit signal to be transmitted to the image forming apparatus 2 subjected to the replacement of the toner cartridge 60.

In response to the processes in S65 and S66, the image forming apparatus 2 performs operations in and after S54.

Here, an example of a replacement part ID number list used upon receiving a request for collating the cartridge ID number 00100200000008 from the contract signer 1 whose contract signer's ID number is 011218 is shown in FIGS. 86(*a*) and 86(b). In this case, the above cartridge ID number has been already registered, and the place of delivery and the date of delivery have not been input in the list. Therefore, it is determined that the toner cartridge 60 in question is not imitative but original. For this toner cartridge 60, the place of delivery and the date of delivery have not been input, and it can therefore be seen that the contract signer 1 obtains this toner cartridge 60 from the service person but from other rote. In this case, in response to the request for collation, a message indicating that "the toner cartridge 60 is confirmed to be original" is sent to the contract signer 1 whose contract signer's ID is 011218 from the terminal station 12, and in the list, the contract signer's ID is input in the column "collation requesting end", and "the date of collation" is filled.

As described, it is determined if the toner cartridge 60 used by the contract signer 1 is original or imitative based on the ID number data at the terminal station 12 on the side of the service provider 10. In this way, if the ID number has not been registered, it can be immediately determined that the toner cartridge 60 is imitative. Here, it is possible that the third person in bad faith obtains the original toner cartridge 60, and decodes the ID data as recorded in the IC chip 61 of the toner cartridge 60, and fabricates an imitative toner cartridge 60 by preparing new ID number in reference to the ID number as decoded of the original toner cartridge, to be recorded in an IC chip. However, according to the present invention, by checking if the ID number has not been registered in the replacement part ID number file managed by the service provider 10, such toner cartridge fabricated by the third person in bad faith can be determined to be imitative.

Moreover, the present invention is arranged so as to register ID numbers and the places of delivery for all the toner cartridges 60 on the side of the service provider 10, and it is therefore possible for the service provider 10 to unitary control the circulation of the toner cartridge 60 in the block. It is also arranged such that unique data which specify respective toner cartridges 60 are transmitted upon installing new toner cartridges 60, and it is therefore possible to promptly detect an imitative product being installed or already installed. Therefore, the service provider 10 can promptly take a necessary or effective action in removing the imitative product. For this promptness, it is possible to suppress the number of such imitative products fabricated in bad faith to the minimum, and prevent the imitative products from being circulated in the market.

Here, by adopting more irregular random values rather than serial numbers, the possibility that a third person in bad faith fabricates imitative products can be further reduced.

The use of an imitative product such as unauthorized copy can be prevented unless the ID number is not falsified by the third person. Further, the cartridge management file in which registered ID numbers, etc., are recorded is under the control of the service provider 10, it is very unlikely that an illegal access to the file is made by the third person. Further, from the side of the service provider 10, the cartridge ID number is transmitted via the network, the cartridge ID number can be prevented from being leaked out when transmitting the data by the service provider 10.

According to the present embodiment, the cartridge ID number of the toner cartridge 60 installed in the image forming apparatus 2 can be confirmed by detecting a currently installed toner cartridge 60, the contract signer 1 of the transmitting end can verify that he actually possesses the toner cartridge 60 with the ID number. Therefore, upon receiving a request for collating the ID number of an imitative product from the contract signer 1, it is possible to seek out the purchasing root and the manufacturer or seller of the imitative product by an appropriate method. As a result, the seller or the manufacturer of the imitative product can be specified. Further, upon receiving a print permission message or print permission signal from the terminal station, the image forming apparatus performs a printing operation using the toner cartridge 60, and if the toner cartridge 60 is determined to be imitative, the printing operation is terminated. In this way, it is possible to eliminate the troublesome task of damaging the ID chip 61 so that the ID chip 61 can no longer be functioned as performed at the time of taking the toner cartridge out of the apparatus in the conventional structure. As a result, it is possible to aggressively and surely eliminate imitative toner cartridges from the market without requiring additional costs and tasks.

Embodiment 16

The following will explain one modified example of the image forming apparatus 2 of the embodiment 15 in consideration of the problem associated with the structure of the embodiment 15. Namely, the problem with the method of the embodiment 15 is that, in the event that the third person decodes in bad faith the ID number of the original toner cartridge 60, and fabricates an imitative product(s) of the toner cartridge 60 with a duplicate ID number of that of the original toner cartridge 60, the resulting imitative product(s) would not be distinguishable from the original one. In order to prevent the above problem, the present embodiment is arranged such that if the product, whose ID number has been checked once, is subjected to checking again, that product would automatically be determined to be "imitative product(s)".

Specifically, as illustrated in FIGS. 86(a) and 86(b), a column "date of collation" is formed in the replacement part ID number list, for inputting therein the date of first performing the collation of the ID number. Specifically, the collation of the ID number is performed in the following manner. First, the arithmetic processing section 122 checks if the received ID number has already been registered. If so, the arithmetic processing section 122 further checks if the date of collation has been input in the column "collation date". If not, it is determined that the received ID number is subjected to collation for the first time. Then, the contract signer 1 is informed of that the replacement part is original after inputting the date of collation in the column "collation date". This notice may be a print permission message or print permission signal.

On the other hand, if the "collation date" has already been input, it is determined that the ID number has already been collated. In this case, the contract signer 1 is informed of that the replacement part in question is imitative. Again, this notice may be a print permission message or a print permission signal.

According to the foregoing arrangement, even if an attempt is made by the third person in bad faith to fabricate a large number of toner cartridges 60 with a duplicate ID number(s) of at least one of those registered in the "replacement part ID number list", the resulting imitative toner cartridges 60 would be determined to be "imitative" as a result of performing the foregoing determination process. Therefore, even if a large number of imitative toner cartridges 60 are fabricated, only one of the imitative toner cartridges 60 may be permitted to perform an image forming operation. Thus, according to the foregoing method, the effective use of the imitative toner cartridges 60 as fabricated by the third person in bad faith can be mostly prevented.

Moreover, for any products, generally, imitative products become available in the market after the original products have started being used in the market. Therefore, in the case where imitative products are fabricated, it is very unlikely that the ID number of one of the imitative products is subjected to collation for the first time, i.e., before the same ID number of the original product is subjected to collation. For this reason, it is fairly safe to determine toner cartridges 60 whose IDs are subjected to collation plural times to be an "imitative product".

As illustrated in FIGS. 86(a) and 86(b), it may be further arranged so as to input in the column "collating end data" the ID number of the contract signer subjected to the collation request. In this way, when it is determined that the product to be installed is an "imitative product", it is possible to identify the contract signer 1 who possesses the imitative product. Moreover, with the cooperation of the contract signer 1, it is also possible to investigate the purchasing root of the imitative product, which would be effective in finding a solution as to how to cope with the problem of imitative product.

Here, when adopting the image forming apparatus 2, if the toner cartridge 60 is, for some reason, temporarily taken out of the apparatus 2, for example, to cope with the paper being jammed, the ID number which has been collated and the date of collation of which has been input would be subjected to collation once again. In this case, a wrong recognition occurs, i.e., the toner cartridge 60 is recognized as "imitative product" by mistake, and it is therefore not possible to continue an image forming operation by the image forming apparatus 2 after the toner cartridge 60 is reinstalled.

In order to counteract the foregoing problem, in the present embodiment, in the case where the toner cartridge 60 installed in the apparatus 2 is temporarily taken out of the apparatus 2 for some reason and is then reinstalled into the apparatus 2, the data on that cartridge is not transmitted. Specifically, the cartridge ID number of the toner cartridge 60 which is read out for the first time is stored in another memory region of the memory section 8 shown in FIG. 80. On the other hand, when the toner cartridge 60 is, for some reason, temporarily taken out of the apparatus, for example, to cope with the paper being jammed, and is then reinstalled in the apparatus 2, the cartridge ID number is read out in the manner explained in the embodiment 15 at a reinstallation timing of the toner cartridge 60.

Subsequently, the controller section 3 compares the latest data being input from the read-out section 4 with the data already stored in the memory section 8. As a result of this comparison, if the data being input differs from the data already stored in the memory section 8, the data is transmitted to the transmitter/receiver section 5, and the content of the data stored in another memory region in the memory section 8 is updated. On the other hand, if the data being input is identical with the data already stored in the memory section 8, neither of updating of the memory content nor transmission of data is performed.

In the foregoing preferred embodiment, explanations have been given through the case wherein the comparison between the latest data being input from the read-out section 4 and the data already stored in the memory section 8 is performed by the controller section 3. However, a comparing section or an arithmetic processing section may be provided separately to carry out the foregoing comparison.

Additionally, in the case of adopting an image forming apparatus provided with a memory device such as a hard disk, etc., as a part of the image forming function, such hard disk may be used as the memory section 8.

Embodiment 17

In the above embodiment 16, the toner cartridge 60 whose ID number is subjected to collation for the first time is determined to be original. However, in recent years, with the progress in recycling use of the replacement part 6 such as the toner cartridge 60, etc., a collecting system for the used toner cartridge 60, etc., has been developed.

In the image forming apparatus 2 of the present embodiment, utilizing the collecting system, the cartridge ID number as recorded in the IC chip 61 of the collected toner cartridge 60 by the service provider 10, is read out. Then, the collation data (for example, the end of collection, date of collection) in the inter-exchangeable ID number list are updated as illustrated in FIG. 87(a) and FIG. 87(b). Namely, in the state where the toner cartridge 60 has not been collected, as illustrated in FIG. 87(a), the data on the end of collation and the date of collation, etc., have not been input. However, upon collecting the toner cartridge 60, the column "end of collection" and "date of collection" are filled.

Figure 85:
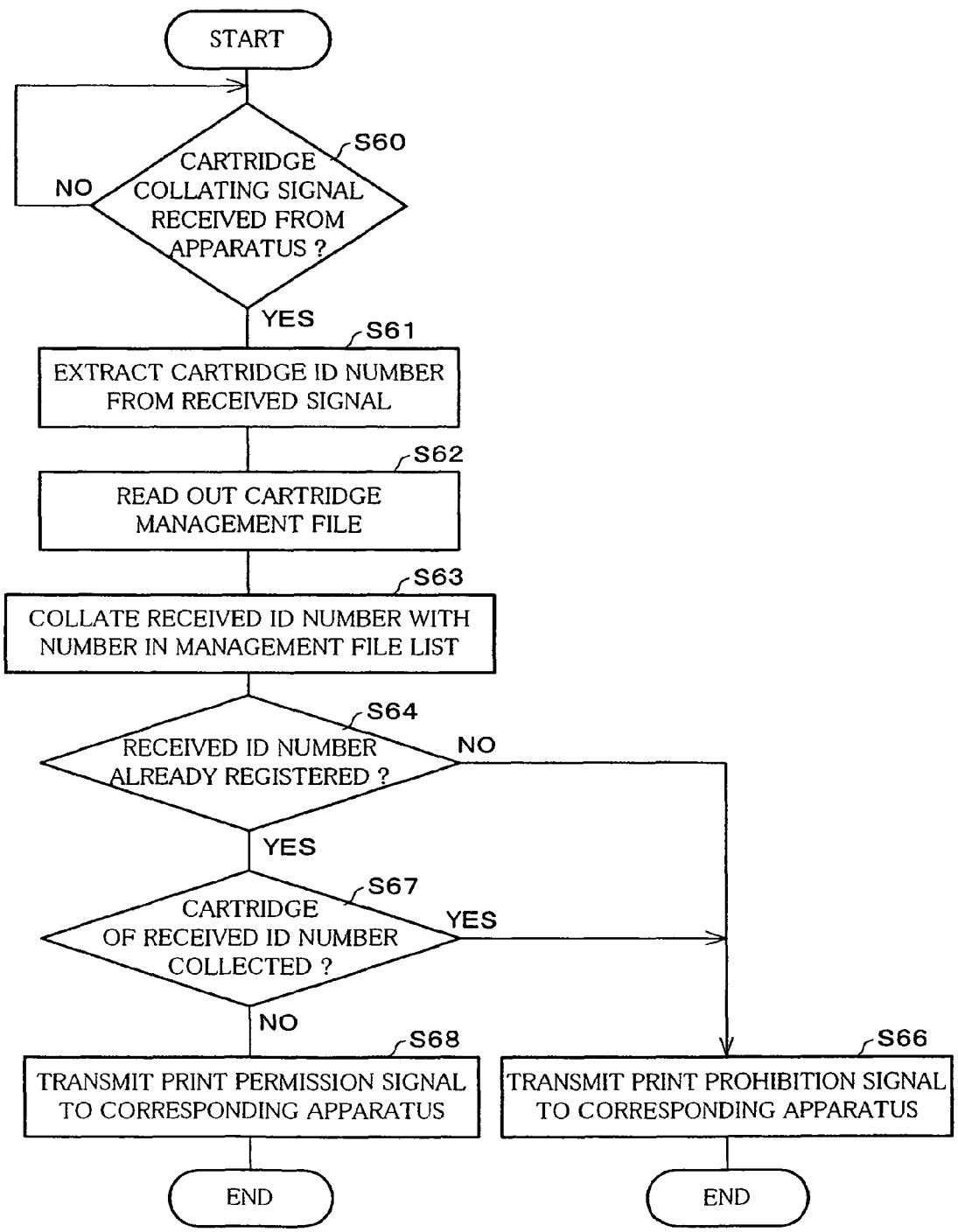
FIG. 85 is a drawing showing, as another example, a process executed by the arithmetic processing section in the terminal station.

As a result, according to the process shown in the flowchart of FIG. 85, the ID number as received is the same as one of the ID numbers already in the collected list, the toner cartridge having the above ID number is determined to be imitative.

The detailed explanations will be given in the following. Here, the processes in S60 to S64 are the same as the processes in the flowchart of FIG. 84. If it is determined in S64 that the ID number as received has not been registered, a sequence goes to S66, and a print permission message or print prohibit signal is transmitted to the image forming apparatus 2 as in the previous embodiment.

However, the following processes are added in the present embodiment. If the arithmetic processing section 122 determines in S64 that the received ID number has been registered, a sequence goes to S67, and the arithmetic processing section 122 further determines if the toner cartridge 60 with the received ID number has not been collected. If not, a sequence goes to S68 where the arithmetic processing section 122 determines that the toner cartridge 60 subjected to collation is original, and a print permission message or a print permission signal is prepared and transmitted to the image forming apparatus 2. On the other hand, if the arithmetic processing section 122 determines that the toner cartridge 60 with the received ID number has been collected, a sequence goes to S66 where the arithmetic processing section 122 determines the toner cartridge subjected to collation to be imitative. In this case, the arithmetic processing section 122 prepares a print prohibit message or a print prohibit signal and transmitted to the image forming apparatus 2.

In general, when the third person copies the ID number, it is most likely that he/she copies directly from the ID number of the original toner cartridge. Specifically, the third person obtains an original toner cartridge which has been used in a proper manner, and prepares an ID number by decoding the ID number obtained from the used original, and the imitative toner is then filled in the toner cartridge 60, or the ID number thus obtained is recorded in the imitative toner cartridge fabricated in reference to the original toner cartridge 60, and the toner is filled, thereby completing an imitative toner cartridge.

Generally, it takes some time before such imitative product reaches the user (in this example, the user includes all the users utilizing the replacement part 6, and in a narrow term, includes the contract signer 1 of the present invention). This means that in the case where the original and imitative product have the same ID number, if the toner cartridge with the above ID number has been collected by the service provider 10, it is likely that the toner cartridge subjected to the collation request at the terminal station 12 is imitative.

In the present embodiment, utilizing the foregoing characteristic, the replacement part 6 used up by the contract singer 1 is collected by the service provider 10. Then, as shown in FIGS. 87(*a*) and 87(*b*), the data are input in the column "data of collection" in the replacement part ID number list. Therefore, the foregoing system works by promptly collecting used original toner cartridges, i.e., before imitative products thereof are distributed in the market.

Embodiment 18

Another embodiment of the present invention will be explained in reference to FIGS. 82(*a*) and 82(*b*). FIGS. 82(*a*) and 82(*b*) show both the case where the delivery data have been input and the case where the delivery data have not been input. Namely, for the ID numbers 00100200000001 to 00100200000007, the place of delivery and the date of delivery have been input. On the other hand, for the ID numbers, 00100200000008 to 00100200000010, the place of delivery and the date of delivery have not been input. Those having the place of delivery and the date of delivery indicate that the replacement part 6 has been delivered to the contract signer 1 guaranteed by the service provider 10. On the other hand, those without having input "place of delivery" and "date of delivery" include not only the replacement parts 6 stored in the service provider 10 but also the replacement parts 6, delivery root of which cannot be traced, for example, those delivered to a general merchandising store via a general circulation root, etc. In this example, the date on the place of delivery is the contract signer's ID.

Further, for the contract signer 1 utilizing the delivery service offered by the service provider 10, it is less likely that the replacement part 6 is obtained from other root, i.e., from a general merchandising store, and thus it is very likely that the replacement part 6 possessed by the contract signer 1 is original. As explained below, the foregoing feature is viewed in the present embodiment.

Figure 88:
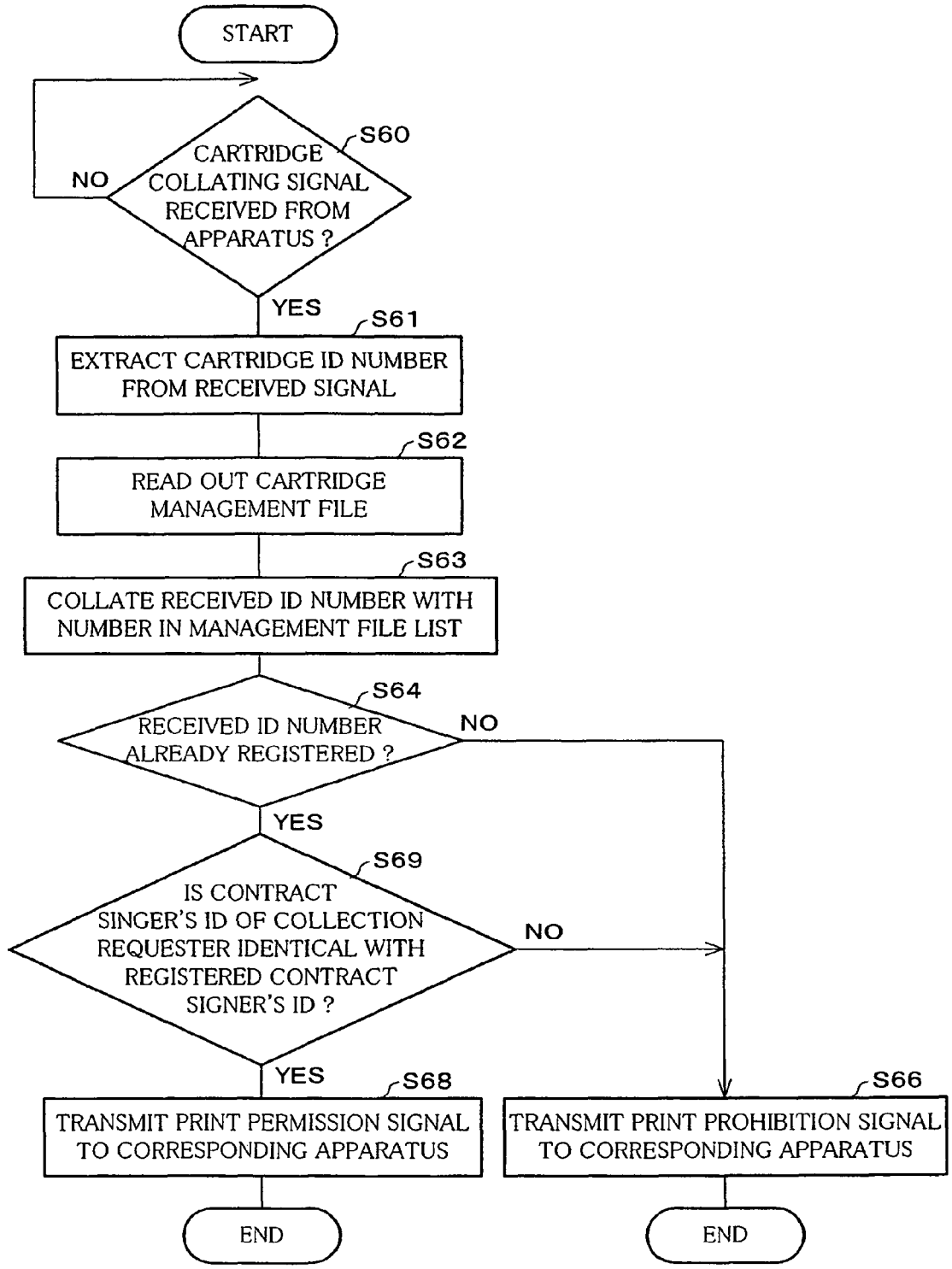
FIG. 88 is a flowchart showing, as a further example, a process executed by the arithmetic processing section in the terminal station.

Namely, upon receiving a request for collating the ID data from the contract signer 1, as shown in the flowchart of FIG. 88, after confirming that the cartridge ID number has been registered by carrying out the processes in S60 to S64 in FIG. 85, a process in S69 (for ease of explanation, S67 of FIG. 85 is replaced with S69) is performed. In this S69, the arithmetic processing section 122 extracts the contract signer's ID from the received ID number, and determines if the contract signer's ID of a collation requester is identical with the registered contract signer's ID of the place of delivery.

As a result, if the contract signer's ID of the contract requester is identical with the registered ID data of the contract signer, a sequence goes to S68 as in the case of the flowchart of FIG. 85. In this S68, the arithmetic processing section 122 determines the toner cartridge 60 subjected to the collation request to be original, and a print permission message or a print permission signal is prepared to be transmitted to the corresponding image forming apparatus 2. On the other hand, if the contract singer's ID of the collation requester is not identical with the registered contract signer's ID data, the arithmetic processing section 122 determines that the possibility of the replacement part 6 possessed by the contract signer 1 of the collation requester being imitative is very high, and a sequence goes to S66 where a print prohibit message or a print prohibit signal is prepared to be transmitted to the corresponding image forming apparatus 2.

As described, according to the arrangement wherein the data on the place of delivery is input beforehand (at the terminal station 12 of the service provider 10), even if the contract signer 1 who possesses an imitative product sends a request for collation to the terminal station 12 with respect to the imitative product before the original is started being used, if the contract singer's ID number as registered beforehand as the data on the place of delivery is not identical with the contract signer's ID number subjected to the collation request, the product is determined to be imitative, and thus it is possible to make a proper determination.

As described, an original product discrimination method of the present invention is characterized by executing a program on a computer which includes the steps of:

(a) registering unique data specifying a replacement part in circulation in computer accessible memory means;

(b) obtaining the unique data on the replacement part in circulation installed in an apparatus by detecting via network its installation in the apparatus; and (c) determining if the replacement part installed in the apparatus is an original product registered in the memory means by collating the unique data obtained in the step (b) with unique data registered in the memory means in the step (a).

According to the foregoing method, the service provider provides unique data such as ID number, etc., to each replacement part in circulation and registers the unique data in the computer accessible memory means. Further, when the replacement part is installed in the apparatus, the service provider operates a computer to carry out the steps of detecting the unique data of the replacement part via network to be collated with the unique data, and determining the replacement part to be original if the detected unique data is identical with the registered ID data.

In this way, the service provider can determine the replacement part whose unique data has not been registered to be imitative with ease by operating a computer. The service provider therefore can quickly take a necessary action for eliminating such imitative product.

In the foregoing structure, it is preferable to set a management file which stores therein the unique data to be unaccessible by a user of the apparatus, etc. In this way, a collating process to determine if the replacement part is original is not performed on the side of the apparatus, and thus it become more difficult to disguise the imitative product such as unauthorized copy, etc., to be the original product. Here, by adopting more irregular random values rather than serial numbers, the possibility that a third person in bad faith fabricates imitative products can be further reduced. Specifically, even if the third person in bad faith decodes the unique data of the original and fabricates an imitative replacement part with the unique data similar to the unique data of the original, the possibility that the unique data of the imitative product is identical with the unique data of the original product can be still reduced. As a result, the imitative products become more difficult to be fabricated.

As described, an original product discrimination method of an original product is characterized by executing a program on a computer which includes the steps of:

(a) registering unique data specifying a replacement part in computer accessible memory means;

(b) receiving the unique data on the replacement part installed in the apparatus on a side of a service receiver, read out and transmitted by the apparatus; and (c) determining if the replacement part installed in the apparatus on the side of the service receiver is an original product registered in the computer-accessible memory means by collating the unique data received in the step (b) with the unique data registered in the computer-accessible memory means in the step (a)

According to the foregoing structure, the same effects as achieved from the foregoing method of identifying an original product can be achieved. Further, the replacement part has unique data to be read out by the apparatus with the replacement part installed therein, and it is therefore difficult to fabricate in a large number imitative products each having unique data identifying a corresponding replacement part. This is because, the unique data which identifies a replacement part is unique to each replacement part independently of other, and it is difficult to fabricate a large number of imitative products by applying thereto such unique data to each replacement part.

As a result, imitative products of the replacement part can be surely suppressed from being circulated.

The foregoing original method discrimination method of the present invention is characterized by further including the steps to be executed by a computer of:

(d) transmitting to the apparatus a signal indicating that an operation using the replacement part is permitted, upon determining that the replacement part installed in the apparatus is the original product registered in the memory means; and (e) transmitting to the apparatus a signal indicating that an operation using the replacement part is prohibited, upon determining that the replacement part installed in the apparatus is not the original product.

According to the foregoing structure, upon determining that the replacement part installed in the apparatus is original, a signal indicative of a permission of an operation using the replacement part is transmitted to the apparatus, and it is therefore possible for the apparatus to execute the control of executing the operation using the replacement part based on a receipt of the signal indicating of the permission of the operation using the replacement part.

On the other hand, upon determining that the replacement part installed in the apparatus is original, a signal indicative of a prohibition of an operation using the replacement part is transmitted to the apparatus, and it is therefore possible for the apparatus to execute the control of executing the operation using the replacement part based on a receipt of the signal indicating of the permission of the operation using the replacement part.

In this way, it is possible to eliminate the troublesome task of damaging the data carrier so that the carrier data can no longer be functioned as performed at the time of taking the toner cartridge out of the apparatus in the conventional structure.

As described, an original product management device of the present invention is characterized in that the arithmetic processing section generates a signal indicative of a permission to use the replacement part upon determining that the replacement part whose unique data is obtained via the communications section is an original product registered in the memory section, while generates a signal indicative of a prohibition to use the replacement part upon detecting that the replacement part whose unique data is obtained via the communications section is not the original product registered in the memory section.

According to the foregoing method, when the arithmetic processing section determines the replacement part to be an original product, a signal indicative of a permission of an operation using the replacement part is prepared, and the apparatus can control to execute an operation utilizing a replacement part based on the signal indicative of a permission of an operation using the replacement part. For example, such permission signal is transmitted from the communications section to the apparatus in which the replacement part is to be installed, and upon detecting a receipt of the permission signal, the apparatus can control to execute the operation using the replacement part.

On the other hand, when the arithmetic processing section determines the replacement part to be an imitative product, a signal indicative of a prohibition of an operation using the replacement part is prepared, and the apparatus can control to terminate an operation utilizing a replacement part based on the signal indicative of a prohibition of an operation using the replacement part. For example, such permission signal is transmitted from the communications section to the apparatus in which the replacement part is to be installed, and upon detecting a receipt of the prohibition signal, the apparatus can control to terminate the operation using the replacement part.

In this way, it is possible to eliminate the troublesome task of damaging the carrier data so that the data carrier can no longer be functioned as performed at the time of taking the toner cartridge out of the apparatus in the conventional structure.

An original product management network system of the present invention of an apparatus detachably provided with a replacement part having unique data, to be used or consumed, is characterized by including:

(a) a first group composed of an apparatus detachably provided with a product-in-circulation having its unique data to be consumed or used up, the apparatus including:

a read-out section for detecting unique data from the product-in-circulation, a transmitter section for transmitting data read by the read-out section to an exterior via a network, and a controller section for controlling the read-out section and the transmitter section; and (b) a second group composed of a service management device which includes:

a communications section for communicating with the first group, a first memory section for registering therein the data on the product-in-circulation as read in the first group, and an arithmetic processing section for calculating an account based on an amount of the product-in-circulation consumed out of an amount of the product-in-circulation delivered.

According to the foregoing arrangement, the foregoing impurity method can be realized by utilizing IT techniques such as a network system and an IC chip, etc.

Here, the unique data of the replacement part is stored as electric data in the memory section of the original product management device physically separated from the apparatus, and therefore, the third person other than the manager of the original product management device is generally not permitted to access the unique data, and thus such problem that the unique data are leaked out to the third person is less likely to occur. Namely, the unique data of the replacement part can be transmitted from a uni-directional transmission system to a manager of the original product management device from the user of the apparatus, the unique data itself can be stored in the state completely shut off from the external network system.

An original product management network system of the present invention, is characterized by including:

(a) a first group composed of an apparatus detachably provided with a replacement part to be consumed or used up, which can be identified by unique data recorded therein, the apparatus including:

a read-out section for detecting unique data from the replacement part, a transmitter/receiver section for transmitting data read out by the read-out section to an exterior via a network, and a controller section for controlling the read-out section and the transmitter/receiver section; and (b) a second group-composed of an original product management device which includes:

a communications section for communicating with the first group, a memory section for registering therein unique data on the replacement part, and an arithmetic processing section which, as a result of comparison between the unique data on the replacement part for which collation is requested from the first group with the unique data on the replacement part registered in the memory section, if the unique data is identical with the unique data registered in the memory section, checks if collation data, which can identify at least a collation requester and a date of collation, has been registered in the memory section, and determines the replacement part to be an original product if the collation data has not been registered in the memory section, while determines the replacement part to be an imitative product if the collation data has been registered in the memory section.

According to the foregoing structure, a proper determination can be ensured even in the following event. That is, the third person who is not a user of the replacement part nor an original product manager may collect the used original product, and decodes the unique data, and based on which fabricate and sell the imitative replacement parts having the same unique data, generally, the imitative products start being used and are subjected to collation after the original products start being used and are then subjected to collation. Therefore, when the replacement part is subjected to collation upon request made via a network, if the replacement part has already been subjected to collation before, i.e., the replacement part is determined to be imitative.

Therefore, compared with the case of determining if the replacement part is an original product only by checking if the unique data has been registered, a determination can be made with an improved determination using collation data as a filter.

An original product management network system of the present invention, is characterized by including:

(a) a first group composed of an apparatus detachably provided with a replacement part to be consumed or used up, which can be identified by unique data recorded therein, the apparatus including:

a read-out section for detecting unique data from the replacement part, a transmitter/receiver section for transmitting data read out by the read-out section to an exterior via a network, and a controller section for controlling the read-out section and the transmitter/receiver section; and (b) a second group composed of an original product management device which includes:

a communications section for communicating with the first group, a memory section for registering therein unique data on the replacement part, and an arithmetic processing section which, as a result of comparison between the unique data on the replacement part for which collation is requested from the first group with the unique data on the replacement part registered in the memory section, if the unique data is identical with the unique data registered in the memory section, checks if collection data, which can identify at least a collection requester and a date of collection, has been registered in the memory section, and determines the replacement part to be an original product if the collection data has not been registered in the memory section, while determines the replacement part to be an imitative product if the collection data has been registered in the memory section.

Generally, as the replacement parts are being used, their performances deteriorate. However, according to the foregoing structure of the present embodiment, the used replacement part is replaced with new one before its expected performances can no longer be obtained. Further, the used replacement part is collected from the first group, and collection data which specifies the date of collection and the collector are registered in the memory section of the original product management device.

According to the foregoing structure, a proper determination can be ensured even in the following event. That is, the third person who is not a user of the replacement part nor an original product manager may collect the used original product, and decodes its unique data, and fabricate and sell the imitative replacement parts having the same unique data thus obtained. However, even in this even, it is general to assume that the imitative products is subjected to collation after the original product is subjected to collation. Therefore, when the replacement part is subjected to collation upon request made via a network, if the collection data has already been recorded, the replacement part is determined to be unright imitative.

Therefore, compared with the case of determining if the replacement part is an original product only by checking if the unique data has been registered, a determination can be made with an improved determination using collection data as a filter.

An original product management network system of the present invention, is characterized by including:

(a) a first group composed of an apparatus detachably provided with a replacement part to be consumed or used up, which can be identified by unique data recorded therein, the apparatus including:

a read-out section for detecting unique data from the replacement part, a transmitter/receiver section for transmitting data read out by the read-out section to an exterior via a network, and a controller section for controlling the read-out section and the transmitter/receiver section; and (b) a second group composed of an original product management device which includes:

a communications section for communicating with the first group, a memory section for registering therein unique data on the replacement part and when delivering the replacement part in the first group, further registering therein identification data on the first group of a place of delivery as delivery data related to the unique data on the replacement part, and an arithmetic processing section which, as a result of comparison between the unique data on the replacement part for which collation is requested from the first group with the unique data on the replacement part registered in the memory section, if the unique data is identical with the unique data registered in the memory section, further compares identification data on the first group of a collation requestor with registered identification data of the first group, and determines the replacement part to be an original product if the replacement part having the unique data subjected to collation has been registered in the memory section.

According to the foregoing system, the replacement part to be delivered to the first group by the service provider is guaranteed to be an original product. Therefore, when delivering the replacement part to the contract signer, one member in the first group, the unique data is registered in the memory section of the original product management device in relation to the identification data of the first group. It can therefore be determined if the collation requester is different from the registered contract signer.

As a result, an improved determination precision can be achieved using identification data as a filter as compared to the case of determining if the product installed is original only based on if its unique data is registered.

Embodiment 19

In the present embodiment, in view of such event that a used-up cartridge storing such recording materials as toner, ink, tape, etc., as expendable, which is detachably mounted in an image forming apparatus for forming images using such recording materials is reused without permission from a manufacturer or a seller of the cartridge, a method of preventing a trouble which is liable to occur in the event will be explained.

The below-explained structure of the present embodiment permits an increase in the number of quasi-original products in circulation, whose quality and function are guaranteed, and which are available at more reasonable price than the original products. As a result, such quasi-original products become more easily obtainable by consumers, and thus imitative products of the quasi-original products without guaranteed quality and function can be removed from the market.

(Business Structure)

Figure 90:
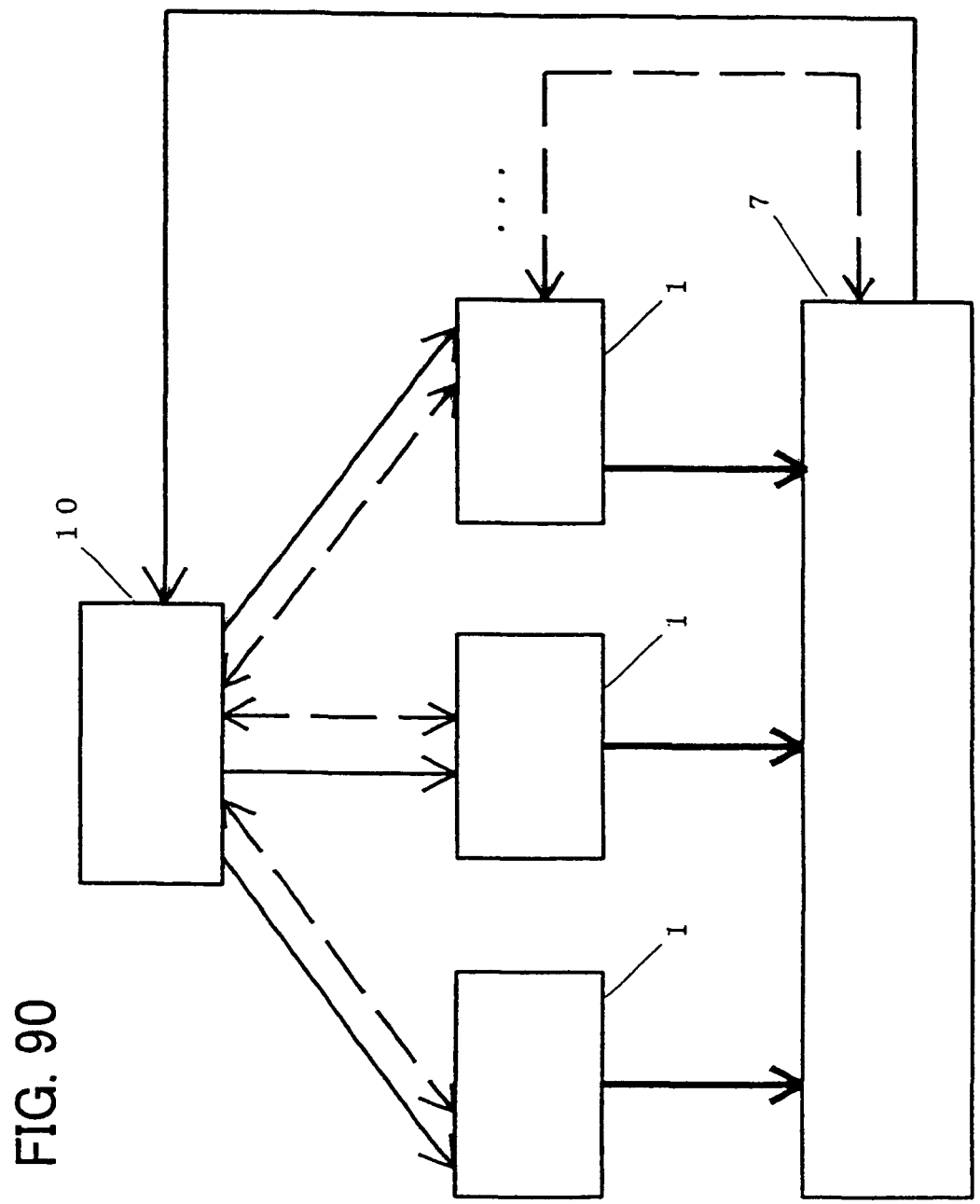
FIG. 90 is a drawing illustrating the general concept of a business model to which the present invention is applicable.
Figure 91:
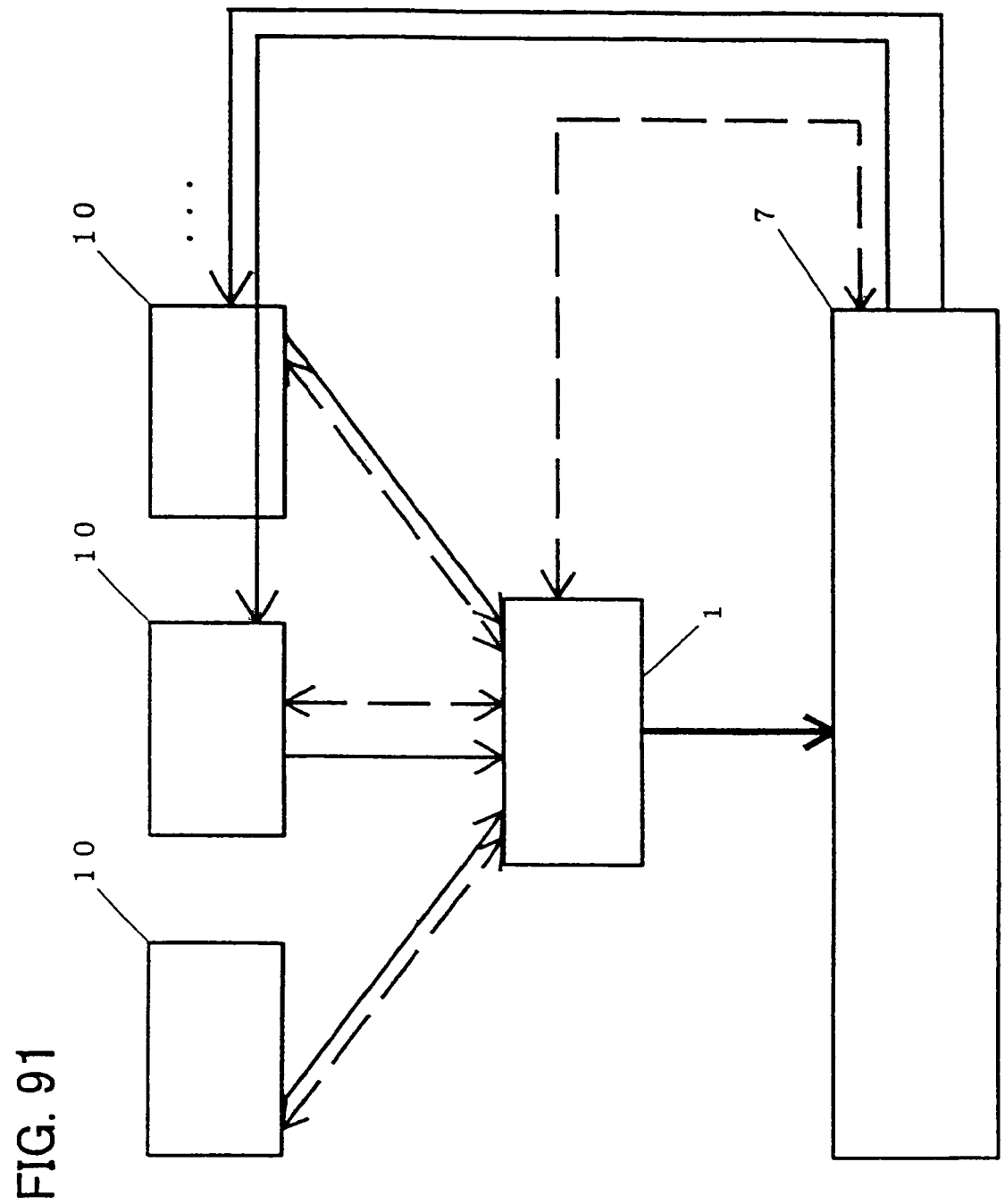
FIG. 91 is a drawing showing the general concept of another business model to which the present invention is applicable.

FIGS. 90 and 91 show the distribution of products (solid line) and the transmission path of data (dotted line) among the service providers 10 (container manager) and the contract signers 1 (customers) and general users. Generally, service providers 10 and contract signers 1 have many to many relationship; however, in an example shown in FIG. 90, a prescribed service provider 10 is focused, and in an example shown in FIG. 91, a prescribed contract signer 1 is focused.

The service provider 10 is a manufacture (having the structure explained in embodiment 1 in reference to FIG. 1) such as a copying machine of an electrophotographic system, and manufactures or sells a toner cartridge as a replacement part. However, the service provider 10 may be specialized in service-sector job such as installation of toner cartridge, inventory control at the place of delivery, accounting process, etc., by obtaining a container for a toner cartridge (hereinafter the toner cartridge 60 is referred to as a container 60 for convenience in explanations) as explained in reference to FIG. 6, from a manufacturer. The foregoing structure, for example, corresponds to a non-productive department such as sales subsidiary established by a manufacturer of image forming apparatuses.

The contract signer 1 such as a toner manufacturer, an ink manufacturer, etc., obtains a container 60 from the service provider 10, and packs the container 60 after filling therein toner or ink to prepare a replacement part 6 (see FIG. 6), and the contract signer 1 then sells the resulting replacement part 6 to the users. The contract signer 1 may be defined to be those who obtain toner or ink from other supply manufacturer than the service provider 10, and the container 60 from the service provider 10, and packs the container 60 after filling therein toner or ink. The contract signer 1 may be those also deal with wholesales, and retail sales.

The general user 7 is defined to be a user has an image forming apparatus in his/her possession (including temporal possession by lease, rental, etc.). This general user 7 includes consumers, such as a personal user, an enterprise user, etc., a wholesaler who sells a replacement part 6 to the end user, a retailer, etc.

Next, the distribution of the product will be explained. First, an empty container 60 without having toner filled therein is supplied to the contract signer 1 from the service provider 10. Then, the contract signer 1 fills toner in the container 60 and then packs it. The contract signer 1 sells the resulting replacement part 6 as a complete product to the general user 7. FIGS. 90 and 91 also show a return flow of the used replacement part 6 from the general user 7 to the service provider 10.

Data flow bi-directionally between the service provider 10 and the contract signer 1. Specifically, the data flows from the contract signer 1 to the service provider 10, for requesting the service provider 10 to issue unique data to be added to individual service providers 10. On the other hand, the data flows from the service provider 10 to the contract signer 1 to inform the unique data in response to the request for adding unique data.

The data flows between the contract signer 1 and the general user 7, for example, as follows. In the case where a purchase offer is made directly through telephone, facsimile, network, etc., purchase data such as user's data such as the model number, the number of purchases of the replacement part 6, the name, address, telephone number of the general user 7, etc., are transmitted from the general user 7 to the contract signer 1. Particularly, in the case of a net business using the Internet, etc., the foregoing flow is necessary, and additionally, the payment data such as credit cart number, etc., may be required. For the value-added service (VAS) in the foregoing net business, such data as appointed date of delivery, delivery state, etc., may be transmitted from the contract signer 1 to the general user 7.

(Replacement Part)

FIG. 6 shows an example of the case of adopting a toner cartridge as the replacement part 6. The toner cartridge is composed of an expendable (not shown) of toner, and the container 60 for storing therein such expendable. According to the fundamental service of the user, the container 60 is supplied from the service provider 10 to the contract signer 1, and the contract signer 1 completes a toner cartridge by filling the container 60 with the toner.

The container 60 further includes a cabinet and a function member such as developing mechanism, etc. As described, for the term indicative of the replacement part 6 without expendable, a "container" is adopted.

Further, the toner cartridge in circulation is packaged by the packaging material 62 and packed by the packing material 63. These packaging material 62 and the packing material 63 are as explained earlier in the embodiment 1.

The characteristic feature of the replacement part 6 lie in that unique data for specifying (identifying) each replacement part 6 is recorded on the surface or in the inside of the container 60. For example, as shown in FIG. 6, an IC chip 51 is mounted on the container 60 as a recording member of unique data, details of which are as explained earlier in the embodiment 1.

(Concrete Example of Unique Data)

In the present embodiment, the rule of forming the ID number (unique data) is defined and controlled by the service provider 10. However, as will be explained later, the present invention is based on the provision that the recording of the ID number on or in the ID chip 61 is performed by the contract signer 1.

In the IC chip 61, as data for specifying the replacement part 6, for example, the following numeral data are recorded:

0|0|100|200|00 00000101.

It should be noted here that the digit number of this numeral data is not intended to be limited to the above. Further, the segmentation mark "|" and the space in the numeral data are shown for ease in explanations to purposely indicate each data group. Therefore, the numeral data may be continuous or discontinuous with segmentation indicative marks (space, comma, etc.,) inserted therein, to be suited for the method of reading data to be adopted. The foregoing numeral data is to be prepared and controlled by the service provider 10.

Next, the meaning of the numbers used in the numeral data will be explained. The numeral data is composed of upper 8 bits and lower 8 bits, where the data of the upper 8 bits is for use in specifying the type of the replacement part 6, while the data of lower 8 bits is the unique data for use in identifying each replacement part 6. Here, it may be defined such that the unique data of the replacement part 6 is constituted by the entire numeral data of 16 bits in combination of the upper 8 bits which identify the model of the replacement part 6 and unique data of the lower 8 bits.

Firstly, the data of upper 8 bits will be explained.

The number in the top first digit is the product identifying data which is specifically indicative of whether the replacement part 6 is original or quasi-original. The original replacement part 6 indicates the one manufactured in a captive factory, and the quasi-original replacement part 6 indicates the one manufactured by a factory of a licensed company, and the number in the top first digit is provided for distinguishing the one produced by the captive factory from the one produced by the licensed company, examples of which are shown in the table 21 below.

TABLE 21

| Number | MEANING |
|---|---|
| 0 | ORIGINAL PRODUCT |
| 1 | QUASI-ORIGINAL PRODUCT (PRODUCT PRODUCED BY LICENSED COMPANY a) |
| 2 | QUASI-ORIGINAL PRODUCT (PRODUCT PRODUCED BY LICENSED COMPANY b) |
| 3 | QUASI-ORIGINAL PRODUCT (PRODUCT PRODUCED BY LICENSED COMPANY c) |
| 4 | NON-TARGET FOR SERVICE |
| ... | |
| 9 | NON-TARGET FOR SERVICE |
| UNFILLED | NON-TARGET FOR SERVICE |

For example, in the case where the contract signer 1 is the company a, the number of the top first digit is set to "1". Here, the original product is defined to be a toner cartridge which is filled with toner by the company a, the quasi-original product is defined to be a toner cartridge which is filled with toner whose quality is guaranteed by the service provider 10, and the non-target product for service is defined to be the toner cartridge whose quality is not guaranteed by the service provider 10.

On the other hand, when the number in the top first digit does not indicate an original product or a quasi-original product, or any number has not been input or it can be considered that any number has not been input, the replacement part is determined to be the non-target product for service. Namely, the non-target product for service does not satisfy a criteria for a predetermined quality set by the service provider 10, and therefore, at least there is a possibility that the non-target product for service adversely affects the main body of the image forming apparatus, which would eventually causes an inconvenience to the user (general user 7) of the image forming apparatus.

Here, a quality assurance may be performed by the contract signer 1 or the service provider 1, depending on the content of the service contract between the two parties. However, it is preferable that a quality assurance standard check be performed by the contract signer 1. In the case of performing the quality assurance standard check on the side of service provider 10, the service provider 10 is required to check the compatibility with the image forming apparatus with respect to toner of various kinds, which is an overburden to the service provider 10.

In the case where the service provider 10 delivers the container 60 which is not filled with toner to the contract signer 1, the data formed on the toner container 60 may be input in the IC chip 61 beforehand by the service provider 10 or input by each contract signer 1. In the former case, it is advantageous in that the service provider 10 can control the data in the block, and thus a trouble caused by an input error or an input failure by the contract signer 1 can be avoided. In the latter case, a burden of the service provider 10 can be reduced.

Here, the data for use in selectively excluding original in-house products from the target for service may be added.

Next, the number in the second top digit is the product identification data for use in roughly classifying each of replacement parts 6 of plural types, examples of which are as shown in the above Table 18.

The numbers in the top three to five digits are the product identification data for use in the medium classification of the plural replacement parts. For example, the toner cartridges 60 for electrophotography can be further classified into plural types, for example, by physical shape, structure, etc., and the data for the medium classification is used to further classify the products in the same class, the toner cartridge for electrophotography, by the above rough classification. Generally, the medium classification corresponds to the model types of the image forming apparatus 2. An example of the medium classification is given in the case of further classifying toner cartridges 60 for electrophotography in the above rough classification in the above Table 19.

The number in the sixth digit from the top is the product identification data for use in identifying the color of the toner stored in the toner cartridge 60, and the example of which is as shown in the Table 20.

Additionally, the bottom two digits in the upper 8 bits are blank data, and are not used effectively in this example. However, these are provided to make the product identification data to be one byte. Also, these two digits are spare digits which can be used when a greater amount of data is required for classifying the replacement part 6.

According to the above-explained rule, the upper 8-bit data "1 0 100 200" indicates a quasi-original magenta toner cartridge for a digital copying machine BL-2000 which is supplied to the company a from the service provider 10 and is filled with toner by the company a.

Next, the lower 8-bit data will be explained. In the above example, the lower 8-bit data indicates the individual number of the toner cartridge 60 of the type 0 0 100 200, and a single unique number is allocated to each toner cartridge 60. Upon receiving a request from the contract signer, the service provider 10 issues an individual number (hereinafter referred to as ID number). The foregoing data are also added to the inter-exchangeable data table at the terminal station of the service provider 10 (service management device).

Although the foregoing explanations have been given through the case of the toner cartridge, the structure of the present embodiment is also applicable to the ink cartridge of an ink jet printer, an ink sheet cartridge of a video printer, etc., and the cartridge is composed of ink, ink sheet as expendable and the container 60 storing such expendable.

(Network Structure and Apparatus Structure)

Figure 92:
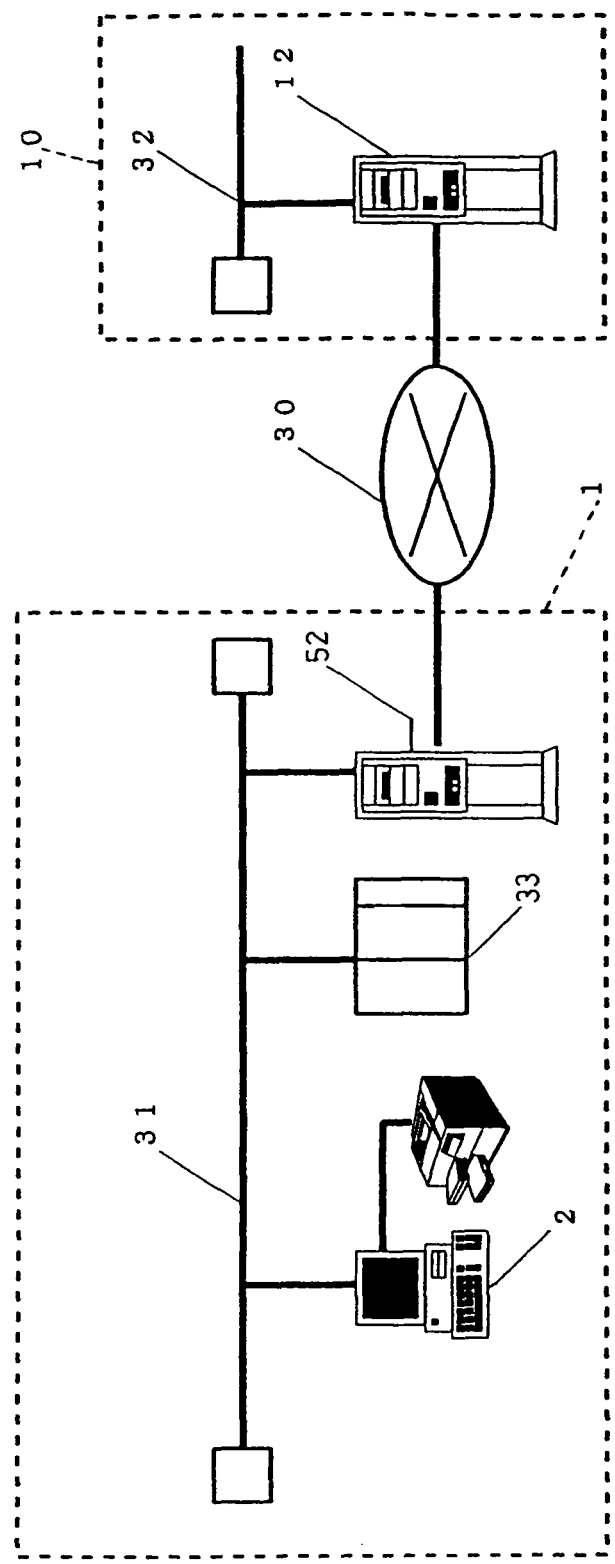
FIG. 92 is an explanatory drawing showing, as an example, a network including a service provider and a contract signer.

FIG. 92 shows an example of a general structure and a function block of the service provider 10 and the contract signer 1 connected in the network. However, in the network of the simplest structure, the terminal station 300 of the contract signer 1 and the terminal station 12 of the service provider 10 are connected.

The service provider 10 includes a terminal station 12 used in the service management, which is connected to the network 30. Here, the network 30 may be a public network such as a telephone line, etc.

Figure 89:
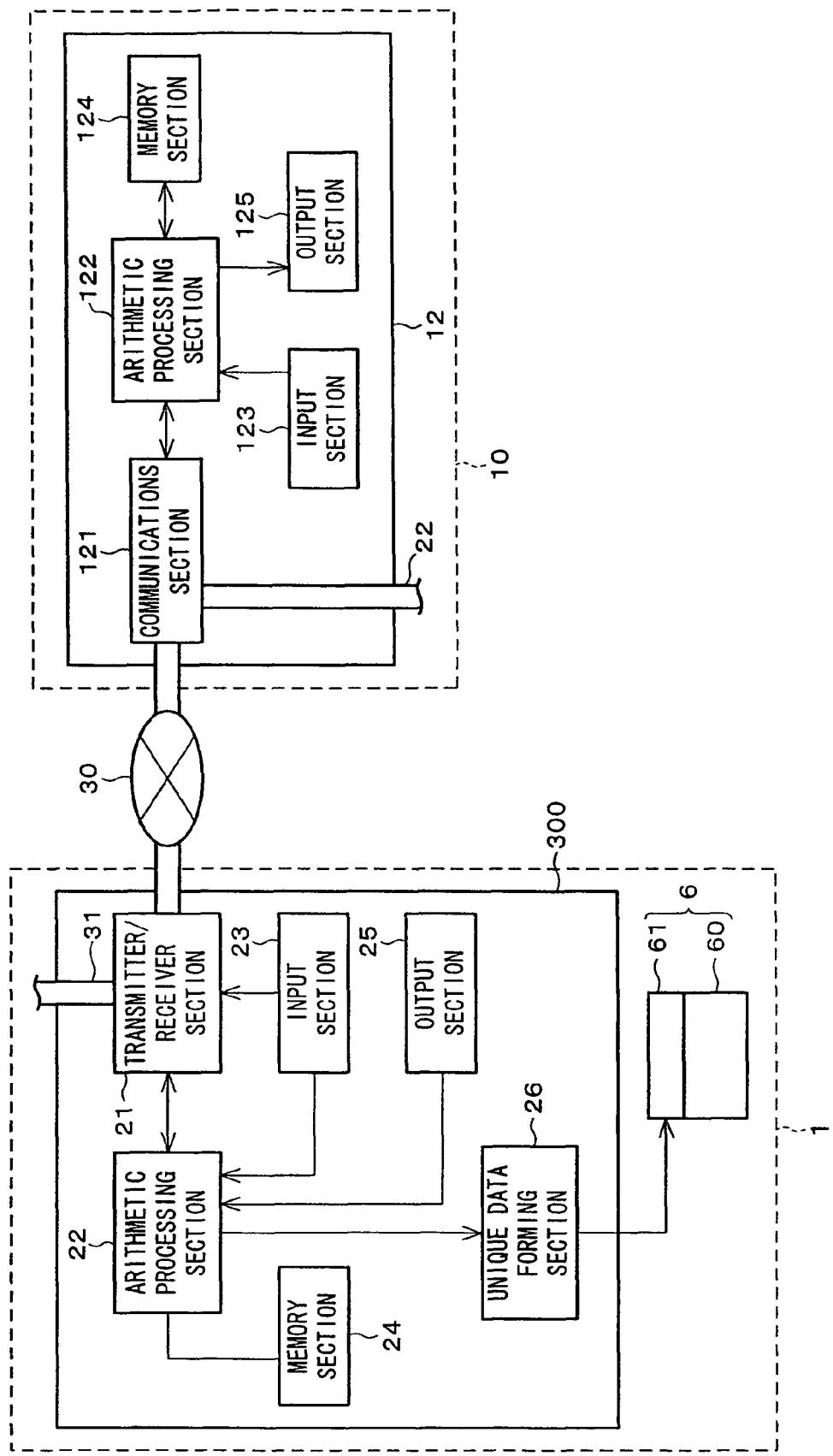
FIG. 89 is a block diagram showing, as an example, a configuration of a device of a service provider and that of a contract signer.

The terminal station 12 (service management device) of the service provider 10 shown in FIG. 89 has the structure explained earlier in the embodiment 1 in reference to FIG. 1. However, in the present embodiment, the terminal station 12 functions as a server with respect to the terminal station 300 of the contract signer 1.

Here, the contents of the memory 124 include replacement part data table shown in Tables 19 to 22, the contract singer's data table, service management table for each contract signer, and an application program in which a process flow of the service management method of the present invention is written, etc. Here, the memory section 124 corresponds to a recording medium of the present invention.

Next, the structure of an apparatus on the side of the contract singer 1 will be explained referring back to FIG. 92. The apparatus on the side of the contract signer 1 includes a terminal station 300, a finisher 33 of the replacement part 6 and a server 52. These terminal station 300, the finisher 33 of the replacement part 6 and the server 52 are connected to the network 31 of an external section such as LAN, etc. Further, the terminal station 300 on the side of the contract signer 1 is connected to the terminal station 12 on the side of the service provider 10 by the network 30 such as a telephone line, etc.

The terminal station 300 is the device for controlling and managing the filling of toner, formation of unique data to be stored in the IC chip 61 of the toner cartridge with respect to the container 60. This terminal station 300 is an essential hardware for the network structure which executes the service management method of the present invention.

The finisher 33 of the replacement part 6 is provided for filling toner in an unfinished replacement part 6 (container 60 in this example) before being filled with toner to prepare a finished replacement part 6. Specifically, the finisher 33 includes a toner filler, and a unique data preparing device, and may also include a packaging/packing device if necessary in the distribution. Namely, the finisher 33 is the hardware used in producing final product of the replacement part 6 based on the service utilizing the service management method and the service management network system of the present invention.

In the case of forming the unique data in hard data, the unique data preparing section is composed of an image forming apparatus such as an ink jet printer, a PC for controlling the image forming apparatus, etc., unlike the case of forming the unique data. In the case of forming unique data in the form of protrusions and recessions on the cabinet, the unique data preparing section is composed of a machine tool such as a miller, a drill, etc., and a PC for controlling the machine tool.

Alternately, the unique data preparing section may be arranged so as to form a unique data preparing section 26 by a memory (IC chip) control use control board (to be connected to an extension bus of a terminal station 300 such as a peripheral component interconnect (PCI), an industry standard architecture bus (ISA), etc.), as a part of the function of the terminal station 300. In this case, the unique data processed by the arithmetic processing section 22 of the terminal station 300 is formed directly on the IC chip 61 without via the network. Namely, the unique data preparing section 26 is functionally considered to be a part of the finisher 33. However, when considering the unique data preparing means as an electric means to the IC chip 61, it further eases the connection with the terminal station and thus can be formed by utilizing the hardware resources of the terminal station 300.

The foregoing unique data preparing section 26 has such layout of the circuit that a signal can be output according to the type of memory adopted in the IC chip (application voltage, timing flow of a writing operation, kind of data, etc.), and is composed of an IC chip terminal station for supplying the signal and a connector for the physical contact. In the following, explanations will be given through the case of adopting the foregoing unique data preparing section 26.

In the case where the terminal station 300 of the contract singer 1 is connected to the external network 30, the server 52 functions as the security countermeasure device, and the server 52 is a hardware specialized in security function. Namely, the security countermeasure device indicates a network security for preventing an external illegal access, and, for example, the server functions as "fire wall" placed between the external network and the internal LAN.

However, it may be arranged such that the server 52 is functionally integrated with the terminal station 300 to be constituted by the same hardware as shown in FIG. 89. In the following explanations, the member directly connected to the network 30 is the terminal station 300 unless otherwise specified.

The terminal station 300 of the contract signer 1 functions like a client with respect to the terminal station 12 of the service provider. The terminal station 300 has almost the same structure as the terminal station 12 of the service provider 10, and includes a transmitter/receiver 21, an arithmetic processing section 22, an input section 23, a memory section 24, and an output section as illustrated in FIG. 89, and further includes the unique data preparing section 26 as above-explained.

The service provider 10 provides the contract signer 1 with services with respect to the replacement part 6 such as a toner cartridge, etc., (to be explained in details later). In the following, the relationship between the specific contract signer 1 and the service provider 10 will be explained.

(Registration of Contract Signers' Data)

Next, operations of the system will be explained. First, the service provider 10 obtains the data on the contract signer 1 as preliminary data, and inputs the data as obtained into the terminal station 12 by means of the input section 123, and then registers the data in the memory section 124 as an electric file. As shown in the contract signer table [1] shown in FIG. 95(a), the preliminary data is not specified as long as the contract signer 1 can be specified, and this has been already explained in reference to the contract signer table [1] of FIG. 8(a).

In order to deal with the contract signer's data at the terminal station 12, the service provider 10 issues a contract signer's ID for each contract signer 1. Here, it may be arranged such that the contract signer's ID is issued by the arithmetic processing section 122, and that the contract signer's ID number as previously issued is stored in the memory section 124 and a new contract signer's ID is issued by incrementing the contract signer's ID number as stored. The foregoing contract signer's ID is unique, and the number such as 000125, etc., is allocated to each contract signer.

As shown in the contract singer table [2] of FIG. 95(b), a matrix table is prepared wherein the columns show the total data of the replacement part 6 to be provided from the service provider 10 to the contract signer 1 for respective contract signers shown in the row, and this matrix table indicates the replacement part(s) 6 subjected to service for each contract signer 1. In this example, it can be seen from the contract signer Table [2] that the contract signer 1 having the contract signer's ID of 000001 has a service contract with respect to the replacement parts of BL-2000 and the BL-2001. Therefore, the contract signer 1 can recognize at a glance or the arithmetic processing section 122 can recognize that the containers 60 of BL-2000 and LB-2001 are to be provided to the contract signer 1 of the ID number 000001.

Here, the contract signer 1 is permitted to add or change the replacement parts 6 subjected to service according to the image forming apparatuses possessed by the general user 7. The various data regarding the contract signer 1 and the replacement part 6 required for the service-section job of the service provider 10 are transmitted from the terminal station 2 of the contract signer 1 to the terminal station 12 of the service provider 10, and is transmitted via the network 30, and the recording of the table corresponding to the memory section 125 is altered by the arithmetic processing section 122.

The contract signer table [1] and the contract signer table [2], can be combined as a common data for use in correlating the contract signer's ID. Therefore, in the case of specifying the contract signer whose ID number is 0000001 based on the contract signer table [2], it can be seen that the contract signer 1 is "Company A", and the containers 60 for the model numbers BL-2000 and for BL-2001 are subjected to service.

As described, a file for storing therein data identifying each contract signer 1 and the contents of the contract signer 1 is prepared, and the file is stored in the memory section 124 of the terminal station 12.

Further, as illustrated in FIG. 96, the delivery data regarding the replacement part 6 subjected to service are shown in FIG. 95(*b*) as the contract signer table [2] in the form of the contract signer management table for each contract signer 1. The delivery data includes not only essential data such as date of delivery, name of product delivered, number of products delivered, but also the confirmed number of containers 60 used when controlling the inventory or accounting.

Namely, in order to promptly provide the replacement part with respect to the general user 7, i.e., to prevent a delay in delivery of the container 60 from the service provider 10 to the contract signer 1, the accounting system of the present invention is arranged such that the container 60 is delivered beforehand from the service provider 10 to the contract signer 1 in the stage the purchase of the container 60 without being filled with toner has not been confirmed by the contract signer 1, and the contract signer 1 is charged according to the number of containers 60 used. In such system, the data indicative of number of containers 60 used is particularly-important.

The foregoing delivery data also can be combined with the contract signer table [1] and the contract signer table [2] as common data for use in collating the ID number. In the foregoing manner, a file in which the service content with respect to the contract signer 1 is prepared to be stored in the memory section 124 of the terminal station 12.

(Container Requesting Process)

The contract signer 1 orders the container 60 with respect to the service provider 10 based on the market condition or the purchase order directly received from the general user 7. In the foregoing the system of the present invention, wherein the service provider 10 delivers the container 60 to the contract signer 1 beforehand, but charges him/her later, it may be arranged such that a predetermined number of containers 60 are delivered to the contract signer 1 unless a change in contract is requested from the contract signer 1, or that when the service provider 10 confirms that containers 60 the contract signer 1 possesses in stock is less than a predetermined number, the service provider 10 inquires the contract singer 1 for the number of containers 60 to be delivered.

Upon receiving a request from the contract singer 1, the service provider 10 delivers the replacement part 6 such as a toner cartridge 60 suited for the image forming apparatus of the contract signer 1, in which toner has not been filled. In general, even among image forming apparatuses produced by the same manufacturer, an applicable replacement part 6 often differs depending on a model type. Therefore, the service provider 10 checks and confirms the model number, the code number, etc., of the replacement part 6 based on the data on the image forming apparatus main body.

In the foregoing standard system, there is a possibility that a container 60 may not be delivered as scheduled, for example, due to an error on the side of the service provider 10 such as a trouble in the manufacturing process of the container 60, etc., or an error on the side of the contract signer 1 such as an ordering error, etc.

As a solution to the foregoing problem, the system of the present invention is arranged such that the service provider 10 delivers the containers 60 under contract as a replacement part 6 to the contract signer 1 beforehand, and the contract signer 1 is charged according to the number of the containers 60 used. As a result, such problem on the side of the service receiver 1, that the production and sales of the replacement part 6 are stopped due to a shortage of the container 60 can be prevented without the need of performing an inventory control of the container 60 on the side of the service receiver 1. Moreover, an increase in production lead time based on a stoppage of a period such as toner filling process due to an absence of delivery of the toner container 60 can be prevented.

In order to realize the foregoing service, the service provider 10 records the data on the delivery of the container 60 delivered to the contract signer 1, and manage the number of the containers 60 the contract signer 1 actually used for the accounting system and the inventory management service. In the case where the service provider 10 has a plurality of contract signers 1, the service provider 10 controls the data for each contract signer 1. A concrete example of counting the number of containers 60 the contract signer 1 actually used will be explained later. According to the foregoing system, the service provider 10 manages the inventory of the containers 60 on the side of the contract signer 1, and the burden on the contract signer 1 to manage the inventory of the containers 60 can be eliminated.

(Process of Requesting Issue of ID Number)

When the replacement part 6 to be supplied in the market or data on the purchase order is directly received from the general user 7, the contract signer 1 completes a final product of a replacement part 6 by placing toner in the replacement part 6 in his possession. The foregoing data on the purchase request of the replacement part 6 is input to a terminal station 300 via the input section 23 or the transmitter/receiver section 21 (to be described later).

If a reduction in amount of inventory of the final product of the replacement part 6 on the side of the contract signer 1 is desired, it is preferable to start manufacturing the replacement part 6 in response to the purchase request order from the general user 7. As described, for the delivery system of replacement part 60, it is desirable that a container 60 without being filled with toner is not a chargeable element while a container 60 filled with toner as a final product is considered to be used, and is thus chargeable to the contract signer 1. In this way, such problem that the replacement part 6 remains unsold and becomes an unnecessary inventory without producing any profit can be prevented.

The method of placing the toner in the container and the image forming apparatus itself are not directly related to the present invention, and detailed descriptions thereof shall be omitted here, and known method and apparatus may be adopted.

Further, in the present invention, it is required to perform a process of transmitting an ID issue request from the terminal station 300 of the contract signer 1 to the terminal station 12 of the service provider 10 to issue the ID number of the container 60 according to the number of production order or purchase order.

To be more specific, the arithmetic processing section 22 of the terminal station 300 transmits from the transmitter/receiver 21 an ID number issue request with respect to containers 60 required for manufacturing the replacement parts 6 as requested based on the number of the replacement parts 6 to be manufactured as received from the input section 23 or the transmitter/receiver 21.

In the following, an example of an ID number issue request message will be explained.

A|1 0 100 2 00|75|000001.

As in the above example, the issue request message is composed of four sections, in which the first section indicates the type of message. In this example, "A" indicates an ID number issue request.

The second section indicates the type of the container 60 subjected to the issuance of the ID number, and in this example, a quasi-original magenta toner cartridge for the digital copying machine of model BL-2000 explained earlier.

The third section indicates the number of the containers 60 subjected to the issuance of the ID numbers as specified in the second section.

The last section indicates the data required for specifying the contract signer 1 of the requester of the ID number, and in this example, it can be seen from the data in the last section that the contract signer 1 of the requestor is the contract signer 1 having the ID number "000001".

It should be noted here that the foregoing ID number issue request message shows merely one example, and, for example, the order of respective sections, or the form of respective data are not intended to be limited to the above example. For example, in the case where the communication between the contract signer 1 and the service provider 10 is limited to the ID number issue request and the response to the issue request, the data indicative of the type of message can be omitted, because in such case, upon receiving a message from the contract signer 1, the service provider 10 can see that the message as received is the message for the ID number issue request. In this example, it is required to transmit only the data identifying the contract signer 1 of the ID number issue requester, and the data indicative of the number of purchase orders. Further, in the case where the service provider 10 has only one contract signer 1, the data specifying the contract signer 1 can be omitted.

Figure 99:
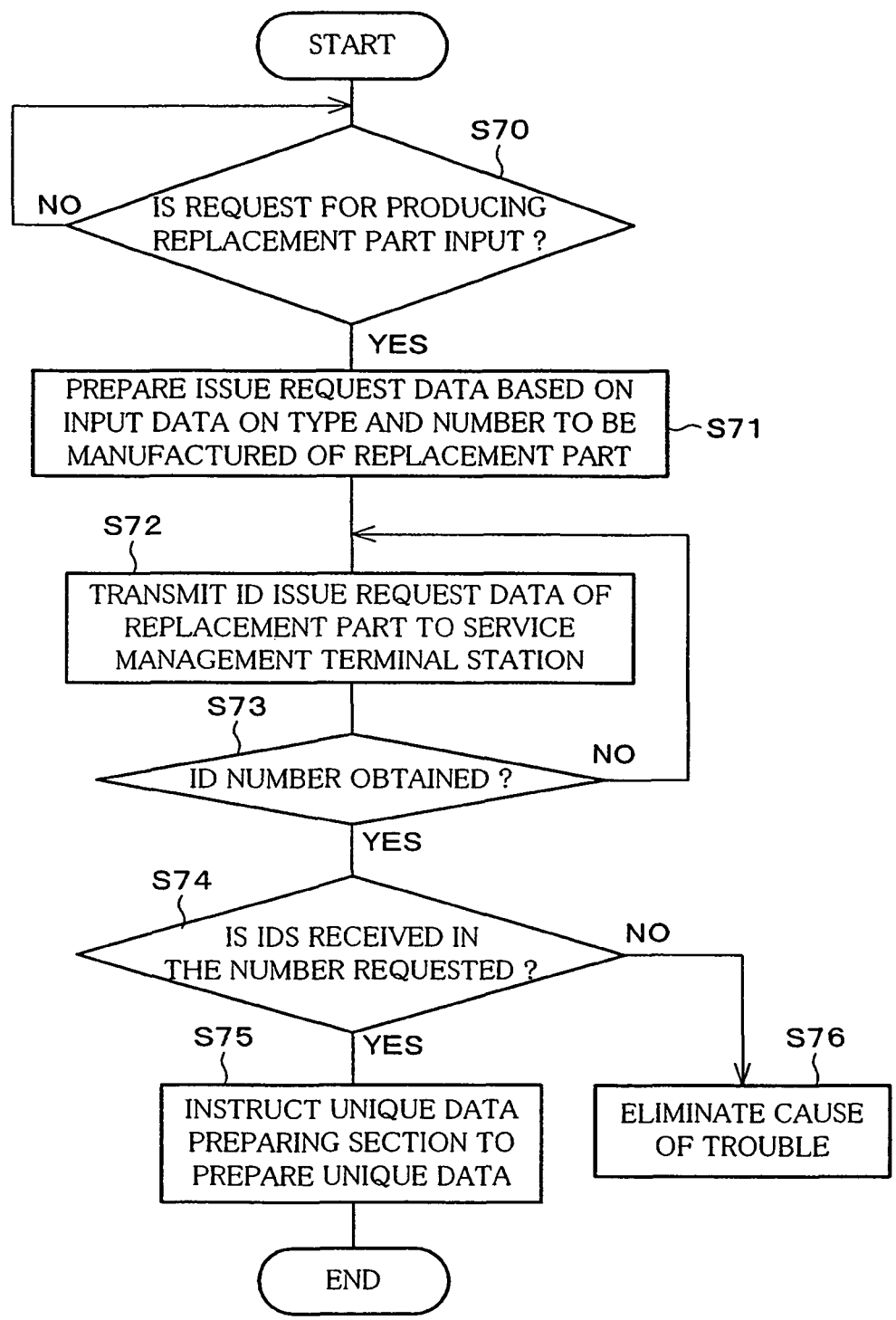
FIG. 99 is a flowchart showing ID number creating process executed by a control terminal station of a contract signer.

FIG. 99 shows an example of the flow of processes to be performed by the arithmetic processing section 22 at the terminal station 300 of the contract signer 1. In the following, the processes in respective steps (hereinafter referred to as S) will be explained according to order.

[S70]

The arithmetic processing section 22 observes if a request order for the replacement part 6 has been input to the terminal station 300. If so, a sequence goes to S71. As described earlier, the input means may be the input section 23 or the transmitter/receiver 21. In the case of adopting the input section 23 as the input means, the operator of the terminal station 300 manually inputs based on an instruction for the production request. On the other hand, in the case of adopting the transmitter/receiver section 21 as the input means, a further instruction is given via a network 31 from the terminal station (not shown) in response to the production request.

[S71]

The arithmetic processing section 22 checks if the data indicative of the type of the replacement part 6 and the data indicative of the number to be manufactured have been input. If not, a request for input is issued again, and the data indicative of the type of the replacement part 6 and the data indicative of the number of replacement part to be manufactured are obtained, thereby preparing issue request data.

[S72]

Next, an ID number issue request is transmitted with respect to the replacement part 6 from the transmitter/receiver 12 to the terminal station 12 of the service provider 12. As described, the ID number issue request data specifically indicates the data indicative of the type of the replacement part 6 and the number of ID numbers to be allocated to the replacement parts 6.

[S73]

It is then checked if a response to the ID number issue request is received from the terminal station 12, i.e., if an ID number as issued is received. If so, a sequence goes to S74. If not, on the other hand, a sequence goes to S74, and an issue request is transmitted once again. In this way, a problem associated with a trouble on communication is liable to be solved. Here, it may be arranged so as to go on to the step of investigating the reason for delay in issuing ID as will be explained later.

[S74]

Upon receiving a response in S73, the number of ID numbers subjected to issue request is compared to the ID number issued in response to the request to see if they are identical in S74. As a result of this comparison, if they are identical, if they are identical, a sequence goes to S75. If not, on the other hand, a sequence goes back to S76. Although not essential, it is convenient to perform the foregoing process in S74 in order to execute the operation under stable condition.

[S75]

As a result of comparison in S74, if the number of ID numbers subjected to issue request is identical with the ID number issued in response to the request, an instruction is given from the arithmetic processing section 22 to the unique data preparing section 26 to form the unique data on the container 60. The data to be transmitted from the arithmetic processing section 22 to the unique data preparing section 26 includes a permission signal for permitting the formation of the unique data, the unique data obtained in S73. In the case of adopting the container 60 provided with a sensor for detecting the position in which unique data can be formed or an IC chip 61, the arithmetic processing section 22 inputs in the IC chip 61 data from a sensor for detecting if a connector for writing the unique data is connected, and the transmission timing for the data from the unique data preparing section 26 is adjusted according to the condition of the container 60.

Additionally, in the case where the unique data preparing section 26 is separately provided from the terminal station 300 as a unique data preparing unit, the data is transmitted to the unique data forming section via the network 31.

[S76]

On the other hand, if it is determined in S74 that the number of ID numbers subjected to issue request is not identical with the ID number issued in response to the request, the associated problem is solved in this step.

For example, a method of once cancelling all the ID numbers as received, and reissuing an accurate number of ID numbers. According to the foregoing method, upon receiving a withdrawal request message from the terminal station 300, it is required for the terminal station 12 to perform the process for setting the corresponding ID number once issued invalid. If the foregoing step is not performed, the ID number actually issued becomes greater than the number of ID numbers requested, which would result in an overcharging for the issue of the ID numbers, and thus an accurate calculation of an account may not be ensured.

Alternatively, it may be arranged so as to issue an issue order only for the numbers in shortage. This method is effective when transmitting each ID number except for the case where because a large number of ID numbers are issued, and a great amount of data needs to be transmitted, the data is divided into plural pieces and the data is transmitted piece by piece to suppress an amount of data to be transmitted in one time.

On the other hand, in the case where a greater number of IDs than requested are received in S73, it is very likely that this problem occurred due to an error on the side of the service provider 10, and it is possible to take an appropriate action by inquiring the service provider 10 for the clarification of this matter, for example, by telephone. In any case, if the number of IDs actually received differs from the number ordered, the contract signer 1 should inform that to the terminal station 12 of the service provider 10. As a result, for example, if the terminal station 300 cannot receive the IDs in the number as requested despite that the ID numbers issued and transmitted according to the number as requested, the terminal station 12 can recognize that the IDs could not be received as requested due to an occurrence of a communication error.

In order to solve the foregoing problem, i.e., the number of IDs actually received differs from the number ordered, the following structure may be adopted. That is, depending on whether i) the number of IDs actually received is smaller than the number ordered or ii) greater than the number ordered, a corresponding error signal is transmitted from the terminal station 300 to the terminal station 12. Upon receipt of the error signal, the arithmetic processing section 122 at the terminal station 12 makes an analysis on the received error signal to recognize the type of error, and takes a necessary action to solve the error. It may be further arranged such when the terminal station 12 receives the IDs in the number as requested, a confirmation signal for the receipt of the IDs is transmitted from the terminal station 300 to the terminal station 12. In this case, when the terminal station receives the confirmation signal, the process of issuing the ID numbers at the terminal station 12 is completed.

(Process of Issuing ID Number)

Figure 100:
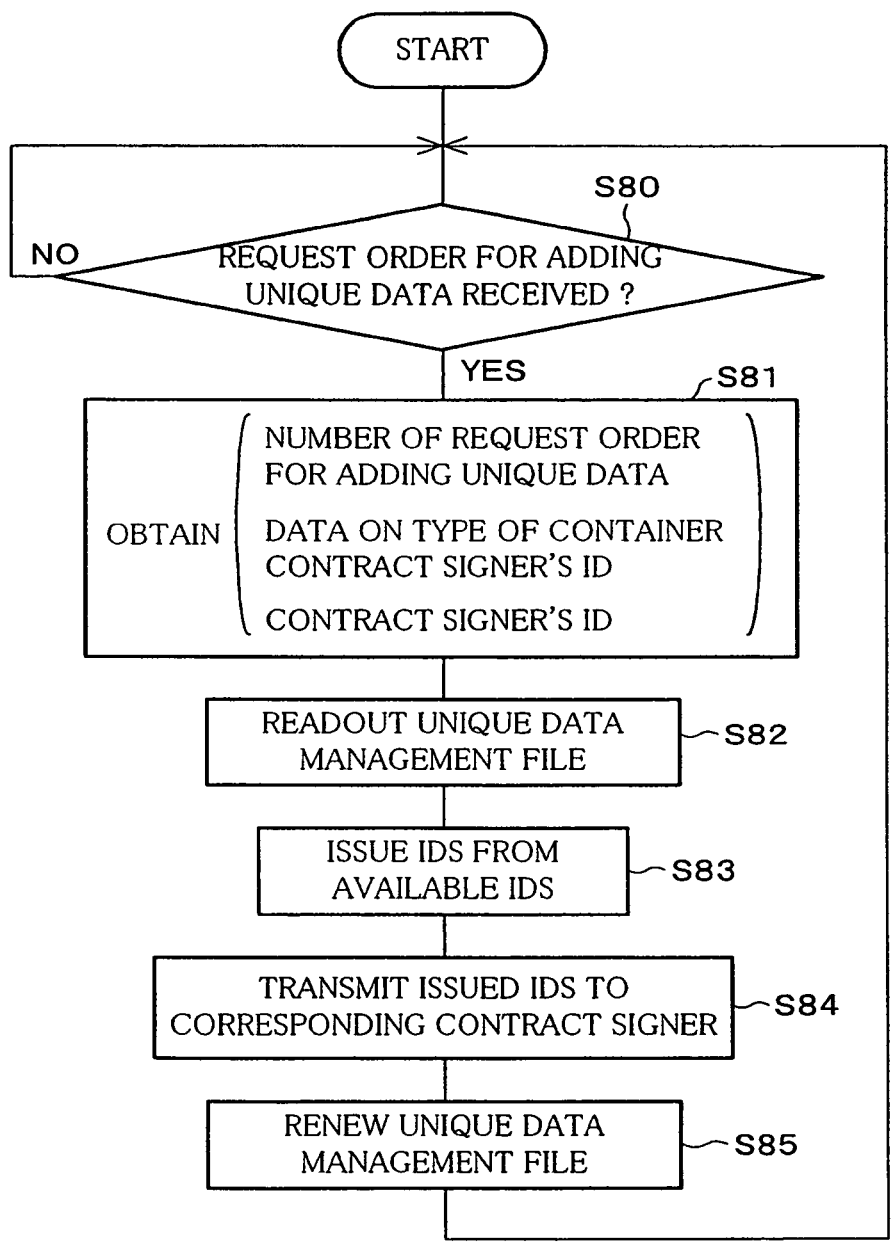
FIG. 100 is a flowchart showing ID number issuing process executed by a control terminal station of a service provider.

FIG. 100 shows one example of an ID number issuance process performed by the arithmetic processing section 122 at the terminal station 12 of the service provider 10. In the following, the content of each step will be explained.

[S80]

In this step, an issuance of a request order for adding unique data is received. Specifically, the arithmetic processing section 122 determines if the data as input via the communications section 121 or the input section 123 contains the data indicative of a request for adding unique data.

For example, when the communications section 121 receives any message, the message as received is analyzed by the arithmetic processing section 122. Specifically, for example, when the communications section 121 receives a message indicative of a request for issuing the ID numbers, the arithmetic processing section 122 recognizes from the first section of the message that the message is an "ID number issue request".

[S81]

Upon confirming in S80 the receipt of the ID number issue request, the content of the ID number issue request is further determined in order, i.e., identifying the contract signer 1 of the requester, the container 60, and the number ordered. For example, upon receiving the issue request message "A|1 0 100 2 00|75|000001", explained earlier, the arithmetic processing section 122 recognizes that for the container 60 of the quasi-original magenta toner cartridge for the digital copying machine BL-2000, the "company A" requested for the issuance of the IDs in the number of "75".

[S82]

Then, based on the data indicative of the type of the container 60 obtained in S81, the arithmetic processing section 122 reads out the ID issue management file on the corresponding container 60 from the memory section 124 as shown in FIGS. 93(a) to 93(c). The files stored in the memory section 124 are prepared according to the model types of the container 60, each of which includes columns for "ID number to be issued", "date of issue", and "issue requester". The example shown in FIGS. 93(a) to 93(c) is given through the case of the quasi-original magenta toner cartridge for the digital copying machine BL-2000.

[S83]

Next, the process of issuing the IDs in the number as requested from the available IDs. In this process, first, the ID numbers previously issued are searched in reference to the ID issue management file. In FIGS. 93(a) to 93(c), a column for "mark data" is formed to facilitate a quick search of the ID issue start number. In the example of FIG. 93(a), the mark is positioned in the top line, and ID issue start number is "|101002|00000001".

Here, the ID issue start number can be searched by detecting the youngest ID number among those with which columns for "the date of issue" and "the requester" have not been input.

FIG. 93(b) shows the recorded data indicating that the ID numbers have been issued in the number of 75 to the contract signer 1 whose ID number is "000001" upon his request. Here, the foregoing mark signal is moved to the ID number next to the most currently issued ID number.

FIG. 93(c) shows the recorded data indicating that the ID numbers have been issued in the number of 20 to the contract signer 1 whose ID number is "000125" upon his request after issuing the ID numbers shown in FIG. 93(b).

Then, the ID numbers issued in the above steps are transmitted from the terminal station 12 to the terminal station 300 of the contract signer 1.

In the following, an ID number issue notice message will be explained in reference to an example shown below:

B|10100200000001:10100200000075.

The ID number issue notice message is composed of two sections. The first section indicates the type of message, B=ID number issue notice in the above example. The last section indicates an ID number as issued.

In the present embodiment, for ease in controlling the ID numbers, the ID numbers are issued in the serial numbers, and therefore, the contract signer 1 of the requester is informed of only the first ID number (10100200000001) and the last ID number (10100200000075). In the foregoing message, ":" indicates the segmentation between the first ID number and the last ID number. According to the foregoing method, an amount data to be transmitted for informing the contrast signer 1 of the requestor of the ID numbers can be reduced, and thus the process load and the network load of the terminal stations 300 and 12 can be significantly reduced.

It should be noted here that the ID numbers to be issued from the terminal station 12 are not necessarily be serial as long as not being overlapped with each other, all the data on the ID numbers as issued may be transmitted. This method of transmitting the data on the ID numbers is disadvantageous in that the process load and the network load of the terminal stations 300 and 12 compared with the former method adopted in the present embodiment, but advantageous in that the possibility that a third person other than the service provider 10 to obtain the ID numbers can be reduced, and such problem that the third person uses the ID number without permission is less likely to occur.

Further, in order to clarify that to which request message, the notice message is transmitted, the notice message may be transferred together with the data on the transmission time or receiving time. As a result, in the case of receiving a plurality of ID issue request messages for the container 60 of the same model from the same contract signer 1, the respective notice messages correspond to which request messages can be clarified.

[S85]

Upon completing the process of transmitting the ID number in S84, the recorded data in the ID issue management file is updated to be transmitted to S80. Namely, regarding the column "mark data", the mark signal is moved to the ID number next to the most currently issued ID number, and for the ID number, the issue date is filled in the column "issue date", and the ID number of the ID number of the requestor is filled in the column "ID issue requester" Please note here that the file updating process in S85 may be performed parallel to the ID number issue process.

(Finishing Process of Replacement Part)

This finishing process of the replacement part includes the process of obtaining the ID number from the service provider 10 and the process of writing the obtained ID number in the IC chip 61 of the container 60, the process of placing toner in the container 60, etc.

First, the terminal station 300 of the contract signer 1 receives a message to be transmitted from the service provider 10 and makes an analysis on the received message. Specifically, the terminal station 300 of the contract signer 1 recognizes from the data in the first section that the received message is the "ID number issue notice". This determination process corresponds to the process content in S73 explained in reference to FIG. 99.

Next, the ID number as issued is detected from the second section. In this case, the ID numbers as issued are 75 ID numbers of from 1010020000001 to 10100200000075. This ID number detection process partially corresponds to the process content in S74 explained in reference to FIG. 99.

Next, the ID number is prepared for the corresponding ID number. In the following, the contents of the process in S75 shown in FIG. 99 will be explained. Namely, the connector (not shown) of, the unique data preparing section 26 is connected to the IC chip 61 of the container 60, and one of the ID numbers provided from the service provider 10 (for example, 00100200000001) is written in the IC chip 61. Here, by the arithmetic processing section 22, a writing timing for the unique data preparing section 26 is controlled.

Upon completing a preparation of an ID number, the connector is taken out of the container 60, and the container 60 is transported by a belt conveyer to the position for placing therein toner by a belt conveyer, etc., and the container 60 is then filled with toner, thereby completing the replacement part 6.

On the other hand, the separately provided container 60 is connected to the connector of the unique data preparing section 26, and the ID number (for example, 00100200000001) which is supplied from the service provider 10 and is not identical with any of the ID number previously used in the IC chip 61 of the container 60 is prepared. The foregoing process is repeated for the number of ID numbers issued.

Here, the arithmetic processing section 22 at the terminal station 300 controls the used ID number and the unused ID number so that the same ID numbers are not used among a plurality of containers 60.

FIG. 94 shows one example of the ID number management file (ID number issue management list). For example, it may be arranged so as to record the ID issue date and time in the column "ID issue date and time" for the used ID number, and based on whether or not this column has been filled, it is determined if the ID number has been used. The example shown in FIG. 94 is given through the case where the status of the post process (filling toner, packaging, wrapping, transporting, etc.), can be managed. In this example, it is therefore possible to adjust the ID preparation time depending on the status of the post process. For example, in an event that a trouble occurs in the process of placing toner in the containers 60, if a continuing of the preparation of IDs may result in a significant increase in the number of containers 60 to which the IDs are formed without being filled with toner, the preparation of IDs can be stopped temporarily by forming a wait-time for the standard ID.

As described, the replacement part 6 finished in the foregoing manner is provided to a wholesale dealer, retailer, and a general user 7 such as a user, etc.

(Account Calculation Process)

An account calculation process will be explained in reference to FIG. 97. FIG. 97 shows an example of an account list during the period of Jun. 16, 2000 to Jul. 15, 2000 receivable from the contract signer 1 having a contract signer's ID No. 000001. The list is prepared and managed by the service provider 10. However, the contract signer 1 is permitted to refer to the list only for his own information. Specifically, the contract signer 1 can access to the list by air mail for hard copy, and from the terminal station 300 for the electric file.

A list is prepared in every predetermined account period for each contract signer 1, and the list as prepared is stored in the memory section 124 at the terminal station 12 as an electric file. Among plural pieces of input data, the data on the name of container is determined at a time of making a contract, and based on the results, and the input data including the data on the name of container are input in the input section 123.

In this case, by recording data on all the containers under contract, the contract signer 1 can confirm the contract content from the accounting list (container data under contract) without the need of checking the signed contract.

Here, in the case of a large number of containers subjected to service contract, a problem arises in that if all the data are displayed irrespectively of whether or not the account is generated in that period, the number of pages in the account list increases, and the chargeable elements cannot be detected promptly. In this case, it is therefore to display only the data on the container 60 subjected to account. In the case of an electric file, it may be also arranged so as to record all the data in the file, and print out only the data on the container 60 subjected to charge when hard-copying the electric file by the printer.

In this way, the contract signer 1 can appreciate the benefits of both methods by referring to the hard-copied output data when he wishes to promptly check the chargeable elements for services, while referring to electric data when he also wishes to confirm the connect of the contract.

Delivery data such as date of delivery, number delivered, total number delivered, etc., are input by the service provider 10 by means of the input section 123 when the service provider 10 delivers the corresponding container 60 to the contract signer 1. Or, it may be also arranged such that the service person who delivers the container 60 transmits the delivery data from a portable terminal station (not shown) to the terminal station 12 via the network 30, and the arithmetic processing section 122 at the terminal station 12 performs a process of inputting data, based on the input data received by the communications section 121 at the terminal station 12.

Here, the total number of delivery indicates the total number of containers 60 obtained by adding a number currently delivered to the number in stock when the contract signer 1 already has the containers 60 in his possession at the time of delivery. In an example of FIG. 97, as the respective numbers in stock are "0", the total number of delivery is equivalent to the number currently delivered.

As described, in order to prevent the shortage of the container 60 at the contract signer 1, it may be arranged so as to ensure that the contract signer 1 has at least one container 60 in stock. In this case, the total number never can never be "0". Here, it is needless to mention that when the service is started, the total number in stock is always "0".

The ID issue data is the most characteristic data in the account calculation in accordance with the present invention. The ID issue data is used when in calculating an account based on the data on the number of IDs issued. In the example of FIG. 97, the IDs issued indicates the number of IDs issued in the period of from Jun. 16, 2000 to Jul. 15, 2000 of all the IDs issued from the service provider 10 to the contract signer 1 whose ID number is 000001. The above IDs issued can be obtained based on the ID number issue list managed by the service provider 10 shown in FIGS. 93(a) to 93(c). In this example, the number of IDs issued is displayed in the ID number issue list for each ID issue data so that the issue list can function as a specification.

Here, the total number issued is identical with the data recorded in the column "the number used".

The present invention is not intended to be limited to the structures in the foregoing preferred embodiments, and various modifications are permitted within the scope of the present invention. For example, explanations have been given through the case where the unique data to be recorded in the replacement part 6 is prepared by the contract signer 1; however, it may be arranged so as to be prepared by the service provider 10 for example as follows. That is, upon receiving an ID number issue request from the service contract signer 1, the service provider 10 forms the data on the contract signer and the ID number of the container 60 as shown in FIGS. 95(a) and 95(b), and the container 60 having formed thereon the unique data is delivered to the contract signer 1.

The foregoing method is advantageous in that a unique data preparing section is not necessarily provided in each contract signer 1. Further, the contract signer 1 needs not perform a process of preparing unique data nor a process of recording the resulting unique data. However, this method is disadvantageous in the following point. In order to apply a new service regarding the accounting system according to the stock management and the number of use of the containers 60 at the contract signer 1, it is required to separately determine if a container 60 is used (chargeable) or unused, and it is also required for the service provider 10 to guarantee that the finished container 60 is delivered to the contract signer 1 that the finished container 60 surely delivered to the corresponding contract signer 1, which require a large burden. Therefore, the method as explained in the foregoing preferred embodiment is believed to be the most effective method.

As described, in the case where the service provider 10 is a manufacturer of the replacement part 6 who produces the replacement part 6 in a captive factory and delivers the resulting in-house product 6 to the general user 7 as an original product, or the case where the service provider 10 is a commission distribution manager for the replacement part 6 (original product), by developing the service management system using the image forming apparatus and the terminal station, it becomes possible for the service provider 10 to provide the replacement part 6 used in the image forming apparatus to the general user 7 according to the management of the number of inventory in stock at the general user 7, and the number of the replacement parts 6 used by the general user 7.

In the foregoing preferred embodiment, for the terminal station 12 of the service provider 10, the service management terminal station with respect to the contract signer 1 is adopted; however, it may be arranged so as to separately provide a terminal station for the general user 7. In this way, for example, in order to maintain the service management with respect to the contract signer 1, even if the service management terminal station for the contract signer 1 stops operating, adverse effect in providing other service management with respect to the general user 7 can be prevented.

In the foregoing preferred embodiment, explanations have been given through the case of developing the service management system between the service provider 10 and the general user 7; however, it may be arranged so as to develop a service management system between the contract signer 1 and the general user 7, and further to provide the terminal station of the same structure as the terminal station 12 on the side of contract signer 1, so that the contract signer 1 provides the services for the management of the inventory and the accounting system with respect to the quasi-original product as the replacement part 6 provided from the contract signer 1 to the general user 7.

In the foregoing management method of a replacement part of the present invention, it is preferable that the step of making an access to the management file be executed according to the number of container used transmitted from the customer, and that the step of informing the customer of the unique data read out from the management file be performed.

According to the foregoing arrangement, it is possible for the manager who executes the management method of a replacement part to focus on a job of delivering a container beforehand without applying thereto unique data to a customer, and a job of managing the unique data. Namely, the manager can omit the process of applying unique data to the container such as a step of applying unique data to the container by recording the unique data in the IC chip, or applying unique data to the container by printing out the unique data in bar codes. As a result, work load of the manager or management load for an operation of forming unique data on the container can be reduced.

As described, the management method of a replacement part of the present invention is characterized by further including the step to be executed on the computer of: calculating an account chargeable to the customer according to a number of times the step of informing the customer of unique data read out from the management file is performed.

According to the foregoing method, the unique data is applied only to the container which the customer actually uses, and thus the customer is charged only for the container the customer actually uses. As a result, a reasonable service with which a container in stock is always in customer's possession, without being charged for unused container.

As described, the management method of a replacement part of the present invention for a replacement part composed of an expendable and a container for storing the expendable, is characterized by including the steps of:

i) preparing issue request data for use in informing a container manager who manages the distribution of the container of an issue of unique data to be applied to each container for its identification; and ii) outputting unique data received from the container manager based on the issue request data to a unique data preparing section for preparing unique data to be applied to each container.

With the foregoing issue request data, it is possible to inform the issue of unique data to be applied to each container to the container manager who manages the circulation of the container. Further, by outputting the unique data informed from the container manager to the unique data preparing section, it is possible to apply unique data to each container.

As a result, the replacement part can be circulated in the state with the unique data is applied to the container, and thus the replacement part can be distinguished from an imitative product without its unique data applied thereto. As explained earlier, it is therefore possible to increase the quantity of original or quasi-original replacement part whose function and quality are guaranteed. As a result, a likelihood for a general consumer to purchase a replacement part whose function and quality are not guaranteed by mistake can be reduced. Further, it is possible to reduce or eventually eliminate from the market an imitative or low quality replacement part. Further, this leads to an increase in demand for containers, and the manufacturer of the container can appreciate the resulting increase in profit.

The container manager of the present invention may be a manufacturer of a container, a manufacturer who produces an expendable and a container, or a commission distribution manager of a container or a replacement part.

The management device for a replacement part of the present invention is characterized by further including:

informing means for informing a customer, who possesses at least one used container, of unique data issued, according to a number of used containers; and calculation means for calculating an account chargeable to the customer, according to the number of used container whose unique data has been reported to the customer.

According to the foregoing method, the unique data is applied only to the container the customer actually uses, and thus the customer is charged only for the containers the customer actually uses. As a result, a reasonable service with which a container in stock is always in customer's possession, without being charged for unused container.

As described, the management device of a replacement part of the present invention for a replacement part composed of an expendable and a container storing the expendable is characterized by including:

issue request data preparation means for preparing issue request data for informing a container manager, who manages the distribution of containers, of an issue of unique data to be recorded on each container for identifying respective containers; and unique data processing means for outputting unique data received from the container manager based on issue request data to a unique data preparing section for preparing unique data to be applied to each container.

With the foregoing issue request data, it is possible to inform the issue of unique data to be applied to each container to the container manager who manages the circulation of the container. Further, by outputting the unique data informed from the container manager to the unique data preparing section, it is possible to apply unique data to each container.

As a result, the replacement part can be circulated in the state the unique data is applied to the container, and thus the replacement part can be distinguished from an imitative product without having unique data applied thereto. As explained earlier, it is therefore possible to increase the quantity of original or quasi-original replacement part whose function and quality are guaranteed. As a result, a likelihood that a general consumer who purchases a replacement part whose function and quality are not guaranteed by mistake can be reduced. Further, it is possible to reduce or eventually eliminate the market in which an imitative or low quality replacement part is available. Further, this leads to an increase in demand for containers, and the manufacturer of the container can appreciate the resulting increase in profit.

Here, the issue request data includes the data identifying a requester, the data indicative of the number of containers subjected to issue of unique data. The informing method of the present invention is not particularly limited, and it may be arranged so as to print out to be sent by facsimile or air mail, but preferably arranged so as to inform the issue request data to the container manager by means of communication means in view of transmission speed and efficiency.

The container manager of the present invention may be a manufacturer of a container, a manufacturer who produces an expendable and a container, or a commission distribution manager of a container or a replacement part.

The management method of a replacement part of the present invention may be arranged so as to include the steps of i) registering delivery data on a container to be supplied to a supply manufacturer; ii) obtaining number of pieces of unique data requested from the supply manufacturer; issuing unique data according to the number of pieces of unique data requested; informing the unique data to the supply manufacturer; and calculating an account according to the number of unique data issued.

According to the foregoing method, it is possible for a third person other than the manufacturer who sells original products to manufacture or sell toner cartridges using containers having equivalent functions as toner cartridges circuited in the market a original product, and it is therefore possible to prevent deterioration of the original container due to respective use, or unfair use of imitative containers.

For the manufacturer who sells an original product, the volume of sales of supplies as a whole such as a toner cartridge, etc., can be boosted, and consequently, an increase in demand for an apparatus main body such as an image forming apparatus to which the supplies are mounted can be expected. Moreover, for the user of the apparatus, since not only exclusive sales of original products by the manufacturer available at relatively high price, but also supplies manufacture and sold by the third person whose quality of a container portion is guaranteed, are available, which accelerates a free competition market. As a result, a wider selection becomes available for the user, and the effect of eliminating power quality products can be achieved.

According to the accounting system of the present invention, an account is calculated based on the number of unique data issued, such as ID number, etc., and it is therefore possible to establish a service system which delivers a container beforehand with respect to the replacement part end manufacturer (contract signer) who obtains a container and sells a toner cartridge having toner filled in the container.

As a result, on the side of the service receiver, the termination of the production and sales of the replacement part due to a shortage of the container can be prevented without the need of performing an inventory control of the container on the side of the service receiver. Moreover, by arranging so as to perform inventory control of the container by the service provider, the operation to be performed by the replacement part end manufacturer can be simplified without the need of performing inventory control.

The manufacturing method of the present invention for a replacement part composed of an expendable and a container for the expendable, is characterized by including the steps of:

informing a manufacturer of a container of a number of issue request of unique data to be applied to the container;

obtaining unique data from the manufacturer of the container;

applying unique data supplied from the manufacturer of the container to the container; and filling the expendable into the container having applied thereto the unique data.

According to the foregoing method, by purchasing the container and placing therein toner as expendable, an original container supplied from the manufacturer of the original product becomes available for the replacement part end manufacturer, and a trouble associated with the container portion can be prevented.

The replacement part management device of the present invention may be arranged so as to include: a memory section for registering a delivery data of the container to be delivered to a supply manufacturer;

an input section for inputting a number of request for an application of unique data given from the supply manufacturer; and an arithmetic processing section for issuing ID number according to the number of request for an application of unique data given from the supply manufacturer.

According to the foregoing management device, the arithmetic processing section calculates an actual number of container used by taking in the number of request for an application of unique data input via the input section and issuing an ID number(s) in the requested number. As a result, it is possible to unitary manage a new service system of not charging for unused container delivered beforehand, but charging only for the actually used replacement part.

The management network system of the replacement part of the present invention may be arranged so as to include the first group composed of a terminal station which includes: a transmitter/receiver section for requesting an issue of unique data to be applied to a container; a unique data input section for obtaining unique data; and an arithmetic processing section for instructing unique data obtained to be applied to the container; and a second group composed of a terminal station which includes: a communications section for communicating with the first group; a first memory section for registering therein delivery data of the product in circulation in the first group; an input section for inputting the current state of use of the product-in-circulation; and an accounting section for calculating an account based on the number of unique data applied out of the number of product-in-circulation delivered.

According to the above network structure, the management method of the present invention can be realized by using IT techniques such as network system, and IC chip, etc. Namely, a purchase action can be determined based on the issue request of the ID number in the first group, i.e., based on the fact of issuing ID number. The unique data input section corresponds to the transmitter/receiver section or the input section at the terminal station, and the unique data may be input from the network by the transmitter/receiver section, or input from the input section. The former case is advantageous in view of data transmission speed, but it is possible that the data is leaked out. The latter case, on the other hand, is not suited for high speed transmission; however, it is less likely that the problem of leaking out of the data occurs.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

The invention claimed is:

1. A service management method of a service management device which is connected to an apparatus detachably provided with a product-in-circulation to be consumed or used up and which includes a storage section, a communications section and an arithmetic processing section, the product-in-circulation having unique data identifying each product-in-circulation:

the storage section storing a management table corresponding to a service receiver identification (ID) of a service receiver, the management table storing a relation between unique data of a product-in-circulation delivered to the service receiver and data of a current state of use of the product-in-circulation, the unique data of a product-in-circulation delivered to the service receiver specifying a product-in-circulation delivered to the service receiver and including a relation among data of the kind of the product-in-circulation, data of a model type of the apparatus, and individual data of the product-in-circulation, and data of a current state of use of the product-in-circulation specifying a current state of use of the product-in-circulation by the service receiver as recorded when occasion demands;

the service management method comprising the steps of:

the communications section receiving, from the apparatus, (i) unique data of a product-in-circulation attached to the apparatus as unique data of a product-in-circulation which is in use of a service receiver and (ii) a service receiver ID of the service receiver, the unique data of a product-in-circulation attached to the apparatus including data of the kind of the product-in-circulation, data of a model type of the apparatus, and individual data of the product-in-circulation;

the arithmetic processing section reading out, from the storage section, the management table corresponding to the service receiver ID received by the communications section and data of a current state of use of a product-in-circulation corresponding to the unique data of a product-in-circulation received by the communications section, and when there is a product-in-circulation whose data of a current state of use is "new (spare)", updating data of a current state of use of a product-in-circulation whose data of the kind and data of a model type of the apparatus are equal to those of the product-in-circulation from "in use" to "used" and updating the data of a current state of use of the product-in-circulation whose data of a current state of use is "new (spare)" to "in use" and causing the updated data to be stored in the storage section; and the arithmetic processing section reading out from the management table an actual amount of the product-in-circulation whose data of a current state of use is "used" or "in use" in the management table and which is consumed by the service receiver, which can be considered as a purchase, and calculating an account chargeable to the service receiver based on the amount of the product-in-circulation consumed read out.

2. The service management method as set forth in claim 1, wherein:
the management table further stores a relation between (i) the unique data of the product-in-circulation and the data of a current state of use of the product-in-circulation and (ii) date-of-delivery data indicative of a date of delivering of the product-in-circulation to the service receiver, and
the service management method further comprising the step of the arithmetic processing section specifying as an unused product-in-circulation to be collected, from the service receiver, a product-in-circulation whose data of a current state of use is "new (spare)" and whose date-of-delivery data indicates a date falling in a collection period among products-in-circulation delivered to the service receiver.

3. A service management device, connected to an apparatus detachably provided with a product-in-circulation to be consumed or used up, the product-in-circulation having unique data identifying each product-in-circulation, the service management device comprising:
a storage section for registering data on a product-in-circulation to be delivered to a service receiver, the storage section storing a management table corresponding to a service receiver identifier (ID) of the service receiver and the management table storing a relation between unique data of a product-in-circulation delivered to the service receiver and data of a current state of use of the product-in-circulation, the unique data of a product-in-circulation delivered to the service receiver including a relation among data of the kind of the product-in-circulation, data of a model type of the apparatus, and individual data of the product-in-circulation;
a communications section for detecting the current status of use of the product-in-circulation via a network, the communications section receiving, from the apparatus, (i) unique data of a product-in-circulation, attached to the apparatus as unique data of a product-in-circulation which is in use of a service receiver and (ii) a service receiver ID of the service receiver, the unique data of a product-in-circulation attached to the apparatus including data of the kind of the product-in-circulation, data of a model type of the apparatus, and individual data of the product-in-circulation; and
an arithmetic processing section for calculating an account based on an amount of the product-in-circulation consumed out of an amount of the product-in-circulation delivered, the arithmetic processing section reading out from the storage section, the management table corresponding to the service receiver ID received by the communications section and data of a current state of use of a product-in-circulation corresponding to the unique data of a product-in-circulation received by the communications section, and when there is a product-in-circulation whose data of a current state of use is "new (spare)", updating data of a current state of use of a product-in-circulation whose data of the kind and data of a model type of the apparatus are equal to those of the product-in-circulation from "in use" to "used" and updating the data of a current state of use of the product-in-circulation whose data of a current state of use is "new (spare)" to "in use" and causing the updated data to be stored in the storage section and calculating an account for the product-in-circulation whose data of a current state of use is "used" or "in use" in the management table.

4. The service management device as set forth in claim 3, wherein:
the arithmetic processing section calculates the number of products-in-circulation whose data of a current state of use in the management table is "new (spare)", compares a result of the calculation with a specified value, and when the number of products-in-circulation whose data of a current state of use is "new (spare)" is equal to or less than the specified value, issues an instruction to dispatch a new product-in-circulation to the service receiver.

5. The service management device as set forth in claim 3, wherein:
the arithmetic processing section reads out data of a current state of use corresponding to the received unique data of a product-in-circulation, and when there is no product-in-circulation whose data of a current state of use is "new (spare)" and there is a product-in-circulation whose data of a current state of use is "in use" the arithmetic processing section does not update data of the current state of use of the product-in-circulation.

6. The service management device as set forth in claim 3, further comprising:
a list memory section for storing a list of products-in-circulation which can be delivered to the service receiver, the list being accessible from an outside.

7. A service management network system, comprising:
a service management device as set forth in claim 3; and
the apparatus, including:
a read-out section for reading out, from a product-in-circulation, unique data of the product-in-circulation, and
a transmission section for transmitting, to the communications section of the service management device,
(i) the unique data of a product-in-circulation read-out by the read-out section as unique data of a product-in-circulation in use of the service receiver, and
(ii) a service receiver identifier (ID) of the service receiver.

8. The service management network system as set forth in claim 7, wherein when a product-in-circulation is installed to the apparatus, the read-out section of the apparatus reads out, from the product-in-circulation, unique data of the product-in-circulation.

9. The service management network system as set forth in claim 7, wherein the apparatus further includes
an arithmetic section including a memory section which stores the unique data of a product-in-circulation read out by the read-out section and a comparing section which compares unique data most currently read out by the read-out section with unique data already stored in the memory section, and
a controller section for, when the unique data most currently read out by the read-out section is different from the unique data already stored in the memory section, updating data stored in the memory section to the unique data most currently read out by the read-out section.

10. The service management network as set forth in claim 7, wherein the apparatus is an image forming apparatus.

11. A non-transitory computer-readable storage medium for storing a service management program for causing a computer to carry out the steps of a service management method as set forth in claim 1.

* * * * *